US012468881B2

(12) United States Patent
Dvorak

(10) Patent No.: US 12,468,881 B2

(45) Date of Patent: Nov. 11, 2025

(54) METHODS AND SYSTEMS FOR CONNECTING A SPREADSHEET TO EXTERNAL DATA SOURCES WITH ORDERED FORMULAIC USE OF DATA RETRIEVED

(71) Applicant: Adaptam Inc., Palo Alto, CA (US)

(72) Inventor: Robert E. Dvorak, Portola Valley, CA (US)

(73) Assignee: Adaptam Inc., Palo Alto, CA (US)

( * ) Notice: Subject to any disclaimer, the term of this patent is extended or adjusted under 35 U.S.C. 154(b) by 0 days.

(21) Appl. No.: 18/642,610

(22) Filed: Apr. 22, 2024

(65) Prior Publication Data

US 2024/0362407 A1 Oct. 31, 2024

Related U.S. Application Data

(63) Continuation of application No. 18/084,469, filed on Dec. 19, 2022, now Pat. No. 11,966,691, which is a continuation of application No. 17/347,436, filed on Jun. 14, 2021, now Pat. No. 11,531,809, which is a continuation of application No. 16/191,402, filed on Nov. 14, 2018, now Pat. No. 11,036,929.

(Continued)

(51) Int. Cl.
*G06F 40/18* (2020.01)

(52) U.S. Cl.
CPC .................................... *G06F 40/18* (2020.01)

(58) Field of Classification Search
None
See application file for complete search history.

(56) References Cited

U.S. PATENT DOCUMENTS 5,815,421 A 9/1998 Dulong et al.
5,983,268 A 11/1999 Freivald et al.

(Continued)

OTHER PUBLICATIONS

Mynda Treacy, Excel VLOOKUP Multiple Sheets, Nov. 21, 2012, My Online Training Hub, pp. 1-7 (Year: 2012).

(Continued)

*Primary Examiner* — Howard Cortes
(74) *Attorney, Agent, or Firm* — HAYNES BEFFEL & WOLFELD LLP; Ernest J. Beffel, Jr.

(57) ABSTRACT

The technology disclosed relates to accessing external data, including massive amounts of data stored in the cloud, in spreadsheet cells: accessing external data direct via a formulaic variable in a spreadsheet, specifying an ordered progression for the accessed external data, selectively propagating data accessed using the formulaic variable vertically or horizontally, within a propagation pattern responsive to normal A$1, $A1 and $A$1 spreadsheet conventions. Two or more external data fields, responsive to the formulaic variable, have an ordered sequence relationship that nests ordering of vectors of the propagated data; and the ordering according to the ordered sequence relationship is maintained during replication by copy and paste. In another disclosed method, the external data is generated using an implicit join of data from at least two external data sources to generate multiple adjoining vectors of spreadsheet cells of data responsive to selection parameters in the formulaic variable.

21 Claims, 85 Drawing Sheets
(82 of 85 Drawing Sheet(s) Filed in Color)

Related U.S. Application Data

(60) Provisional application No. 62/586,719, filed on Nov. 15, 2017.

(56) References Cited

U.S. PATENT DOCUMENTS

| | | | | |
|---|---|---|---|---|
| 6,038,567 | A | 3/2000 | Young | |
| 6,317,750 | B1 | 11/2001 | Tortolani et al. | |
| 6,985,895 | B2 | 1/2006 | Witkowski et al. | |
| 6,988,241 | B1 | 1/2006 | Guttman et al. | |
| 7,099,890 | B2 | 8/2006 | Cahill et al. | |
| 7,117,435 | B1 | 10/2006 | Kotler et al. | |
| 7,120,866 | B2 | 10/2006 | Kotler et al. | |
| 7,155,667 | B1 | 12/2006 | Kotler et al. | |
| 7,302,444 | B1 | 11/2007 | Dunmore et al. | |
| 7,350,141 | B2 | 3/2008 | Kotler et al. | |
| 7,370,274 | B1 | 5/2008 | Stuple et al. | |
| 7,412,645 | B2 | 8/2008 | Kotler et al. | |
| 7,506,242 | B2 | 3/2009 | Kotler et al. | |
| 7,506,243 | B2 | 3/2009 | Kotler et al. | |
| 7,523,390 | B2 | 4/2009 | Kotler et al. | |
| 7,546,533 | B2 | 6/2009 | Sareen et al. | |
| 7,549,115 | B2 | 6/2009 | Kotler et al. | |
| 7,673,227 | B2 | 3/2010 | Kotler et al. | |
| 7,702,997 | B2 | 4/2010 | Kotler et al. | |
| 7,702,998 | B2 | 4/2010 | Kotler et al. | |
| 7,810,032 | B2 | 10/2010 | Bauchot et al. | |
| 8,140,549 | B2 | 3/2012 | Barinaga | |
| 8,286,072 | B2 | 10/2012 | Chamberlain et al. | |
| 8,312,371 | B2 | 11/2012 | Ording | |
| 8,341,512 | B2 | 12/2012 | Sol et al. | |
| 8,726,143 | B2 * | 5/2014 | Simkhay | G06F 40/18 715/219 |
| 9,092,412 | B2 | 7/2015 | Salch et al. | |
| 9,239,820 | B1 | 1/2016 | Marks et al. | |
| 9,305,176 | B2 | 4/2016 | Gloski et al. | |
| 9,436,637 | B2 | 9/2016 | Kommanaboyina | |
| 9,558,232 | B1 | 1/2017 | Taylor et al. | |
| 9,727,989 | B2 | 8/2017 | Garg et al. | |
| 9,875,228 | B1 | 1/2018 | Hall et al. | |
| 9,990,349 | B2 | 6/2018 | Campbell et al. | |
| 10,019,758 | B2 | 7/2018 | Bartolucci | |
| 10,140,352 | B2 | 11/2018 | Hariharan et al. | |
| 10,409,892 | B2 | 9/2019 | Rothschiller et al. | |
| 10,579,724 | B2 | 3/2020 | Campbell et al. | |
| 10,685,174 | B2 | 6/2020 | Bastide et al. | |
| 11,036,929 | B2 | 6/2021 | Dvorak | |
| 11,423,116 | B2 * | 8/2022 | Gross | G06F 40/18 |
| 2002/0036662 | A1 | 3/2002 | Gauthier et al. | |
| 2002/0091728 | A1 | 7/2002 | Naer et al. | |
| 2002/0118221 | A1 * | 8/2002 | Hudson | G06F 9/453 715/711 |
| 2002/0169799 | A1 | 11/2002 | Voshell | |
| 2003/0009411 | A1 | 1/2003 | Ram et al. | |
| 2003/0110191 | A1 | 6/2003 | Handsaker et al. | |
| 2003/0212953 | A1 | 11/2003 | Serraf | |
| 2004/0163048 | A1 | 8/2004 | McKnight et al. | |
| 2005/0015379 | A1 | 1/2005 | Aureglia et al. | |
| 2005/0044496 | A1 | 2/2005 | Kotler et al. | |
| 2005/0044497 | A1 | 2/2005 | Kotler et al. | |
| 2006/0069635 | A1 | 3/2006 | Ram et al. | |
| 2006/0129809 | A1 | 6/2006 | Battagin et al. | |
| 2006/0131383 | A1 | 6/2006 | Battagin et al. | |
| 2007/0005635 | A1 | 1/2007 | Martinez et al. | |
| 2007/0061752 | A1 | 3/2007 | Cory | |
| 2007/0094607 | A1 | 4/2007 | Morgan et al. | |
| 2007/0136666 | A1 | 6/2007 | Khen et al. | |
| 2009/0031205 | A1 | 1/2009 | Aureglia et al. | |
| 2009/0031206 | A1 | 1/2009 | Aureglia et al. | |
| 2009/0228776 | A1 | 9/2009 | Folting et al. | |
| 2009/0282349 | A1 | 11/2009 | Olsen et al. | |
| 2010/0211862 | A1 | 8/2010 | Parish et al. | |
| 2012/0110001 | A1 | 5/2012 | Young | |
| 2013/0013994 | A1 | 1/2013 | Handsaker et al. | |
| 2013/0021377 | A1 | 1/2013 | Doll | |
| 2013/0073939 | A1 | 3/2013 | Honsowetz | |
| 2015/0015504 | A1 | 1/2015 | Lee et al. | |
| 2015/0082137 | A1 | 3/2015 | Zarpas | |
| 2015/0149893 | A1 | 5/2015 | Lukic et al. | |
| 2015/0169530 | A1 | 6/2015 | Otero et al. | |
| 2015/0169532 | A1 | 6/2015 | Otero et al. | |
| 2015/0199328 | A1 | 7/2015 | Danziger et al. | |
| 2015/0254226 | A1 | 9/2015 | Renshaw et al. | |
| 2016/0055139 | A1 | 2/2016 | Creason et al. | |
| 2016/0124932 | A1 | 5/2016 | Chen et al. | |
| 2016/0132473 | A1 | 5/2016 | Bunch | |
| 2016/0142488 | A1 | 5/2016 | Adler et al. | |
| 2016/0371249 | A1 | 12/2016 | Chilakamarri et al. | |
| 2016/0378842 | A1 | 12/2016 | Demonsant et al. | |
| 2017/0004125 | A1 | 1/2017 | Honsowetz | |
| 2017/0124046 | A1 | 5/2017 | Campbell et al. | |
| 2017/0124049 | A1 | 5/2017 | Campbell et al. | |
| 2017/0315978 | A1 | 11/2017 | Boucher et al. | |
| 2017/0339229 | A1 | 11/2017 | Miller et al. | |
| 2018/0005122 | A1 | 1/2018 | McDaid et al. | |
| 2018/0302393 | A1 | 10/2018 | Mazur | |
| 2018/0341371 | A1 | 11/2018 | Callaghan | |
| 2019/0012305 | A1 | 1/2019 | Dvorak | |
| 2019/0012306 | A1 | 1/2019 | Dvorak | |
| 2019/0340219 | A1 | 11/2019 | Schoedl | |
| 2020/0004799 | A1 | 1/2020 | Gross et al. | |
| 2020/0302013 | A1 * | 9/2020 | Stegmaier | G06F 40/18 |

OTHER PUBLICATIONS

"Parts of an Algebraic Expression", Nelson Mathematics Secondary Year Two, Cycle One, 2009, Nelson Education Ltd., 4 pages.

"Copying Formulas and using Relative and Absolute Cell References Tutorial", Mar. 16, 2016, www.teststeststests.com, pp. 1-13 (Year: 2016).

U.S. Appl. No. 16/031,379, filed Jul. 10, 2018, U.S. Pat. No. 11,354,494, Jun. 7, 2022, Granted.

U.S. Appl. No. 17/833,738, filed Jun. 6, 2021, US-2022-0300705-A1, Sep. 22, 2022, Pending.

U.S. Appl. No. 16/031,759, filed Jul. 10, 2018, U.S. Pat. No. 11,017,165, May 25, 2021, Granted.

* cited by examiner 721
711
733
714

716
726
737
718

744
745
754

782
771
793
764

787
777
778
768
Geo & Region Donation Summation
Geo
Region
Americas
EMEA
USA
Europe
Rest FIG. 26A
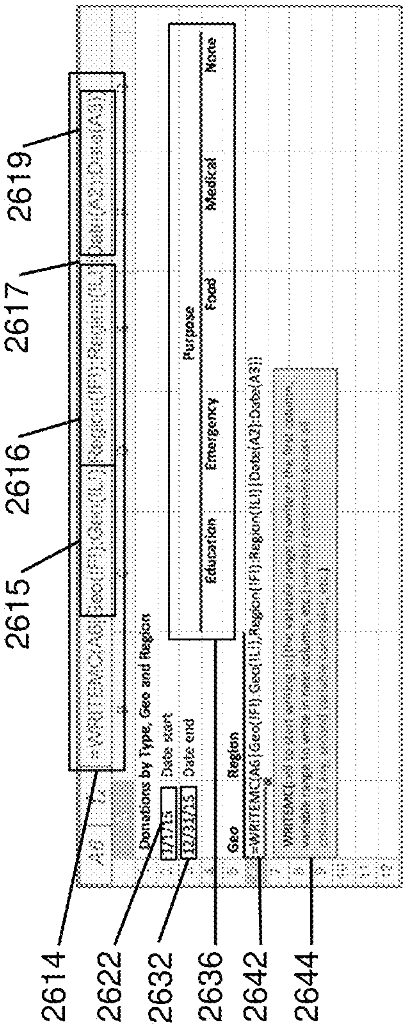
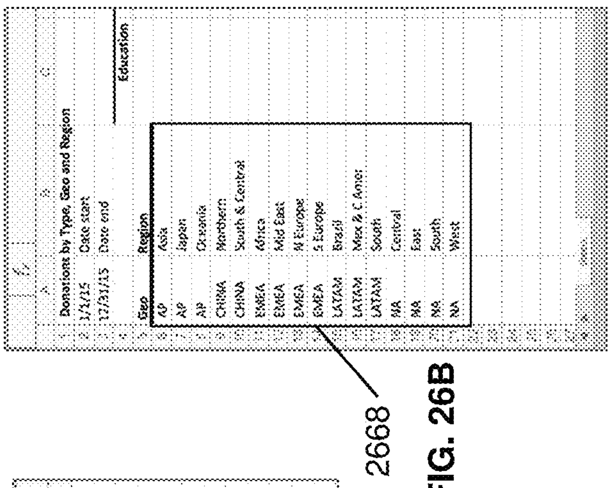
FIG. 26B
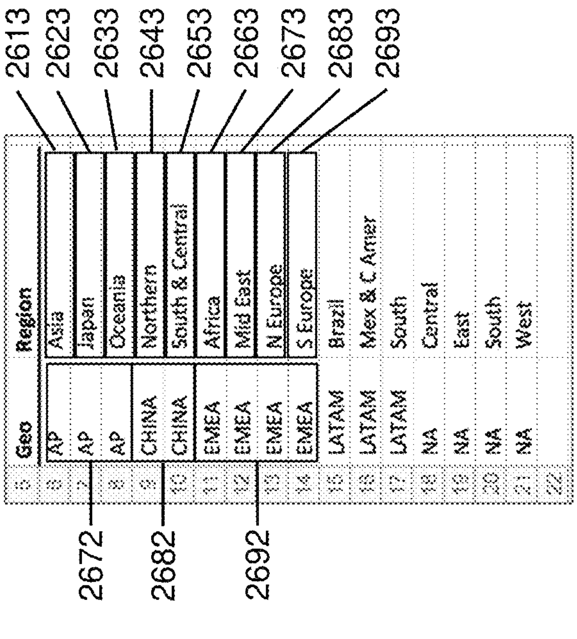
FIG. 26C
FIG. 26D
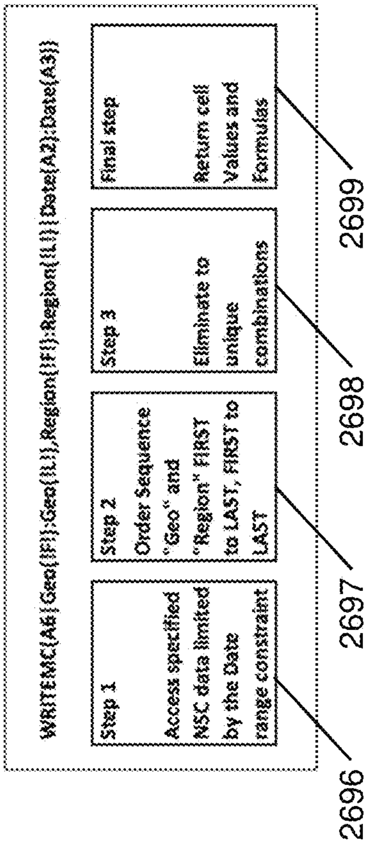

FIG. 48

=AVERAGE(Donation(Geo($B4),Region($C4),Purpose(E$3),Date(!$F$1:!$L$1),!$F$1:!$L$1)

Formulaic data in the Cloud

| Geo | Region | Purpose | Date | Donation |
|---|---|---|---|---|
| Americas | Rest | Emergency | 3/4/93 | $2,438 |
| Americas | Rest | Emergency | 3/4/93 | $3,210 |
| Americas | Rest | None | 3/4/93 | $3,764 |
| Americas | USA | Education | 3/4/93 | $9,402 |
| Americas | USA | Emergency | 3/4/93 | $12,375 |
| Americas | USA | None | 3/4/93 | $22,683 |
| Americas | Rest | Education | 3/5/93 | $4,210 |
| Americas | Rest | Education | 3/5/93 | $2,119 |
| Americas | Rest | Emergency | 3/5/93 | $4,389 |
| Americas | Rest | None | 3/5/93 | $2,360 |
| Americas | USA | Education | 3/5/93 | $10,857 |
| Americas | USA | Emergency | 3/5/93 | $8,391 |

Step 1
Access specified NSC data

| Geo | Region | Purpose | Date | Donation |
|---|---|---|---|---|
| Americas | Rest | Education | 3/5/93 | $4,210 |
| Americas | Rest | Education | 3/5/93 | $2,119 |

4855

Step 2
Order Sequence Date FIRST to LAST

| Geo | Region | Purpose | Date | Donation |
|---|---|---|---|---|
| Americas | Rest | Education | 3/5/93 | $4,210 |
| Americas | Rest | Education | 3/5/93 | $2,119 |

Step 3
Eliminate to unique Donation Date implicit values

| Geo | Region | Purpose | Date | Donation | Implicit Sum Donation |
|---|---|---|---|---|---|
| Americas | Rest | Education | 3/5/93 | $4,210 | $6,329 |
| | | | | $2,119 | |

Step 4
Calculate the average Donation

| Geo | Region | Purpose | Date | Implicit Sum Donation | [illegible] |
|---|---|---|---|---|---|
| Americas | Rest | Education | 3/5/93 | $6,329 | $6,329 |

Final step
Return the average value

| [illegible] |
|---|
| $6,329 |

4877

6762

6722

6742

6745

6738

6765

6762

6772

6775

6768

6814
6823
6824
6834
6842
6852
6862
6863
6872
6873
6884
6895

8500

METHODS AND SYSTEMS FOR CONNECTING A SPREADSHEET TO EXTERNAL DATA SOURCES WITH ORDERED FORMULAIC USE OF DATA RETRIEVED

PRIORITY APPLICATIONS

This application is a continuation of U.S. application Ser. No. 18/084,469, titled "Methods and Systems for Connecting a Spreadsheet to External Data Sources with Ordered Formulaic Use of Data Retrieved," filed 19 Dec. 2022, now U.S. Pat. No. 11,966,691, issued 23 Apr. 2024, which is a continuation of U.S. application Ser. No. 17/347,436 filed 14 Jun. 2021, now U.S. Pat. No. 11,531,809, Issued 20 Dec. 2022 which is a continuation of U.S. application Ser. No. 16/191,402, filed 14 Nov. 2018, now U.S. Pat. No. 11,036, 929, issued 15 Jun. 2021, which claims the benefit of U.S. Provisional Patent Application No. 62/586,719, filed on Nov. 15, 2017. The priority applications are hereby incorporated by reference.

RELATED APPLICATIONS

This application is related to U.S. Provisional Application No. 62/530,786, entitled, "Methods and Systems for Connecting a Spreadsheet to External Data Sources With Formulaic Specification of Data Retrieval" filed Jul. 10, 2017, U.S. Provisional Patent Application No. 62/530,794, titled, "Methods and Systems for Connecting a Spreadsheet to External Data Sources with Temporal Replication of Cell Blocks" also filed on Jul. 10, 2017 and U.S. Provisional Application No. 62/530,835, titled, "Methods and Systems for Providing Selective Multi-Way Replication and Atomization of Cell Blocks and Other Elements in Spreadsheets and Presentations" also filed Jul. 10, 2017. The related provisional applications are hereby incorporated by reference for all purposes.

BACKGROUND

The technology disclosed relates to formulaically handling large, complex data sets in spreadsheet applications, replicating spreadsheet functionality for non-spreadsheet cell data. In particular, it relates to ways for users to work with a broad spectrum of numeric and text data not stored in a spreadsheet, including data not discretely defined. The technology disclosed also relates to displaying non-spreadsheet cell (NSC) data formulas, formulaic values and numeric values in cells in consistent ways when dealing with inconsistent data or data containing errors. It simplifies spreadsheet cell handling of diverse data and its use while stepping through a progression of complicated calculations.

The technology makes it easy to work with large, complex, inconsistent and error containing data sets without having to inspect and fix the data before doing complex spreadsheet operations. It allows spreadsheet instructions to successfully handle diverse NSC data sets allowing users to reuse complicated spreadsheet formula and function operations in copy and paste settings across diverse data sets such that better, easier analysis of complicated external data sets may result.

SUMMARY

The technology disclosed relates to accessing external data in spreadsheet cells. In one implementation, a spreadsheet application includes spreadsheet cells that can use formulaically defined external data in ways that are like existing spreadsheet copy and paste and formula functions. In particular, the technology relates to a spreadsheet application that allows users to easily handle complex data inter-relationships simply through ordered data commands that sequence data retrieval and usage within spreadsheet cells. These operations work for all types of alpha, numeric, alphanumeric and date/time data whether keyed or not and whether normalized or de-normalized. These operations make it easy for users to consistently set up calculations and calculations with row and/or column headings without having to examine the data and make it easy for users to identify and even correct for missing data or inconsistent data. The commands for these operations are spreadsheet like and facilitate similar spreadsheet function, formula and copy and paste operation. These operations allow users to easily present and use complicated or non-perfect Non-Spreadsheet Cell (NSC) data in spreadsheet cells, tables, pivot tables and charts similar to how they use their current spreadsheet cell data. They also allow users to create sets of calculations with complex row and column headings which can change based on constraint (filter) values specified for the calculations. They then allow users to set up easy drill down and drill up capabilities including multiple constraints (filters). All those contents can change based on simple constraint changes much like with a pivot table filter. In this case the table headings can also dramatically change in number and content, with the constraint (filter) change.

We then show how our technology supports joining data from multiple external (e.g., cloud) data tables to create new spreadsheet-accessible formulaic data sets, to create in spreadsheet data sets and to take those joins directly into spreadsheet cell calculations. This capability then works in the spreadsheet copy and paste, heading and calculation cell filtering, pivoting, drill down and breadth of function and calculation capabilities.

Particular aspects of the technology disclosed are described in the claims, specification and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fec.

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 26A FIG. 26B, FIG. 26C and FIG. 26D example the Constrained Multiple Column WRITE variant of Ordered Sequential Replication.

FIG. 48 illustrates the mechanics of the AVERAGE calculation in FIG. 47A, showing how the missing data causes the result to be the wrong AVERAGE.

DETAILED DESCRIPTION

Figure 1:
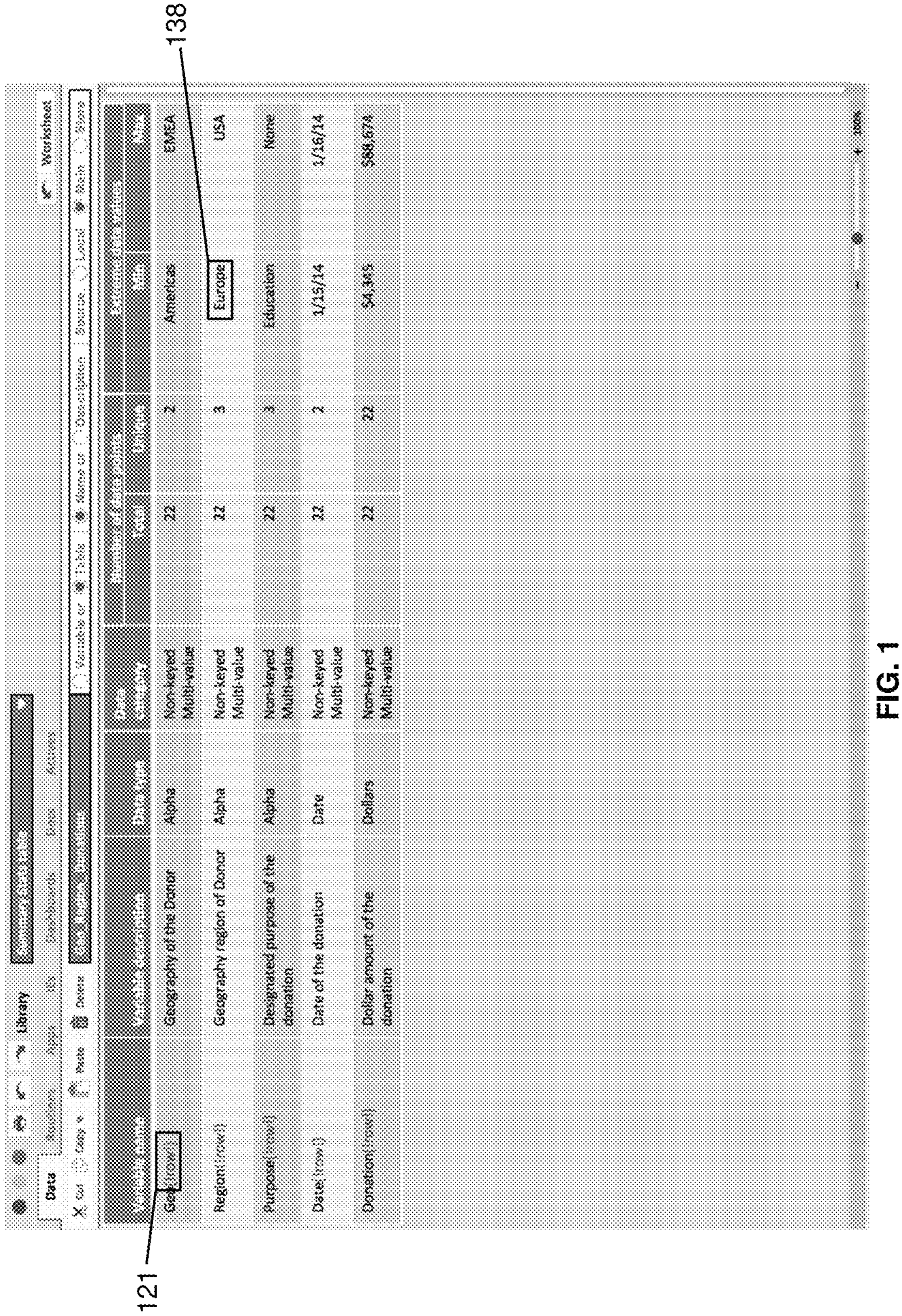
FIG. 1 shows summary statistics for an extremely small non-predefined keyed Non-Spreadsheet Cell (NSC) data set.

The following detailed description is made with reference to the figures. Example implementations are described to illustrate the technology disclosed, not to limit its scope, which is defined by the claims. Those of ordinary skill in the art will recognize a variety of equivalent variations on the description that follows.

When spreadsheet applications were first created, they electronically emulated tabular paper spreadsheets. More recently, Microsoft Excel, Google Sheets, Apple Numbers and others have dramatically increased the breadth of capabilities and usefulness of spreadsheets. Spreadsheet applications now access data across a wide variety of sources including relational, structured and semi-structured, open data protocol (OData), Web and Big Data/NoSQL among others; and these applications manipulate data—such as in pivot tables and via Microsoft PowerPivot. Additionally, spreadsheets have extensive functionality for creating charts with SmartArt and for building forms, and they even have programming languages embedded within them, such as Visual Basic, Apps Script and Apple Script. In one example, Microsoft Excel includes more than four hundred and fifty built-in functions.

With all the added capabilities, spreadsheet applications have become substantially more complicated. The data manipulation and embedded programming language capabilities can be very powerful, but are complicated to learn and therefore they are used by a very small fraction of the spreadsheet application user base. Well over a hundred books and online videos have been published to help users understand capabilities of Excel alone.

With the world moving to the use of more and more data, and bigger and more complicated data sets, there is a need to enable the spreadsheet applications to handle many large and complex data sets. Regular users have not wanted to learn the complicated capabilities, such as those in Microsoft Excel Power Query and PowerPivot, required for importing moderate sized data sets into their Excel spreadsheets. Many users would love to be able to handle data sets larger than the row or column constraints of their spreadsheets and to be able to more easily manipulate the large and sometimes messy data sets. Most users want to do this while learning as few new commands as possible, with large external data set usage as simple as using small sets of data in their spreadsheets today.

The formulaically defined non-spreadsheet cell (NSC) data variables and related technologies disclosed in "Methods and Systems for Connecting a Spreadsheet to External Data Sources with Formulaic Specification of Data Retrieval" filed previously, allow users to work with all types of numeric and text external data sets much larger and more complex than can currently fit in traditional spreadsheets. This external data connection creates the foundation for users to automate spreadsheet work without the use of embedded programming languages or special prebuilt data feeds, taking spreadsheets from a tool users employ to conduct one off or routine analytics to a real-time competitor of systems that automate repetitive activities.

The disclosed technology allows users to very easily create within their spreadsheet cells ordered data sets from external data sets using our NSC data variables exploiting identified data hierarchies or finding their own relationships. Those ordered data sets can be for pure data presentation purposes or presentation purposes such as easily creating the row, column or row and column headers for a set of calculations. Those calculations can be for very specific formulas and functions where the order of the data matters for the calculation or the successful copying and pasting of the calculation. The technology also makes it easier for users to alter row, column or row and column headings and accompanying calculations by automatically coordinating those changes.

The disclosed technology extends the capabilities described in "Methods and Systems for Connecting a Spreadsheet to External Data Sources with Formulaic Specification of Data Retrieval" to make it easier to handle external data sets using predefined data keys (filters) or using user defined (non-predefined) data keys (filters) to select the desired data. When using the non-predefined key Data, the user writes the formulaic variable (equivalent of database attribute) they want from the external data and all the formulaic variable keys (filters) required to specify the tuple they want to retrieve. So, if they had a non-predefined key formulaic variable database (henceforth shortened to non-keyed data) with Charity 'Donation' values totaled by 'Geo', 'Region', 'Purpose' and 'Date' as in FIG. 1 and FIG. 2, and the user wanted a specific Donation value-they need to write one of our formulaic variables for 'Donation' specifying each formulaic key (filter) variable and its value required to retrieve the desired data, e.g., 'Donation(Geo("Americas"),Region("Rest"),Purpose ("Emergency",Date("1/15/14"),!F!)'.

In situations where users are going to repeatedly use the same formulaic variable combinations, they may instead want to have a predefined keyed formulaic data set (henceforth shortened to keyed data) created with predefined variables (attributes) for which the user will specify the value to get the tuple they want retrieved. In this example, the keyed data formulaic variable for 'Donation' could be predefined with the following keys within the parentheses for Donation(Geo, Region, Purpose, Date) so the user equivalent to the non-keyed formulaic variable above would be shortened to:

'Donation("Americas","Rest","Emergency","1/15/14")

thus making it much quicker for the user to specify the formulaic data they want provided they want data using the predefined keys. We will example both types of formulaic data below and show settings that also use a combination of the two.

The disclosed technology also makes handling pre-defined or user created data relationships in either Keyed or Non-keyed data much easier in formulas, functions and copy and paste. It makes it much easier to handle data and even fix data sets with inconsistencies and/or missing data. It also allows users to join multiple external (e.g., cloud) data sets together to create new external (e.g., cloud) formulaic variable data sets (accessible by users), to create in spreadsheet data sets, and to use directly in spreadsheet calculations (without the need of the creation of a new joined data set). Our technology also makes it very easy for users to create tables of complex calculations into which they can easily conduct drill downs and drill ups. This disclosed technology makes it much simpler for spreadsheet users to work with the larger and more diverse data sets that would be externally available to them in the cloud.

Non-Keyed Data Use Cases

Non-keyed data is typically the data with the most inconsistencies and therefore can be the hardest to deal with in the organized manner required by spreadsheet cell manipulation and calculations. Spreadsheets get around this by imposing the spreadsheet cell row and column labels to any non-keyed data imported into a spreadsheet, thus giving the very consistent referencing needed for spreadsheet manipulation. That however does not make the data readily usable in a consistent way for the more organized and summarized usage in creating row, column or row and column heading driven calculations. Users typically have to look at the data to figure out how to manipulate it to create the headings and the calculations they desire. While that may be easy to do with very small data sets, larger and more complicated data sets make that a very time consuming and painful process that most users would like to avoid. Since our formulaic Non-Spreadsheet cell (NCS) data allows users easy access to large and complicated external data sets, we have created easy ways for them to organize and use those data sets without having to examine all the data and learn database tool commands to manipulate the data.

To begin to example these data access and organization capabilities we are going to work with an extremely small sized non-keyed data set shown in FIG. 1. It will allow us to example some of the data inconsistency and missing data problems and our solutions in easy to understand examples. In this embodiment, we indicate to the user that data is non-keyed and has multiple values with the syntax '!row!' 121 within the formulaic data variable. This tells the user that they are dealing with the data row by row and cannot retrieve the data using predefined user data keys. The data however is organized by our application as described in our prior art allowing users to move through the rows and columns using cell values and our FIRST '!F! and LAST '!L! formulaic commands. The '!F!' and '!L!' commands progress through rows Order Sequenced in progressive Unique values using commands like FIRST—'!F!', then '!2!', '!3!' and so on for going up in value, starting with the LAST value—'!L!' and working down, or starting at a specified value like '!22!' then going down '!21!', '!20! or up !23!, !24! in number size, alphabetical, date/time or alphanumeric progressions.

Figure 2:
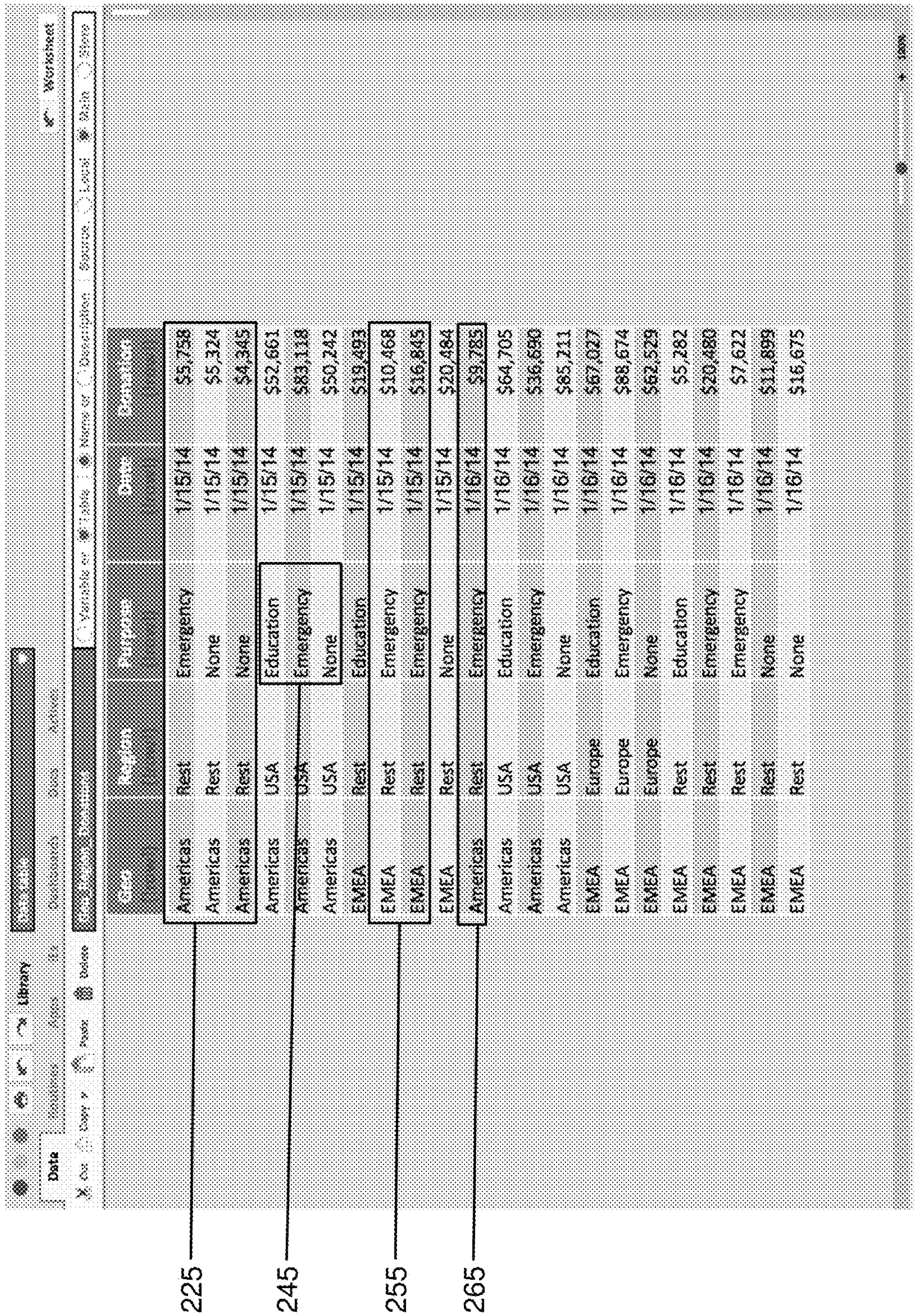
FIG. 2 shows the entire data set and identifies example inconsistencies or missing data.

FIG. 2 shows the entire data set and examples some of the inconsistencies and missing data frequently found in data sets. For example, 255 shows there are two donations on '1/15/14' with 'Emergency' as the Purpose value, 'Rest' as the Region value, and 'EMEA' as the Geo value. This would make normal discrete identification difficult given all the defining variables ('Geo', 'Region', 'Purpose' and 'Date) for the two different donations are the same. The data set also includes inconsistencies or missing data exampled by showing there are three different values 245 for the variable Purpose—'Education', 'Emergency' and 'None'. However, data rows 225 show a situation on 1/15/14, where only two of the three possible Purpose values are represented and there is no value for 'Education'. Similarly, 265 shows a situation where only one Purpose value appears for a 'Geo', 'Region', 'Purpose' and 'Date combination. These types of inconsistencies or missing data are very typical in database data sets, yet as we will show present problems for many spreadsheet calculations-particularly those done with the two-dimensional grids or tables. We will now begin to show how our technology allows successful spreadsheet usage of external data with such issues.

Figure 3A:
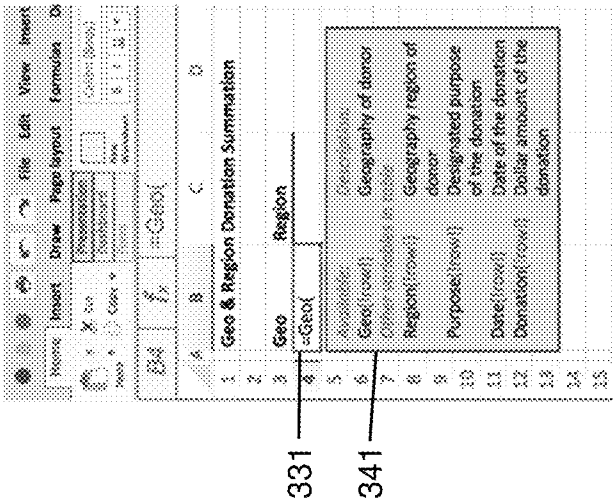
FIG. 3A FIG. 3B, FIG. 3C, FIG. 3D and FIG. 3E example creating coordinated Unique row headings through use of the disclosed Ordered Sequential Formulaic variables and the Ordered Sequential Replication copy and paste capabilities.

FIG. 3A shows a user starting a very typical spreadsheet use of the example data to create summations for each of the Geo and Region combinations. In cell B4 331, the user begins to type the formulaic variable for the Geo value they would like. As they type 'Geo(' it pops up a formulaic data help box 341 that shows them 'Geo(!row!)' telling them Geo is a non-keyed multi-value (non-discrete) formulaic data variable and then gives them all of the other formulaic variables in that external data table, and in this embodiment their descriptions, so the user can specify the variable and values to retrieve the data they desire.

Figure 3B:
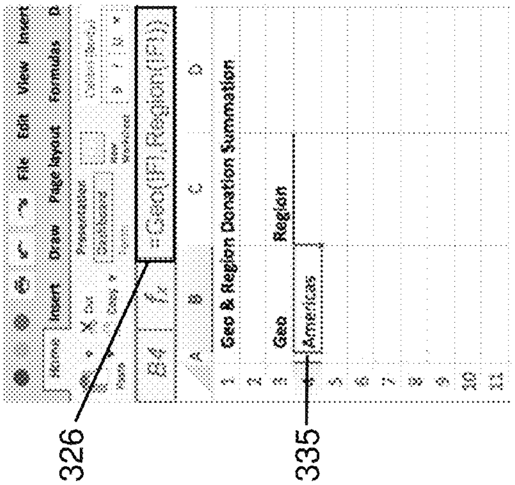

In FIG. 3B, the user has completed writing the formulaic variable of Geo that they want shown in 326 and gets the value 'Americas' in cell B4 335. That formulaic variable, '=Geo(!F!,Region(!F!))' specifies not just the first unique value of Geo but one with respect to the first unique value of Region. The user is doing this anticipating copying and pasting this cell to create the complete heading and wants to make sure the Geo value will match the Region value which will be in the next column. They are using our formulaic data variable command '!F!' that when copied creates Ordered Sequentially related Unique values. This will become very important in a moment as it allows normal copying and pasting to give the sequence of the related Geo and Region values.

Figure 3C:
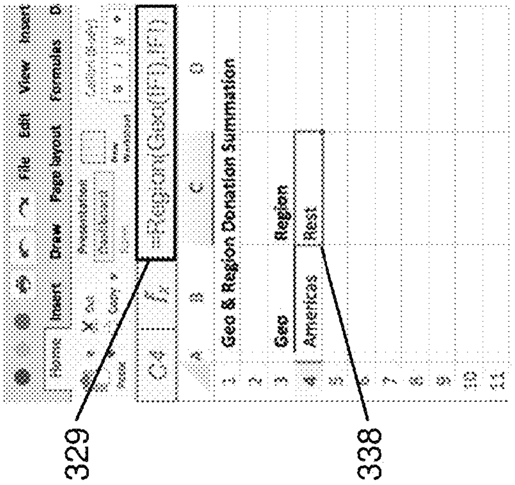

In FIG. 3C the user again employs our Unique Ordered Sequential formulaic data variable for the other half of the row heading relationship, 'Region'. They have typed 'Region(Geo(!F!),!F!)' 329 in cell C4 338 and got the value 'Rest'. What they have specified is that they want the first value of Region for the first value of 'Geo'. So, our application starts by constraining (filtering) the data to that for the FIRST value of 'Geo' ('Americas' 335), and from that remaining data retrieves the FIRST value of 'Region' ('Rest' 338). The order of the variables and the formulaic commands (!F!) is very important to generating this result because had the variable been written Region(!F!, Geo(!F!)), instead it would have retrieved the FIRST value of 'Region' 'Europe' (the FIRST value of 'Region' 138 in FIG. 1). This importance of the sequencing of variables and their formulaic commands (INDIRECT INDEX REFERENCES) is important in our technology determining which data is retrieved and used and then as we will discuss next how that data is replicated when it is copied and pasted.

Figure 3D:
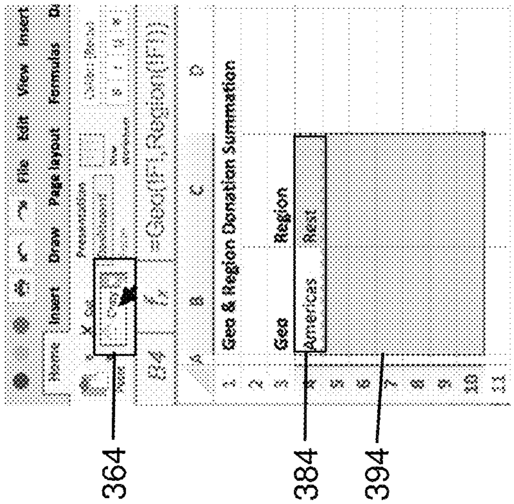
Figure 3E:
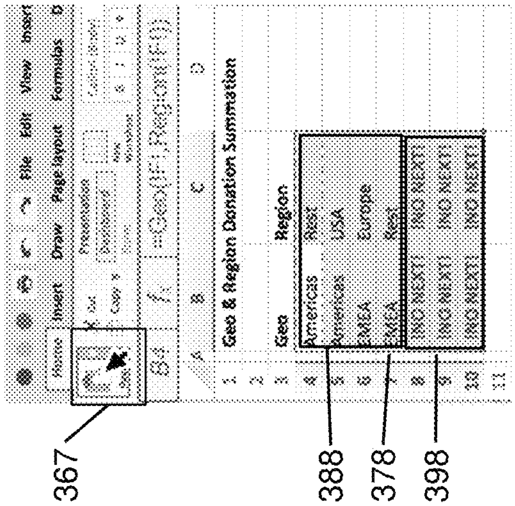

FIG. 3D then shows the user starting the copy and paste process for the two headings in 384. They have decided to copy 364 the two headings 384 down to row 10 in 394. FIG. 3E then shows the paste 367 into the 14 target cells 378. The user gets four combinations of Geo and Region values in 8 cells 388 and three sets of '!NO NEXT!' in 6 cells 398 which tell the user that they lacked values for those cells. The copy and paste employed our Unique variant of our Ordered Sequential Replication copy and paste technology to get the desired sets of values.

Figure 4:
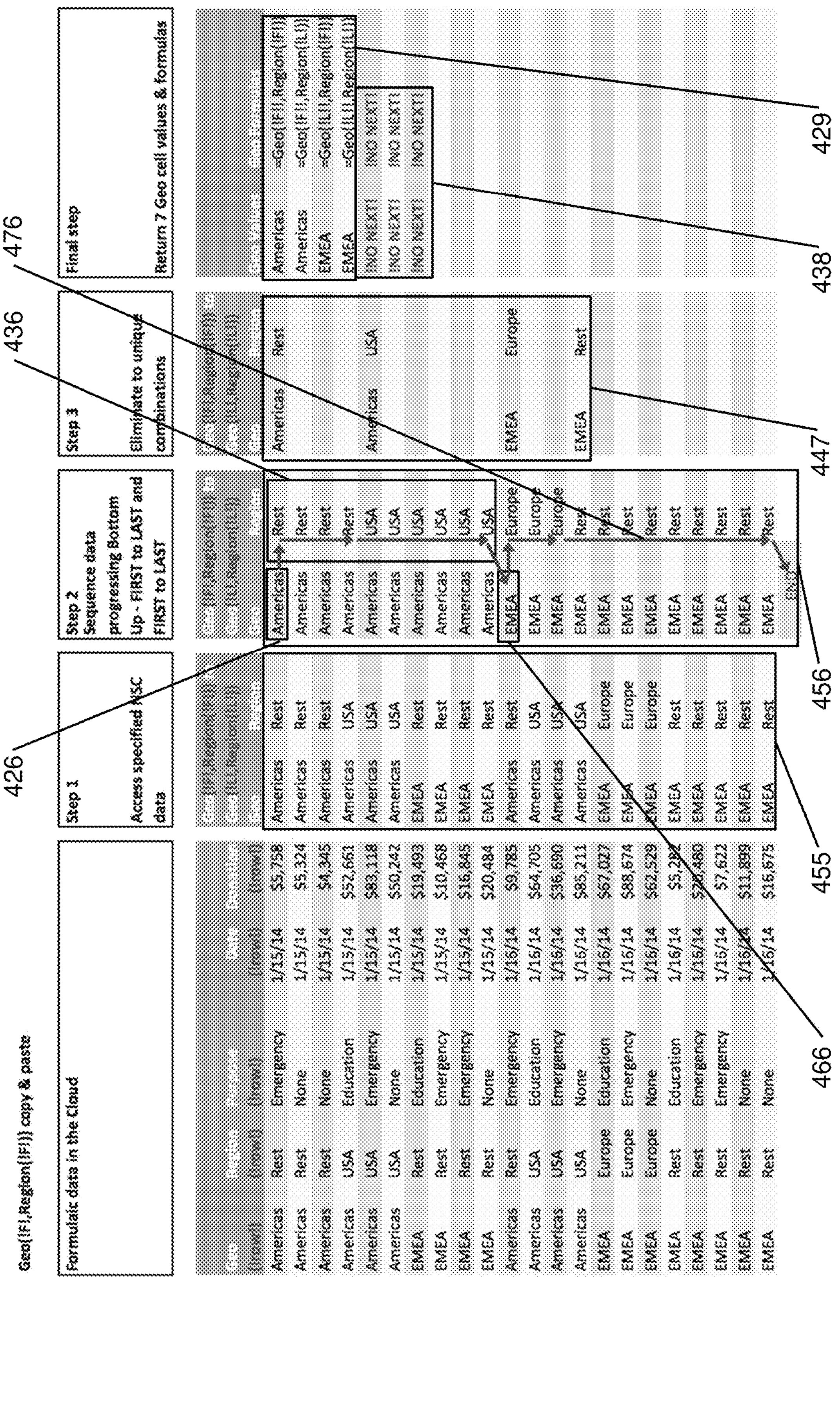
FIG. 4 and FIG. 5 illustrate the mechanics of the Unique variant of Ordered Sequential Replication copy and paste technology for two related row heading columns.

FIG. 4 illustrates the mechanics of how our Unique variant of our Ordered Sequential Replication copy and paste technology works for the 'Geo' variable 'Geo(!F!, Region(!F!))' 326 used in the copy and paste in FIG. 3D and FIG. 3E. Once the user has set up the Ordered Sequentially related formulaic data variables they need do nothing other than use what looks like normal copy and paste to them. Our technology starts by accessing the NSC formulaic data 455 (in this example stored in a Cloud database), then because both Geo and Region have '!F! commands it sequences both data sets together progressing with the first to the last values 456. This sequencing starts with the first value of Geo, 'Americas' 426, and then sequences the next column 'Region' 436 values related to 'Americas' before proceeding to the next value of Geo, which in this example is 'EMEA' 466. At this point it repeats the process of sequencing the 'Region' values before finding there is no next Geo and therefore stopping the sequence at the 'END'. The overall Ordered Sequence follows the red arrows 476. Next, our technology then eliminates to the Unique combinations 447. The final step is to add the additional three sets of '!NO NEXT!' 438 to complete the seven sets of 'Geo values and formulas and return those values and formulas 429 and 438 to the appropriate spreadsheet cells. The disclosed technology added the three sets of '!NO NEXT!' 438 values because the user specified a total of seven sets of 'Geo' and 'Region' combinations 394 to be created, but our system found only four sets 429 so it fills in the remaining three sets with '!NO NEXT!' 438, in this embodiment (which could have been a NULL error or some other message informing the user no value was found), to show that no values exist.

Figure 5:
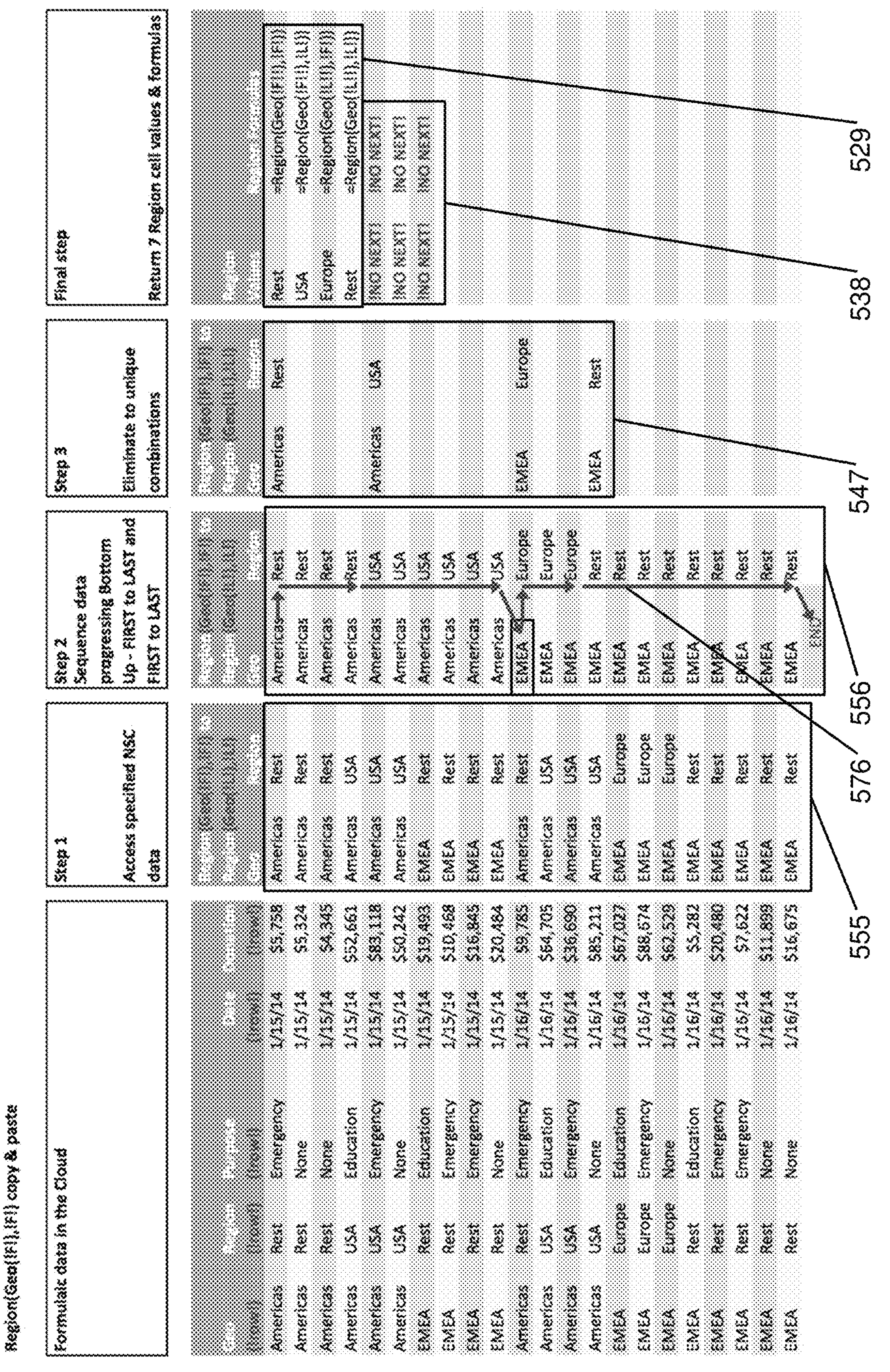

FIG. 5 shows the parallel process for the Region copy and paste exampled in FIG. 3D and FIG. 3E. Because the user set Geo and Region as Ordered Sequential formulaic data variables the technology steps one 555, two 556 and three 547 are identical to those in FIG. 4 and the only difference is the final step which returns the Region values and formulas 538 and 529. Thus, the user has their desired set of headings available once they delete the three sets of '!NO NEXT!' 398 values. While guessing how many rows to copy is not a big deal with this incredibly small data set, getting to the correct length for more complicated data sets and spreadsheets would not be as easy and therefore worth automating, as we will discuss next.

Figure 6B:
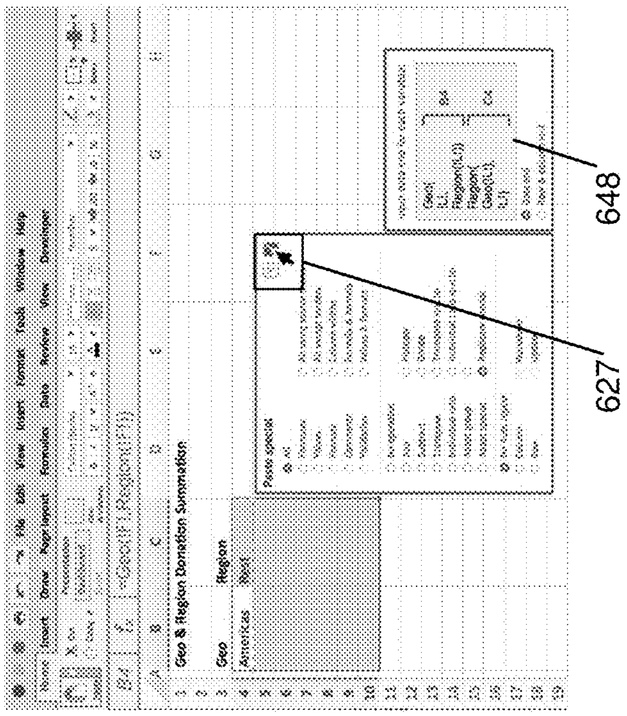
FIG. 6A FIG. 6B and FIG. 6C example Replicate Special Data End and Unique variants of Ordered Sequential Replication.
Figure 6A:
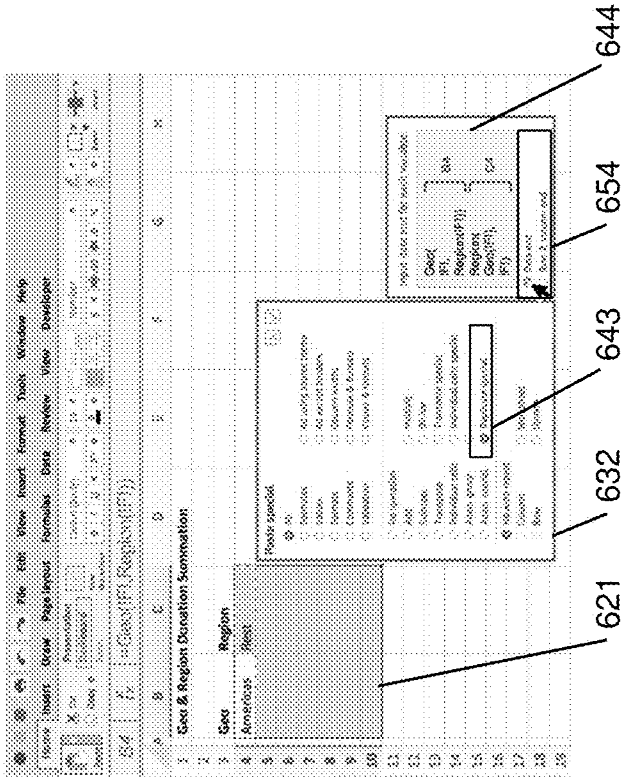
Figure 6C:
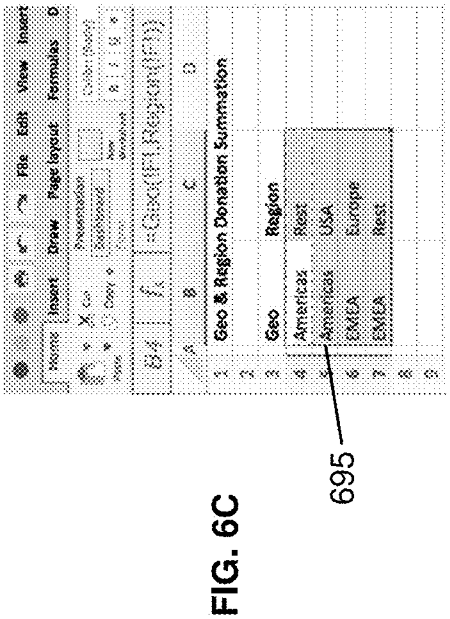

FIG. 6A through FIG. 6C show an additional variant of our disclosed Sequential Replication capability in which our technology eliminates the undershooting in copying or the '!NO NEXT!' overshooting problem. We call this the End variant of our Ordered Sequential Replication copy and paste. It allows a user to specify the formulaic data endpoint for the copy and paste. In our technology, when copying and pasting any of our formulaic variable cells 621 the user has a Paste Special 632 option, shown in FIG. 6A of 'Replicate special' 643 that then offers two options shown in 654 of 'Data End' or 'Row and Column End'. Here the user selected the 'Data end' option. In this embodiment, that opens a box 644 which displays the formulaic data within the copied cells, in this example 'Geo(!F!,Region(!F!))' for cell B4 and 'Region(Geo(!F!),!F!)' for cell C4. It is asking the user to specify their desired data endpoint for the copy and paste. In FIG. 6B the user specifies those data end points in 648 of 'Geo(!L!,Region(!L!))' for cells copying B4 and 'Region(Geo(!L!),!L!) for cells copying C4. When the user then clicks done in 627 our system delivers the paste in FIG. 6C 695. Despite the user highlighting a larger paste area 621 the result is the smaller area 695 specified by the Data End selections 648.

Figures 7A, 7B, 7C, 7D, 7E:
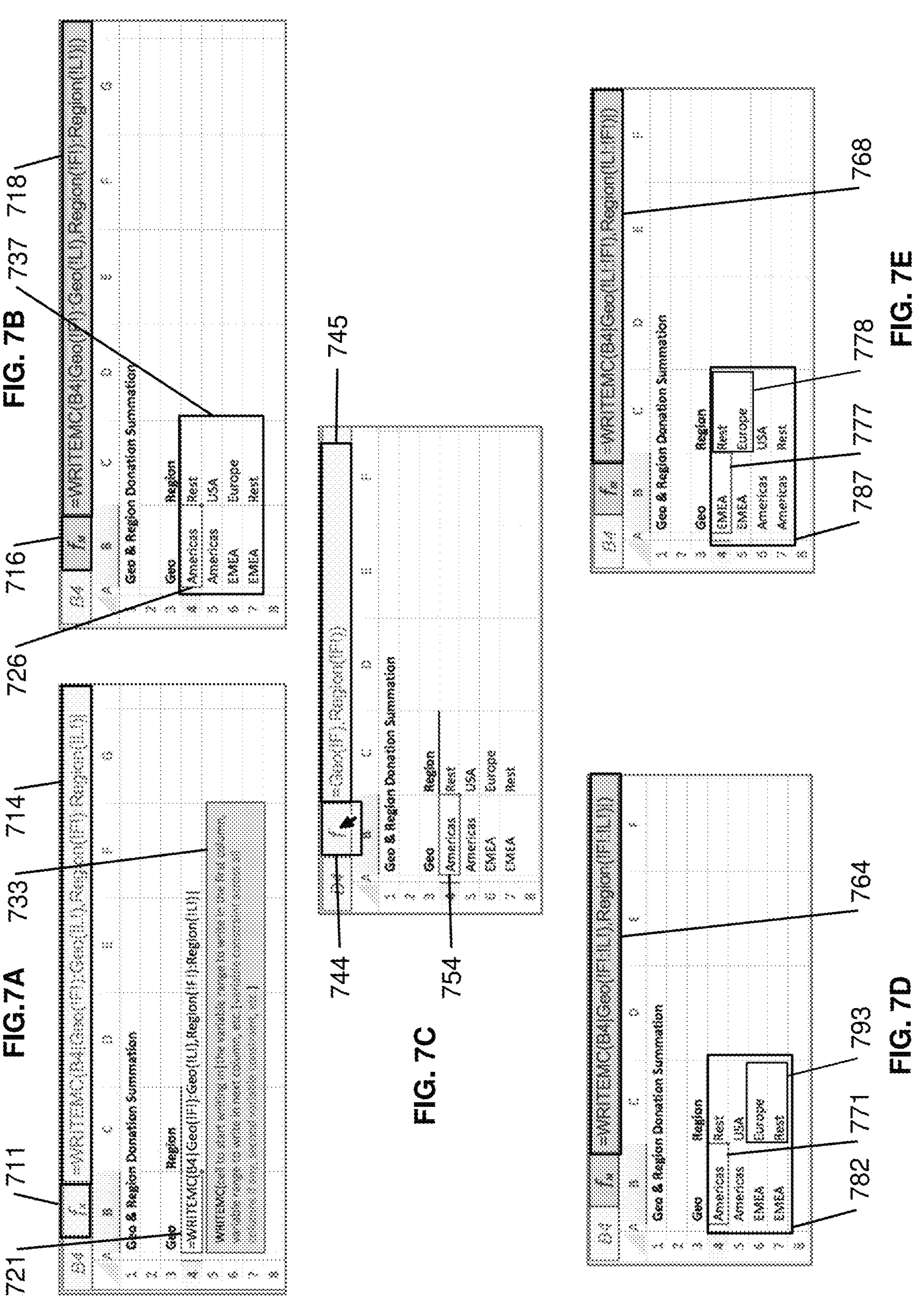
FIG. 7A FIG. 7B, FIG. 7C, FIG. 7D and FIG. 7E example Multiple Column WRITE use of Unique and Data End variants of Ordered Sequential Replication capability.

FIG. 7A through FIG. 7D shows an additional way our technology supports creating the equivalent of our Unique Data End variant of our Ordered Sequential Replication copy and paste in a single formula. Multiple rows or columns of content can easily be created by this WRITE based approach. FIG. 7A shows a user creating a WRITE Multi-Column 'WRITEMC' statement that will execute our Unique End variant of our Ordered Sequential Replication with one easy to use Master command. In this embodiment, when the user starts typing the command in cell B4 721 box 733 pops up to explain the syntax for the 'WRITEMC' (Write Multiple Column) command. It tells the user to first type the cell they want to start the write-in and then the sequence of the variable ranges they want to write in each successive column. Those columns will successively use our Unique End variant of our Ordered Sequential Replication without the user having to create formulas for each variable and then copy and paste them. The user simply sets the order of the variables and each variable sequence. The order of the variables sets their column positions and the column to column sequence of replication while the '!F!' and '!L!' sets the sequence of the in-column replication and tells the system to use Unique combinations of the variables. In 714 the formulaic variable formula:

'Geo(!F!):Geo(!L!),Region(!F!):Region(!L!)' tells our technology to sequence 'Geo' FIRST to LAST in its column together with 'Region' FIRST to LAST in its column.

FIG. 7B shows the outcome of hitting return on the 'WRITEMC' formula 718 in cell B4 726 to get the values in 737. In this embodiment, the formula 718 changed color, as did its background, and the $f_x$ in 711 turned into a blue $f_M$ with a blue background 716, because the completed formula 718 is a Master formula, which is the Master for more than one cell. If the user wants to switch it to see the formula for that specific cell, in this case cell B4 726, the user simply clicks on the blue $f_M$ box 744 as shown in FIG. 7C. Then the formula for cell B4 754 will switch as shown in 745 to give the cell specific formula in grey text and grey shading not blue Master formula 718. The blue $f_M$ box 716 will also change back to the normal grey $f_x$ box 744. This gives the user an easy way to see or change both the cell specific formula and when a cell has it, the Master formula for a cell.

FIG. 7D examples using a more streamlined variable syntax shown in 764 for cell Master formula in cell B4 771. That syntax shortens the variable part of the command to:

'Geo(!F!:!L!),Region(!F!:!L!)' in 764 while delivering the same results 782 as were delivered by the formula in 718 for 737. Other formulaic approaches could be used provided they give the technology the variables, where to put them, and the order of the column to column and within column sequences and accommodate the different variants.

FIG. 7E examples a user deciding that they want a different sequence order within each variable (column), instead of the FIRST to LAST used in FIG. 7A to FIG. 7D, they want LAST to FIRST for both variables. Therefore, they change the cell B4 777 formula 768, so the formulaic variable part of the command is:

'Geo(!L!:!F!),Region(!L!:!F!)'.

Thus, cell B4 777 contains 'EMEA' rather than 'Americas' found in that cell in 771. Similarly, the position of 'Rest' and 'Europe' 778 has changed from 793 and the order of 'Rest' and 'Europe' has reversed as expected. The user accomplished all this with a very small command change that takes on much greater importance when working with normally sized or large and complex data sets.

Figure 8:
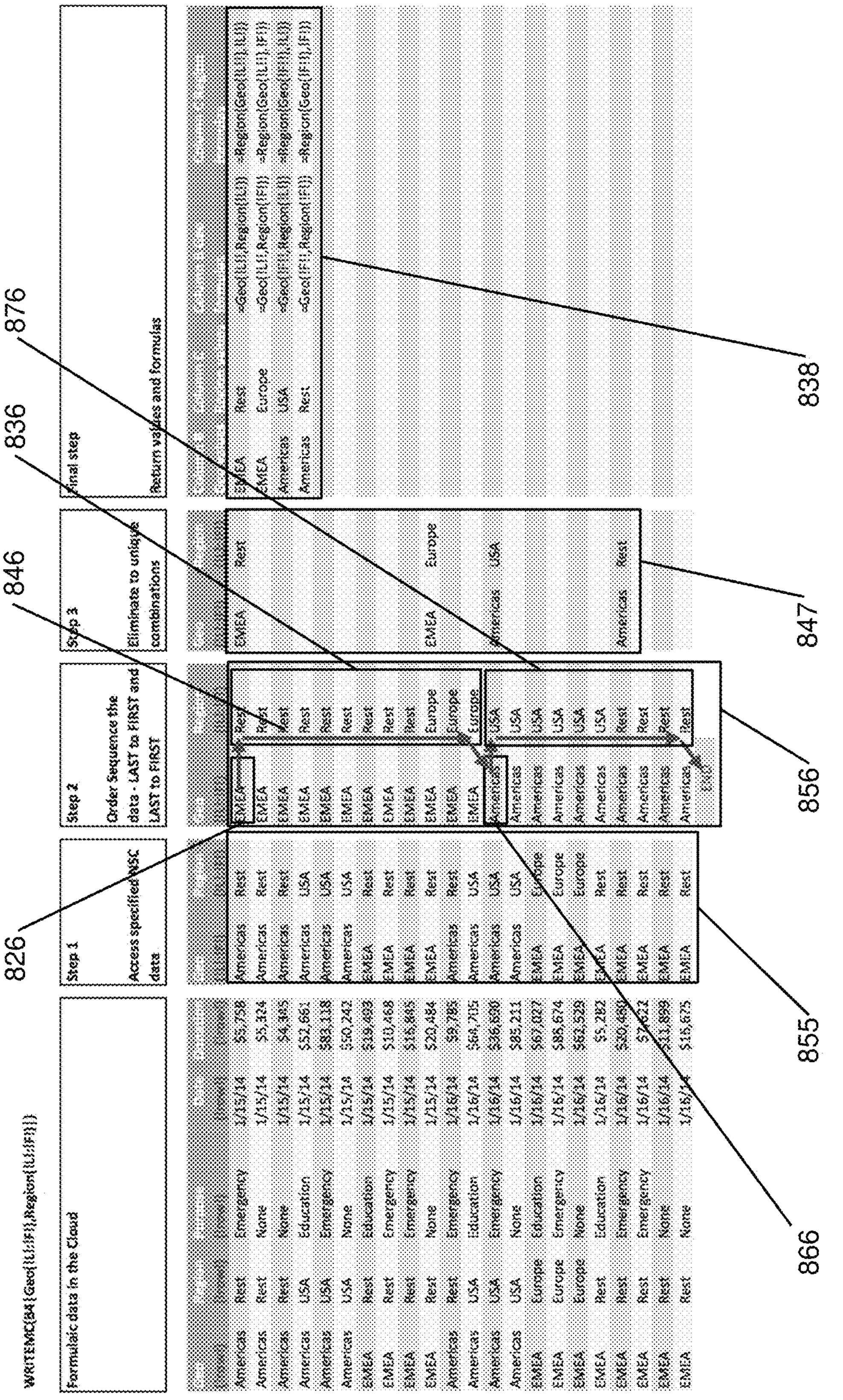
FIG. 8 illustrates the mechanics of Unique and Data End variants of Ordered Sequential Replication for the Multiple Column WRITE (WRITEMC).

FIG. 8 illustrates the mechanics of Multiple Column WRITE (WRITEMC) the Unique and Data End variant of our Ordered Sequential Replication capability to deliver the results 787 in FIG. 7E. In the first step 855 the technology accesses the specified 'Geo' and 'Region' Non-Spreadsheet Cell (NSC) data. In step two 856 the technology Order Sequences the data LAST to FIRST for both Geo and Region together. Therefore, it starts with EMEA in 826 and progresses as shown by the red arrow lines 846 ordering the variables LAST to FIRST in 836 then moving to 'Americas' 866 before going back to Region column 876, again ordering LAST to FIRST until it ENDs the process. Step 3 847 then eliminates all the duplicate combinations to give only the Unique combinations. The final step 838 then returns those Unique values and their formulas to the spreadsheet cells. This has made a set of operations that can be scaled to very large and complex data sets very easy for the user to conduct. They do not have to import data into cells and then do a series of sorts and cuts and pastes to create their desired data set or headings. They can extremely easily change the content, the order, the number of columns or the information used from large and complex external data sets with simple spreadsheet cell commands.

Figure 9B:
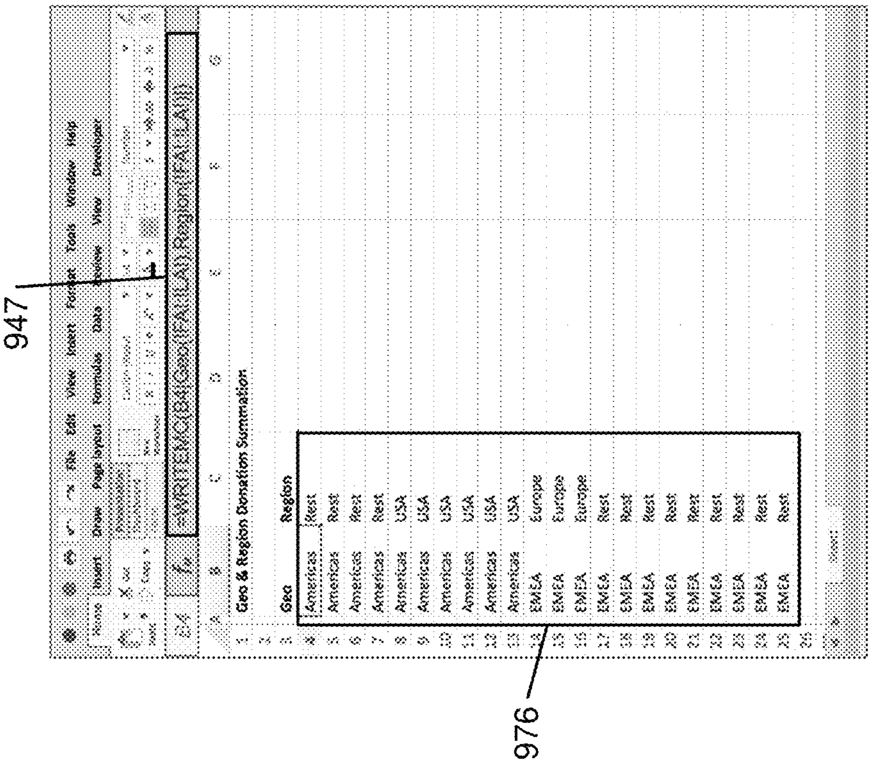
FIG. 9A and FIG. 9B example ALL and Data End variants of Ordered Sequential Replication for the Multiple Column WRITE (WRITEMC).
Figure 9A:
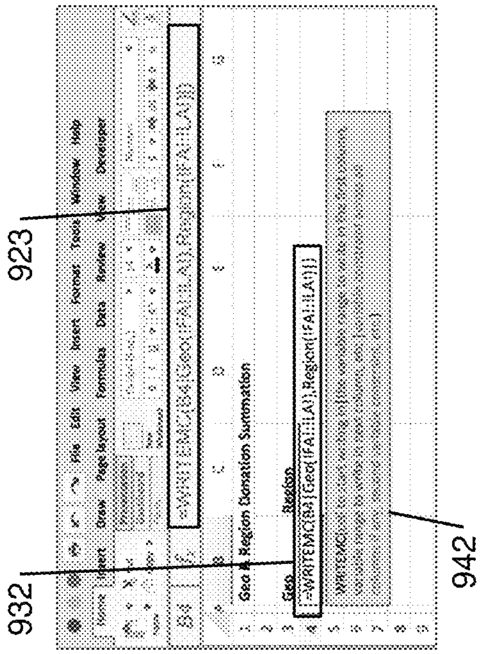

There will be settings where the users would like to very quickly and easily see the entire data set instead of the Unique values. FIG. 9A and FIG. 9B, show a simple command syntax change in the disclosed technology, for showing ALL the data rather than just the Unique values. FIG. 9A shows a 'WRITEMC' Master command 923 for cell B4 932 using '!FA!' and !LA!' which, in this embodiment, means FIRST ALL and LAST ALL. The result that occurs when return is entered for command 947, in FIG. 9B, is a full set of data 976 returned organized FIRST to LAST together for 'Geo' and 'Region'. There is no removal down to the unique values because the user has specified ALL with the formulaic data commands '!FA! and !LA!.

Figure 10:
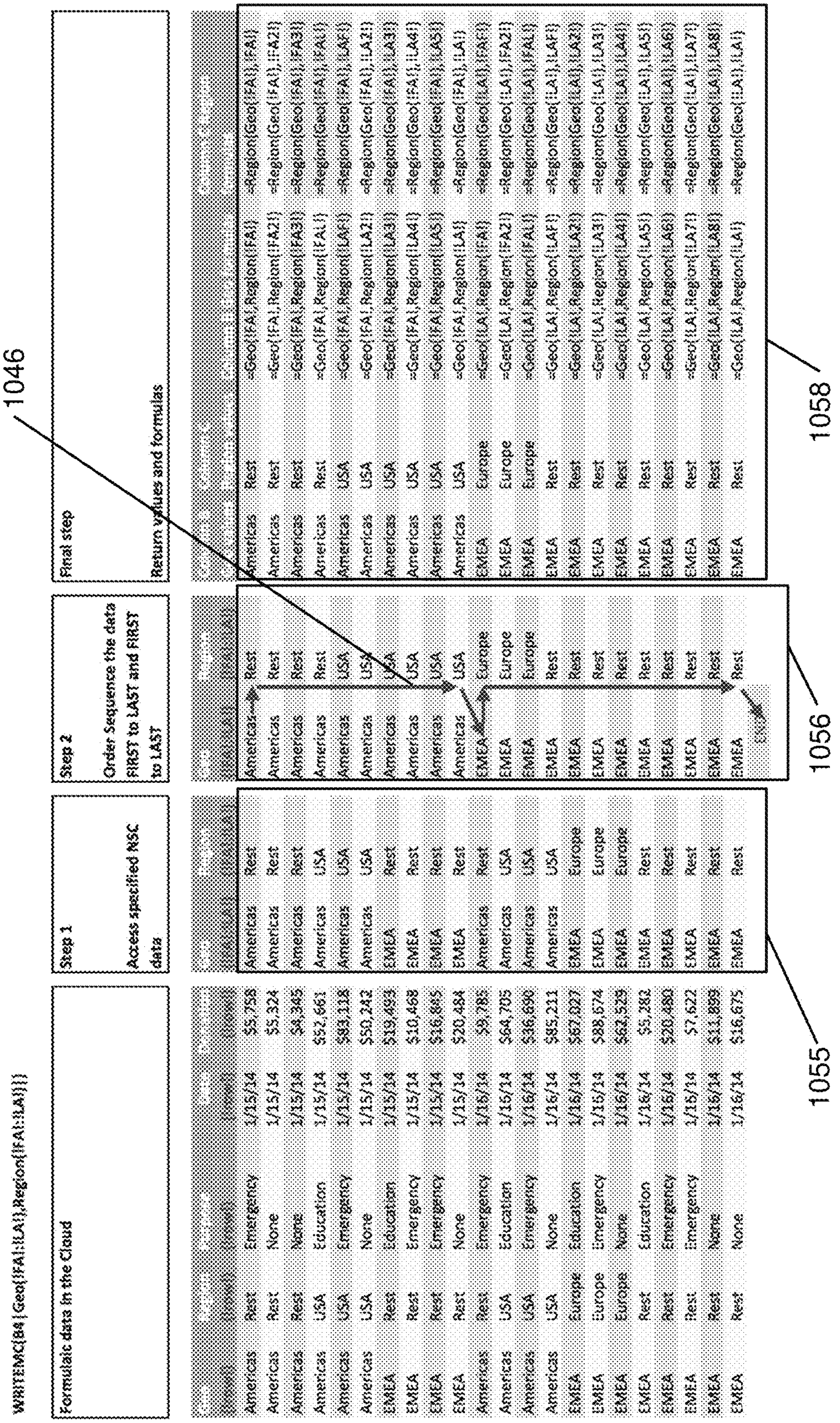
FIG. 10 illustrates the mechanics of ALL and Data End variants of Ordered Sequential Replication for the Multiple Column WRITE (WRITEMC).

FIG. 10 shows the illustrative three steps of the Multiple Column WRITE (WRITEMC) ALL process. Step one 1055 accesses the specified NSC data variables. Step two 1056 Order Sequences the formulaic variables from column to column and within columns, as shown in the red arrow sequence 1046. The system does the two column sorts FIRST to LAST for both 'Geo' and 'Region' together. The final step returns all the 'Geo' and 'Region' values as well as their formulaic data formulas which include a !FA! to !LA! numbering sequence. In this embodiment, that numbering sequence relates both their Unique value and ALL value where an '!FA2! tells the user that this variable is the second value for the first Unique value. A !3A4!' would tell the user that this variable is the forth value of the third Unique value while the '!LA! tells the user that this is the last value of the last unique value.

Figure 11A:
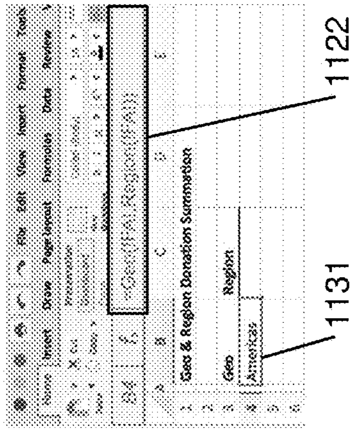
FIG. 11A FIG. 11B, FIG. 11C, FIG. 11D and FIG. 11E example ALL and Data End variants of Ordered Sequential Replication copy and paste.
Figure 11B:
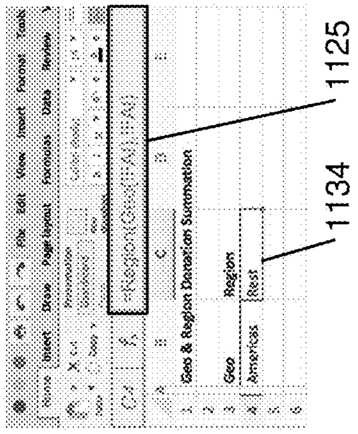
Figure 11C:
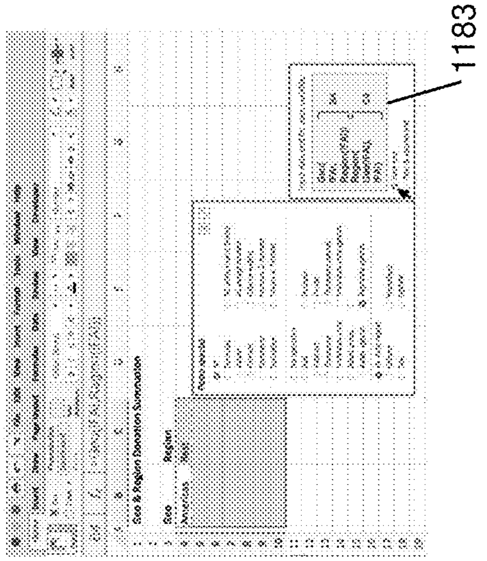
Figure 11D:
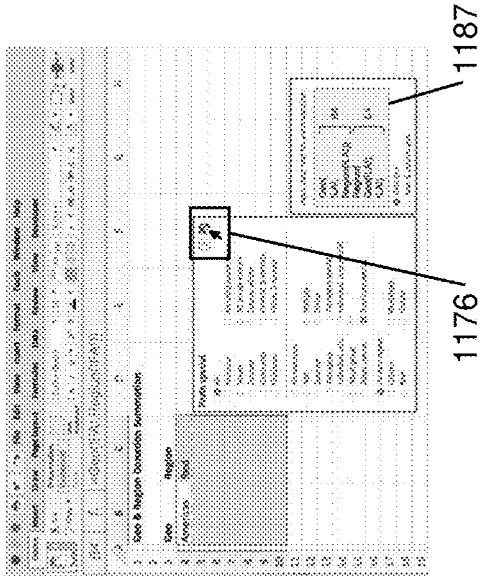
Figure 11E:
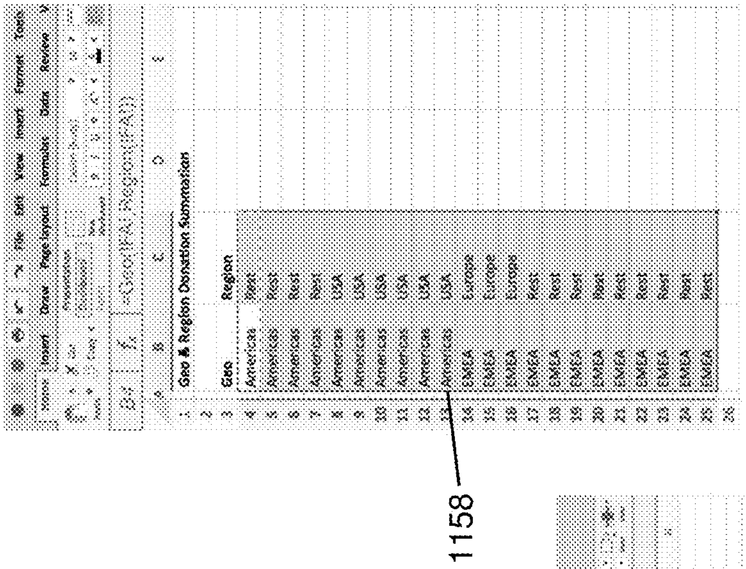

FIG. 11A through FIG. 11E example the ALL and Data End variants of the disclosed Ordered Sequential Replication copy and paste. FIG. 11A shows the usage of the !FA! command in the formula '=Geo(!FA!),Region(!FA!))' 1122 for cell B4 1131 which retrieves the value 'Americas'. FIG. 11B retrieves the value 'Rest' in cell C4 1134 using the command 1125 '=Region(Geo(!FA!),!FA!)'. Now the user has the Geo and Region variables ready for a copy and paste ALL replication. In FIG. 11C they opt to use the paste Special Replicate Data End option and see the formulaic variables in 1183 that they need to alter to the End values they desire. In FIG. 11D they specify in 1187 the end of the variables 'Geo(!LA!, Region(!LA!))' and 'Region(Geo (!LA!),!LA!) and when they click the arrow 1176 they get all the values shown in 1158 in FIG. 11E and the formula values that accompany them. Thus, the users have an easy way to use spreadsheet commands and copy and paste to access and organize as they would like entire data external sets or select parts of entire data sets by specifying beginning or end values that are not FIRST ALL or LAST ALL.

Our technology not only allows users to retrieve, summarize, and organize data sets with simple spreadsheet commands, but to also overcome data problems, missing data and to structure the data in much more flexible manners that gives users the flexibility to easily change the presentation of data intensive analyses. FIG. 12A continues working with our donation data set but now includes the Purpose values, that record the Purpose intended by the donor for the donation. In FIG. 2, we identified that one 'Geo' and 'Region' combination was missing any values for the 'Purpose' value 'Education'. Therefore, when the user types the command '=WRITEMC(B4|Geo(!F!:!L!),Region(!F!:!L!),Purpose (!F!:!L!)|)

1224 in cell B4 1231 they get the values in cells 1242. However, the first combination for the 'Americas' has the first 'Purpose' value 'Emergency' 1233 rather than 'Education' which is the first Purpose value of the remaining sets of 'Geo' and 'Region' combinations 1243, 1253, and 1263. Had the user written the command differently in this embodiment, as in FIG. 12B:

'=WRITEMC(B4|Geo(!F!:!L!),Region(!F!:!L!),Purpose (Purpose(!F!:!L!),!F!:!L!)|)

1228 then they get the resulting data 1246 in which the omission of 'Education' has been fixed 1237 and therefore the resulting data 1246 is one row longer than that in cells 1242. While this fix looks relatively simple given the small size and simplicity of our 22-line example data set, for much larger and more complex data sets this ability to work around data deficiencies, whether intended or otherwise, with very simple spreadsheet commands will save users huge amounts of frustration and work.

Figure 12B:
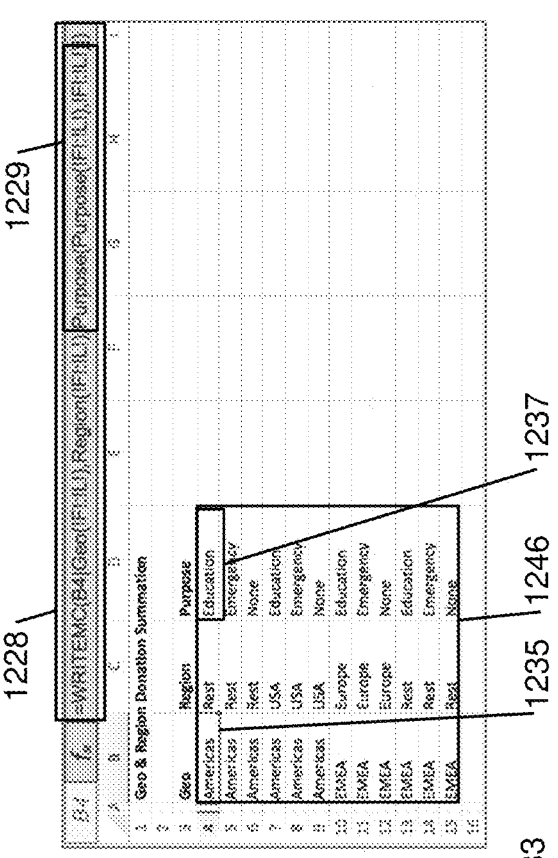
FIG. 12A FIG. 12B and FIG. 12C example the results of using Multiple Column WRITE with and without Multiple Sequences (e.g., via an adjustment constraint). It shows how Multiple Sequences can be used to correct data inconsistencies or missing data.
Figure 12A:
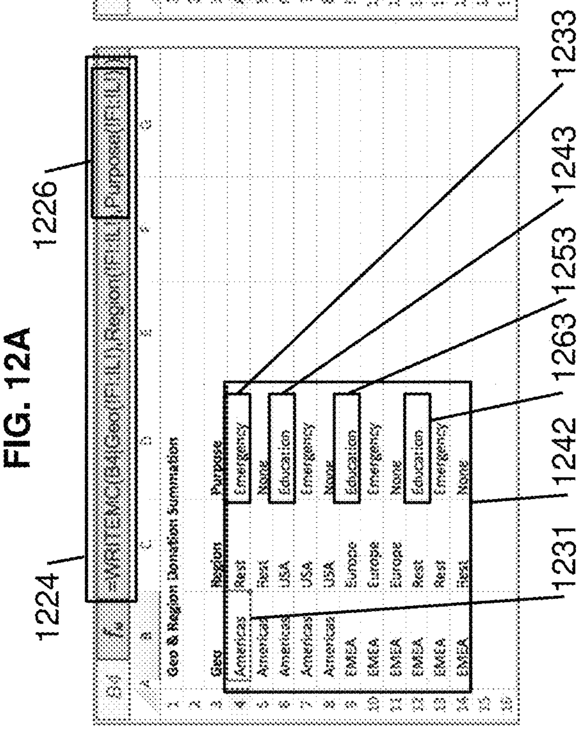

The difference in the WRITEMC results of FIG. 12A cells 1242 and FIG. 12B cells 1246 come from replacing the 'Purpose(!F!:!L!)' 1226 in formula 1224 with the 'Purpose (Purpose(!F!:!L!),!F!:!L!)' 1229 in formula 1228. In the latter case, instead of using the 'Purpose' constraints inherited from each of the 'Geo' and 'Region' combinations, by making Purpose a function of 'Purpose(!F!:!L!)' the Purpose is constrained only by all options of Purpose. This doubling up on the 'Purpose' variable is one way of adding an ADJUSTMENT CONSTRAINT to the formulaic variable Ordered Sequence inheritance. This change fixes the deficiency in cells 1242 of the 'Geo' value of 'Americas' and the 'Region' value of 'Rest' lac-king the 'Purpose' value of 'Education', by giving the full set of 'Purpose' values for all 'Geo' and 'Region' combinations in data 1246.

Figure 12C:
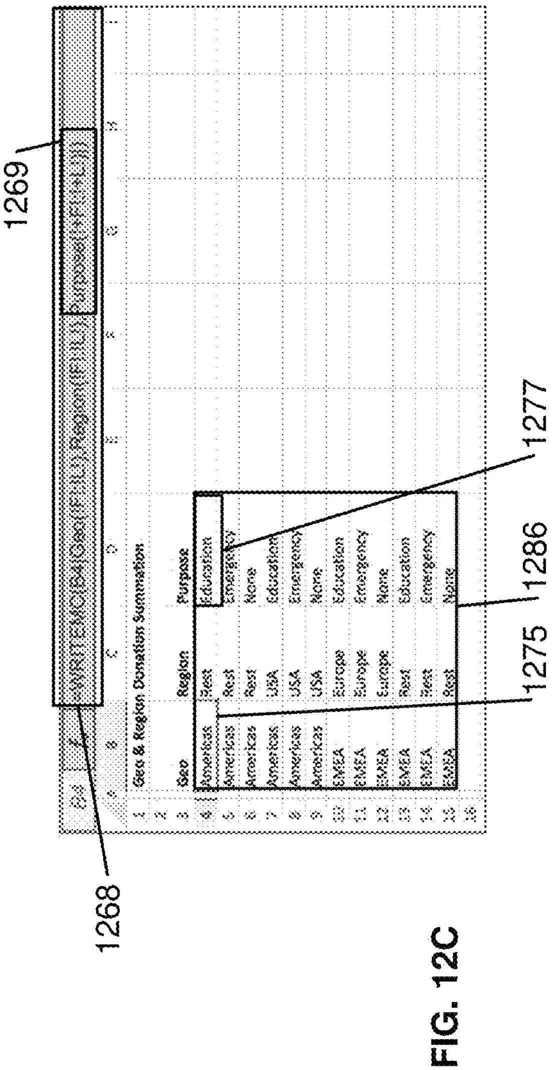

FIG. 12C examples a shorter syntax for breaking the Ordered Sequential inheritance of data options as was done in FIG. 12B. In this embodiment, the ADJUSTMENT CONSTRAINT is a variant of the FIRST, LAST and intermediate Unique formulaic data commands that uses '!+F!', '!+L!' (or '!+2!' for example) commands to break the sequential data inheritance limitation of options and like the 'Purpose (Purpose(!F!:!L!),!F!:!L!)' 1229 in formula 1228 reset Purpose to use its overall breadth of Unique values 'Purpose (!+F!:!+L!) 1269 in formula 1268 thereby giving the same set of values in 1286 as in data 1246.

Figure 13:
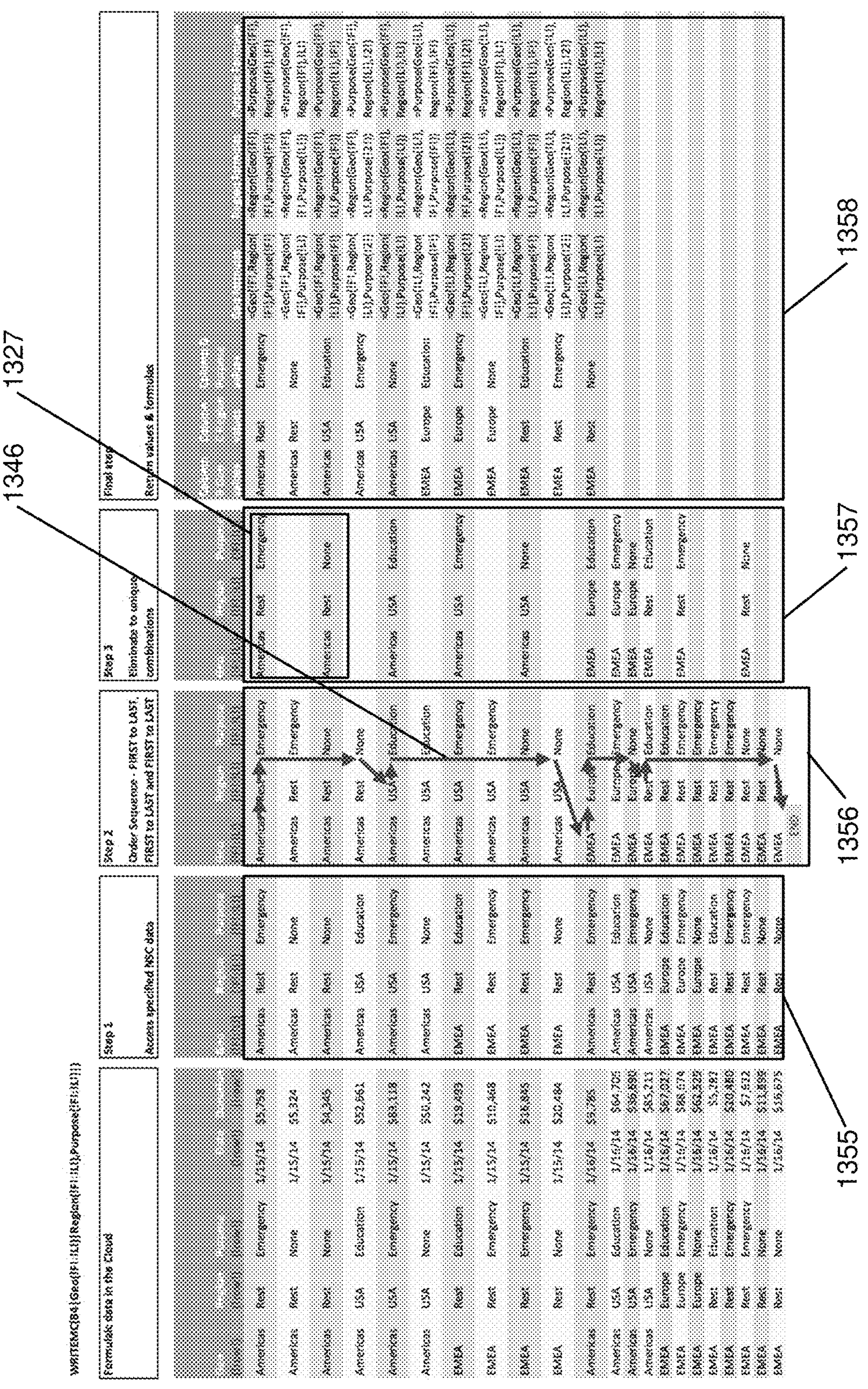
FIG. 13 illustrates the mechanics of Multiple Column WRITE without Multiple Sequences dealing with inconsistent or missing data.

The use of Multiple Sequences is shown in FIG. 12B and FIG. 12C. FIG. 13 illustrates the mechanics of how the Multiple Column WRITE in FIG. 12A works without the Multiple Sequences and FIG. 14 illustrates the mechanics of using Multiple Sequences as shown in FIG. 12B and FIG. 12C.

FIG. 13 shows four steps for delivering the values and formulas for the FIG. 12A cells 1242. Step one 1355 accesses the NSC data. Step two 1356 does a three-level Ordered Sequencing of the data progressing 1346 FIRST to LAST together for all three columns. Then in step three 1357 the disclosed technology eliminates redundant data, down to the Unique combinations. Because there is no data set for the combination 'Americas', 'Rest' and 'Education' it is missing from the 'Americas' and 'Rest' combinations 1327, as it is missing from cells 1242. Then the final step 1358 sends the values and formulas back to cells 1242.

Figure 14:
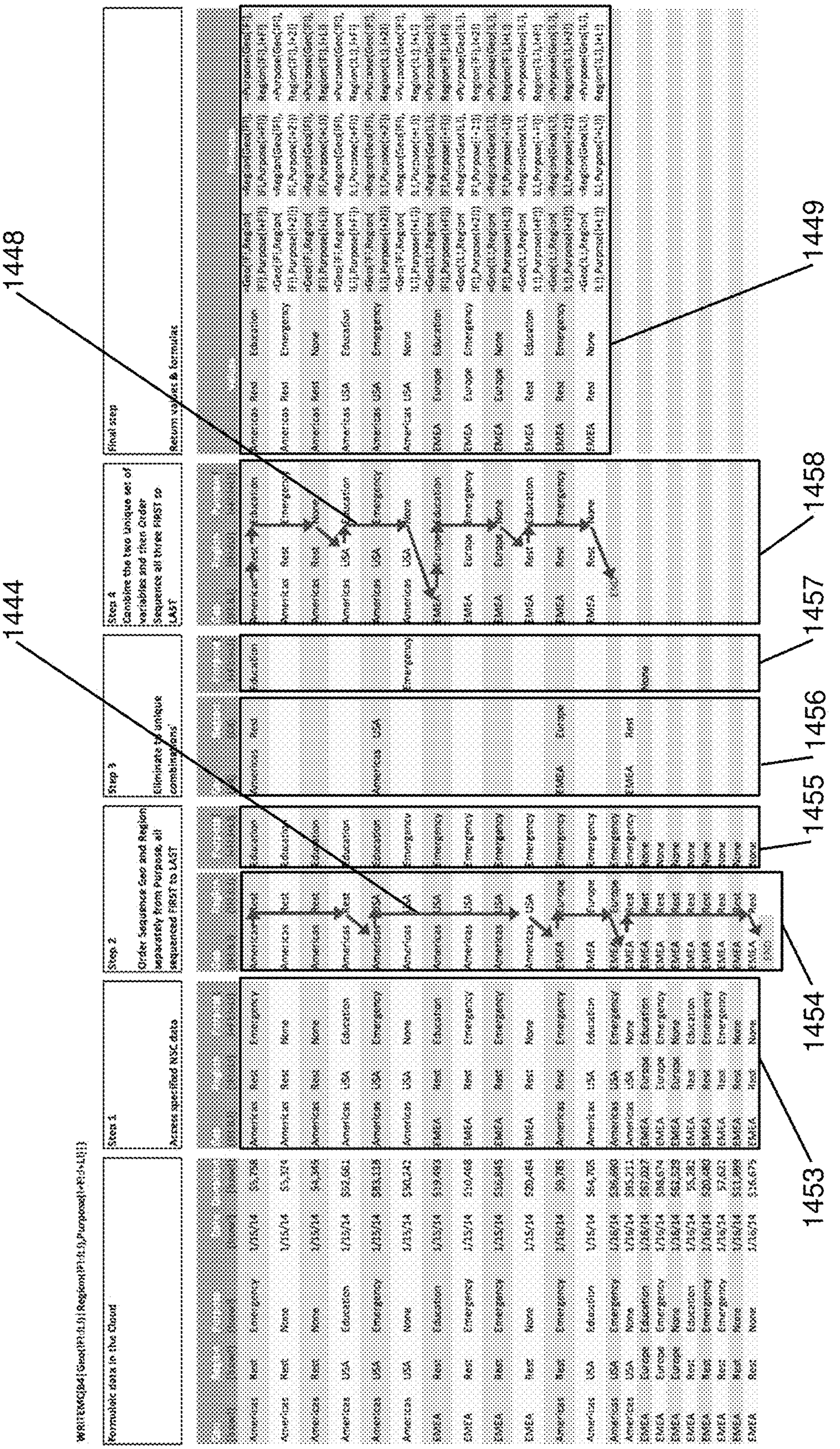
FIG. 14 illustrates the mechanics of Multiple Column WRITE with Multiple Sequences to correct for inconsistent or missing data.

FIG. 14 delivers the full set of headings as shown in FIG. 12B data 1246 or in FIG. 12C data 1286. Step one 1453 accesses the specified NSC data. Step two is very different than the step two in FIG. 13, in that it does two separate Ordered Sequences. The first 1454 sequences the 'Geo' and 'Region' data FIRST to LAST and FIRST to LAST together. The second 1455 sequences all the 'Purpose' data FIRST to LAST by itself. This separate sequencing is user specified: 'Purpose(Purpose(!F!:!L!),!F!:!L!)' 1229 in formula 1228 or 'Purpose(!+F!:!+L!)' 1269 in formula 1268. In the syntax of this embodiment, those ADJUSTMENT CONSTRAINT commands signal the disclosed technology to separate the Ordered Sequencing of 'Purpose' from that of 'Geo' and 'Region'. That separation is then carried into step three in which the 'Geo' and 'Region' pairs are eliminated to the Unique sets in 1456 while in step 3 1457 the elimination to the unique values of 'Purpose' is done. Those sets of values are then combined in step four 1458 and the combined variables are then Order Sequenced FIRST to LAST for all three levels 1448. The final step then returns the values and formulas 1449 to the cells 1246 in FIG. 12B or the cells 1286 in FIG. 12C. While there are certainly other syntaxes that will communicate the same commands and formulaic data formulas, the key to our technology is making it easy for users to use spreadsheet compatible commands to trigger manipulation of data using versions of disclosed Ordered Sequential Replication capabilities with and without Multiple Sequences. Thus, it's allowing users to manipulate large amounts of data and identify and fix external data problems and deficiencies via simple spreadsheet cell commands without having to learn an embedded spreadsheet programming language, a database language like SQL, and/or import data into spreadsheet cells and do extensive pivot or other manipulations.

While the Multiple Sequences may be helpful for one dimensional data layouts, it is critical in the two-dimensional information or calculation grids so often used in spreadsheets. The spreadsheet commands must handle informational inconsistencies or missing data very simply in situations in which the grid has a cell for which no data exists. The different ways the disclosed technology handles two-dimensional grids is described next.

Figure 15A:
FIG. 15A FIG. 15B and FIG. 15C example unconstrained and constrained Formulaic variable WRITER(WRITE Row) commands.
Figure 15B:
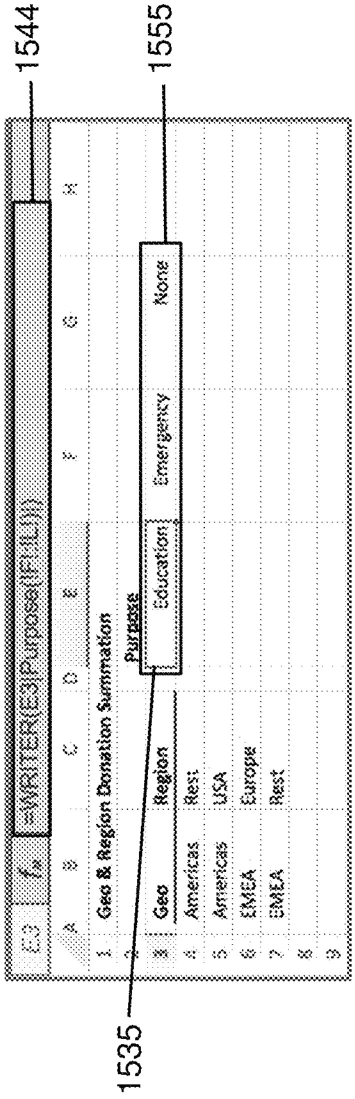
Figure 15C:
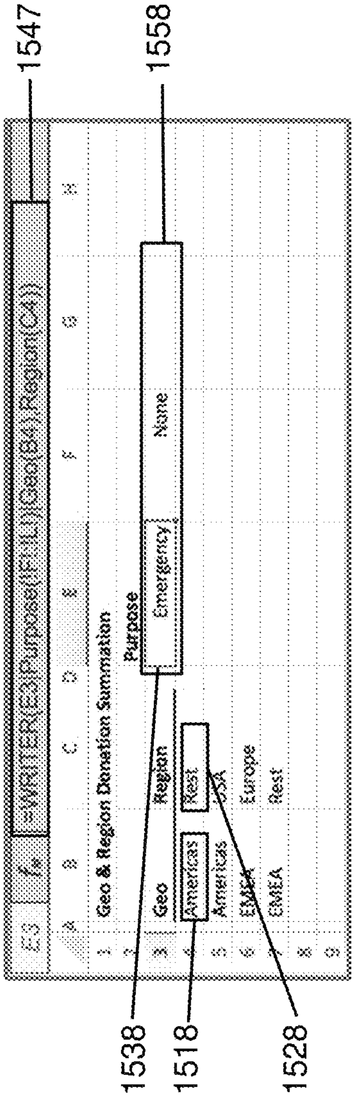

FIG. 15A through FIG. 15C examples our unconstrained and constrained Formulaic variable WRITE commands in two-dimensional settings. FIG. 15A shows an incomplete WRITE formula 1541 for the full set of Unique 'Purpose' values in cell E3 1532. FIG. 15B then shows the completed formula 1544:

'=WRITER(E3|Purpose(!F!:!L!)|)' for cell E3 1535 that delivers the three values 'Education', 'Emergency' and 'None' shown in 1555. If for some reason the user wants to constrain (filter) those 'Purpose' values to those only for a certain set of formulaic data variable values, they can do so as shown in FIG. 15C. In FIG. 15C the Purpose heading is constrained in the WRITER(Write Row) formula 1547:

'=WRITER(E3|Purpose(!F!:!L!)|Geo(B4),Region(C4))' in cell E3 1538 to the 'Geo' value 'Americas' in cell B4 1518 and the 'Region' value 'Rest' in cell C4 1528. How to set these constraints up is explained in the help pop-up 1536 in FIG. 15A telling the user to put any variable constraints after the second bar 'J' and before the last parentheses ')'. Those constraints (filters) then limit the values written in FIG. 15C cell 1558 to just 'Emergency' and 'None', which is useful in settings in which the users want to limit the values written.

Figure 16:
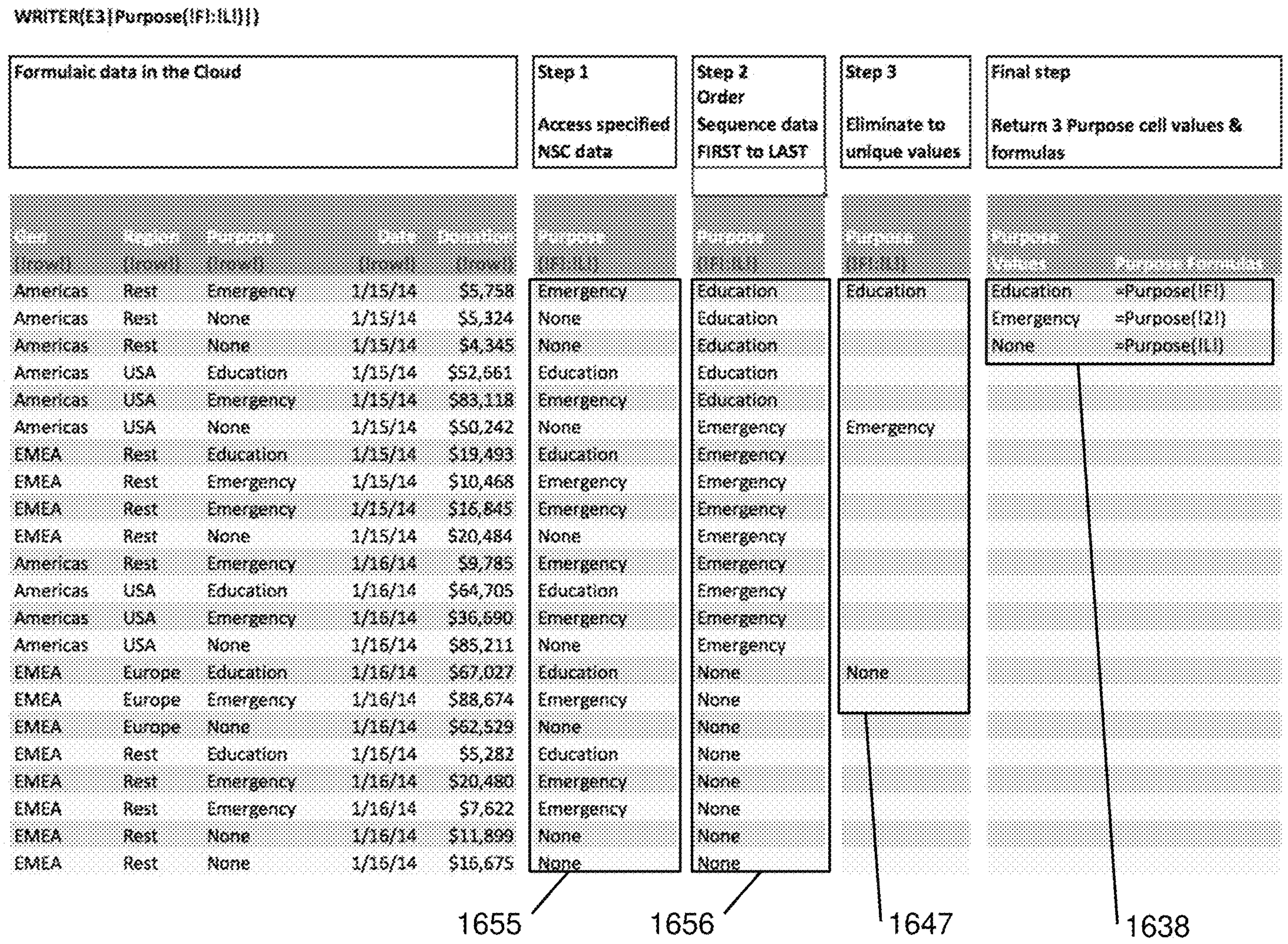
FIG. 16 illustrates the mechanics of an Unconstrained WRITER command.
Figure 17:
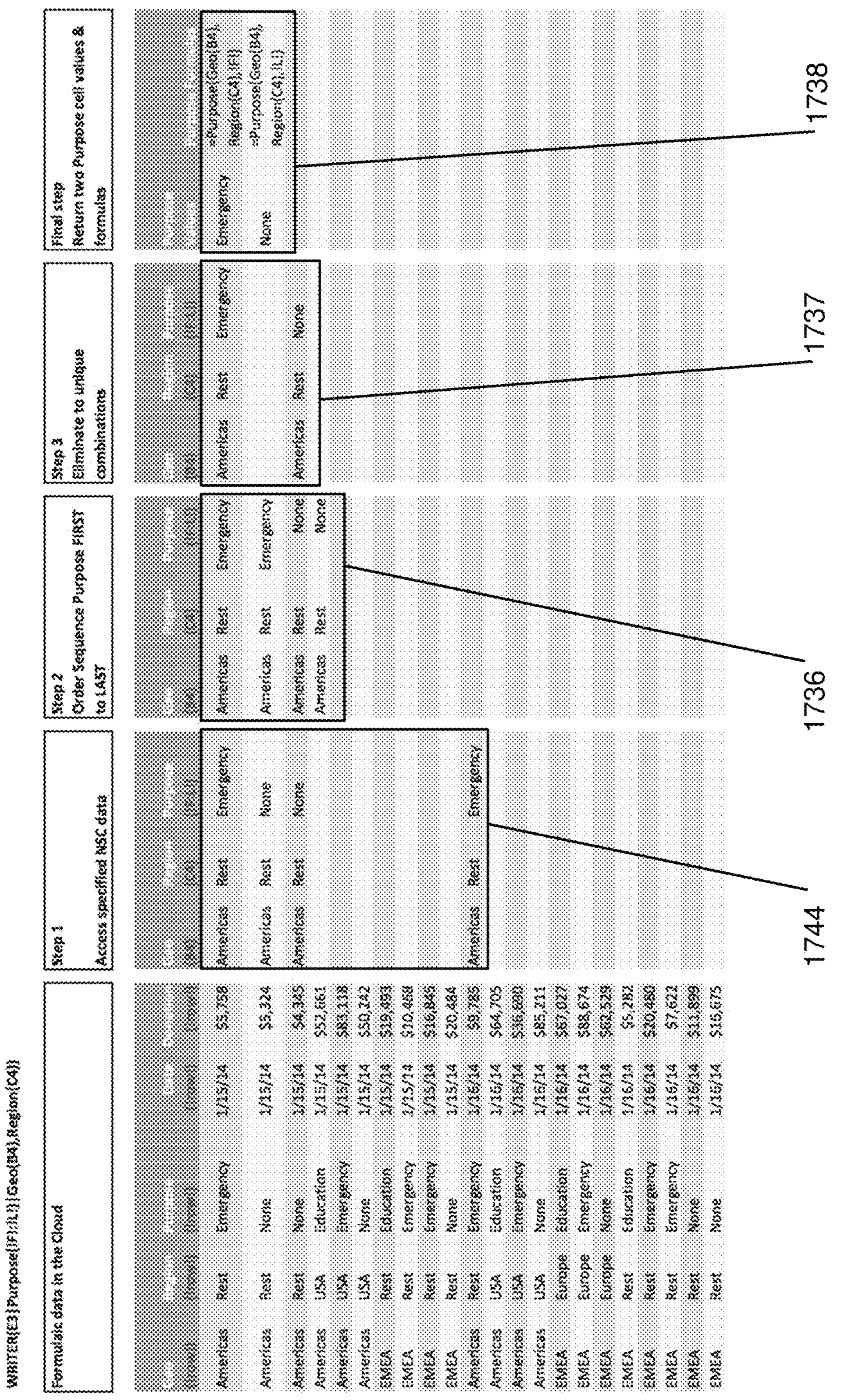
FIG. 17 illustrates the mechanics of a Constrained WRITER command.

FIG. 16 and FIG. 17 illustrate the differences in disclosed technology operations between using a constraint and not using a constraint, in the write statements for FIG. 15C with constraint and FIG. 15B with no constraint. FIG. 16 illustrates the mechanics of the Unique sequencing FIRST to LAST for the command 1544:

'=WRITER(E3|Purpose(!F!:!L!)|)

in FIG. 15B. There are no constraints in this four-step process starting with step one 1655 accessing the specified NSC data. The second step 1656 orders the sequence of the data FIRST to LAST while step three 1647 eliminates the Unique values. The fourth and final step 1638 returns to the spreadsheet cells the three values and the formulas.

FIG. 17 shows the difference in the process dealing with two constraints 'Geo(B4)' with a value of 'Americas' 1518 and 'Region(C4)' with a value of 'Rest' 1528 in the formula 1547. In step one 1744, the disclosed technology accesses a smaller data set than the comparable step 1655, but for three different variables, including Purpose and filtering the data for the two constraints 'Geo(B4)' value of 'Americas' 1518 and 'Region(C4)' value of 'Rest' 1528. Step two 1736 does both the Ordered Sequencing FIRST to LAST and step three 1737 eliminates to unique sets of values before returning the values and formulas to the spreadsheet cells in the final step 1738. Very small changes in the commands, which are very easy for users to implement, result in substantially different outcomes, particularly when done with large and complex data sets. Users of the disclosed technology can very easily create different data sets or headings, as shown in FIG. 15A through FIG. 15C.

Figure 18A:
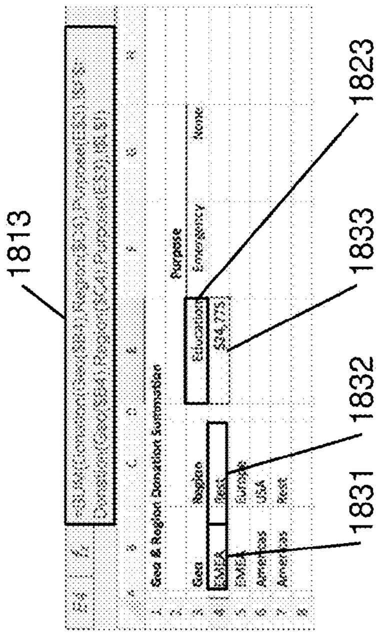
FIG. 18A FIG. 18B and FIG. 18C example and illustrate a formulaic variable summation calculation using both row and column headings.

FIG. 18A examples using both row and column formulaic variable headings to do spreadsheet calculations (a two-dimensional grid). In cell E4 1833 the user has written the formula 1813:

'=SUM(Donation(Geo($B4),Region($C4),Purpose(E$3), !$F$!)/(Donation(Geo($B4), Region($C4),Purpose (E$3),!$L$!)'

Figure 18B:
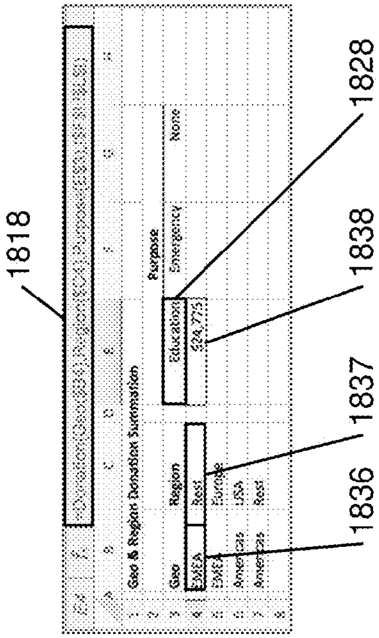

For this formula, the 'Donation' values to be summed are limited to those for the 'Geo' value of 'EMEA' in cell B4 1831, the 'Region' value of 'Rest' in cell C4 1832 and the 'Purpose' value 'Education' in cell E3 1823. The resulting value '$24,775' is shown in cell E4 1833. FIG. 18B examples an abbreviated syntax for delivering the same outcome via an implicit SUM of values occurring in this formulaic variable command which is triggered by the '!$F$!:!$L$!' at the end of the formula 1818. This is because the user used the syntax for unique values '!F!' and '!L!' to create the range '!$F$!:!$L$!' that in this embodiment defaults to a summation to give the unique value for 'Donation'. Thus, the 'Donation' value of '$24,775' in cell E4 1834 is generated and the process our technology used to generate it and the same value in FIG. 18B 1838 is illustrated in FIG. 18C.

Figure 18C:
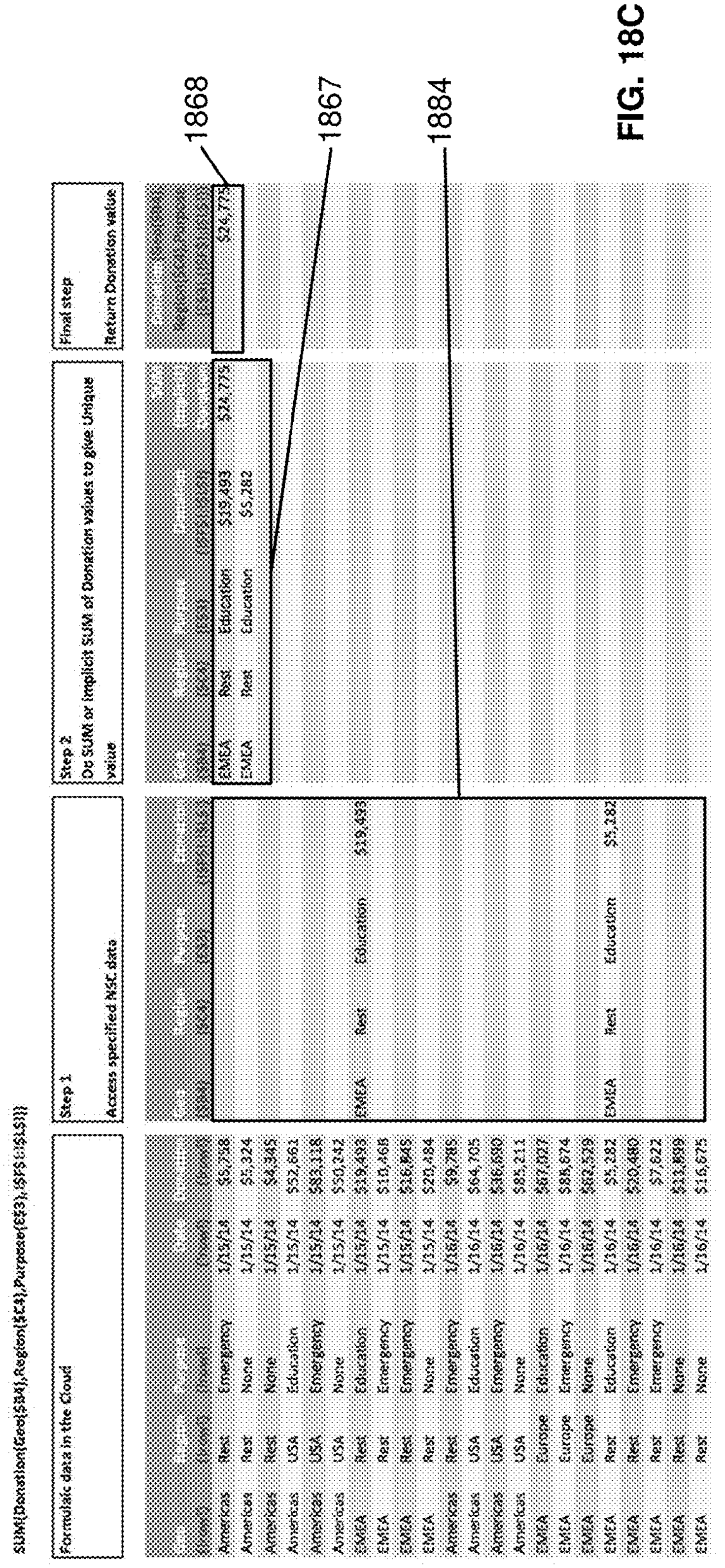

In FIG. 18C the first step 1884 of generating the value in cell E4 1833 or 1838 accesses the formulaic NSC data. Step two 1867 then does the explicit or implicit summation of the 'Donation' values which are then populated to cell E4 1834 or 1838 from the final step 1868. The dollar signs '$' have been used in the formula 1813 and 1818 as per the normal spreadsheet convention for limiting changes directionally during copy and paste. This allows a user to do what looks like a normal copy and paste of disclosed formulaic variable formulas using messy sets of non-keyed data with inconsistencies and even missing data and get their desired outcomes. The user also opted to use the Unique FIRST and LAST for all the formulaic data, which would have eliminated any Geo, Region, Purpose and Donation combinations with the same values. That may result in the elimination of desired Donations which can easily be retained by instead using the FIRST ALL and LAST ALL commands for the variable to be SUMMED-Donation.

Figure 19A:
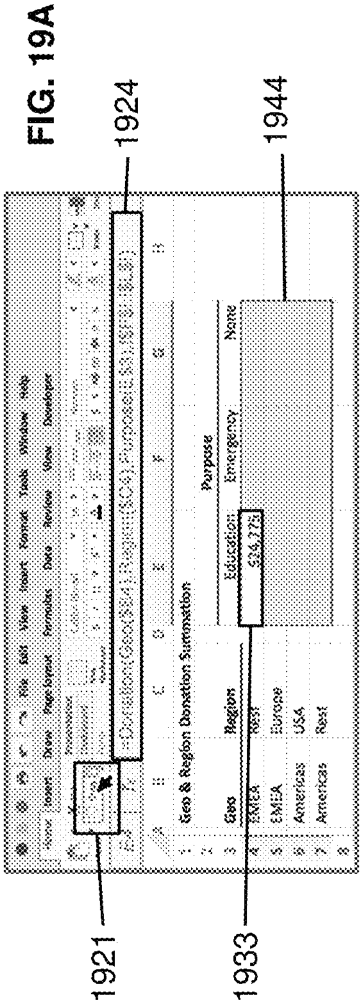
FIG. 19A and FIG. 19B example the copy and paste of a calculation cell using both row and column headings (two-dimensional).
Figure 19B:
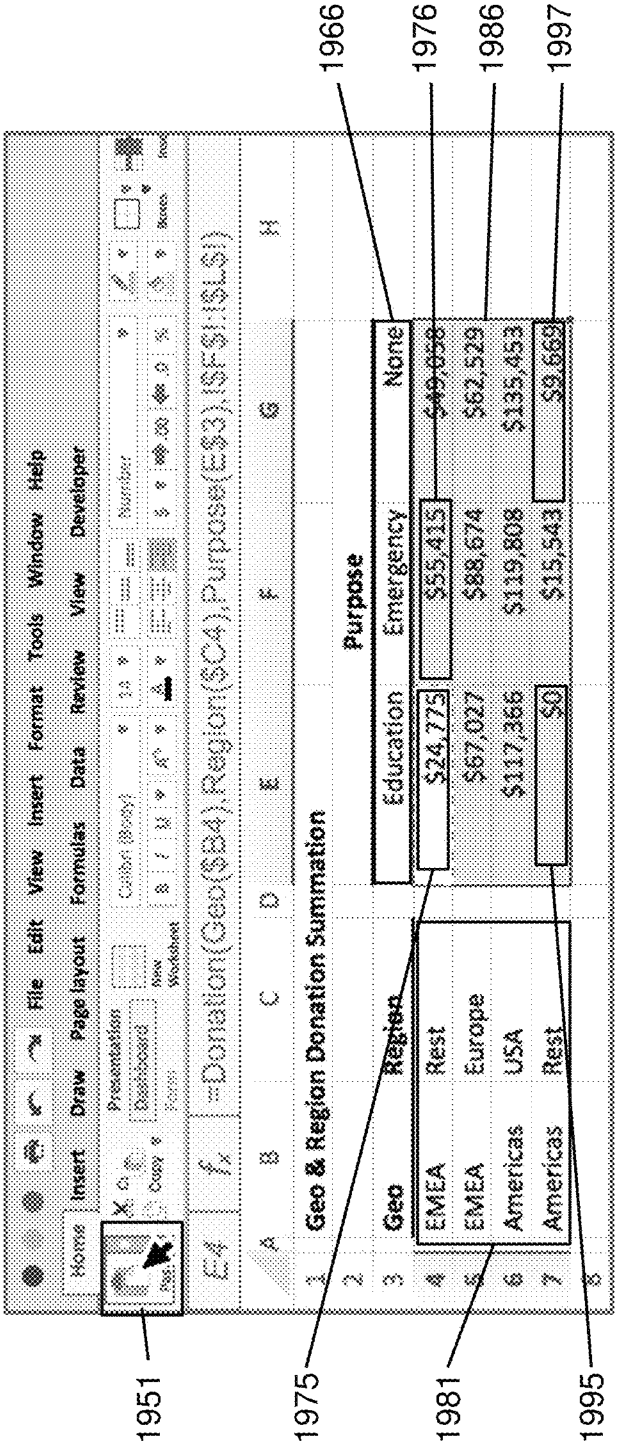

FIG. 19A and FIG. 19B shows the user doing the copy and paste for the cell E4 1838 in FIG. 18B. It is being done with this very small set of non-keyed non-discrete data which has numerous omitted data combinations of values and dates. FIG. 19A examples copying 1921 cell E4 1933 to the cells 1944. When the paste 1951 is completed, as shown in FIG. 19B 1986, the '$' usage just like a normal spreadsheet has correctly limited the use of the headings 1966 and 1981. This is best seen by exposing the formulas for a few cells below starting with the originally copied cell:

1975 '=Donation(Geo($B4),Region($C4),Purpose(E$3), !$F$!:!$L$!)'

1976 '=Donation(Geo($B4),Region($C4),Purpose(F$3), !$F$!:!$L$!)'

1995 '=Donation(Geo($B7),Region($C7),Purpose(E$3), !$F$!:!$L$!)'

1997 '=Donation(Geo($B7),Region($C7),Purpose(G$3), !$F$!:!$L$!)' and then illustrating how the values are determined for the cells.

Figure 20:
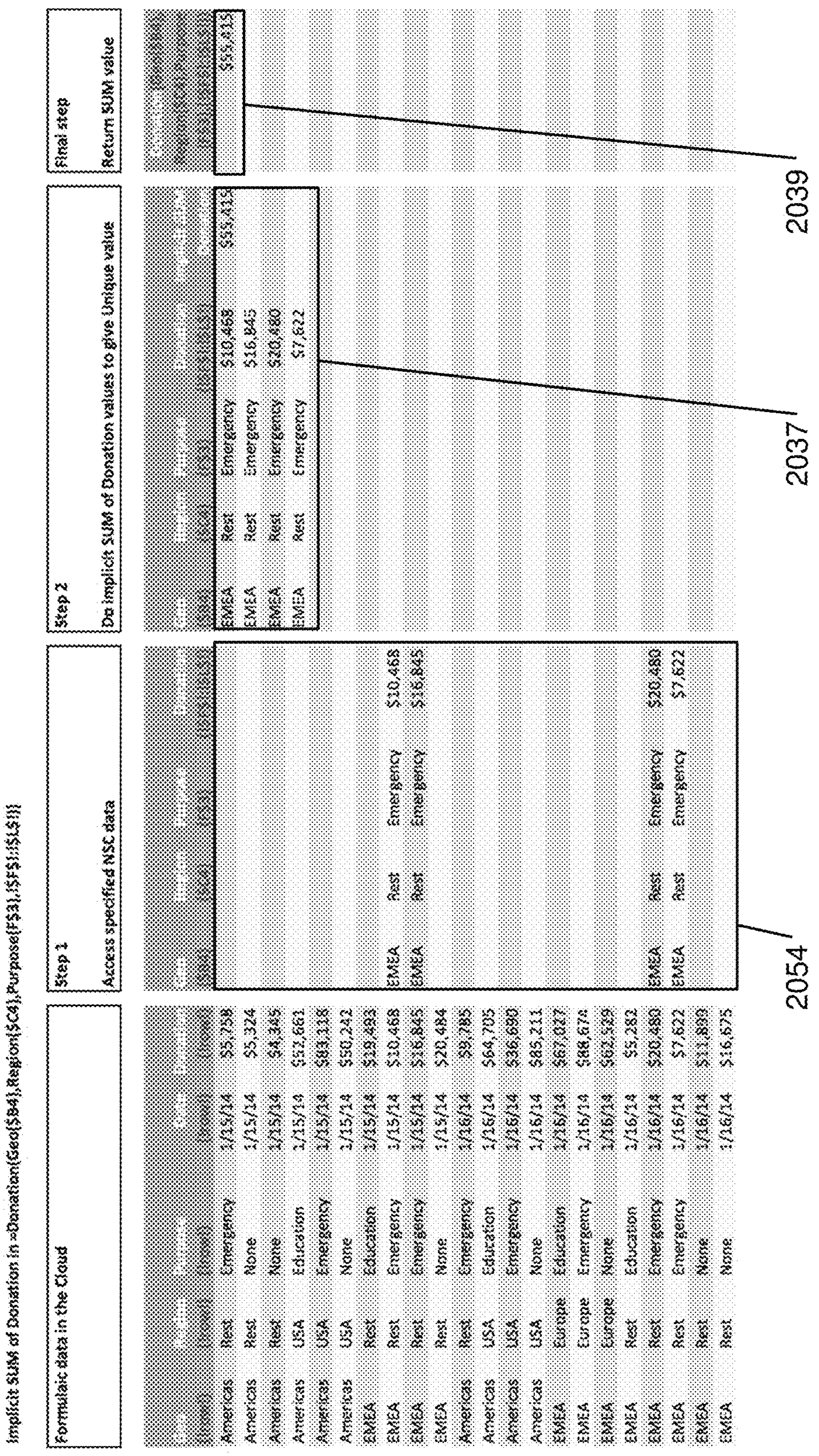
FIG. 20 illustrates the mechanics of copying and pasting a calculation cell using both row and column headings (two-dimensional).

FIG. 20 illustrates the copy and paste calculation done for cell F4 1976 in FIG. 19B. FIG. 20 accesses the data in step one 2054, does the implicit summation in step two 2037 and sends the value '$55,415' 2039 to cell F4 1976. Scaling this to normal sized data sets the values handled by each individual cell could go from one or the few in our examples to the hundreds to many thousands or more. Missing data is also handled as shown for cell E7 1995 which finds no values for the specified formulaic data and so in this embodiment it returns a value of '$0'. It could be set to return a different value or message such as '-', '!NO NEXT!', 'NULL' or 'No data'. However, in this setting it is very normal to have days with no values and so for numeric data '0' is the user's desired option.

Our technology also allows the user to construct the formulas delivering the values in FIG. 19B 1986 without using the row 1981 and column 1966 headings. FIG. 21A through FIG. 21D example the commands that accomplish that using our Unique and Multiple Sequence variants of our Ordered Sequential Replication copy and paste capability to deliver the desired set of calculation cell formulas and values.

Figure 21A:
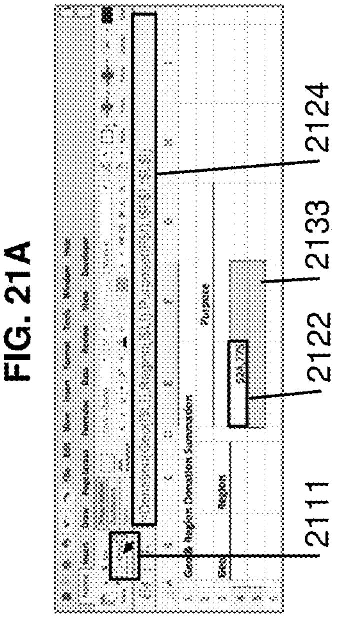
FIG. 21A FIG. 21B, FIG. 21C and FIG. 21D example using Multiple Sequence and Data End variants of Ordered Sequential Replication copy and paste.
Figure 21B:
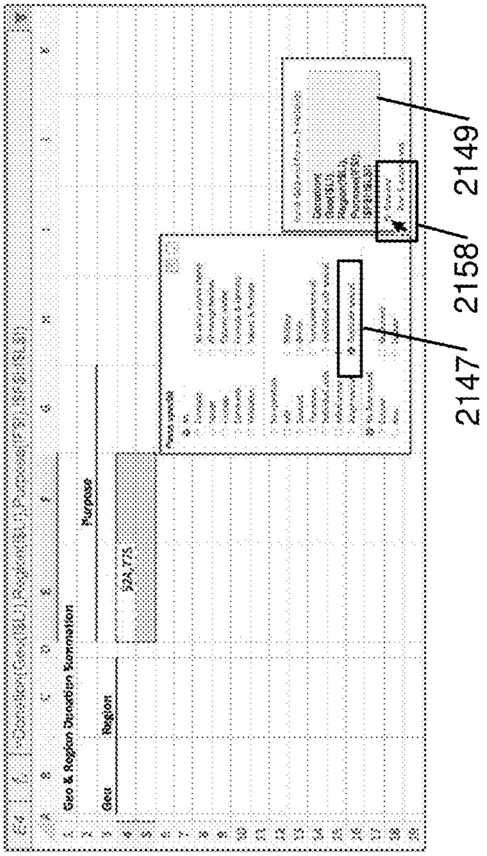

In FIG. 21A the user has written the following formulaic variable formula 2124 in cell E4 2122:

=Donation(Geo(!$L!),Region(!$L!),Purpose(!F$!),!$F$!:!$L$!)

The position within the parentheses '( )' for a variable such as 'Donation' and the use of the '$' are important to values pulled from the NSC data by our formulaic data. We have talked previously about the inheritance of a variable from those that precede it and how it impacts our copy and paste. Where unless otherwise designated, by the Multiple Sequences shown in FIG. 12A through FIG. 14, variable values are limited by those which preceded them. However, in the disclosed technology and this embodiment with two-dimensional information or headings, the single '$' options limit inheritance. Specially, a variable preceding another with the other single '$' convention (e.g., !$F! vs !F$!) does not impact that variable's range of options. So, in the formula 2124 shown above, 'Region' does inherit limitations from 'Geo' because the both share the '$' preceding the '!$F!', !$2! or '!$L!' within the '! !'. But because 'Purpose' has the other '$' convention, namely the '$' coming after the '!F$!', !2$! or '!L$!' within the '! !', its options and it's copying and pasting is not impacted by 'Geo' or 'Region' and vice versa. This capability ensures that even in situations in which there is no data for the value in cell 2122 and formula 2124, because the first 'Geo' and 'Region' combination had no data for the first 'Purpose' value, that the '0' or '!NO NEXT!' value would be inserted and that it would not be skipped over. This is critical to ensuring the two-dimensional set of calculations delivers the correct value in each cell when doing the copy and paste without the aid of the row and column headings.

Getting the formula and its inheritance right is also critical to copying and pasting cell E4 2122. The copying 2111 is then initiated by the user on cell E4 2122 to the area 2133. As it turns out the size of the paste area will not matter because in FIG. 21B the user has elected to use the Paste Special 'Replicate special' 2147 option. They then elect to use the 'Data end' 2158 option popping up 2149 showing the user the variable below they need to select an end for:

Donation(Geo(!$L!),Region(!$L!),Purpose(!F$!),!$F$!:!$L$!)

Figure 21C:
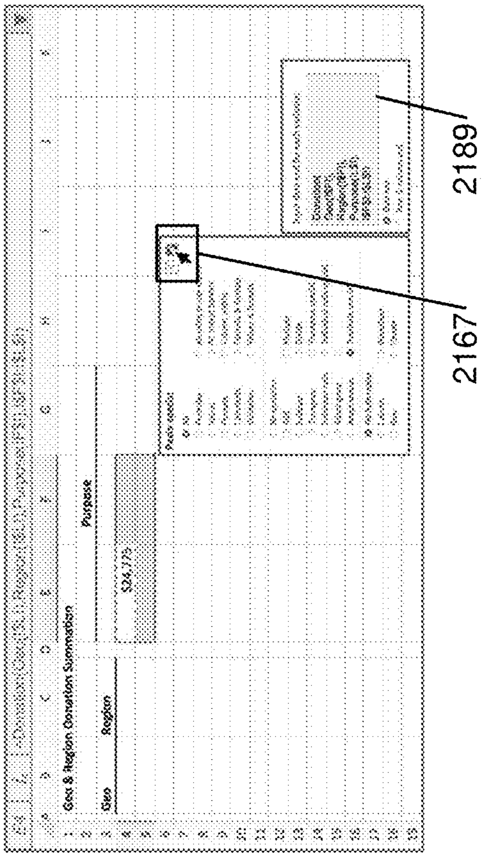

In FIG. 21C the user then alters the variable in the pop-up 2189 to be:

Donation(Geo(!$F!),Region(!$F!),Purpose(!L$!),!$F$!:!$L$!)

Thus, making 'Geo' copy LAST to FIRST, 'Region' LAST to FIRST and 'Purpose FIRST to LAST once the user hits the check mark in 2167. This gives the user the twelve values in 2174 in FIG. 21D which match the twelve values 1986 in FIG. 19B and were generated despite not having the headings 1966 and 1981 in FIG. 19B.

Figure 21D:
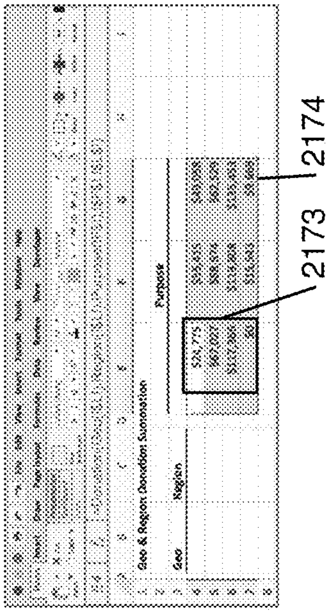
Figure 22:
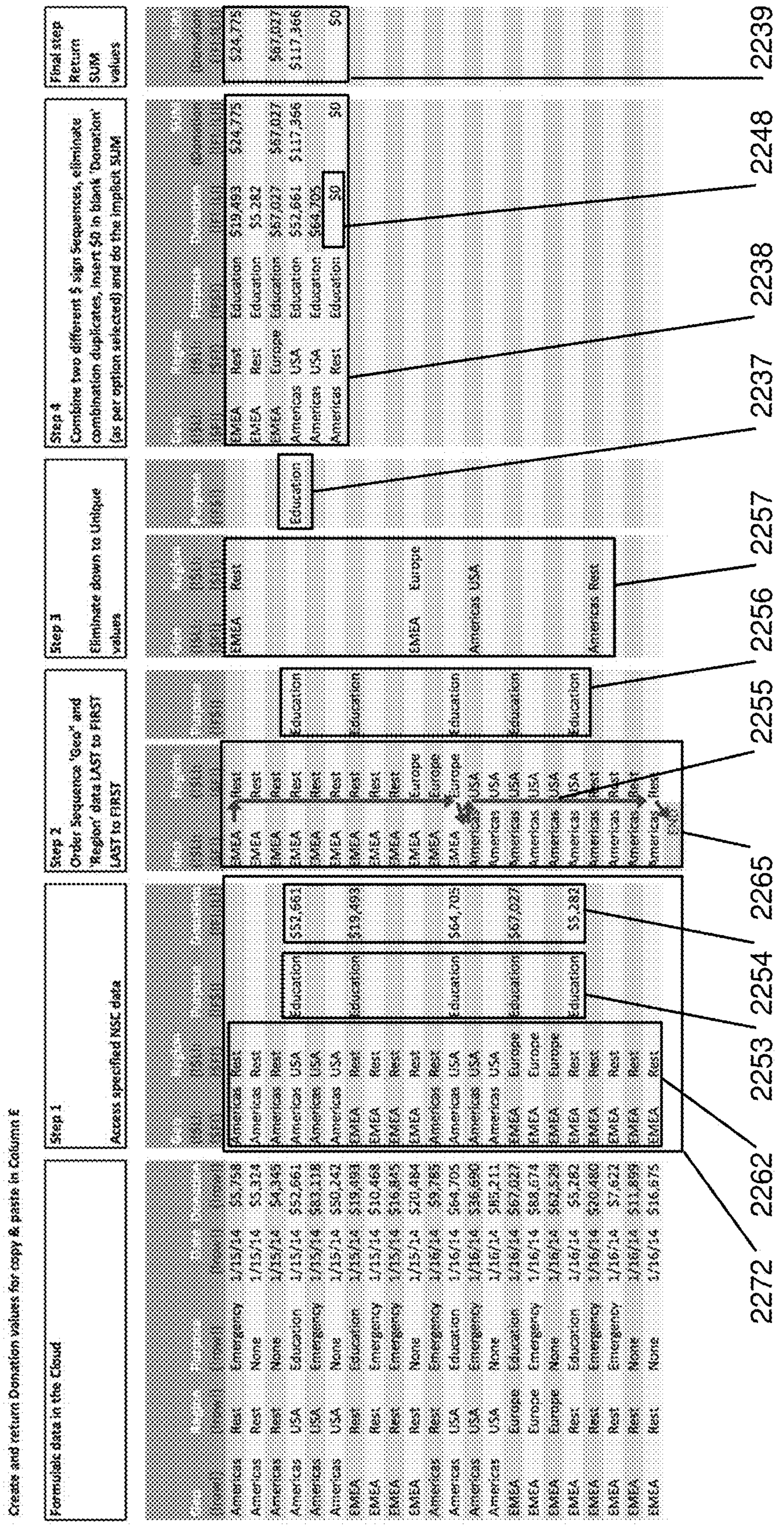
FIG. 22 illustrates the mechanics of Multiple Sequence and Data End variants of Ordered Sequential Replication copy and paste capability for calculation cells.

FIG. 22 illustrates the copy and paste operations for the four cells in column E 2173 in FIG. 21D. It is a five-step process in which the values of 'Purpose' are not changing because we are not moving right to left. The value of 'Purpose' is not impacted by 'Geo' and 'Region' even though they precede 'Purpose' in the formula because they have different single '$' syntax ('!$L!' vs !F$!'). In step one 2272 the full set of 'Geo' and 'Region' values are accessed 2262. The 'Purpose' values 2253 are filtered for the FIRST 'Purpose" value which happens to be 'Education'. The Donation values 2254 are filtered for the combination of the 'Geo' and 'Region' pairs and the Purpose value. In step two the 'Geo' and 'Region' data set 2265 is Order Sequenced LAST to FIRST, LAST to FIRST together as shown by the red arrows 2255. The Purpose 2256 values are made ready for the next step. In step three, the disclosed technology eliminates to the unique combinations for the set of data 'Geo' and 'Region' 2257 and the Purpose value of 'Education' 2237 is eliminated down to one value. In step four 2238 our technology combines the data sets and because in this embodiment any empty combinations have a zero value, '0' is filled in for 2248 for the selected user. Step four then completes the four implicit summations to create the four different Unique Donation values in the last column of 2238. In step five those four Donation values 2239 are sent to the cells 2173 in FIG. 21D.

Figure 23:
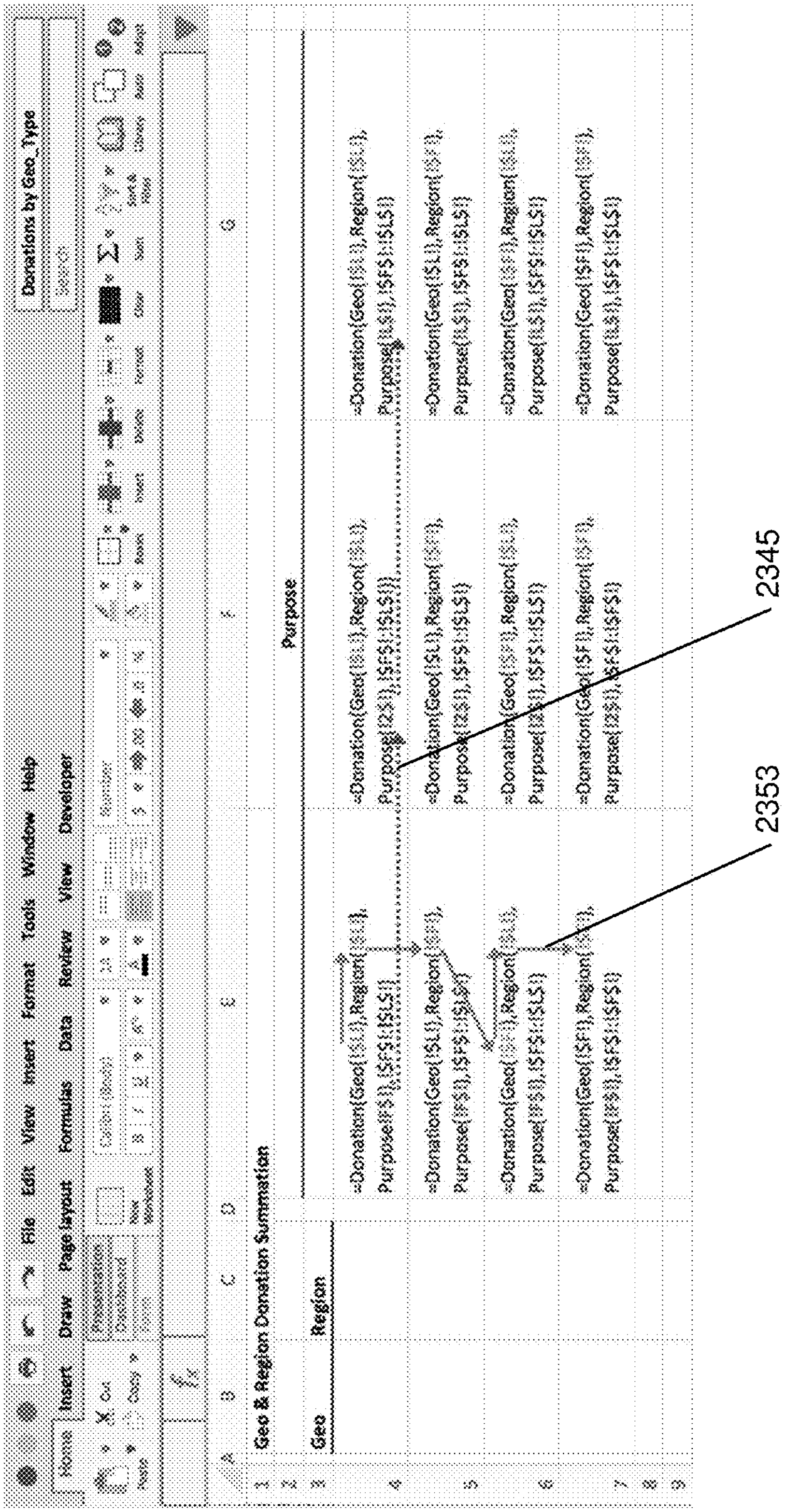
FIG. 23 shows the formulas generated for the calculation cells created using Multiple Sequence and Data End variants of Ordered Sequential Replication copy and paste capability.

FIG. 23 displays the formulas for all twelve of the cells copied and pasted in FIG. 21D selection 2174. The highlighted blue values and arrows 2353 show the Ordered Sequences LAST to FIRST for both the 'Geo' and 'Region' values. Because there is only one variable, Purpose, changing as the user copies to the right it tracks changing Unique values as it moves with the red values indicated by the red arrows 2345.

Figure 24A:
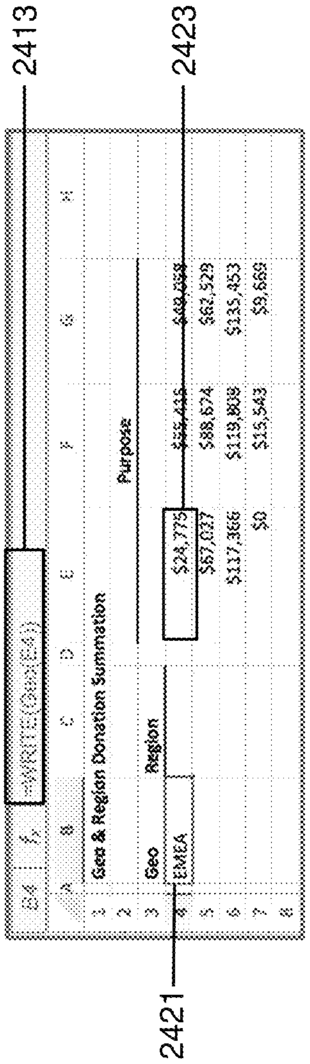
FIG. 24A FIG. 24B and FIG. 24C example formulaic variable WRITE capability for writing the selected variable from a formula using multiple variables.
Figure 24B:
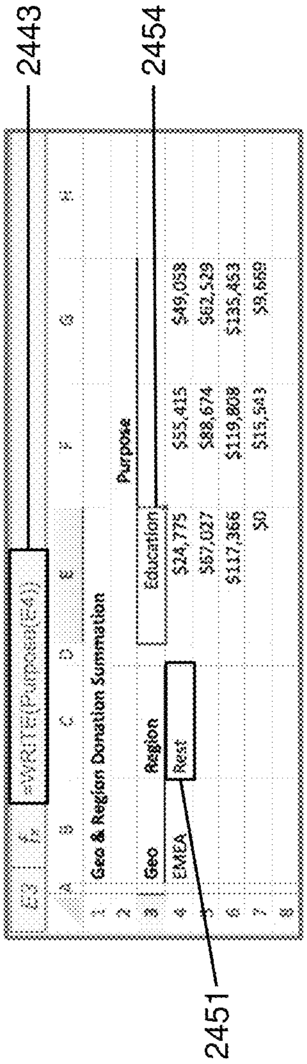
Figure 24C:
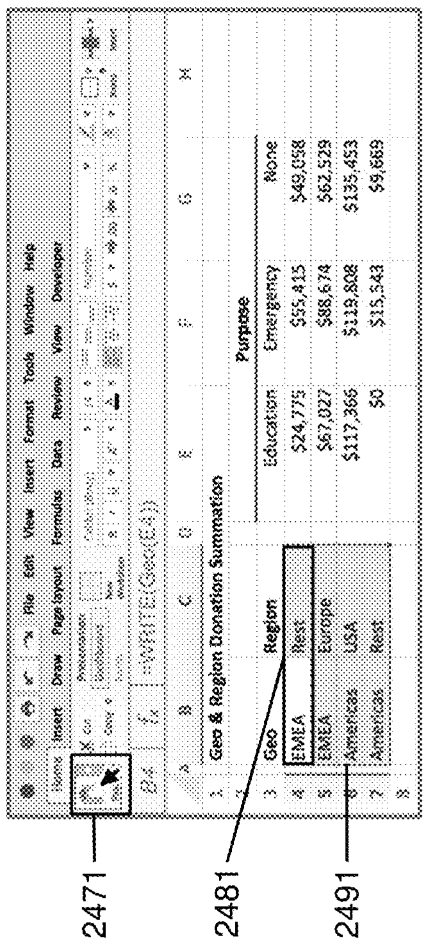

FIG. 24A through FIG. 24C illustrate adding the heading labels for the cells in 2174 in FIG. 21D using another embodiment of the disclosed technology. FIG. 24A shows cell B4 2421 with a formulaic variable WRITE formula '=WRITE (Geo(E4))' 2413 for writing the 'Geo' variable value used in cell E4 2423, getting the 'Geo(!$L!) value from the formula 2124 below which is in cell E4:

'=Donation(Geo(!$L!),Region(!$L!),Purpose(!F$!),!$F$!:!$L$!)'

In this situation, because 'Geo' only has one value used in the formula 2124 for cell E4 2423 it writes that value 'EMEA' in cell B4 2412. A later example will show what would have occurred in the case in which more than one value of 'Geo' is in that formula 2124.

FIG. 24B shows adding a second row heading in cell C4 2451 and a row heading in E3 2454 with the formula '=WRITE (Purpose(E4))' 2443, in preparation for a regular copy and paste of the full set of headings as completed in FIG. 24C. That copy and paste is completed in the pasting action 2471, replicating the formulas of the two cells 2481 into the paste cells 2491. This gives the user another very easy way to create the headings for complex external data sets. It also gives the user an easy way to check that they have the correct values in a complex formula by writing some or all of its values to cells that they can then check against the values they expected.

Having used this very small data set to example some of the basic principles of how the disclosed technology works, we will now use a more realistically sized set of the same data to better illustrate more of the capabilities and show additional aspects of our technology. We are staying with the same Charity volunteer but now the person wants to understand the charity donations for a specified time-period by the location of the donor and by the designated purpose of the donation. The user is using the cloud available data in FIG. 25, all of which is non-keyed multi-value (non-discrete) data shown as such with our '!row!' 2521 syntax. Instead of the 22 rows in our previous example, the user has '12,328,439' rows 2526 of charity donations spanning almost 25 years ('7,832' days 2567). Spreadsheet operations that seem simple at the 22-data point level are decidedly more complicated with all the complexity and potential data problems at the 12 million data point level. For example, the value of letting the user easily and quickly see and organize the unique values in the data is massively more valuable.

Figure 25:
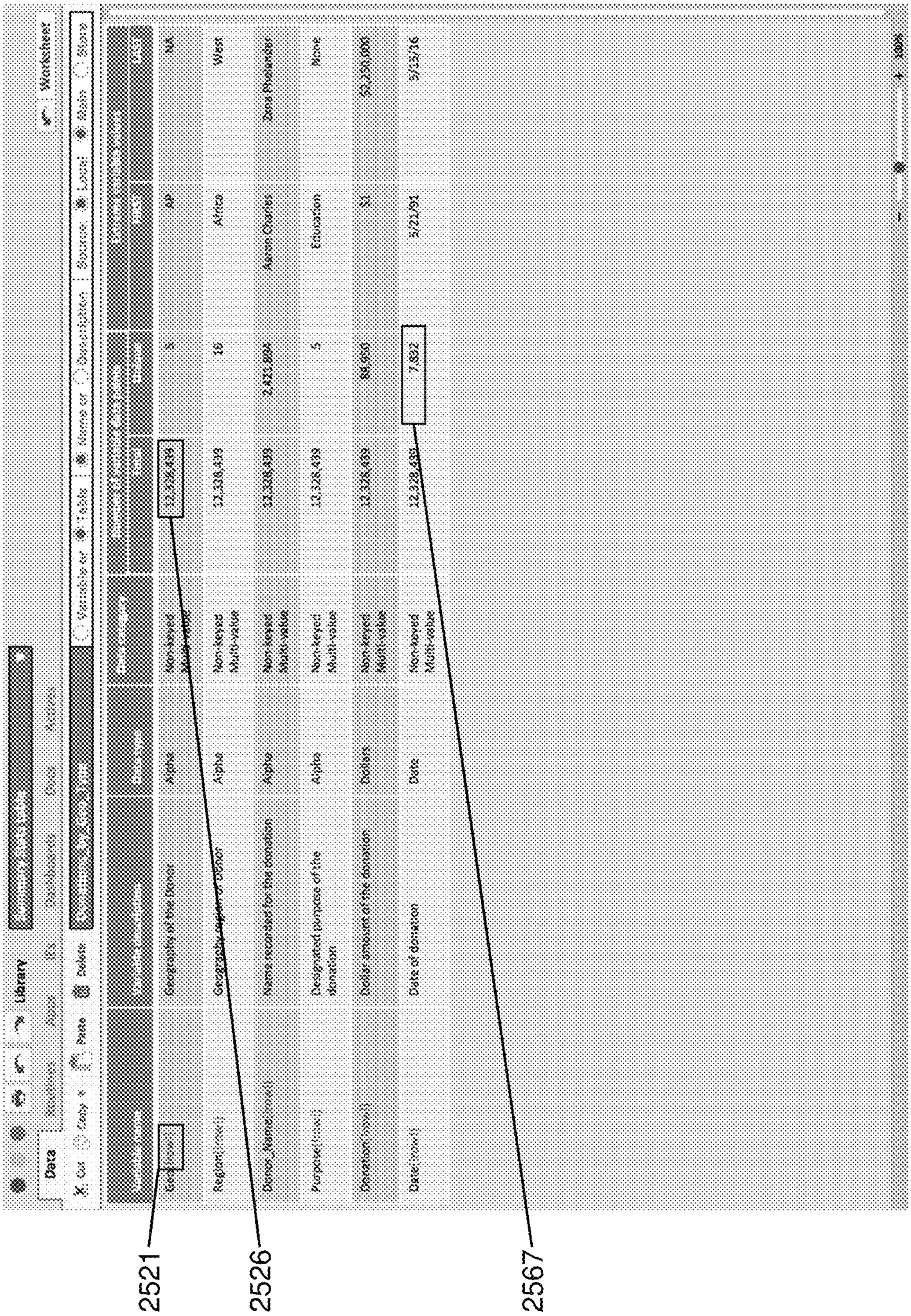
FIG. 25 shows the summary statistics for a sizeable non-keyed NSC (cloud) data set.

In FIG. 26A disclosed formulaic variable WRITE statements create the donation 'Purpose' headings 2636 and the user wants to fill out the 'Geo' and 'Region' of the donor without spending time looking at data summary FIG. 25 and looking at the cloud data to view all the different permutations and combinations of 'Geo's and 'Region's to manually construct the headings. In this example, adding headings would be difficult as the user wants to limit the headings to the values of a specified date range (a constraint or filter). The user writes the command 'WRITEMC(' shown in formula 2614 for cell 'A6' 2642 with the help pop-up 2644 to aid by showing the inputs. The user then inputs the values desired for column A in this example 'Geo(!F!):Geo(!L!)' 2615 followed by the values for column B 'Region(!F!): Region(!L!)' 2616 using in this example the less abbreviated syntax. They then put in a bar '|' 2617 to show that they are finished with the columns and input 'Date(A2): Date(A3)' 2619 as the date constraint for the 'WRITEMC' formula. When they hit return, they get the two columns of row headers shown in FIG. 26B 2668. Those column headings are limited to the values between '1/1/15' 2622 and '12/13/15' 2632 and so any other values of 'Geo' and 'Region' used during a different time-period have been excluded.

FIG. 26C shows the order of the headings created in 2668. Our technology used a version of the steps we have previously discussed outlined in FIG. 26D, but not illustrated because of the huge amounts of data involved. In step one 2696 our application accesses all the Geo and Region data between 'Date(A2): Date(A3)' 2619 inclusive, which in this example is between '1/1/15' 2622 and '12/31/15 2632. In step two 2697 that data set, likely well over half a million rows, is then Order Sequenced FIRST to LAST for both 'Geo' and 'Region' together. In step three 2698, a huge set of duplicate combinations are removed to leave the Unique combinations. Then in the final step 2699 those Unique combinations are returned to 2668 and their formulaic variable formulas are returned to the cells. Because the user in this example specified a FIRST to LAST sequence in both 'Geo(!F!):Geo(!L!)' 2615 and 'Region(!F!):Region(!L!)' 2616, the region starts with the FIRST 'Geo' 'AP' in cell A6 and continues 'AP' until the all the Regions for 'AP' 2672 are filled in 2613, 2623, and 2633. The 'AP' regions are ordered alphabetically with 'Asia' 2613, first, 'Japan' 2623 second and 'Oceania' 2633 last. Then the next Geo 'China' 2682 is started with 'Northern' 2643 Region first and 'South and Central' 2653 last. Then the third Geo 'EMEA' 2692 is started with the first Region 'Africa' 2663 followed by the second 'Mid East' 2673, the third 'N Europe' 2683 and then the last 'S Europe' 2693. The process continues going through the rest of the Geos and Regions in a similar fill the level to the right before incrementing the level to the left Bottom Up approach. This same process will apply to as many levels as the user elects to use and works the same way for column headings filling the level to the right before incrementing the level to the left we have previously discussed.

As shown in FIG. 26A through FIG. 26C, the disclosed WRITEMC command offers a very simple way to work through complicated NSC data sets and see an organized layout. It allows users to constrain data within the data set, as displayed in this example with the constraint of the date range specified by 'Date(A2): Date(A3)' 2619. This data can be easily re-sequenced and the command syntax abbreviated, in manners similar or different to what we have previously discussed, to reduce user work.

Figure 27A:
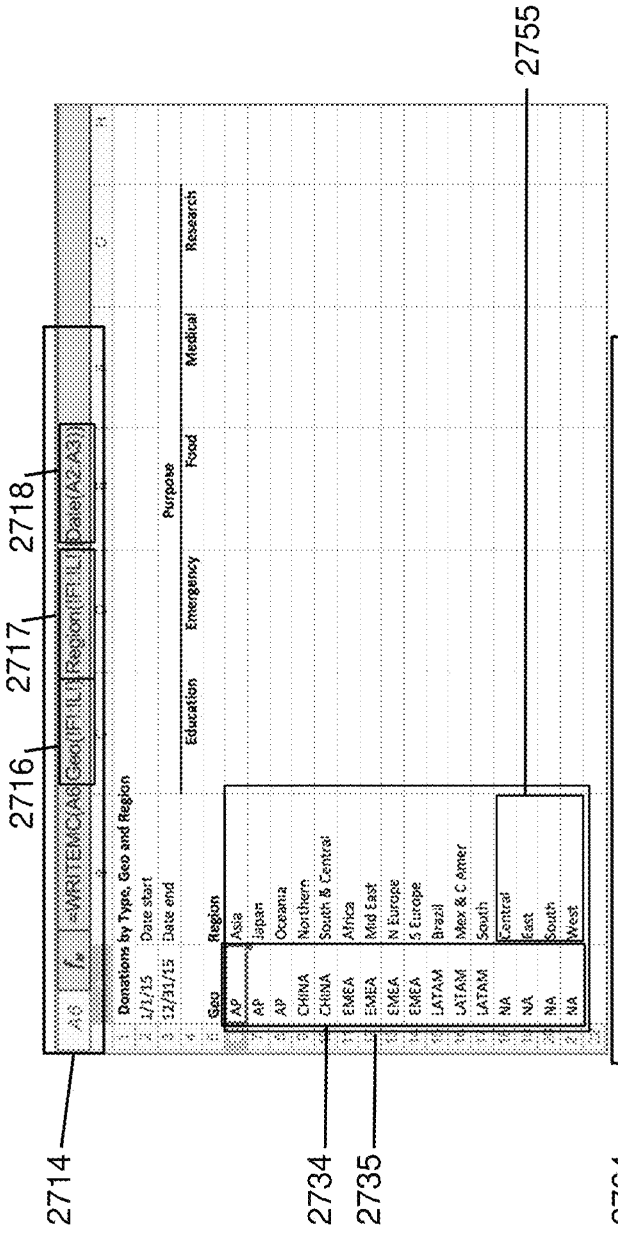
FIG. 27A and FIG. 27B examples the case of manipulating the NSC data within the spreadsheet using Multiple Column WRITE capability.
Figure 27B:
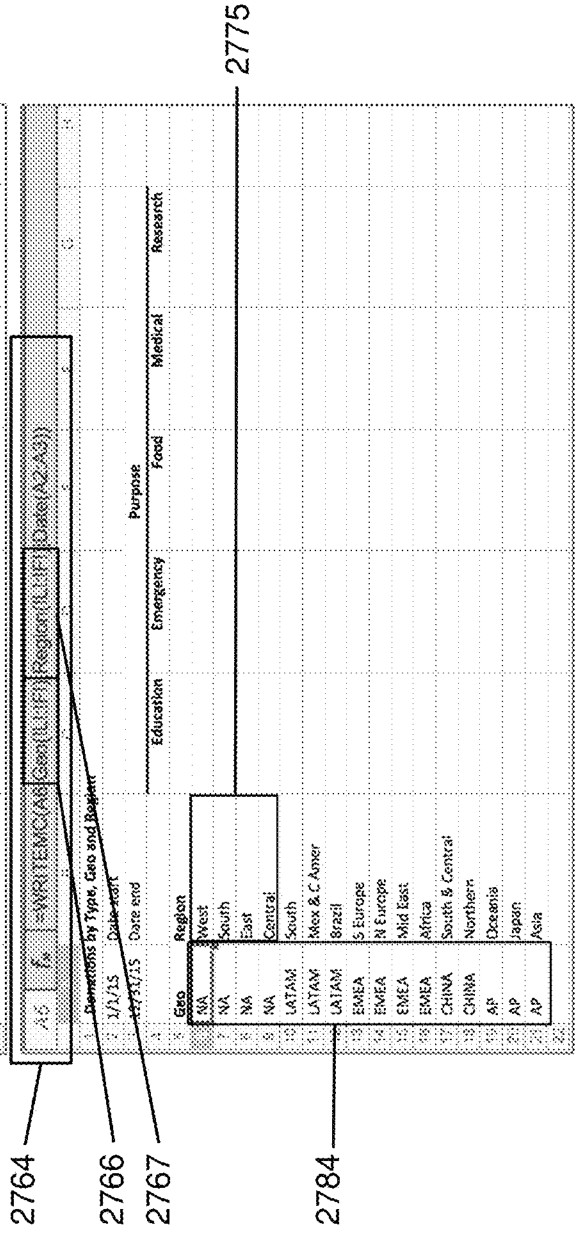

FIG. 27A uses the abbreviated command syntax we exampled earlier where the user replaces NSC data command 'Geo(!F!):Geo(!L!)' 2615 with 'Geo(!F!:!L!)' 2716, 'Region(!F!):Region(!L!)' 2616 with 'Region(!F!:!L!)' 2717 and the 'Date(A2): Date(A3)' 2619 with 'Date(A2: A3)' 2718. This gives the values shown in 2735 which are identical to the content in 2668. In FIG. 27B the user then reordered the content by altering the formula in A6 2714 to that of A6 in 2764. By switching 'Geo(!F!:!L!)' 2716 to 'Geo(!L!:!F!)' 2766 the Geo column content is reordered from FIRST to LAST in 2735 to LAST to FIRST in 2784. By making a similar change from 'Region(!F!:!L!)' 2717 to 'Region(!L!:!F!)' 2767 the Region content is also changed in order from FIRST to LAST as shown in 2755 to LAST to FIRST as shown in 2775. This capability by changing just a few characters allows the user to easily organize the data in different ways and thereby easily tailor the presentation of the information.

Figure 28A:
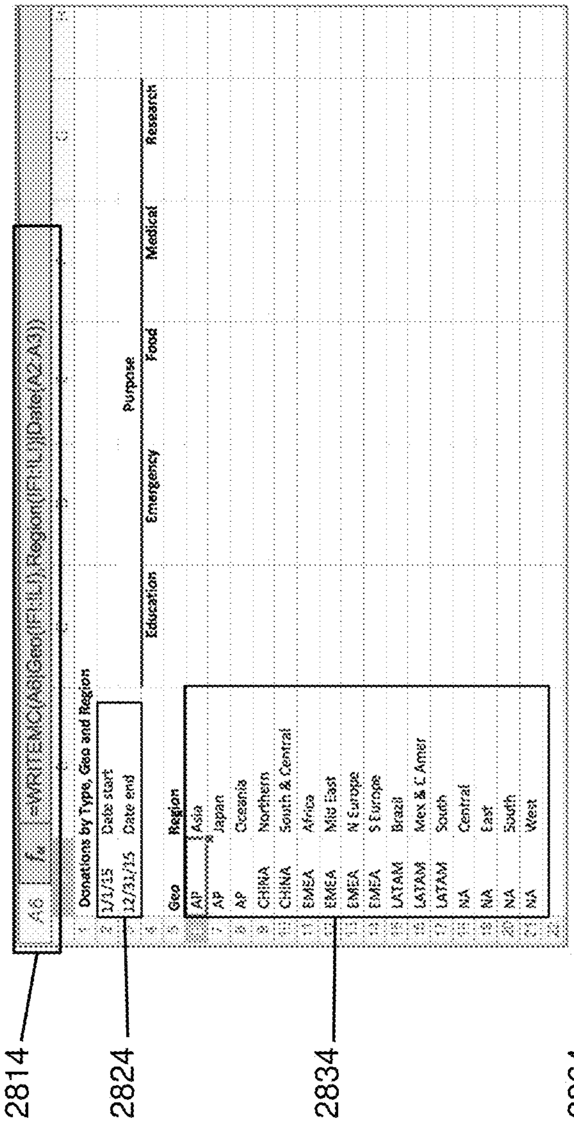
FIG. 28A and FIG. 28B example the automatic impact of changing the constraints (filter) for a Constrained Multiple Column WRITE.
Figure 28B:
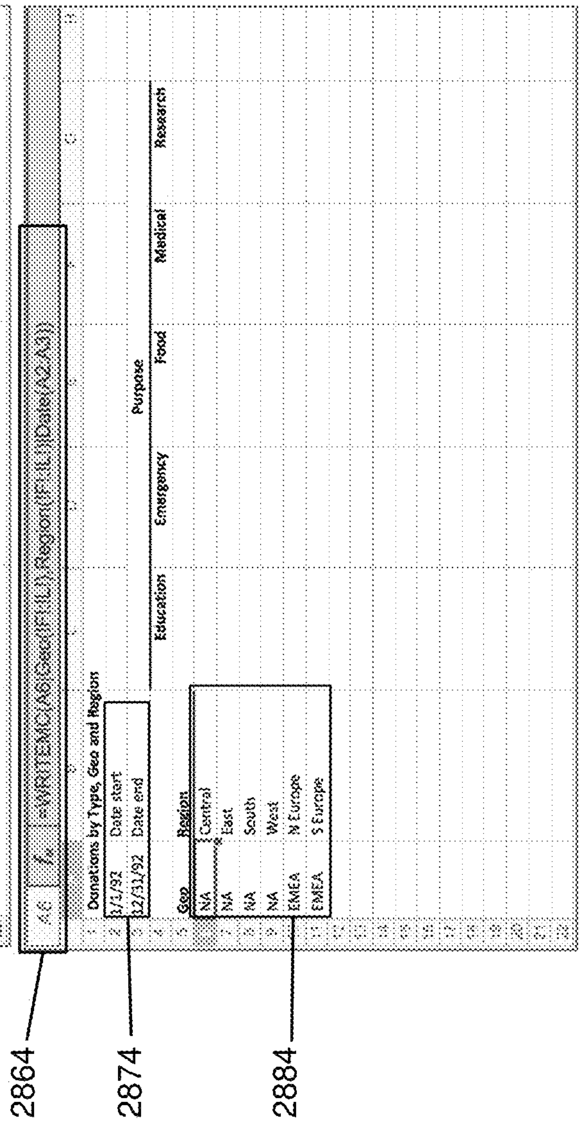

FIG. 28A and FIG. 28B example the automatic impact of changing the constraint for the Constrained Multiple Column WRITEMC variant of Ordered Sequential Replication capability. FIG. 28A shows the columns with the date constraint set to be the days from '1/1/15' to '12/31/15' 2824 while FIG. 28B shows the same columns with the date constraint set to the days from '1/1/92' to '12/31/1992' 2874. The multi-column WRITEMC formula is identical for FIG. 28A cell A6 2814 and FIG. 28B cell A6 2864. However, because in the year 1992 the Charity was in its very early days it only shows Donors in 'NA' and parts of 'EMEA' 2884, while by the year 2015 the Charity has donations from all over the world shown in cells 2834. The row headings in cells 2834 and 2884 were automatically tailored by the disclosed application after the user changed the dates 2824 to dates 2874. While this capability is usable to automatically tailor the presentation of information from a sizeable Non-Spreadsheet Cell (NSC) data set, it becomes even more valuable to users with larger and more complicated data sets such as those exampled in FIG. 29A through FIG. 29D.

Figure 29A:
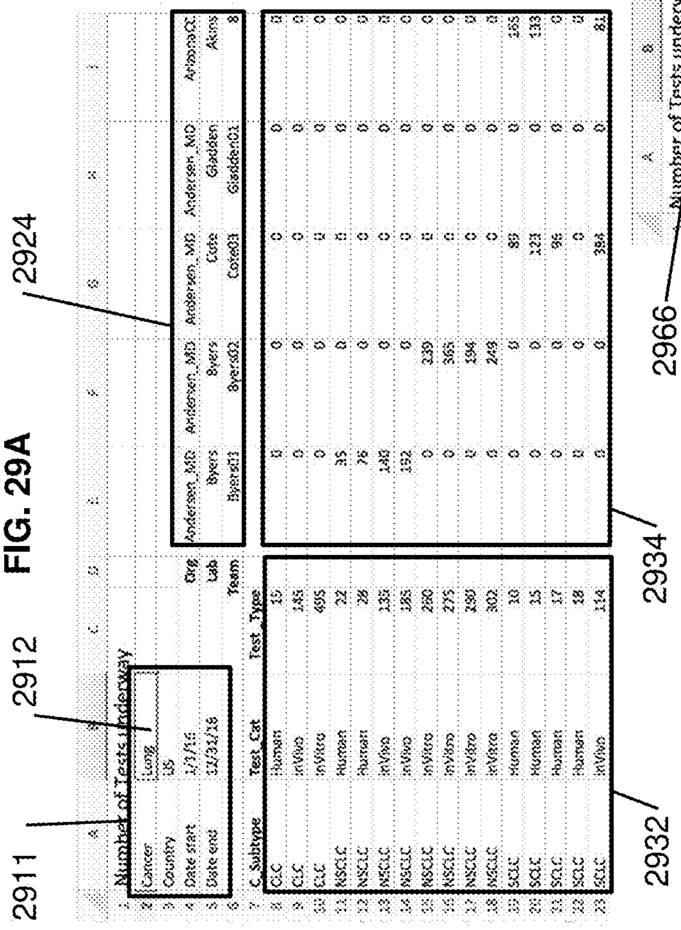
FIG. 29A FIG. 29B, FIG. 29C and FIG. 29D example column and row heading and calculation cell content Auto Flexing using constrained variant of Ordered Sequential Replication.

FIG. 29A examples a spreadsheet with headings and content that is automatically tailored when a user changes any one of four constraint values. The spreadsheet is being created by a cancer researcher who is calculating the number of cancer tests being conducted around the world using data from a large external (e.g., cloud) database. The researcher wants to be able to look at data that changes based on inputs 2911 of the type of 'Cancer', 'Country' of the work, for dates between 'Date start' and 'Date end' with inputs in the adjacent cells in B2 to B5. Those changes would be reflected in the column headings 2924, the row headings 2932 and the calculated cell content 2934. The user would like to be able to make a change like changing the cancer type 'Lung' 2912 in FIG. 29A to 'ACC' 2966 and automatically see the result in FIG. 29B. The column headings change from 2924 to 2978, the row headings change from 2932 to 2986 and the calculation cell content 2934 changes to cell content 2988. The total content shows that the total set of 'Lung' results in FIG. 29C 2928, which includes 42 columns and 31 rows, turns into a much smaller set of 'ACC' results in FIG. 29D cells 2937, which includes 14 columns and 17 rows.

This substantial difference occurs because lung cancer is one of the most prevalent forms of cancer with a great deal of research and tests underway, and ACC is a very rare form of cancer with substantially less work underway in 2016. Without an application in which headings and content automatically change, a typical spreadsheet lacks the capabilities to automatically present data sets with this level of tailoring, let alone retrieve that data set directly from the cloud using simple in cell spreadsheet formulas. The ability to very quickly see what 'Org' (organization) in which 'Lab' and what 'Team' in 2924 are doing tests on which 'C_Subtype' (Cancer subtype), 'Test_Cat' (Test category) and specific 'Test_type' in 2932 puts very powerful information easily at the fingertips of the spreadsheet user.

Figure 29C:
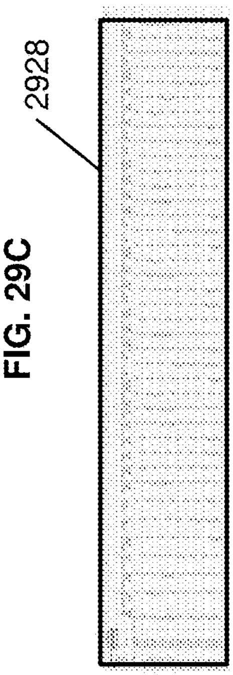
Figure 29D:
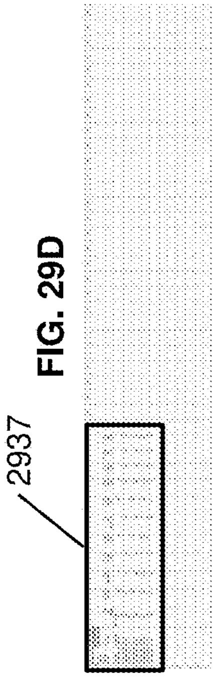
Figure 29B:
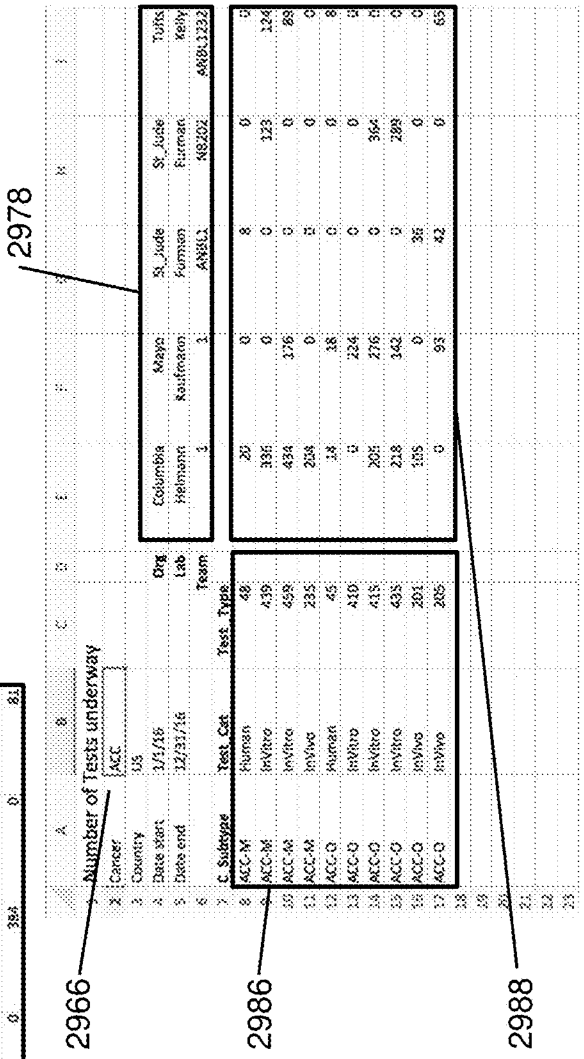
Figure 30:
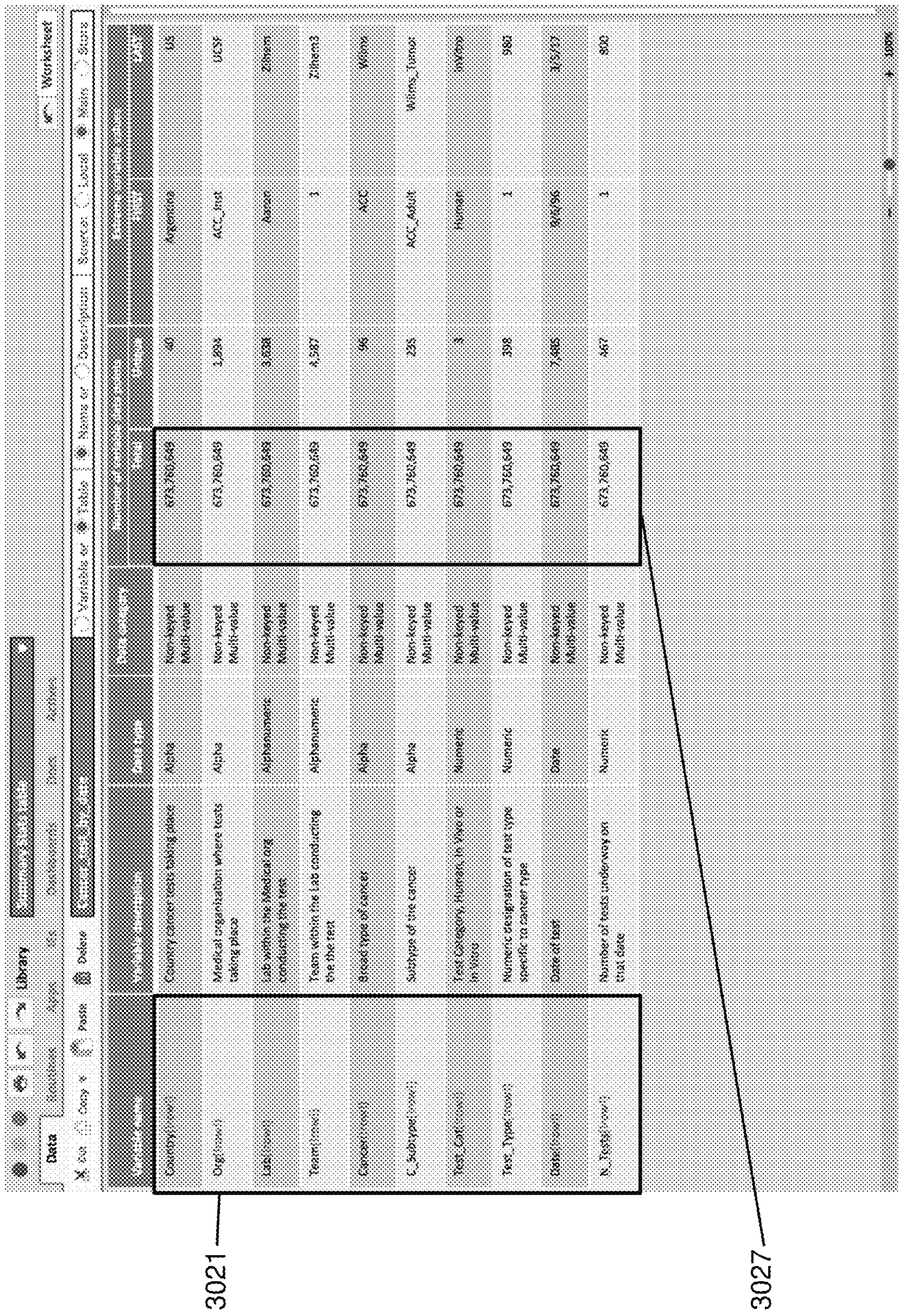
FIG. 30 shows the summary statistics for a non-keyed NSC dataset (e.g., cloud data) that is over 500 times the largest current day spreadsheet maximum row capacity.

Because the raw data need not pass through spreadsheet cells for storage, the disclosed NSC formulaic data approach can handle a row data set (!row!) 3021, as shown in FIG. 30, of '673,760,649' rows 3027 which is dramatically higher than anything current spreadsheets can handle. The capability that we exampled in FIG. 19A through FIG. 29D goes far beyond the spreadsheet pivot table to manually collapse or expand row or column headings and content. Our Auto Flexing row, column and content capability can automatically change in many ways as described next.

The disclosed formulaic data combined with new capabilities can automatically synchronize and change (what we call Auto Flex) calculation cells and accompanying row and column headings via the use of shared constraints. It can be easily set up by users using a combination of WRITE commands and a copy and paste replication of one or more calculation cells.

Figure 31A:
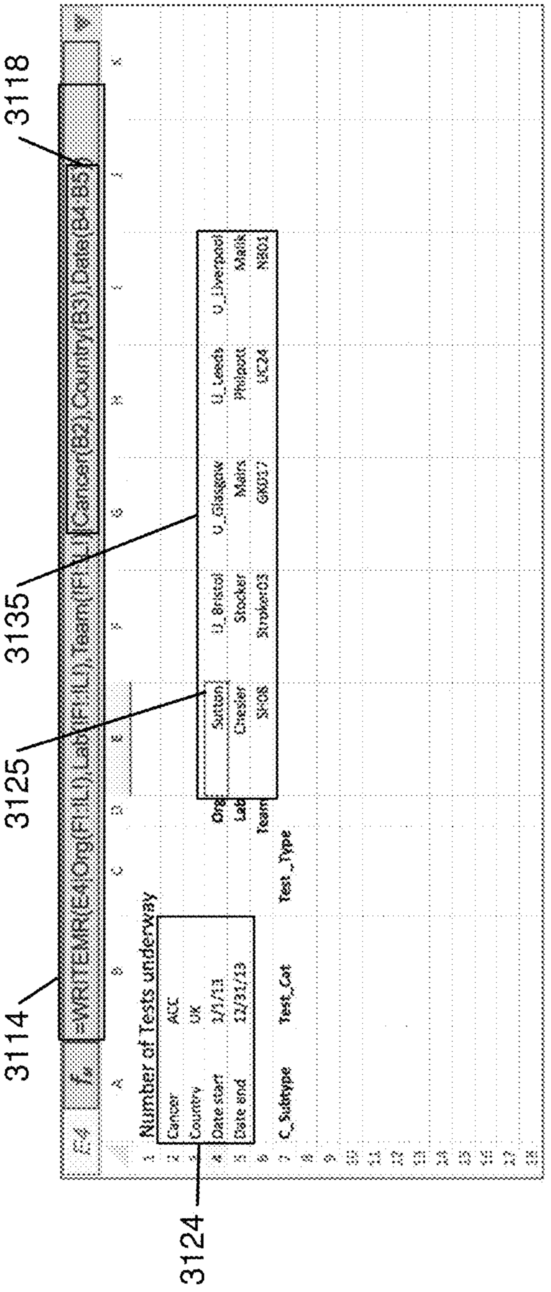
FIG. 31A and FIG. 31B example setting up Auto Flexing Multiple Row and Column WRITE variants of Ordered Sequential Replication.
Figure 31B:
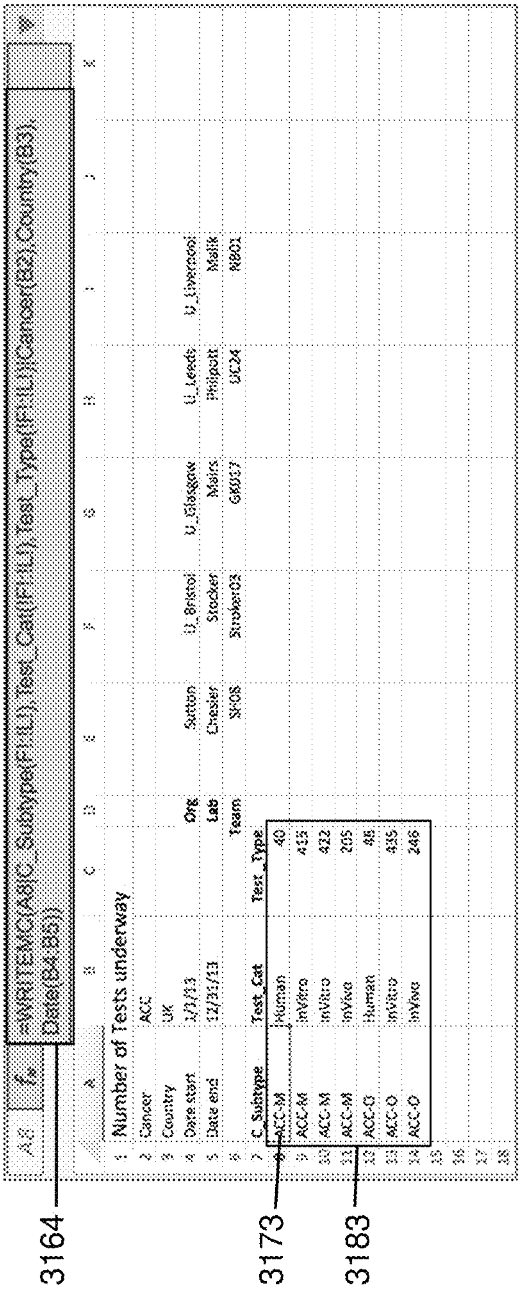

FIG. 31A shows the column heading setup for the spreadsheets in FIG. 29A through FIG. 29D with the four constraints 3124: Cancer, Country and the Date start and Date end combination. It uses the write multiple rows 'WRITEMR' formula shown in formula 3114 for cell E4 3125 to fill in column headings 3135. The formula 3114 incorporates the constraints 3118 in the formula after the 'I' in sub-formula. FIG. 31B completes the headings using the 'WRITEMC' formula 3164 for cell A8 3173 to fill in row headings 3183. This gives a complete set of headings that will Auto Flex with constraint changes and are ready to be used to create the calculation cells.

Figure 32A:
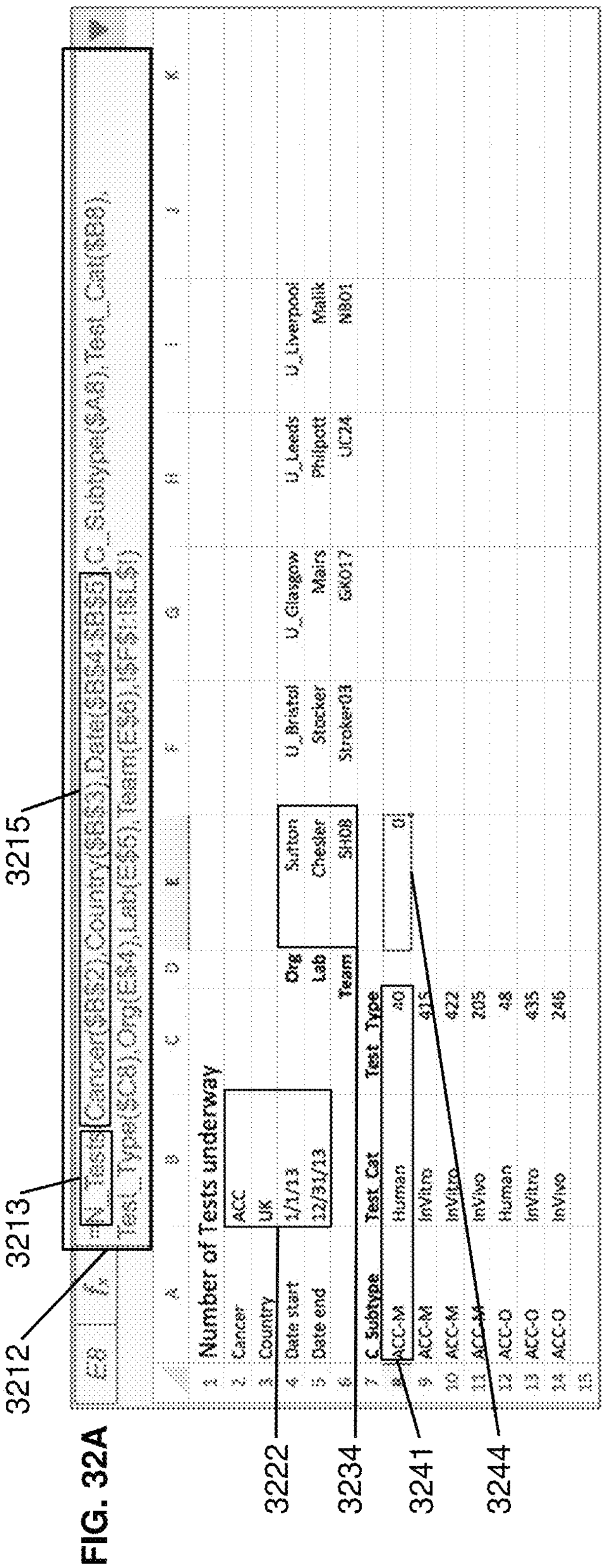
FIG. 32A and FIG. 32B example two different ways of setting up Auto Flexing calculation cells.

FIG. 32A then shows one way to create the calculation cells shown in FIG. 29A 2934 and in FIG. 29B cell content 2988. Our approach has been developed so the user can as much as possible create one cell with a spreadsheet formula, function and $ conventions and then easily copy and paste that cell to create the others. The formula created in cell E8 3244 and shown in 3212 uses our formulaic NCS variables pulling data from NSC data sources (e.g., cloud). It is doing a calculation summing (implicitly) the number of 'N_Tests' 3213 for the 'Org', 'Lab' and 'Team' values shown in 3234 and the 'C-Subtype', 'Test_Cat' and 'Test_Type' values shown in cells 3241 using the constraints of the 'Cancer', 'Country' and 'Date start' and 'Date end' shown in 3222. In this embodiment of our technology specifying the order of sub-variables in the formulaic data is how the user applies the constraints. The constraints (or filters) apply to any variable that follows them, provided the constraints are not single '$' limited or reset, (as described in FIG. 21A supra). In this example, when constraints are positioned first 3215 within the variable 'N_Tests' 3213 and do not have a single '$', they apply to the variables 'C_Subtype($A8),Test_Cat ($B8),Test_Type($C8), Org(E$4), Lab(E$5), Team(E$6)' and the variable 'N_Tests' 3213 because its '!$F$!:!$L$! also follows the constraints. The use of the headings values with the '$' limitations on copy and paste then make it so this one cell can be easily replicated to the other cells. Because the number of cells will potentially vary with the constraints, it requires one of the disclosed Replicate Special End copy and paste variants: either Data end or Column and row end.

Figure 32B:
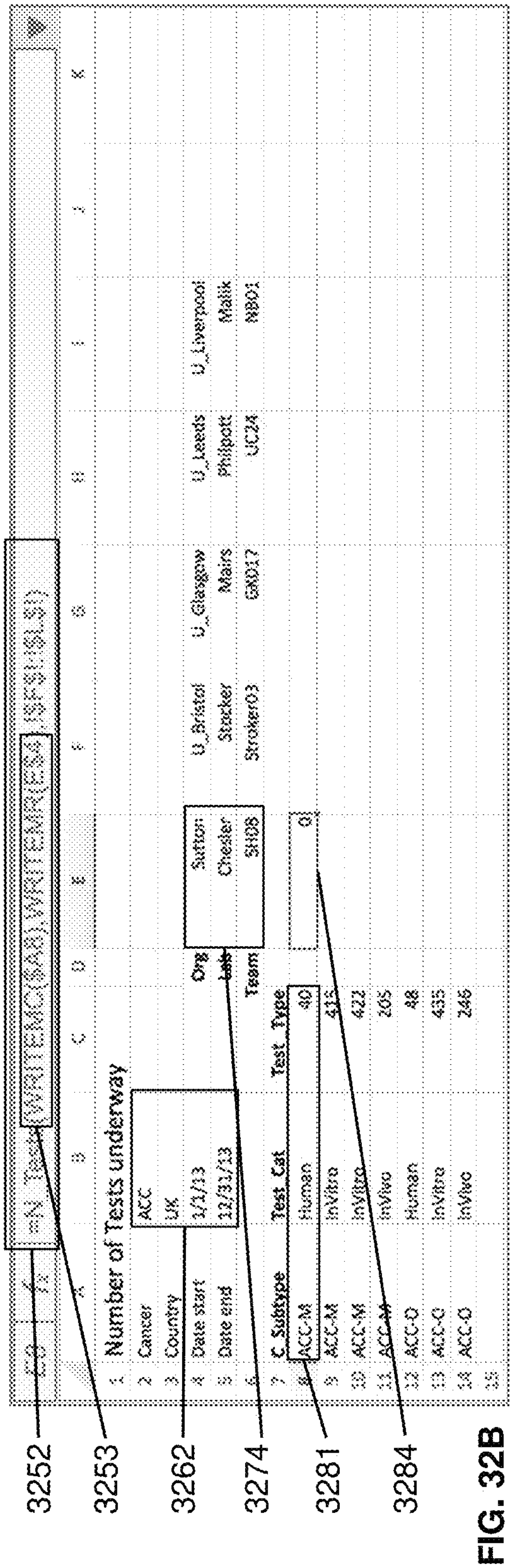

FIG. 32B shows another way to create the calculation cells shown in FIG. 29A cell content 2934 and in FIG. 29B cell content 2988. It takes full advantage of the changeable nature of the multiple row and column headings. In this embodiment of our technology, when a multiple write command is placed within the parentheses of a formulaic variable, the variable inherits all of its values and constraints (filters) for the row or column that is specified. So, when the user puts 'WRITEMC($A8), WRITEMR(E$4)' 3253 within the 'N_Tests' variable in formula 3252 for cell E8 3284, 'N_Tests' received respectively the 'WRITEMC' values and constraints from the WRITEMC values in cells A8 to C8 3281 and the WRITEMR values and constraints from cells E4 to E6 3274. This makes it very easy for the user to write the formula, for example the implicit sum of 'N_Tests', ensuring the values used match the respective column and row headings, as is accomplished with a very short and simple formula 3252.

Figure 33A:
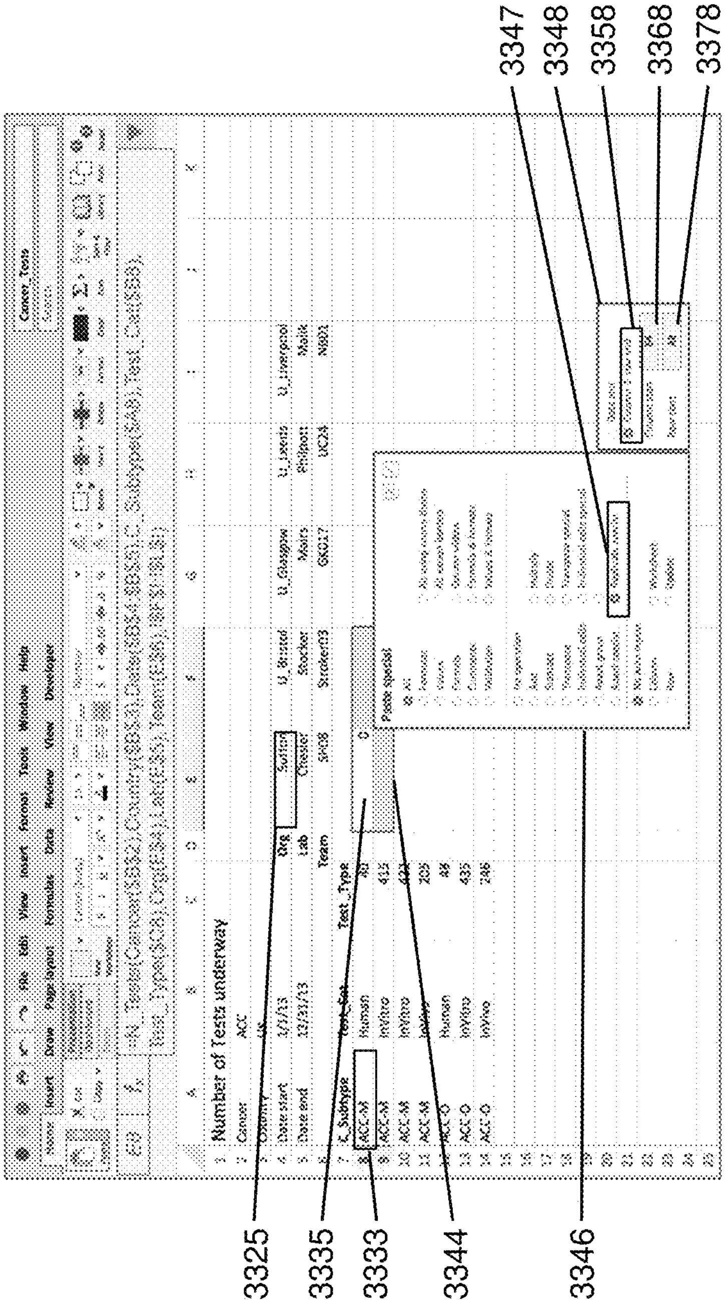
FIG. 33A and FIG. 33B example the Column and Row End variant of the Auto Flexing Ordered Sequential Replication copy and paste for a calculation cell.
Figure 33B:
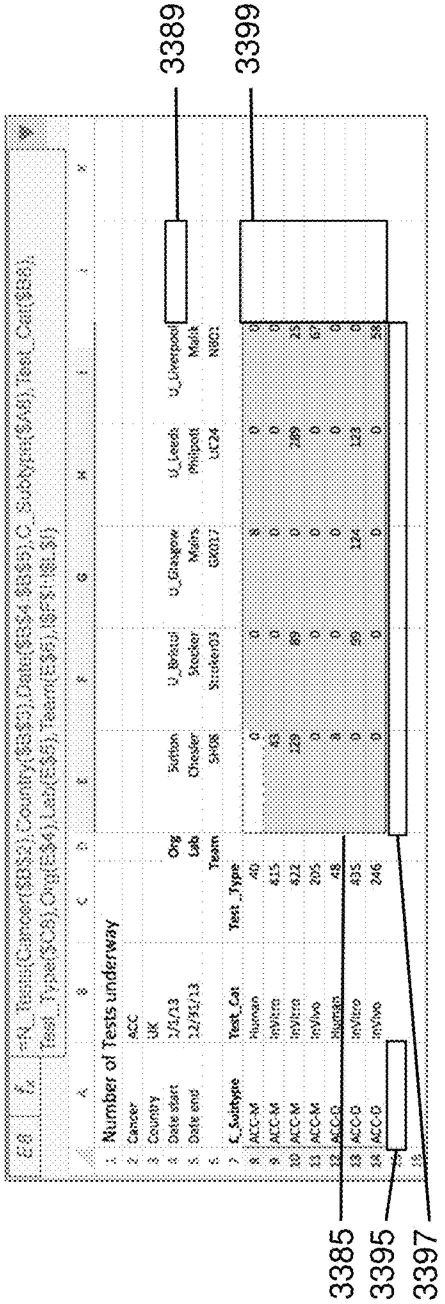

FIG. 33A and FIG. 33B example an additional Replicate Special copy and paste variant, for Column and Row end, of the disclosed technology that populates cells that Auto Flex. Cell E8 3335 is being copied and pasted to the target area identified 3344 which, like in some of our other examples, is arbitrary because the paste will determine the ends of the copy. The user elected to use our paste special pop up box 3346 in which they elected to use 'Replicate special' 3347. That action popped up the additional box 3348 in which the user elected to use the 'Column and row end' option 3358. That option expanded out to show Column start 3368 and Row start 3378 boxes. A user utilizes those boxes in this embodiment to connect the copied cells to their respective Auto Flexing header rows and columns. The user in the 'Column start' box inputs 'E4' in the box 3368 linking the cells to the population of content in cell E4 3325. So, as long as the fourth row starting in cell E4 has content our technology will populate the copied cells in column E. However, once the heading has no content, as it does in FIG. 33B 3389, our technology will not fill the copied cells as shown by the empty cells in 3399. The row header connection works the same way with the user specifying 'A8' in box 3378 linking the number of rows in the copied space to those in column A starting in row 8 3333. Therefore, once the row headings stop, as they do in FIG. 33B at cell A15 3395, the copied space stops shown in the empty cells 3397. This will then automatically adjust as was shown in FIG. 29A to FIG. 29D as constraint changes Auto Flexing the row and column headings. While FIG. 33A and FIG. 33B exampled doing the copy and paste for the calculation cell created in FIG. 32A the same approach will work for the calculation cell created in FIG. 32B, giving the same result.

Figure 34:
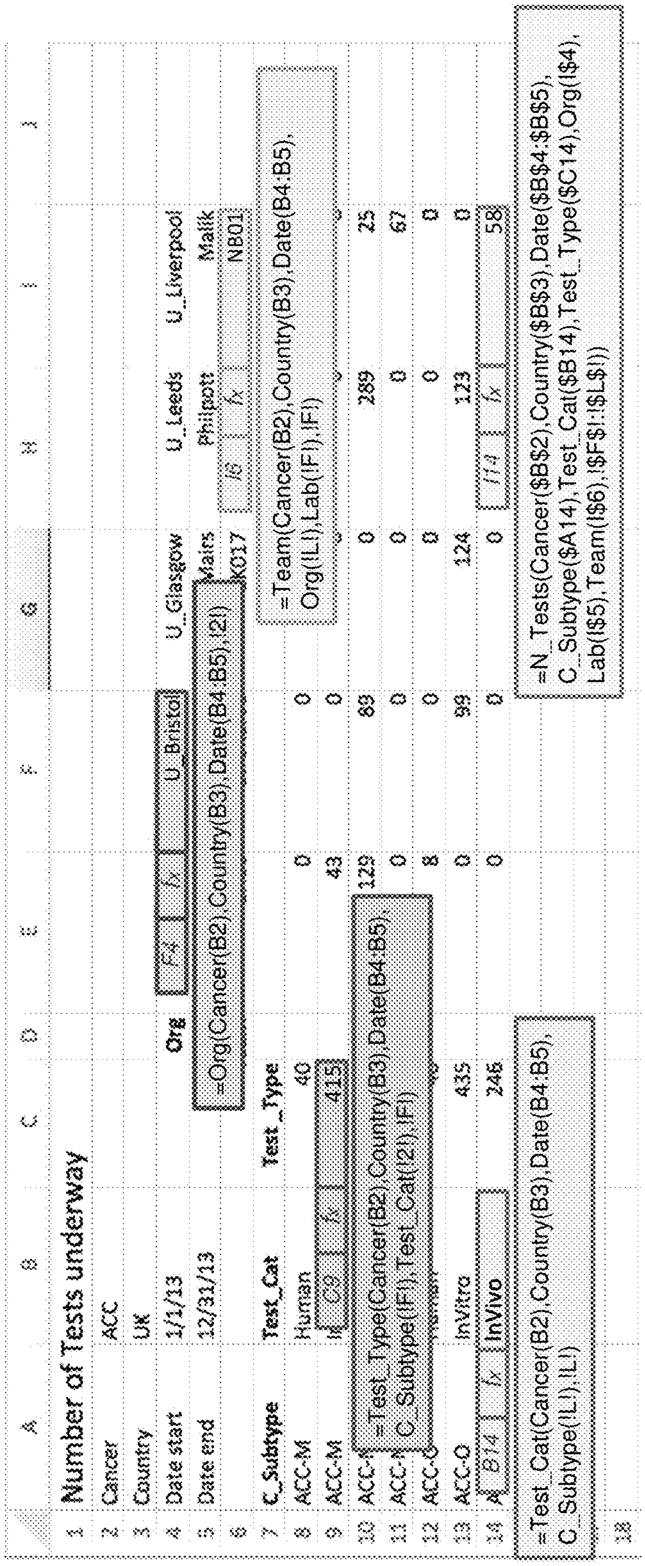
FIG. 34 shows examples of the cell formulas from the copy and paste of FIG. 33B and examples the reason these cells do not need a conversion (e.g., Cube values) for further usage.

FIG. 34 shows that the cells generated by the disclosed Replicate Special copy and paste variant of FIG. 33B cells 3385, as well as the headings, have formulaic values so they can be copied and pasted or moved elsewhere without any need for Cube values (required to use values in a conventional spreadsheet pivot table elsewhere) or any other such conversion for further use. They can however be copied so that they retain their current values and do not flex with changes in the constraints.

Figure 35:
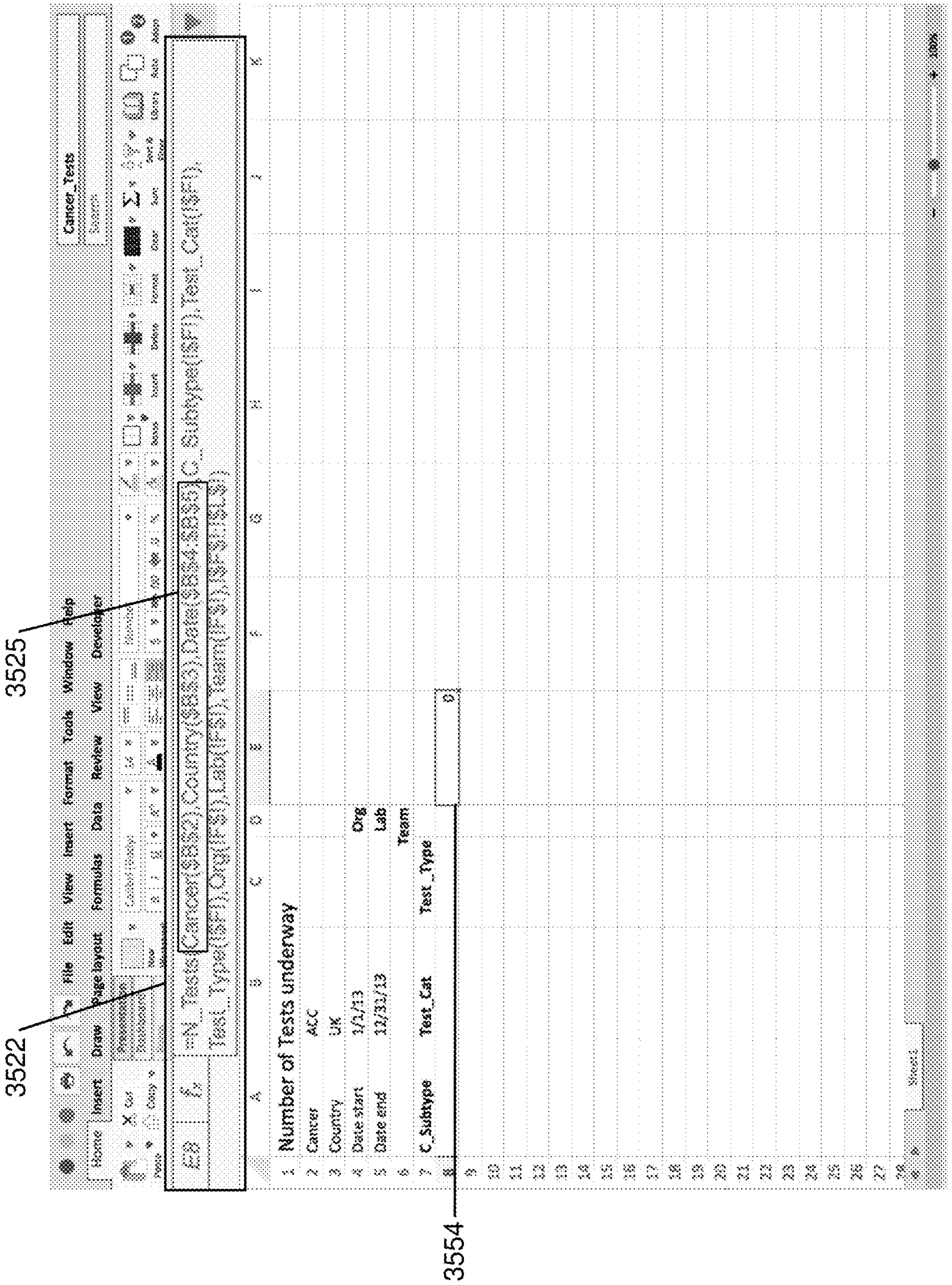
FIG. 35 examples using Auto Flexing Ordered Sequential Replication Formulaic variables to create a calculation cell that does not require row and column headings to create content, as if it had them.

FIG. 35 examples using the disclosed Unique variant of our Order Sequential Replication Formulaic variables to create a cell from which a copy and paste can be utilized to create the spreadsheet cells in FIG. 33B cells 3385 without the need for the row or column headings. They replace the formula 3212 that uses the headings in FIG. 32A:

'=N_Tests(Cancer($B$2),Country($B$3),Date($B$4:$B$5),C_Subtype($A8),Test_Cat($B8), Test_Type($C8),Org(E$4),Lab(E$5),Team(E$6),!$F$!:!$L$!)' with the formula 3522 in FIG. 35 that needs no row or column headings:

'=N_Tests(Cancer($B$2),Country($B$3),Date($B$4:$B$5),C_Subtype(!$F!),Test_Cat(!$F!), Test_Type(!$F!),Org(!F$!),Lab(!F$!),Team(!F$!),!$F$!:!$L$!)'

The constraints 'Cancer($B$2),Country($B$3),Date($B$4:$B$5)' 3525 in FIGS. 35 and 3215 in FIG. 32A are the same in both formulas but the subsequent variables in the formulas are different with the heading free version replacing the cell references with our Unique formulaic commands using '$' variants of '!F!' and !L!. Therefore, both the formula 3212 in FIG. 32A and its comparable formula 3522 in FIG. 35 generate the same value of '0' in cell E8 3554 and E8 3244.

Figure 36A:
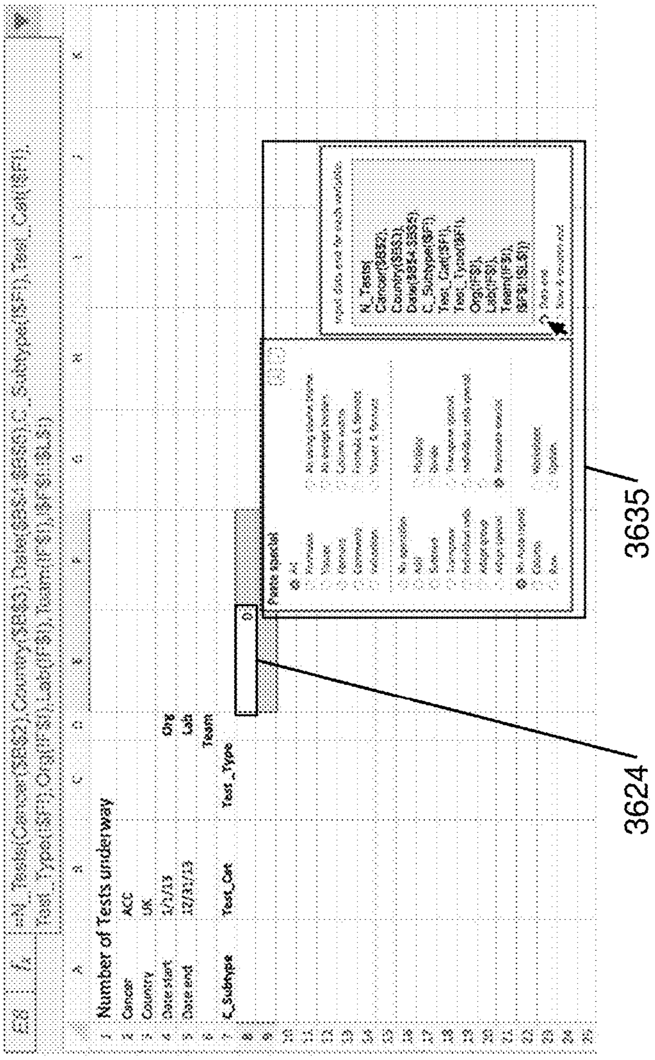
FIG. 36A FIG. 36B and FIG. 36C example the user employing Auto Flexing Ordered Sequential Replication Data End copy and paste for a calculation cell not using row and column headings.
Figure 36B:
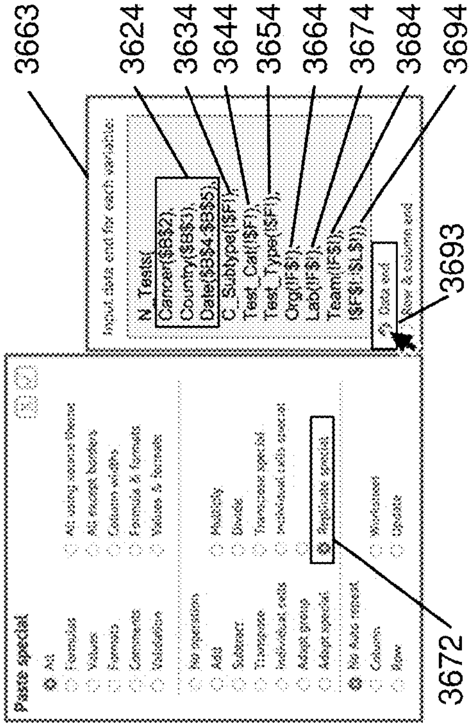
Figure 36C:
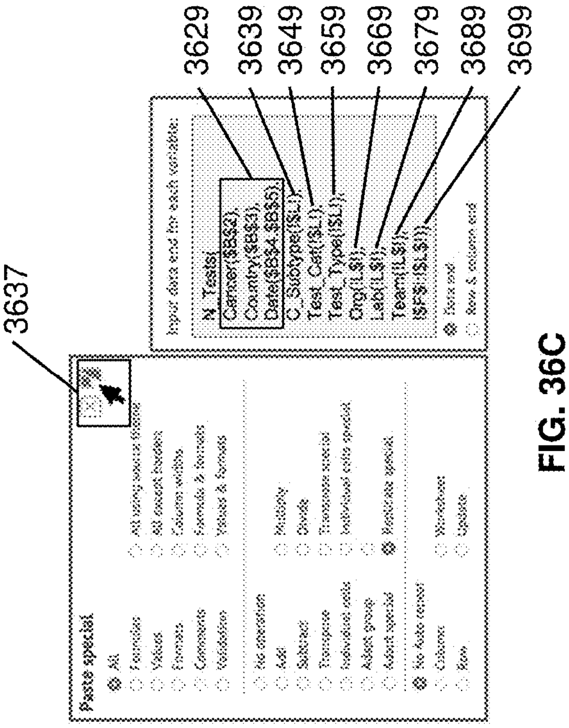

FIG. 36A to FIG. 36C example employing the disclosed Unique Data End variant of the disclosed Ordered Sequential Replication copy and paste on the calculation cell generated in FIG. 35, using the copy and paste on a formula that has many constraints (filters), many different row and column headings, and that Auto Flexes.

In FIG. 36A the user has started the copy and paste process for the formula in cell E8 3624 selecting the disclosed Replicate special and 'Data end' option in 3635. FIG. 36B shows a blow up of 3635 detailing the selection of 'Replicate special' 3672 and the selection of 'Data end' 3693. Those selections expand the 'Input data end for each variable' box 3663 which gives the user the list of variables that they can change to utilize their desired endpoint. In this example, the user sets those endpoints in FIG. 36C. A comparison of the respective values in FIG. 36B and FIG. 36C shows that the user made no changes to the constraints 3624 compared with constraints 3629. However, the user changed the next six 'N_Tests' variables 3634, 3644, 3654, 3664, 3674 and 3684 in FIG. 36B, from the '!F! FIRST variant of our formulaic variable to the !L! variant 3639, 3649, 3659, 3669, 3679, and 3689 in FIG. 36C while retaining the same '$' syntax. Finally, the user did not choose to alter the 'N_Tests' '!$F$!:!$L$!' 3694 compared with 3699 and then finish the paste by selecting check mark 3637. Our technology then determines the correct range for the copy and paste and populates the values shown in FIG. 37A 3745. The user has the capability to alter one of the constraints 3722, 3732 or 3742 and have the spreadsheet Auto Flex the results.

Figure 37C:
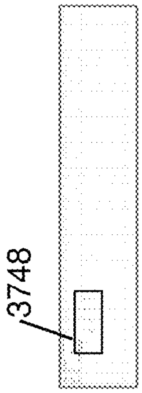
FIG. 37A FIG. 37B, FIG. 37C and FIG. 37D example the impact of a constraint (filter) change on a set of calculation cells using Auto Flexing Ordered Sequential Replication.
Figure 37D:
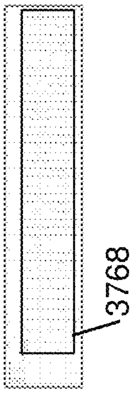
Figure 37A:
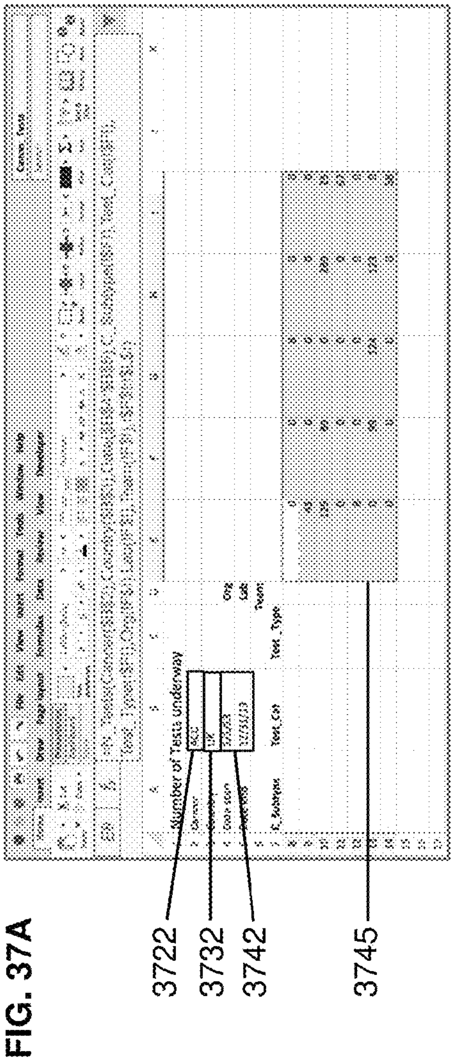
Figure 37B:
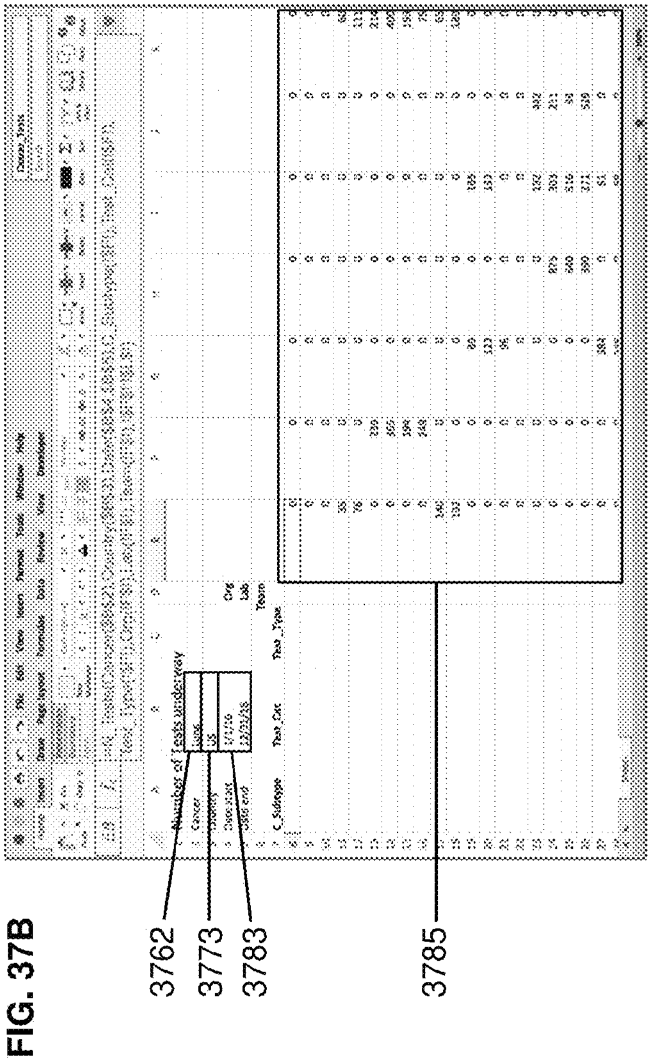

FIG. 37B examples that constraint (filter) changing capability as the user changed the Cancer from 'ACC' 3722 and the Country from 'UK' 3732 in FIG. 37A to Cancer 'Lung' 3762 and Country 'US' 3773. The result is dramatic, as the small set of outcome cells shown in FIG. 37A 3745 is replaced by a partial view of outcome cells 3785 shown in FIG. 37B, with the full set comparison 3748 only visible in FIG. 37C, which includes 5 columns and 7 rows of calculations, for the data represented in FIG. 37A compared to the full set comparison 3768 shown in FIG. 37D, which includes 38 columns and 24 rows of calculations, for the data represented in FIG. 37B. The example described shows that, in a complicated setting with multiple constraints (filters), users of the disclosed technology have multiple options for creating calculation cells that Auto Flex.

Figure 38A:
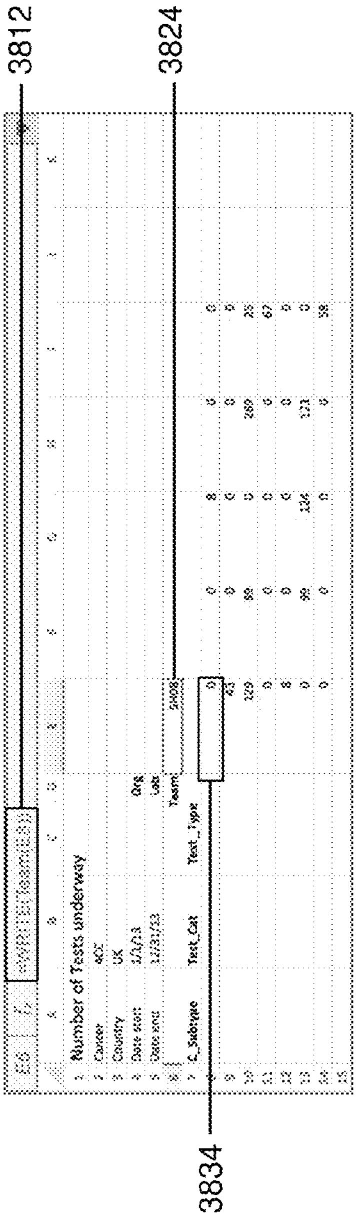
FIG. 38A FIG. 38B and FIG. 38C example employing WRITE a variable value used within a cell capability combined with End Row Start (variant of Row and Column End) copy and paste to Auto Flex content.
Figure 38B:
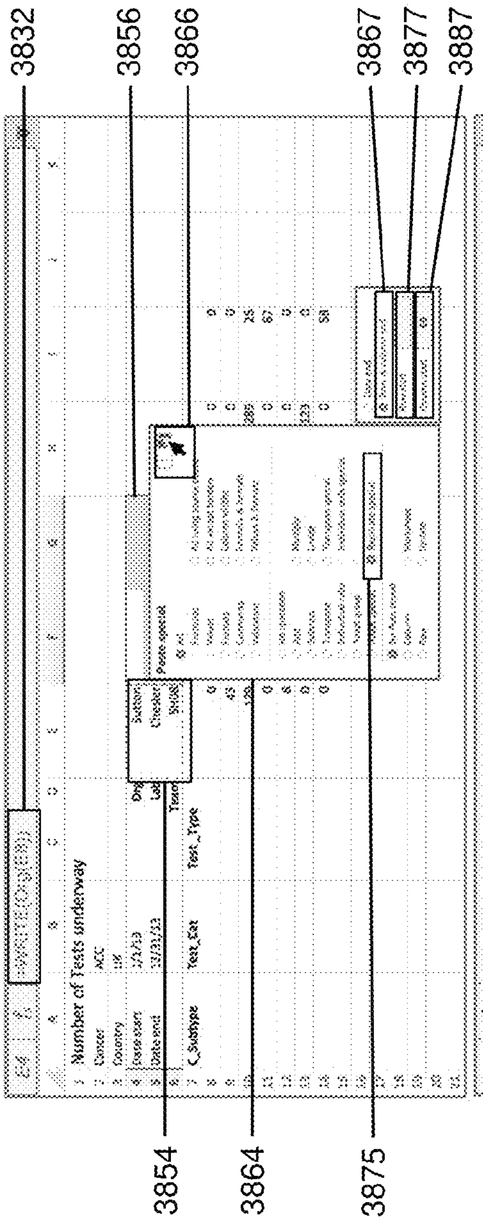
Figure 38C:
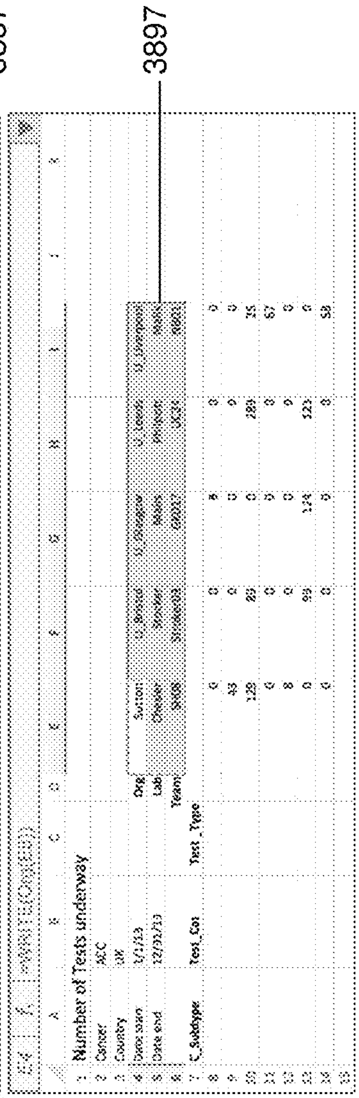

FIG. 38A through FIG. 38C example employing the combination of the disclosed WRITE a variable value used within a cell capability, described in FIG. 24A through FIG. 24 C, and the disclosed End variant of our Ordered Sequential Replication copy and paste capability to give headings that Auto Flex based on the calculation cells that are connected with.

In FIG. 38A cell E6 3824 the user types the formulaic variable formula '=WRITE (Team(E8))' 3812 which writes the Team value used in cell E8 3834 resulting in the value 'SH08' 3824. The user can use the WRITE statement to create the remaining two headings to give the set of three cells 3854, followed by a copy and paste 'Replicate special' 3875 of those three headings 3854 to an arbitrary two columns 3856, selecting the 'Row and column end' 3867 'option. The user inputs E8 into the 'Column start' box 3887, which links the number of heading columns to the calculation cell values started in E8. Since the paste is going across columns only, the user inputs no value into the 'Row start' box 3877 and they click on the check 3866 to complete the paste. They then view the values 3897 in FIG. 38C, and more importantly have the number of those values Auto Flex linked to the number of columns starting in E8 3834.

Figure 39A:
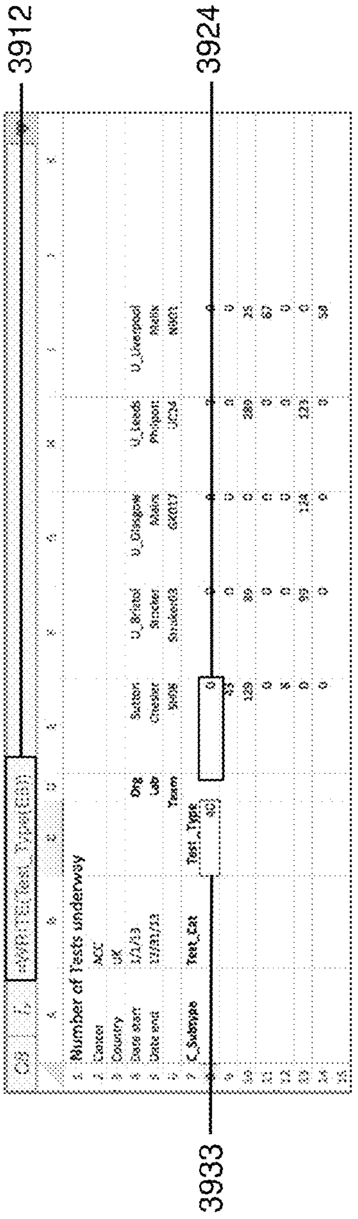
FIG. 39A FIG. 39B and FIG. 39C example employing WRITE as a variable value used within a cell capability combined with End Column Start (variant of Row and Column End) copy and paste to Auto Flex content.
Figure 39B:
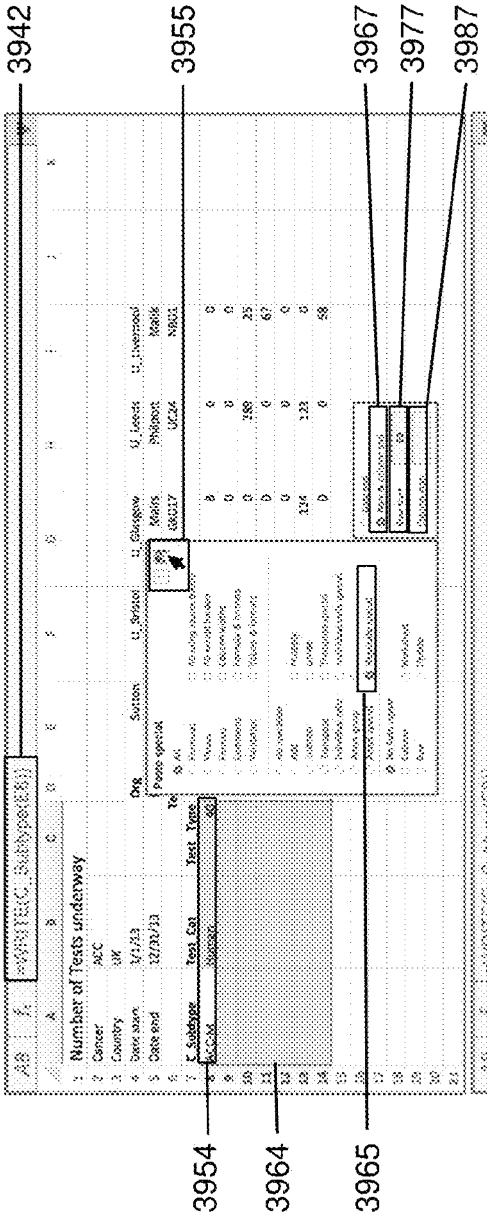
Figure 39C:
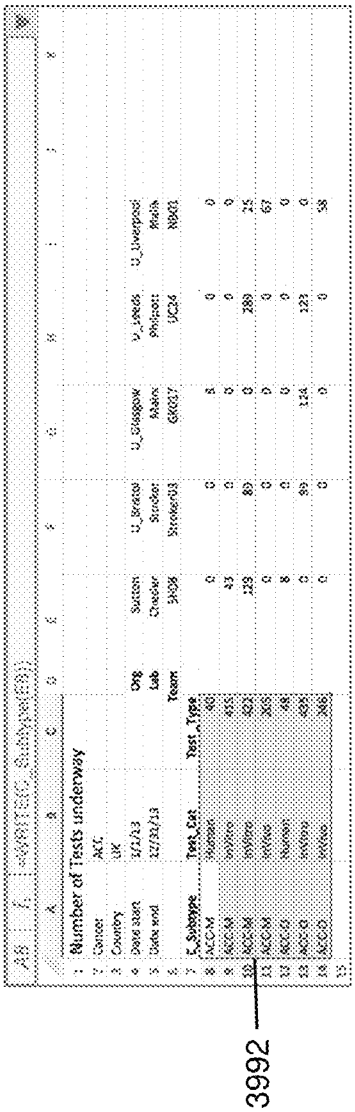

The user then replicates the process to fill in the row headings shown in FIG. 39A through FIG. 39C. In FIG. 39A cell C8 3933 the user can type the formulaic variable formula '=WRITE (Test_Type(E8))' 3912 writing the value of 'Test_Type' used in cell E8 3924. After typing the remaining two row heading WRITE statements for the cells 3954, the user can again use the 'Replicate special' 3965 paste option with the 'Row and column end' 3967 option, leaving the 'Column start' box 3987 blank and filling in the 'Row start' box 3977 with value 'E8'. After clicking the check box 3955, the user can view the row headings 3992 shown in FIG. 39C. In this example, the user has used a different way within the disclosed technology to create the constraint (filter) driven Auto Flex capabilities shown in FIG. 29A to FIG. 29D.

These constraint-based Auto Flex capabilities allow users to also drill down through external data easily within spreadsheet cells formulas requiring no spreadsheet database or spreadsheet embedded programming skills, such as visual basic (VBA) or Apps Script. In one example, a cancer researcher can set up the same cancer test data and calculations described supra, so that users of the spreadsheet can drill down from viewing the test numbers for all the cancers and all the countries to view the data for a single cancer and a single country, all with the row and column headings Flexing as specified by the cancer researcher. This is similar to using a spreadsheet pivot table with filters which can directly manipulate external data, depositing only the results in the spreadsheet and not only pivot and filter the content but also Flex and filter the content row and column headings. The creator of the spreadsheet can also create content with simple data NSC formulaic data manipulation and retrieval for very complex calculations. All of this is then easily changeable by altering a calculation formula and quickly and easily using versions of the disclosed normal or Replicate Special copy and paste to change the content of a large spreadsheet.

Figure 40A:
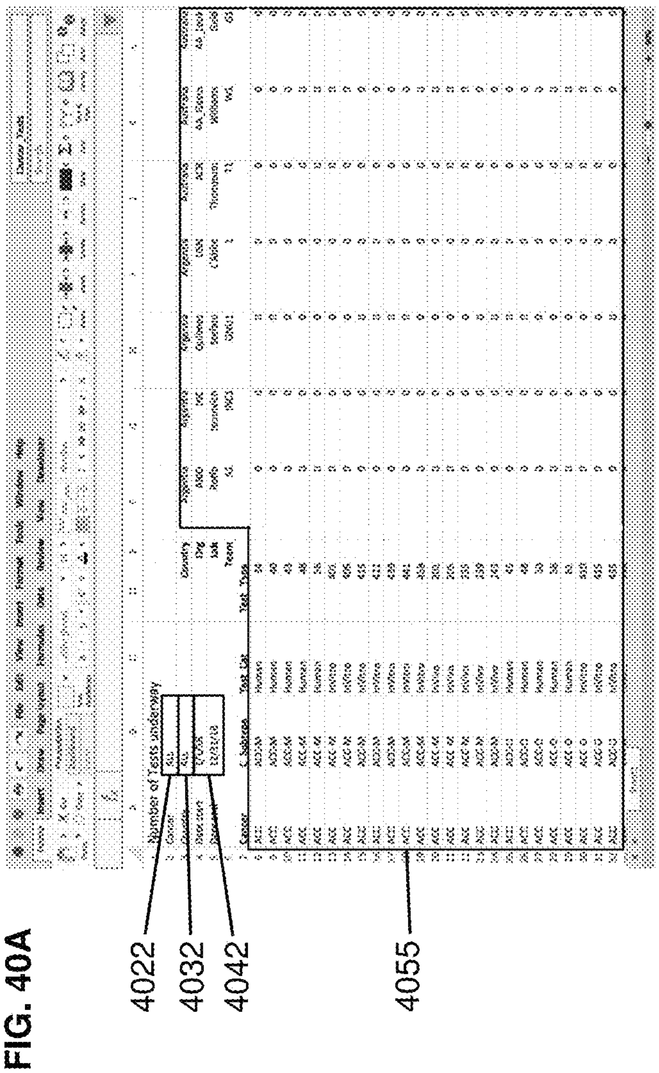
FIG. 40A FIG. 40B, FIG. 40C and FIG. 40D show a cancer researcher's spreadsheet with two extremely different constraint (filter) settings Auto Flexing the spreadsheet content.
Figure 40B:
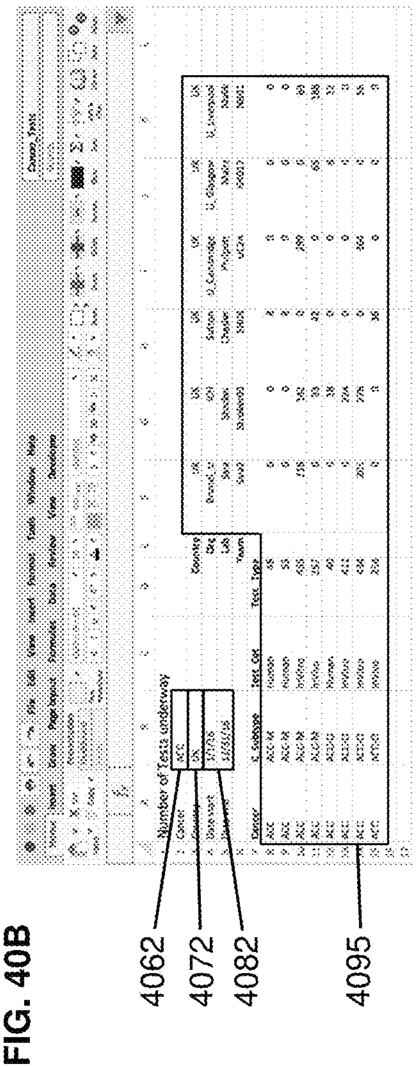
Figure 40C:
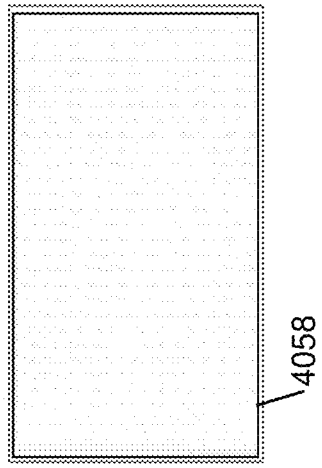
Figure 40D:
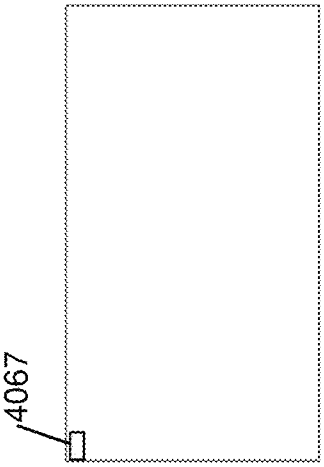

FIG. 40A through FIG. 40D show the cancer researcher's spreadsheet with two extremely different constraint (filter) settings. FIG. 40A and FIG. 40C show the outcome of 'Cancer' 4022 and 'Country' 4032 set to 'ALL' and the 'Date' range set to start in '1/1/16' and end in 12/31/16' 4042. Those constraints or filters control the headings and content 4055 of the spreadsheet created. In contrast, in FIG. 40B and FIG. 40D the user drills all the way down to one Cancer 'ACC' 4062 and one Country 'UK' 4072 and with the same Date range set to start in '1/1/16' and end in 12/31/16' 4082. The disclosed technology automatically changes all the headings/content cells 4055 in FIG. 40A to the headings/content cells 4095 in FIG. 40B. FIG. 40C and FIG. 40D offer a display of the difference in data size in which outlined area 4058 shows the entire worksheet view of the headings/content, which includes 10 columns and 15 rows, for FIG. 40A while outlined area 4067 shows a similar full worksheet view for FIG. 40B, which includes 180 columns and 300 rows, at the same (zoom) scale.

The disclosed technology eliminates what could be a very ugly task of finding the content shown in FIG. 40B utilizing only the fixed headings of FIG. 40A.

Figure 41A:
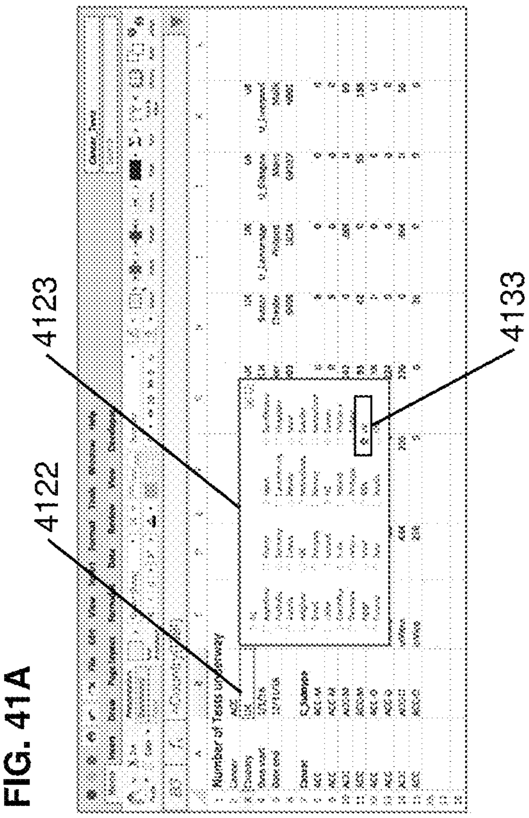
FIG. 41A FIG. 41B, FIG. 41C and FIG. 41D example the operation and creation of Constraint pop-up boxes for decision input cells.
Figure 41B:
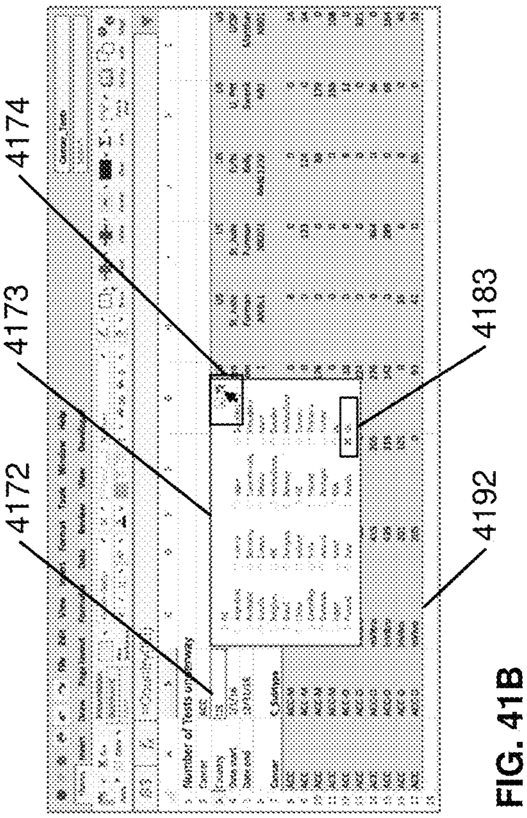

Users of the disclosed technology can also opt to utilize the formulaic variable options for the constraints in a pop-up box as shown in FIG. 41A In this embodiment, pop-up box 4123 can be activated from cell B3 4122 and can display the current selection, 'UK' 4133. The user can then change their selection to one or more other countries within the pop-up, as shown in FIG. 41B, by selecting 'US' 4183 in pop-up 4173 and then clicking on check mark 4174 to accept the changes. Accepting the pop-up box generates a change to the value in cell B3 4172 and changes spreadsheet headings and content 4192 as shown in FIG. 41B.

Figure 41C:
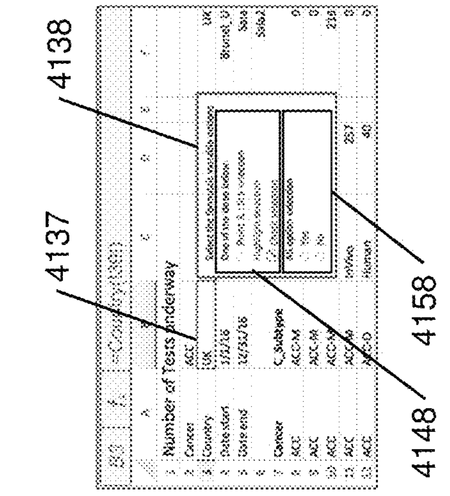
Figure 41D:
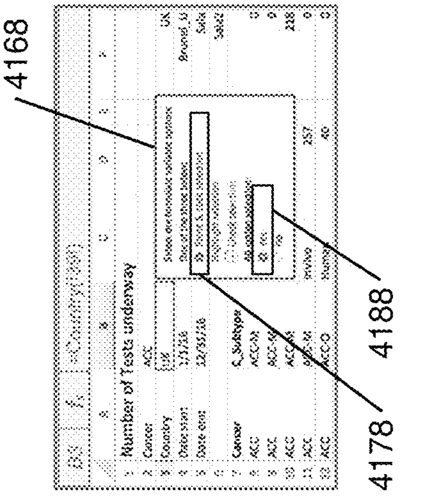

In this embodiment, the user could create that box by double or left clicking on the cell B2 4137 of their spreadsheet, as shown in FIG. 41C, and selecting an add pop-up box data entry option to display pop-up box 4138 with a set of selection options 4148 and the option to add an 'ALL' option 4158. For the example in FIG. 41A and FIG. 41B the user selected the 'Point and click selection' 4178 in FIG. 41D and the 'Yes' option 4188 for the 'ALL' option. This feature makes adding a pop-up formulaic variable selection box 4123 extremely easy and offers a way to greatly enhance the utility of this spreadsheet when it is shared with others or used at a later point in time when the user is less current on the options available for their selection.

Figure 42A:
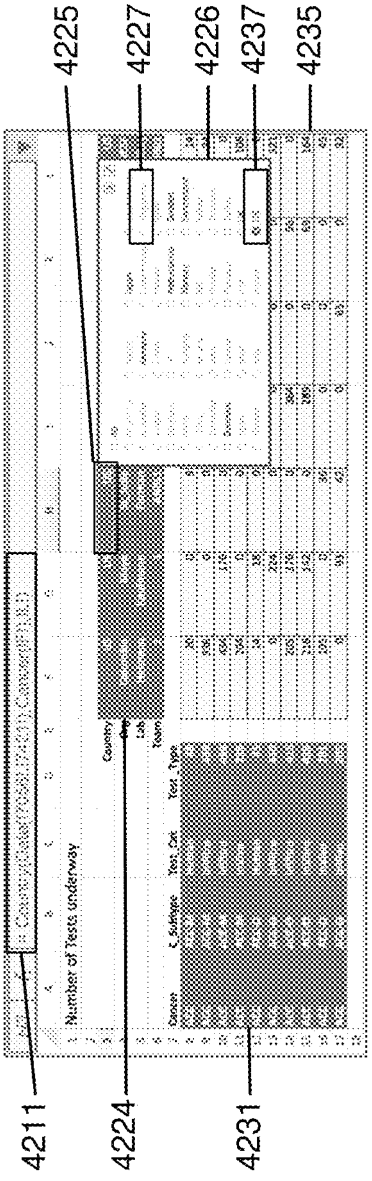
FIG. 42A FIG. 42B and FIG. 42C example replacing input cells with pop-up boxes embedded in heading or calculation cells.

The disclosed technology also supports moving the constraints or drill down dimensions into the analysis headings and content. FIG. 42A examples the scenario in which the cancer researcher has used pop-ups like those created and used as described supra relative to FIG. 41A through FIG. 41D, but for the grey shaded headings 4224, 4231 and lightly shaded black outlined calculation cells 4235. This capability eliminates the need for the constraint cells used in previous examples while retaining all the drill-down and constraint capabilities. In this embodiment, when the spreadsheet user double clicks on a heading or content cell they can access a selection pop-up 4226 shown for cell H3 4225. In this example, the user has elected to use a pop-up showing all the formulaic variable input options, but only the ones available with the current constraints are visible in the darker type. So 'Singapore' 4227 is a 'Country' in the external database for the variable 'Country' but not one that has data within the other constraints viewable via formulaic variable formula 4211. More specifically 'Singapore' is in the lighter type face because it does not have data within 'Date(!7056!:!7421!)' (1/1/16 to 12/31/16) for 'Cancer(!F!)' (ACC) that are constraints currently shown in the formula 4211. Our formulaic data has therefore made it easy for users to view in the pop-up which data sets are applicable with the other constraints but also allow a user to view the broader set of selections in case they want to consider changing one of the other constraints to view the information they desire.

Figure 42B:
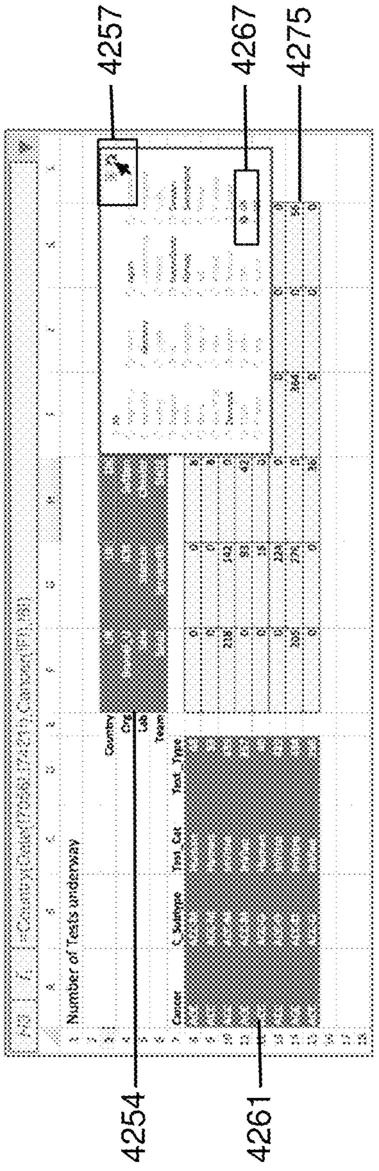
Figure 42C:
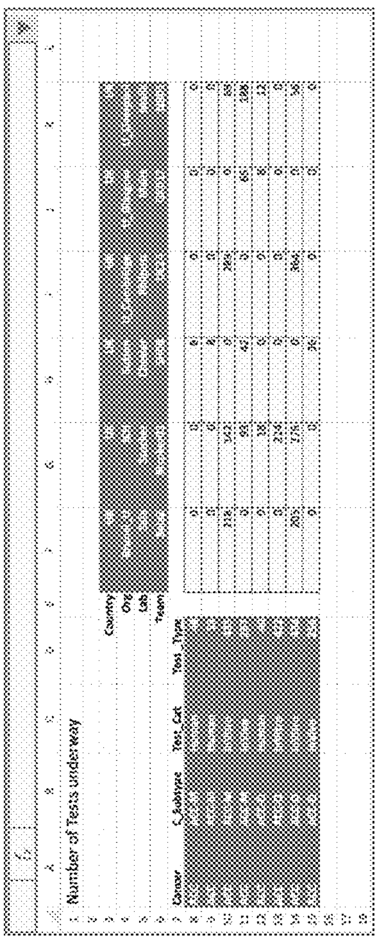

FIG. 42B shows the user having changed the Country from the 'US' 4237 to the 'UK' 4267 and once they click on check box 4257 viewing the grey shaded headings 4254, 4261 and lightly shaded black outlined calculation cells 4275 that show the changed content in FIG. 42C (versus FIG. 42A).

Figure 43A:
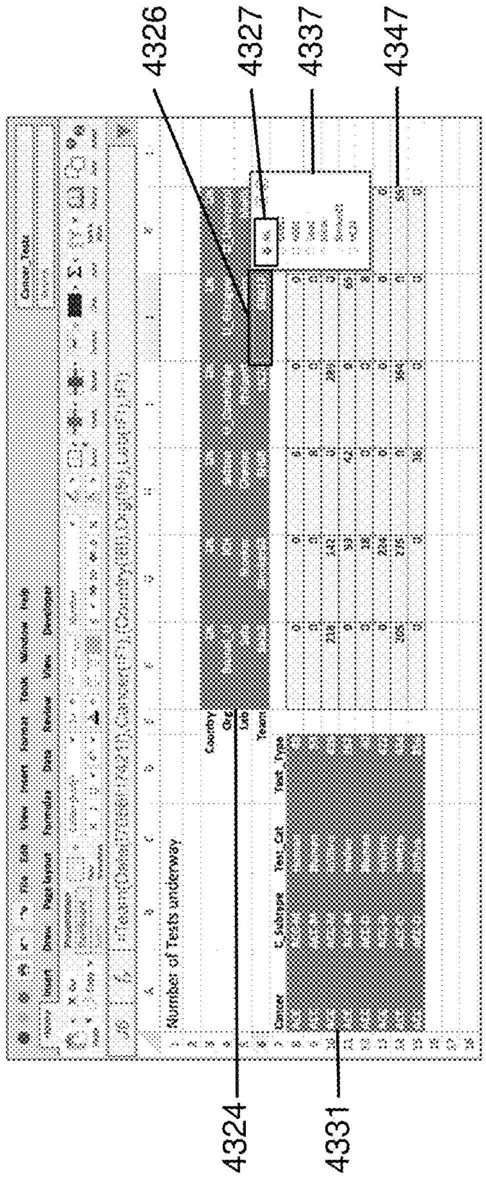
FIG. 43A and FIG. 43B example setting the formulaic pop-up box to show only the constrained options.
Figure 43B:
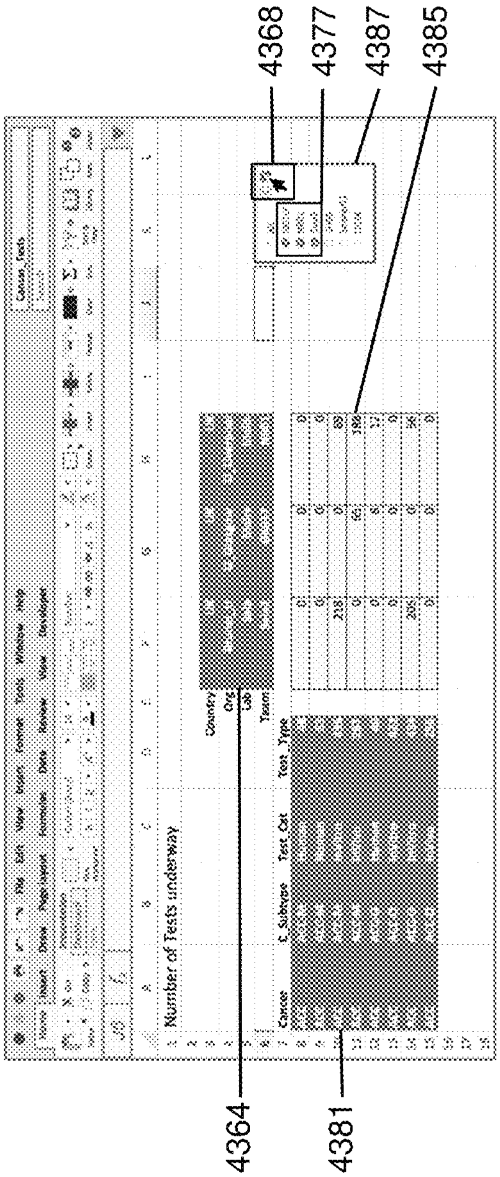

In another embodiment, the user has set it up so they can fine tune the content of the other headings as exampled in FIG. 43A in which the user has double clicked on cell J6 4326 to bring up the 'Team' selection pop-up 4337. Because of the large number of Team possibilities in this example, the creator of the spreadsheet elected to create a pop-up box 4337 that only shows the constraint available options. In pop-up box 4337 the user sees that 'ALL' 4327 option is the current setting, but the user is only interested in viewing a subset of the Team results. They decide to limit the data presented to a smaller subset, which would be very helpful if the data presented was larger or they had an audience for the spreadsheet that should only see a subset of the data. So, in FIG. 43B they select the three teams 4377 in the drop-down 4387 and then accept the changes by clicking check box 4368. In this example, this selection of results for the three Teams gives a smaller set of column headings 4364 compared with headings 4324 in FIG. 43A, and a smaller set of calculation cells 4385 compared to calculation cells 4347 in FIG. 43A, which would be visible after the pop-up 4387 disappears. However, it does not change the content of the row headings 4381 compared with row headings 4331 in FIG. 43A It is worth noting that the user does not see the content of column headings 4364, row headings 4381, and calculation cells 4385 until they select check box 4368 but both are displayed in the figures to example both the cause and result.

Figure 44A:
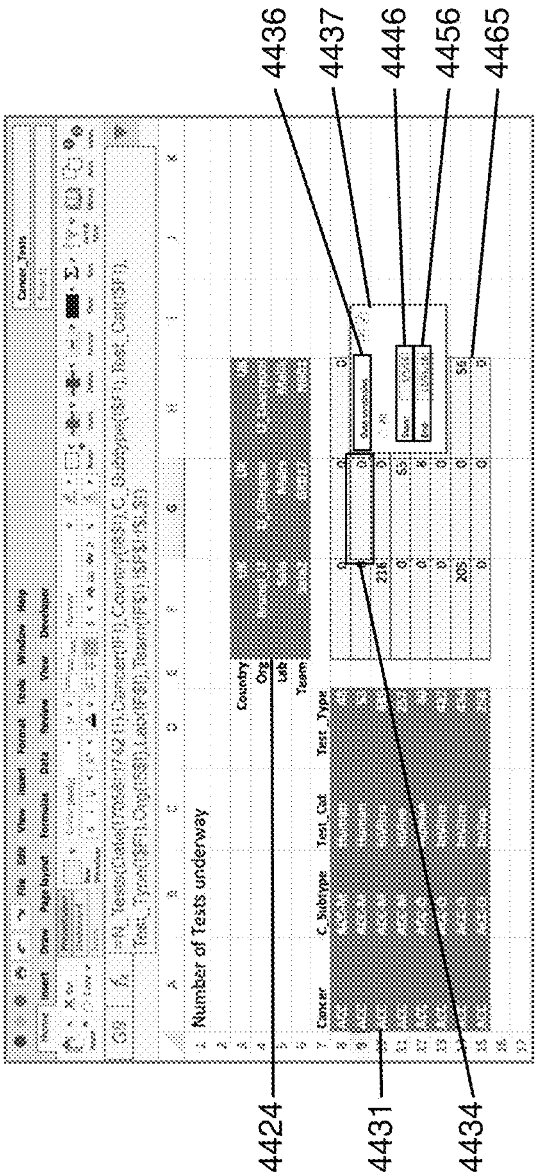
FIG. 44A and FIG. 44B example setting the formulaic pop-up box for setting constraints within calculation cells.
Figure 44B:
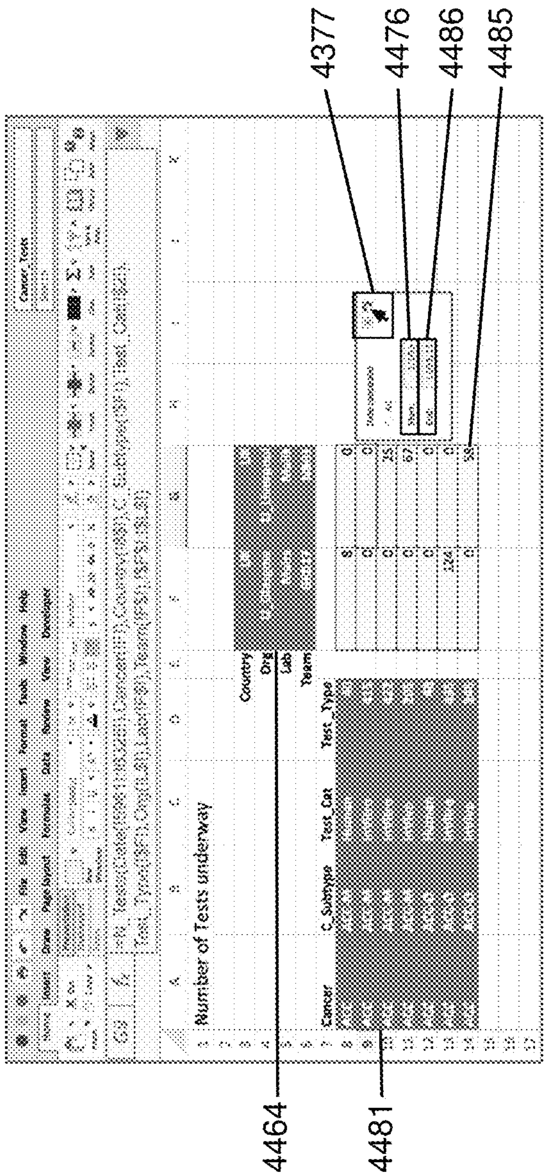

FIG. 44A further examples constraint changes being controlled by the calculation cells. In this embodiment, those changes are accessed by double clicking on a calculation cell such as G9 4434 and selecting to see the Constraint (filter) pop-up box 4437. That pop-up shows one constraint controlled by these cells: date constraint 4436, currently set to 'Start:' '1/1/16' 4446 and 'End:' '12/31/16' 4456. FIG. 44B shows a change of the dates to 'Start' '1/1/13' 4476 and 'End:' '12/31/13' 4486. Once the user selects check box 4377 they see a change in the column headings 4464 vs. 4424, the row headings 4481 vs. 4431, and calculation cells 4485 vs. 4465. Thereby the user of the disclosed technology can create attractive spreadsheet analytics allowing very quick and easy manipulation and presentation of large and varied analytics including extensive drill downs using externally sourced data.

Figure 45A:
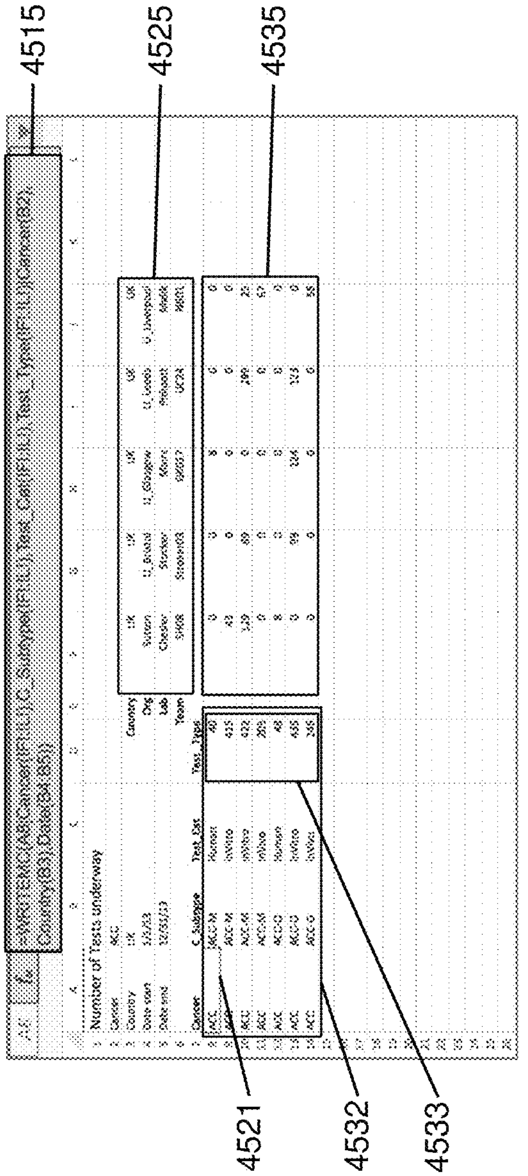
FIG. 45A and FIG. 45B example the difference in using only Unique versus blending use of Unique and ALL NSC formulaic variables in the WRITE function.
Figure 45B:
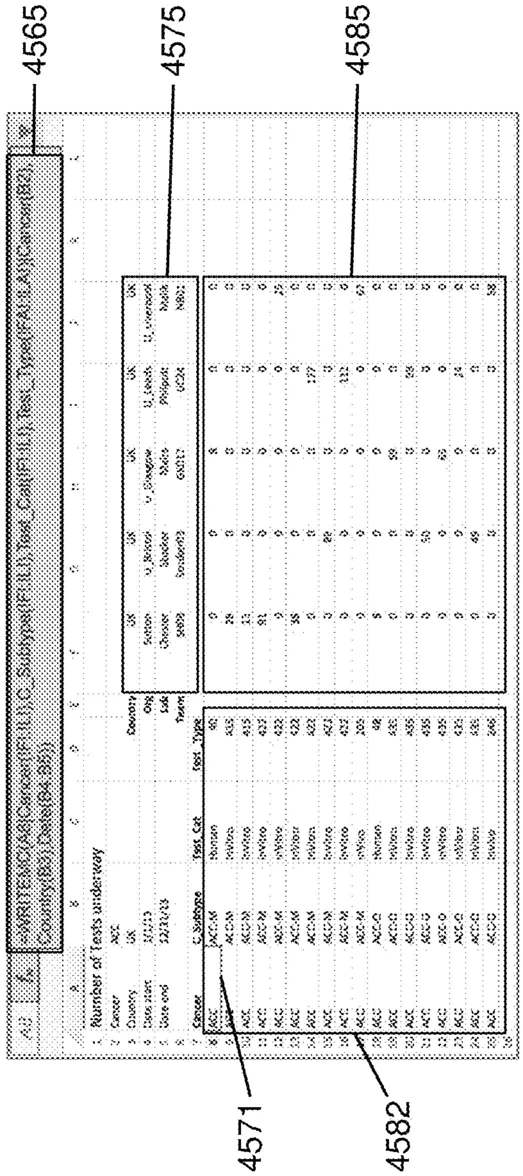

Users can also blend our formulaic Unique variable commands, e.g., '!F!' with our formulaic variable ALL, e.g., '!FA!, commands, with constraints, drill downs and Auto Flexing. For example, the cancer researcher's test data may be such that each line of the 'Test_Type', 4533 in FIG. 45A indicates different test groups and therefore the researcher would like to see the full set of 'Test_Type' data instead of only the Unique value summary. If they had used the WRITE heading approach they would then change the WRITE statement 4515:

'=WRITEMC(A8|Cancer(!F!:!L!),C_Subtype(!F!:!L!), Test_Cat(!F!:!L!),Test_Type(!F!:!L!)|Cancer(B2), Country(B3),Date(B4:B5))' in cell A8 4521 of FIG. 45A to the WRITE statement 4565:

'=WRITEMC(A8|Cancer(!F!:!L!),C_Subtype(!F!:!L!), Test_Cat(!F!:!L!),Test_Type(!FA!:!LA!)|Cancer(B2), Country(B3),Date(B4:B5))' in cell A8 4571 of FIG. 45B, to show greater detail in both the row headings 4582 vs. 4532 and the rows of the calculation cell content 4585 vs. 4535. However, it stays with the Unique values for the column headings that are unchanged in 4575 vs. 4525 between FIG. 45B and FIG. 45A.

Figures 46A, 46B, 46C:
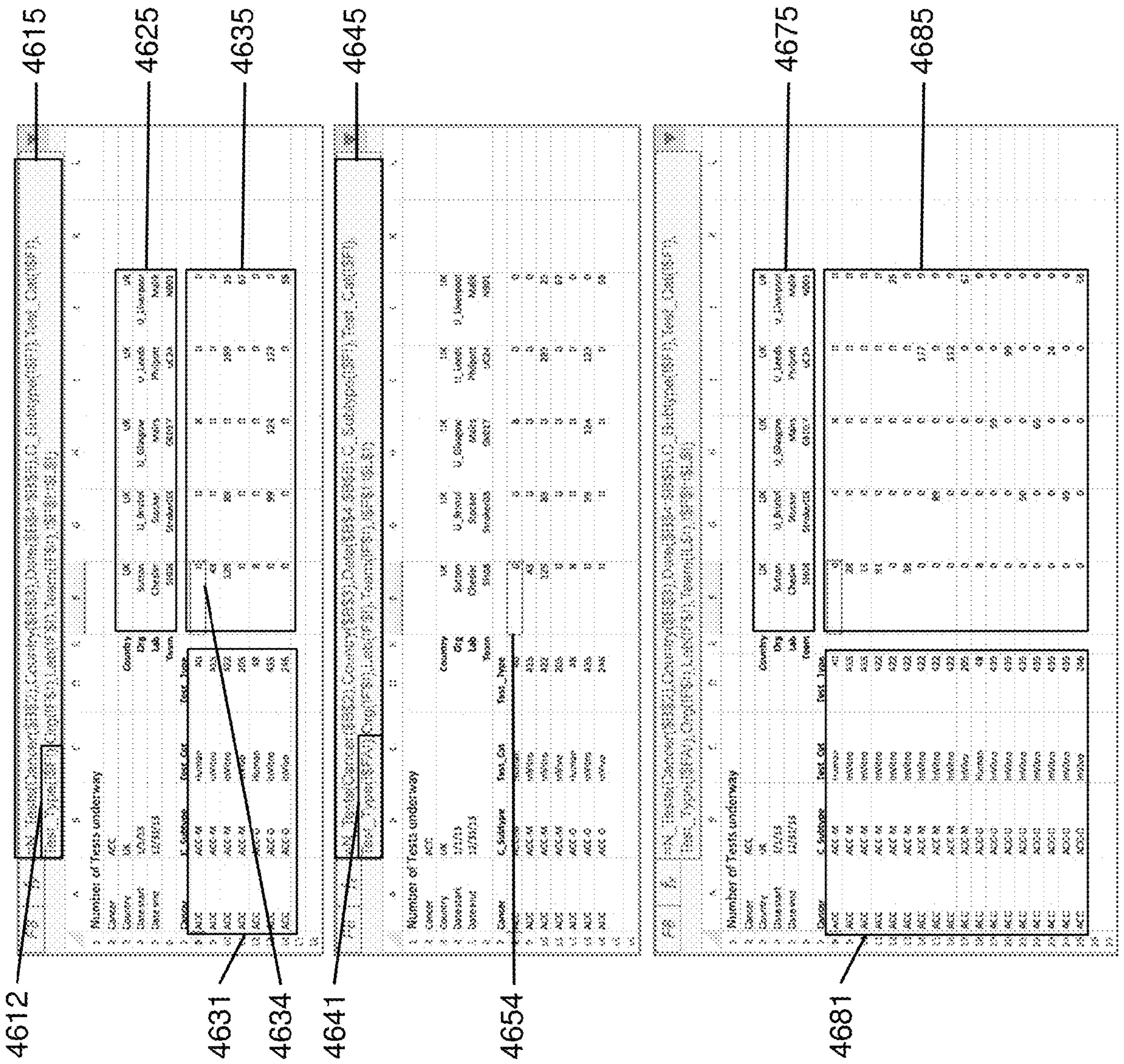
FIG. 46A FIG. 46B and FIG. 46C example the difference in using only Unique versus blending use of Unique and ALL NSC formulaic variables for calculation cells.

Had the user instead employed the approach of creating the spreadsheet cell content first before the headings, as shown and described relative to FIG. 35 to FIG. 37D and then created the row and column headings using the 'WRITE a value within a cell' approach, like the process utilized in FIG. 38A to FIG. 39C, they could also blend our formulaic variable Unique commands, e.g., '!F!' with our formulaic variable ALL commands, e.g., '!FA!'. FIG. 46A through FIG. 46C examples that approach. The user could change the formula 4615:

'=N_Tests(Cancer($B$2),Country($B$3),Date($B$4: $B$5),C_Subtype(!$F!),Test_Cat(!$F!),Test_Type (!$F!),Org(!F$!),Lab(!F$!),Team(!F$!),!$F$!:!$L$!)' in the calculation cell F8 4634 in FIG. 46A to the formula 4645:

'=N_Tests(Cancer($B$2),Country($B$3),Date($B$4: $B$5),C_Subtype(!$F!),Test_Cat(!$F!),Test_Type (!$FA!),Org(!F$!),Lab(!F$!), Team(!F$!),!$F$!: !$L$!)' in cell F8 4654 of FIG. 46B. The change of 'Test_Type(!F!) 4612 to Test_Type(!FA!) 4641 changes the formula to ALL values for 'Test_Type'. This cell, when Data End copied and pasted, provides the greater detail in both the row headings 4681 compared with 4631 and the rows of the calculation cell content 4685 compared with 4635. However, the column headings 4675, compared to 4625, are unchanged displaying only the Unique formulaic values.

The examples described, with more complicated non-keyed non-discrete multi-value data sets, cover many different ways to use the disclosed formulaic data variable technology to access manipulate, calculate and present results using external data. In addition to replicating, with NSC data, the traditional spreadsheet pivot, filtering and other cell data manipulation, we show Auto Flex and drill down the spreadsheet cell row and column headings and calculation cells in a range of user-decided ways. Also disclosed are the option of creating intelligent pop-up boxes that can show users complete and constrained option sets for changing the content of their spreadsheet cells. We show the power of using the disclosed Unique formulaic data capabilities to make complex data sets simple to access, manipulate and use in spreadsheet cell calculations. We also show ways to use the disclosed technology to identify and work around data inconsistencies and mistakes which are all too frequently encountered. Before showing the disclosed technology for keyed non-discrete multi-value data sets, we show more of the simplicity and spectrum of different function and calculation flexibility with a small data set non-keyed example.

FIG. 47A again utilizes the data for the charity volunteer viewing donations for a very small data set from a time-period in the early days of the charity, when they were only collecting donations in the Americas and not yet getting donations from all over the world. The user wants to determine the Average Daily Donation in their one 'Geo' the 'Americas' 4731, their two different 'Region' values 'Rest' and 'USA' 4732 and for their three different giving 'Purpose' values 4724. They write an AVERAGE calculation 4715 and get an average of '$6,329' 4733 in cell E4. However, because they have seen data problems before and are concerned that the data is incomplete without zeros recorded for days with no giving in each Geo, Region and Purpose combination, they decide to try rewriting the AVERAGE calculation to fill that problem should it exist. In FIG. 47B formula 4755 they use our easy formulaic variable data fixing capabilities changing the 'Date' setup in the calculation from 'Date(!$F$!:!$L$!)' 4716 to 'Date(Date(!$F$!: !$L$!),!$F$!:!$L$!)' 4756. Alternative syntax 'Date(!+$F$!: !+$L$!) syntax could also be utilized. This use of the disclosed Multiple Sequence formulaic variables effectively fills in any dates with partial data and will ensure arriving at the correct daily average in cell E4 4763 of FIG. 47B. As it turns out, the user was right to worry about the incomplete data as E4 4763 shows a value of '$3,165' vs. the '$6,329' shown in E4 4733.

Figure 47A:
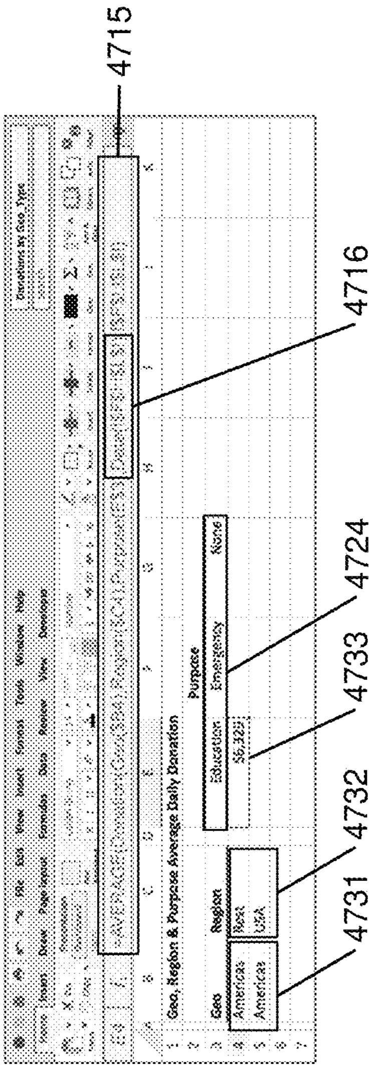
FIG. 47A and FIG. 47B example using and not using Multiple Sequence formulaic variables for additional types of spreadsheet functions (to correct for missing data).
Figure 47B:
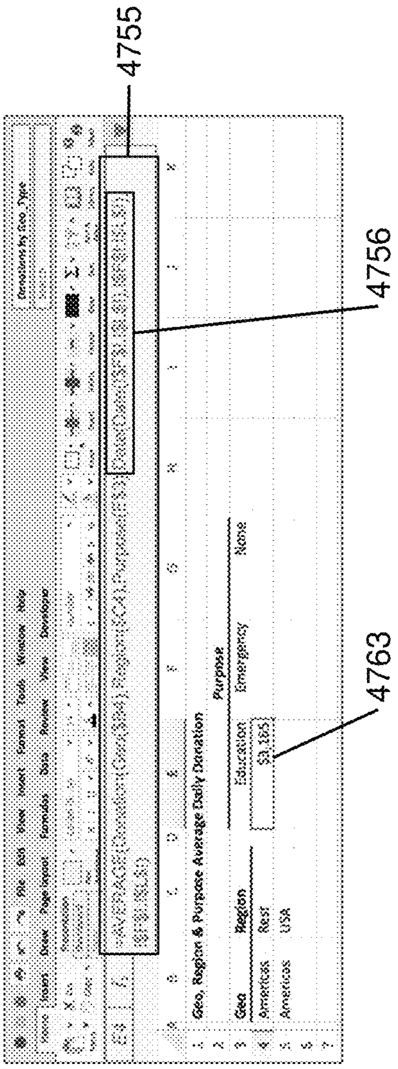

FIG. 48 illustrates the disclosed technology, without Multiple Sequencing, delivering the result shown in FIG. 47A cell E4 '$6,329' 4733. The calculation is accurate with all the data that exists within the external database, but because that data has omitted recording zeros on days with no donations in any of the 'Geo', 'Region' and 'Purpose' combination, it arrives at an incorrect average daily donation. Our example has only data for the 'Americas, Rest, Education' combinations on '3/5/93' 4855 without a zero for that same combination on 3/4/93 and therefore it arrives at an incorrect AVERAGE '$6.329' 4877 due to not factoring in the zero on 3/4/93.

Figure 49:
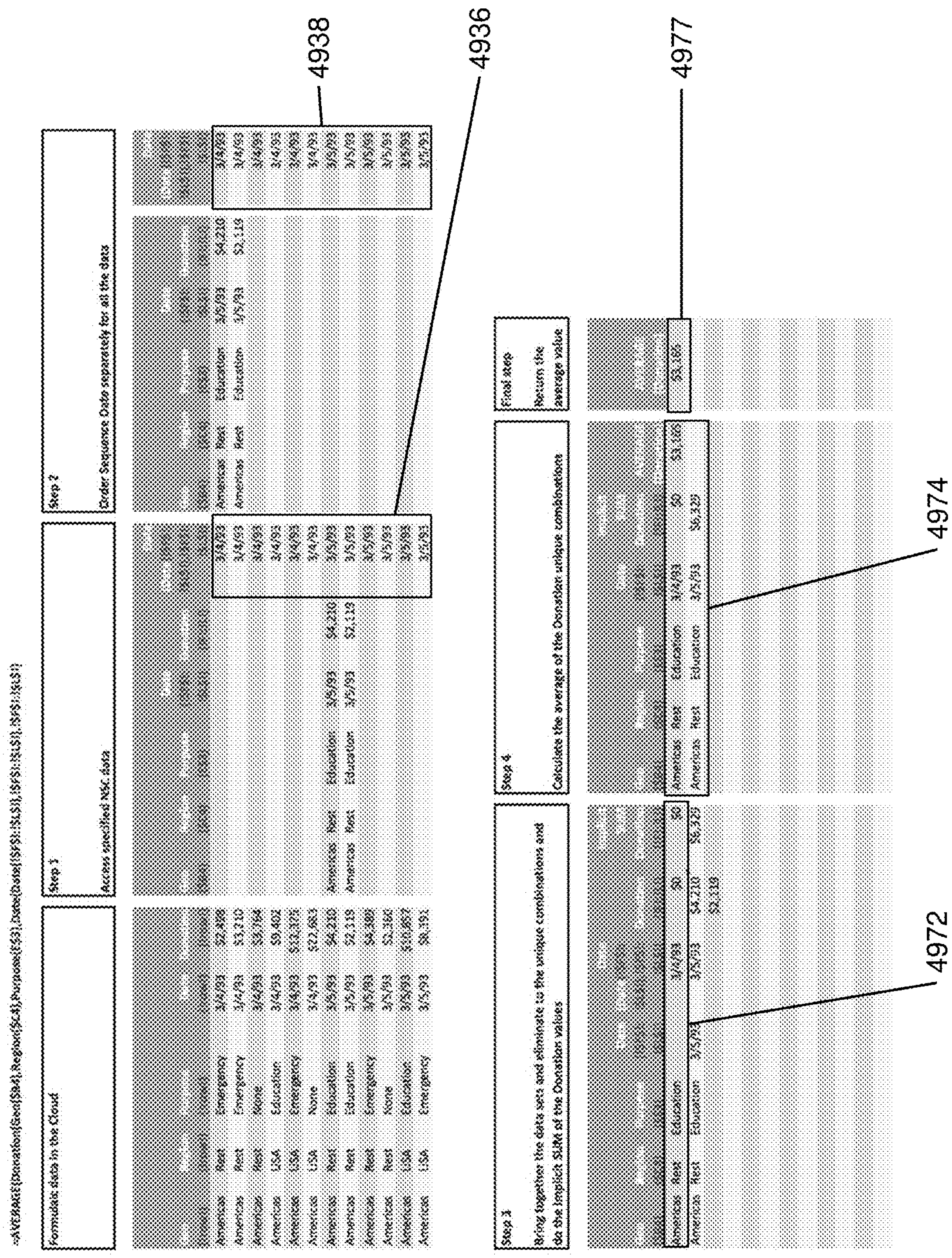
FIG. 49 illustrates the mechanics of the AVERAGE calculation in FIG. 47B, showing Multiple Sequencing technology fixing the missing data and arriving at the correct AVERAGE.

FIG. 49 illustrates the working of the disclosed Multiple Sequence technology delivering the result in FIG. 47B cell E4 '$3,165' 4763. As described for FIG. 47B, that uses our technology to separately access 4936 and sequence 4938 all the Dates in the database and therefore insert the '$0' for the Americas, Rest, Education' combination on '3/4/93' 4972. This uses the steps we have previously described for our Multiple Ordered Sequential Replication with our abbreviated syntax that implicitly sums to the Unique values. The result is that both days are included in the average calculation 4974 and therefore the correct average '$3,165' 4977 is sent to the spreadsheet cell E4 4763 in FIG. 47B. While this was exampled on an illustratively small data set so that we could readily show what is going on, you can see how valuable this would be for a year's worth of data with numerous omissions. It would also be critical to numerous of the other spreadsheet functions our technology would support including statistical functions determining statistical distributions, math/trigonometry functions dealing with arrays, information functions looking at data sets, financial functions evaluating data sets, engineering functions dealing with functional data sets, and date/time functions dealing with potentially incomplete date/time sets.

Keyed-Data Usage

Now we are going to example how these same capabilities of our technology previously discussed work for keyed non-discrete (multi-value) data. Even though the keyed data has one or more predefined user keys (e.g., id numbers) that allow unique data navigation of the data, the data can still have missing data, inconsistencies, data hierarchies and data relationships that present problems with spreadsheet cell data access, manipulation and usage of external data (not brought into spreadsheet cells before usage). Because normal to large data sets quickly make examples very complicated to understand, we will again begin with a very small data set before showing more normal sized data examples.

Figure 50:
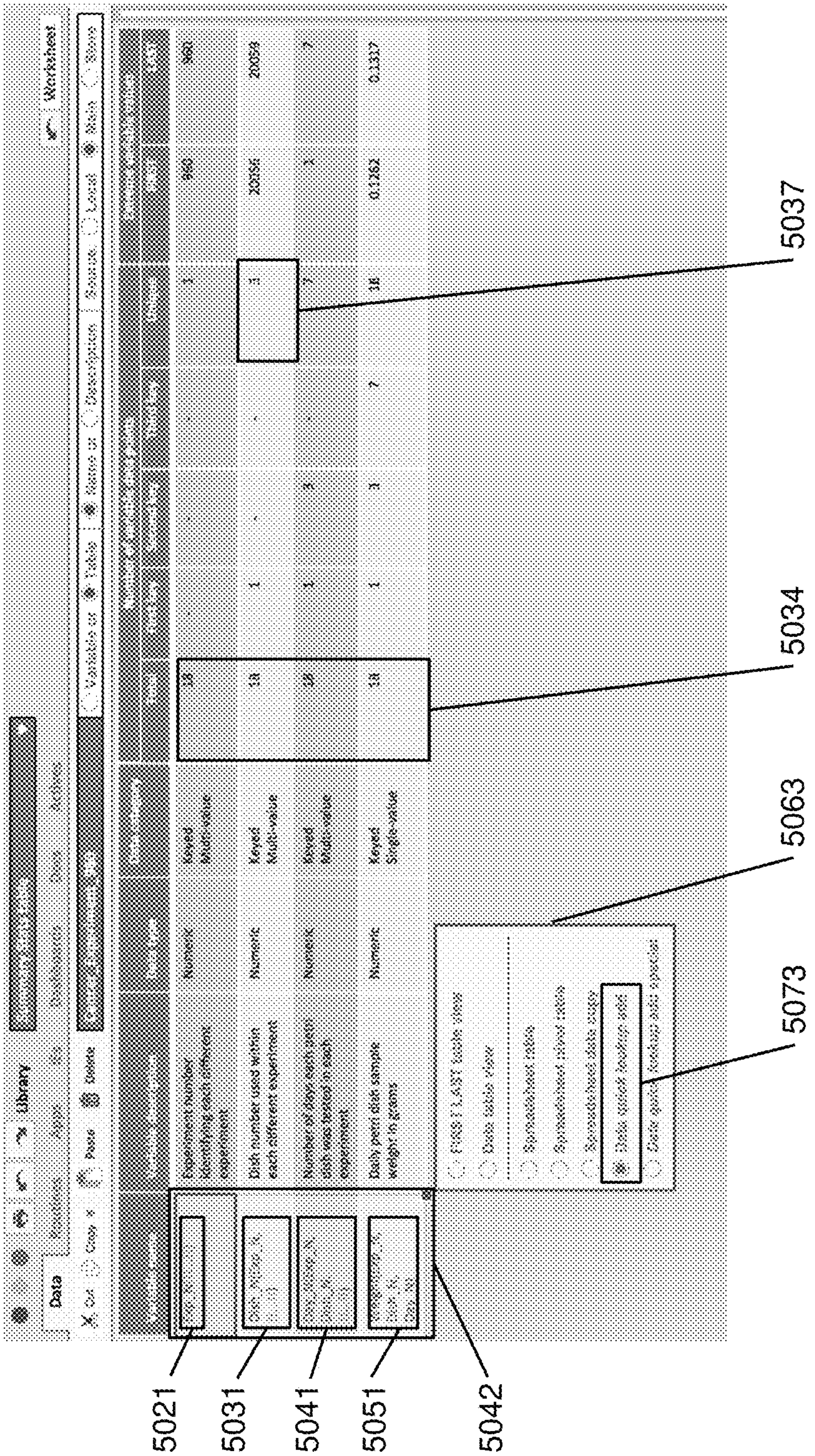
FIG. 50 shows the summary stats for an example predefined keyed (keyed) data set.

FIG. 50 shows a cancer researcher data set having four variables 5021, 5031, 5041, 5051 and '18' data points 5034 for each variable. The first variable 'Exp_N(!! . . . !!)' 5021 is one of the predefined user keys and in the syntax of this embodiment a keyed variable after any predefined keys are specified that has multiple values is denoted with syntax "!! . . . !!'. In this embodiment, we further differentiate keyed variables using the keys with syntax of double sets of exclamation points '!!!!' to make is easier for users to quickly differentiate keyed formulaic variable use from non-keyed. The second variable 'Dish_N(Exp_N,!! . . . !!) 5031 is identified by the first variable 'Exp_N' but then still has '3' Unique values 5037 so is also designated with a '!! . . . !!'. The fourth variable 'Weight(Exp_N,Dish_N,Day_N) 5051 is a compound key-identified single value which, once all the predefined key values within its parentheses are defined, is a single value in the data set. Like many previous starting examples, we are exampling an extremely small data set so we can illustrate how the disclosed technology works. The pop-up 5063 is one way for a user to start to manipulate the cloud data for their spreadsheet use. In this example, the user has elected to add all the highlighted data 5042 to a quick lookup 5073. In this embodiment, this option means that once a user starts to type the variable name in a spreadsheet cell, a pop-up will become visible showing them the variable name and its pertinent set up info including any keys needed to specify it.

Figure 51:
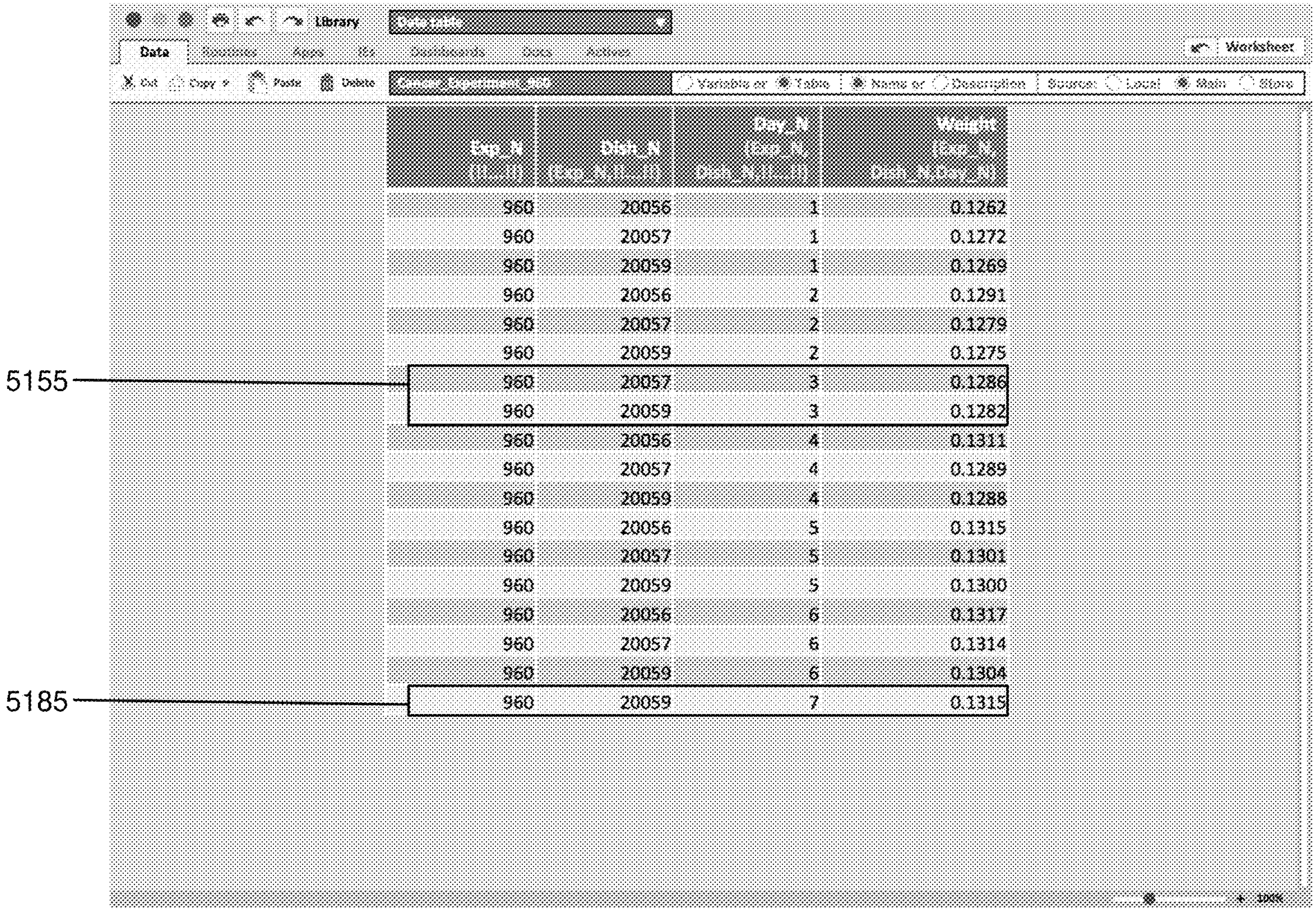
FIG. 51 shows the complete data set for the data in FIG. 50.

FIG. 51 shows the full data set for all four variables—the eighteen values for each variable in FIG. 50. You can see that the data set is incomplete relative to having a value for each variable on each day as Day '3' only has two values 5155 and is missing a value for 'Dish_N' '20056' and Day '7' only has one value 5185—missing values for 'Dish_N' '20056' and '20057'.

Figure 52A:
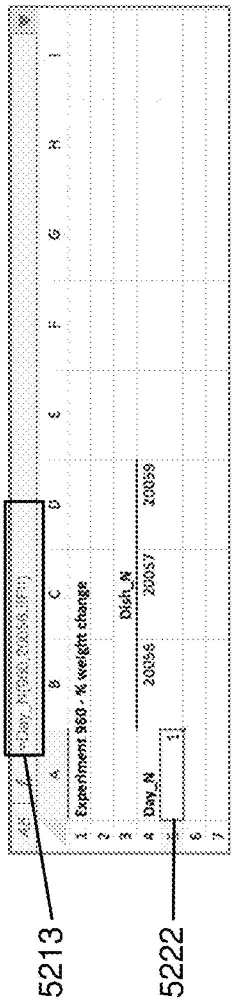
FIG. 52A FIG. 52B and FIG. 52C example the copy and paste of keyed non-discrete (multi-value) formulaic variables for discovering data problems.
Figure 52B:
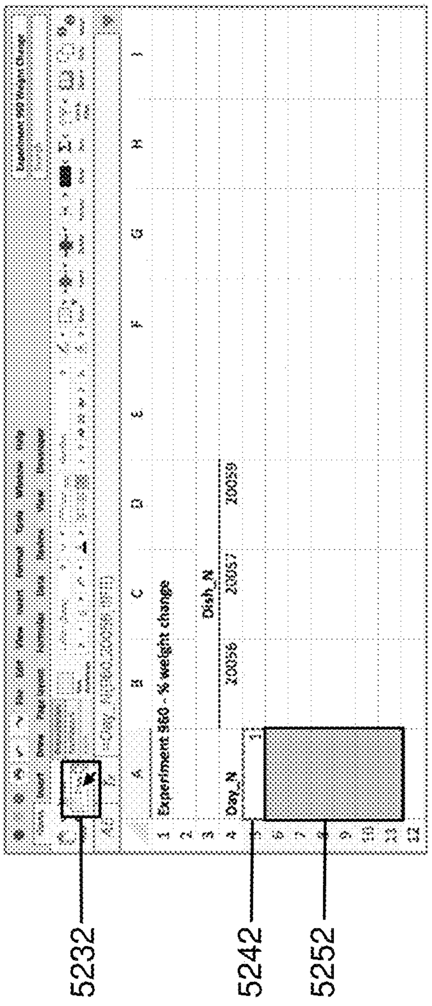
Figure 52C:
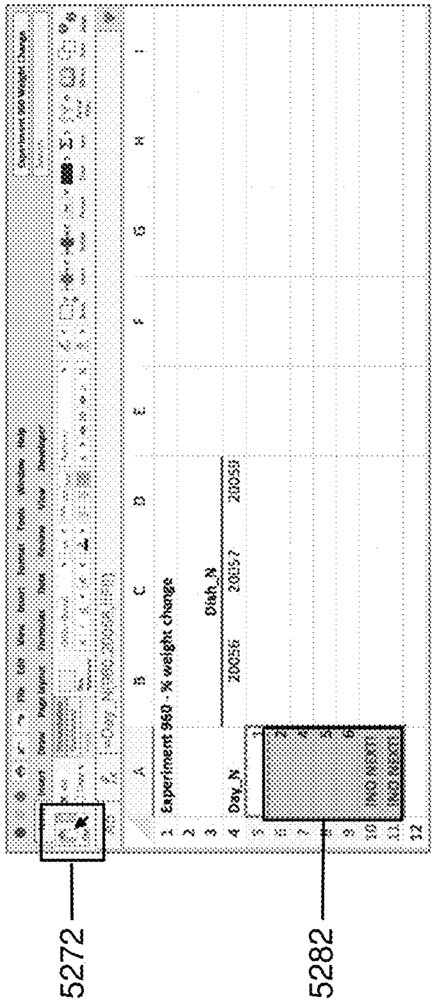

FIG. 52A shows the user creating the row headings for a percentage (%) weight change calculation they would like to do for each 'Day_N' for each 'Dish_N'. The user has created a formulaic variable formula '=Day_N(960,20056,!!F!!)' 5213 in cell A5 5222. They plan to copy and paste that cell to create the row headings and begin that process in FIG. 52B by copying 5232 cell A5 5242 to the six highlighted cells A6 through A11 5252. When they complete that task by clicking the paste 5272 in FIG. 52C, they get a disappointing result in the highlighted cells 5282. The days go 2 4 5 6 and they get two '!NO NEXT!' cells. This confirms their concern that the data has inconsistencies or missing data.

Figure 53:
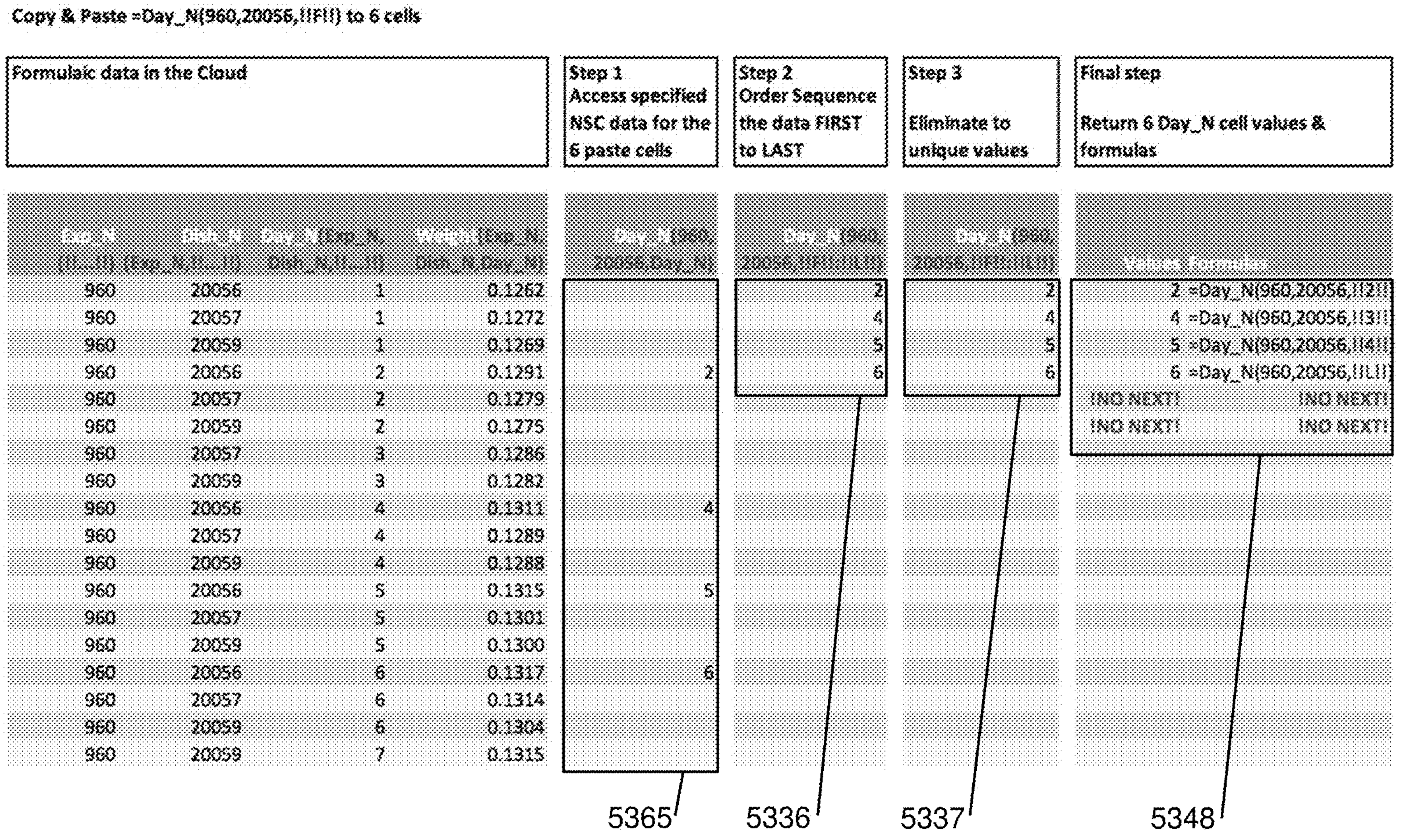
FIG. 53 illustrates the mechanics of the copy and paste shown in FIG. 52A through FIG. 52C.

FIG. 53 illustrates the working of our technology showing why they got the copy and paste results 5282. When step one accesses the data 5365, you can see that there are no values for 3 and 7. So the sequencing 5336 and the eliminating to unique values 5337 give only four values to return which then get filled out with two '!NO NEXT!' values in returning the six copy and paste values 5348.

Figure 54A:
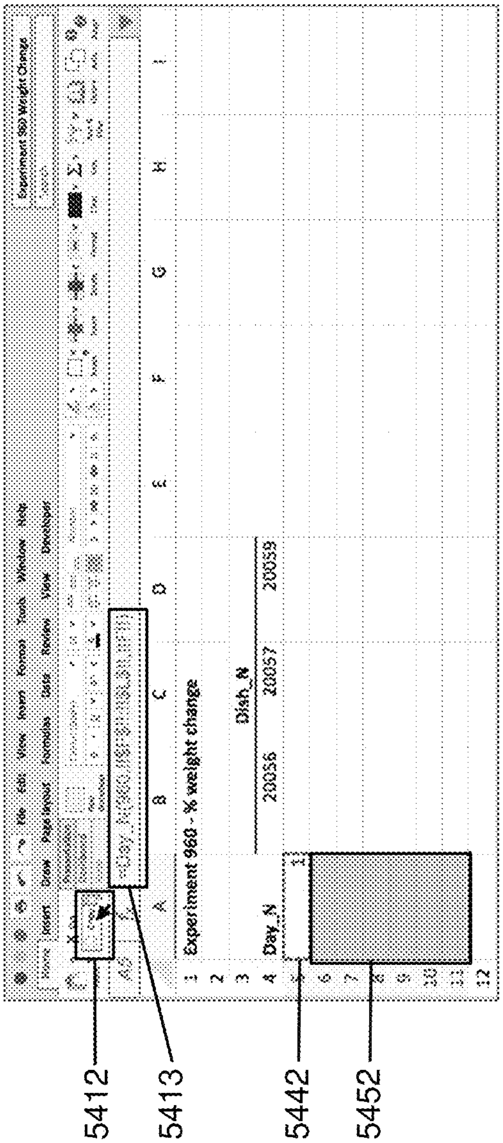
FIG. 54A and FIG. 54B example the copy and paste of keyed non-discrete (multi-value) formulaic variables using Multiple Sequence Ordered Sequential Replication technology to correct the data problems.

To get a full set of the "Day_N" row headings the user decides to rewrite the formula for cell A5 5222 using a keyed data variant of our previously described Multiple Sequence Ordered Sequential Replication formulaic variable technology. In FIG. 54A the user has written the formulaic variable formula '=Day_N(960,!!$F$!!:!!$L$!!,!!F!!)' 5413 for cell A5 5442. They then copy 5412 cell A5 5442 to the six highlighted cells 5452. After they hit paste 5472 in FIG. 54B they get a complete set of the 'Day_N' values in the highlighted six cells A6 through A11 5492 completing the full set of 'Day_N' values with A5 5482 (the cell they copied). Those values run from '1' to '7' with no '!NO NEXT!' values because they represent the full set of values across all three of the 'Dish_N' values.

Figure 54B:
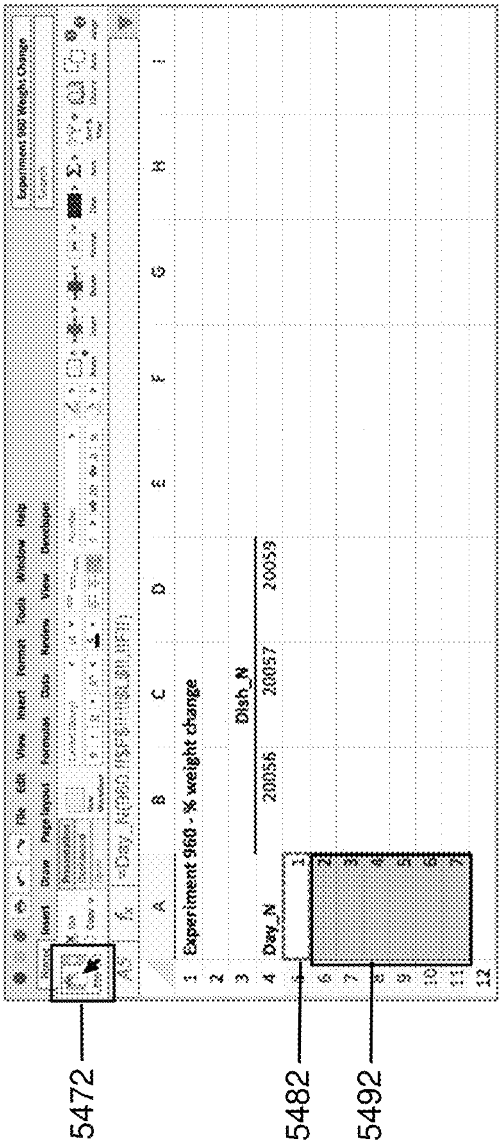
Figure 55:
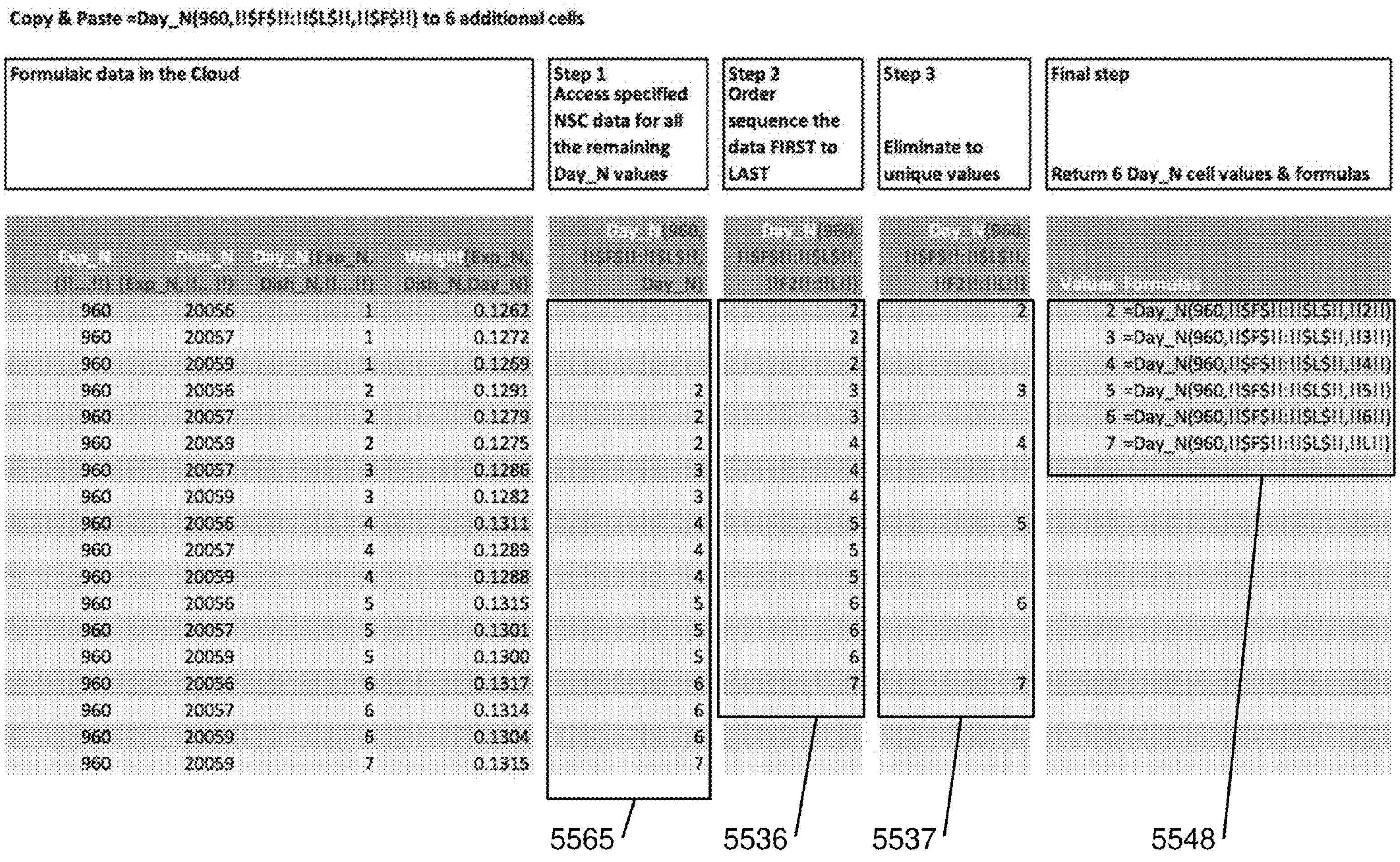
FIG. 55 illustrates the mechanics of the copy and paste shown in FIG. 54A and FIG. 54B using Multiple Sequence Ordered Sequential Replication technology to fix the data problems.

FIG. 55 illustrates the working of our technology showing why the copy and paste in FIG. 54A and FIG. 54B resulted in a full set of values. Step one 5565 accesses all the 'Day_N' values above the value of '1'. In step two 5536 those 'Day_N' values are sequenced FIRST to LAST. In step three 5537 the values are eliminated down to Unique values that then get returned in the final step 5548 with their formulaic variable formulas. The result is no omissions or mistakes in any of the 'Day_N' sets of values because one of the 'Dish_N's has less than a full set of 'Day_N' values. While on this very small data set this may not seem like a big problem, imagine if you had a hundred or more days for more dishes and more experiments and you quickly see the huge value of the user making a very small formulaic variable change and fixing vast numbers of problems or inconsistencies in their data.

Figure 56A:
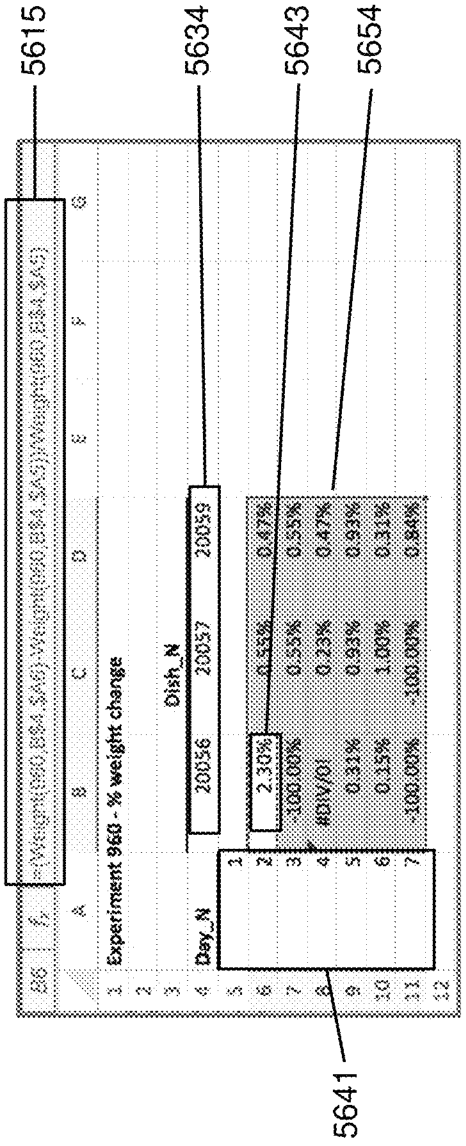
FIG. 56A and FIG. 56B example the Formulaic copy and paste of keyed discrete (single value) variables in a calculation cell and the resulting formulas.
Figure 56B:
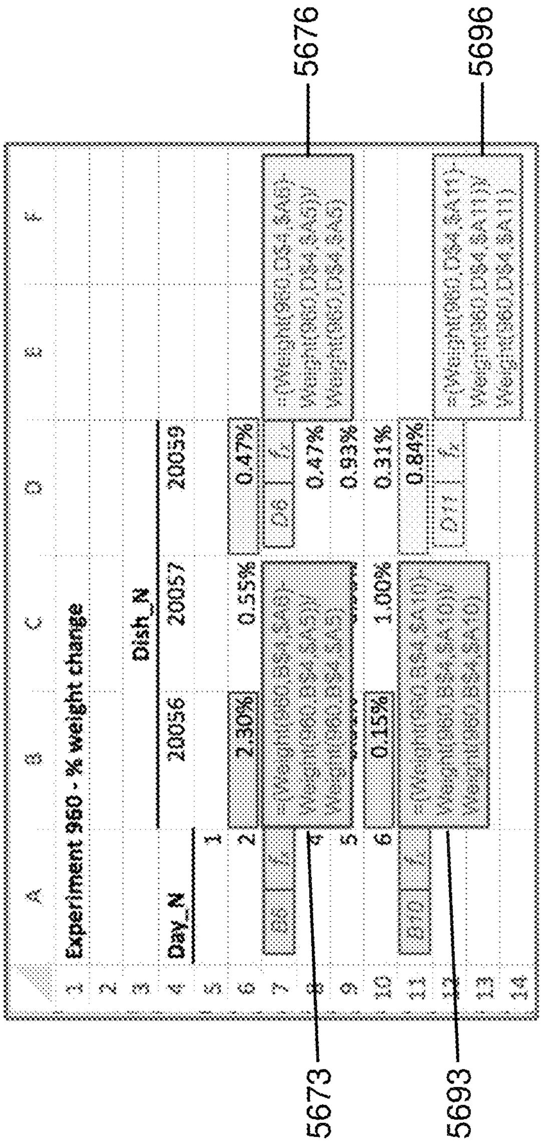

FIG. 56A examples how these formulaic headings can then be used for formulaic keyed data calculations. The row 5641 and column 5634 headings completed in FIG. 54B are used in the percentage weight change calculation 5615:

'=(Weight(960,B$4,$A6)−Weight(960,B$4,$A5))/Weight(960,B$4,$A5)' in cell B6 5643. As in the non-keyed example the '$' constraints apply, as in a normal spreadsheet, for limiting change during copy and paste. The formula in B6 5643 was then copied to create the other values in the highlighted cells 5654. You can see formula examples of the results of that Formulaic Variable copy and paste in FIG. 56B. It shows, in the four examples (5673, 5676, 5693 and 5696) how the '$' constrains the copy and paste to use the appropriate row and column headings for the formulaic variables.

Figure 57A:
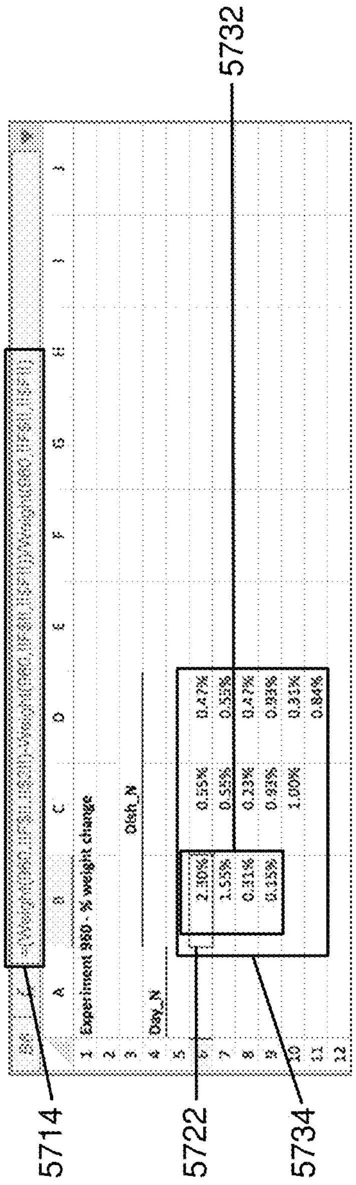
FIG. 57A FIG. 57B and FIG. 57C example using Unique Formulaic Variable copy and paste and then using variants of Unique Multiple Sequence Ordered Sequential Replication copy and paste to identify and/or correct data problems.
Figure 57B:
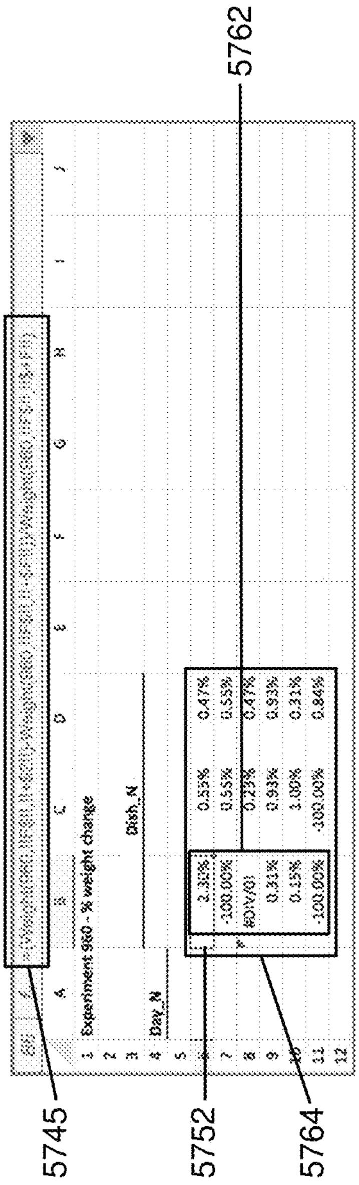

Just as in the non-keyed data, with our technology a user can generate keyed-data calculations like those shown in FIG. 56A without using the row and column headings. FIG. 57A examples doing the percentage weight change calculations for cell B6 5722 which has been copied and pasted using our Formulaic Variable Data End copy and paste shown in FIG. 21A through FIG. 21D. This results in a different number of results for each of the three columns 5734 because each has a different number of 'Day_N's values in the data set and the formula 5714 for cell B6 5722 that was replicated does not correct from missing data. However, when the user replaces the formula 5714:

'=(Weight(960,!F$!!,!!$2!!)−Weight(960,!!F$!!,!!$F!!))/Weight(960,!!F$!!,!!$F!!)' of FIG. 57A with the formula 5745:

'=(Weight(960,!F$!!,!!+$2!!)−Weight(960,!!F$!!,!!+F!!))/Weight(960,!F$!!,!!+$F!!)' for cell B6 5752 in FIG. 57B, the user gets the full set of values 5764 exactly matching those in FIG. 56A 5654. This is because the formula 5745 corrects for missing 'Day_N's. It uses the disclosed Multiple Sequence Unique Formulaic variables for 'Day_N' because of the '+' sign (see FIG. 12C) in the '!!+$2!!', !!+$F!!, and '!!+$F!!' in the 'Day_N' key position triggers the Multiple Sequence for 'Day_N'. This then ensures there is a full set of values for each 'Day_N' for each 'Dish_N'. In this example, the inserted values give results in 5764 ('−100.0%' or '# DIV/0!') that will likely cause the user to realize data was missing. However, in situations like this one the user may want a different option, shown in FIG. 57C, where the inserted values identify there was no value very clearly for the user. In this embodiment, that is done with the '!NO NEXT!' in red type in 5784 telling the user that missing data was inserted and showing them exactly where.

The selection between inserting a zero value or inserting a message like '!NO NEXT!' could be made a user option as there would be many situations where one would be a much better option. For our Charity where days with zero donations are not recorded and the insertion of the zero is correct, they would clearly want the option of inserting a '0' value. There would be other settings like with our Cancer researcher where the inserted data is clearly missing data that would not be a zero and therefore the user is likely to opt for the most visible way of seeing the missing data. In this embodiment of our technology selecting the desired filling approach could be via different spreadsheet commands such as the '!!FN!' and '!!2N!! used by the user in the formula 5775 (which also has the '+' because the user is also using the Multiple Sequence). It also could be a setting attached to the data when it is set up and the selection is then done so the user need do nothing to get a different outcome.

Figure 57C:
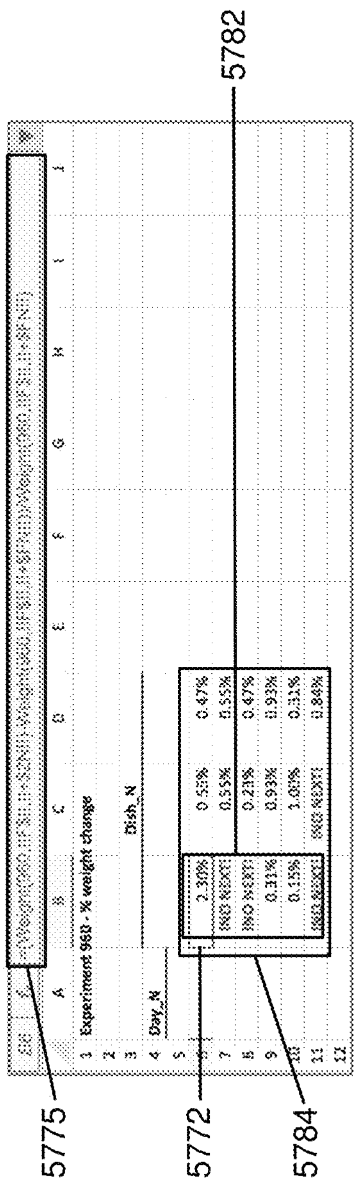
Figure 58:
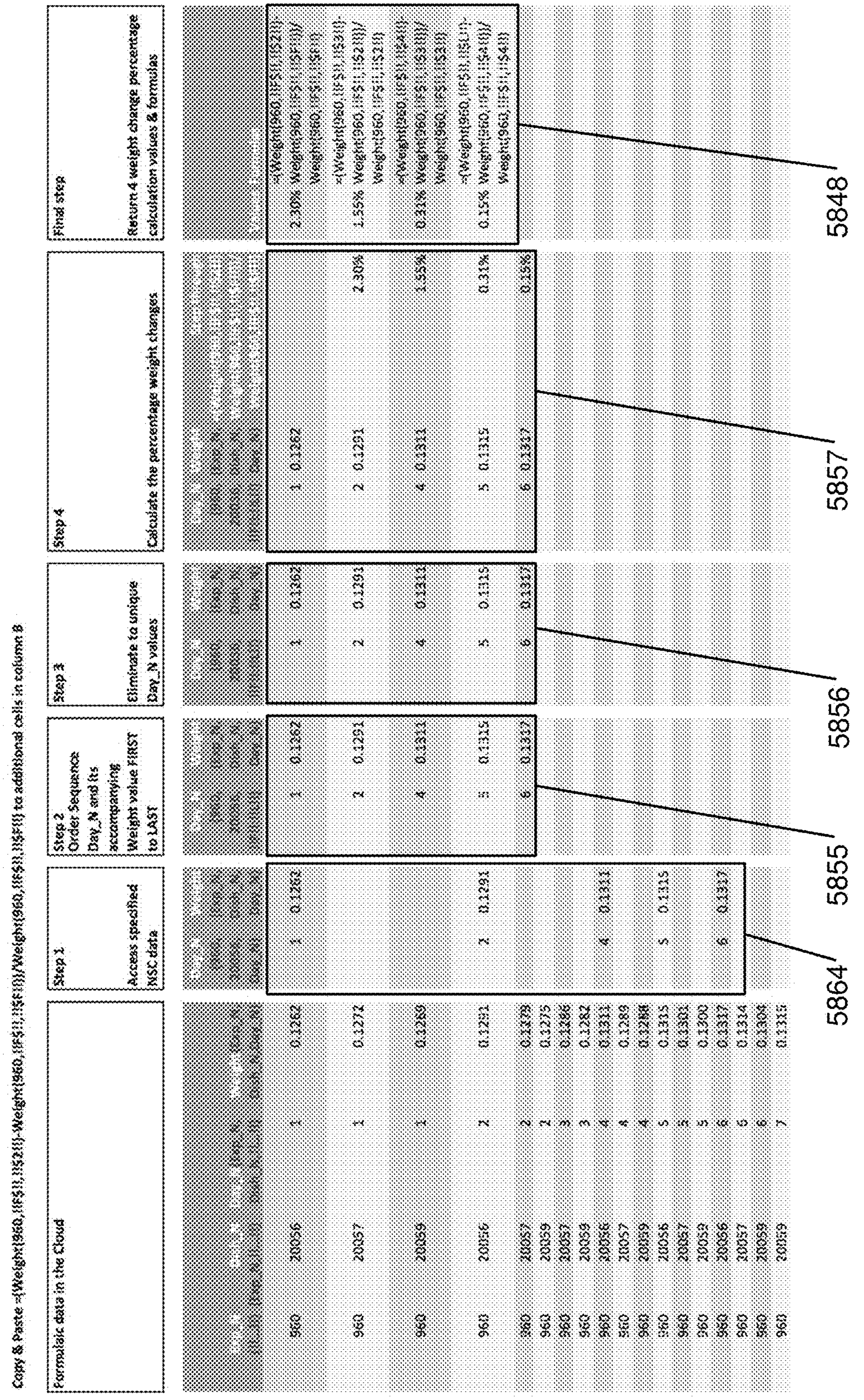
FIG. 58 illustrates the mechanics of Unique Sequence Ordered Sequential Replication copy and paste done in FIG. 57A.
Figure 59:
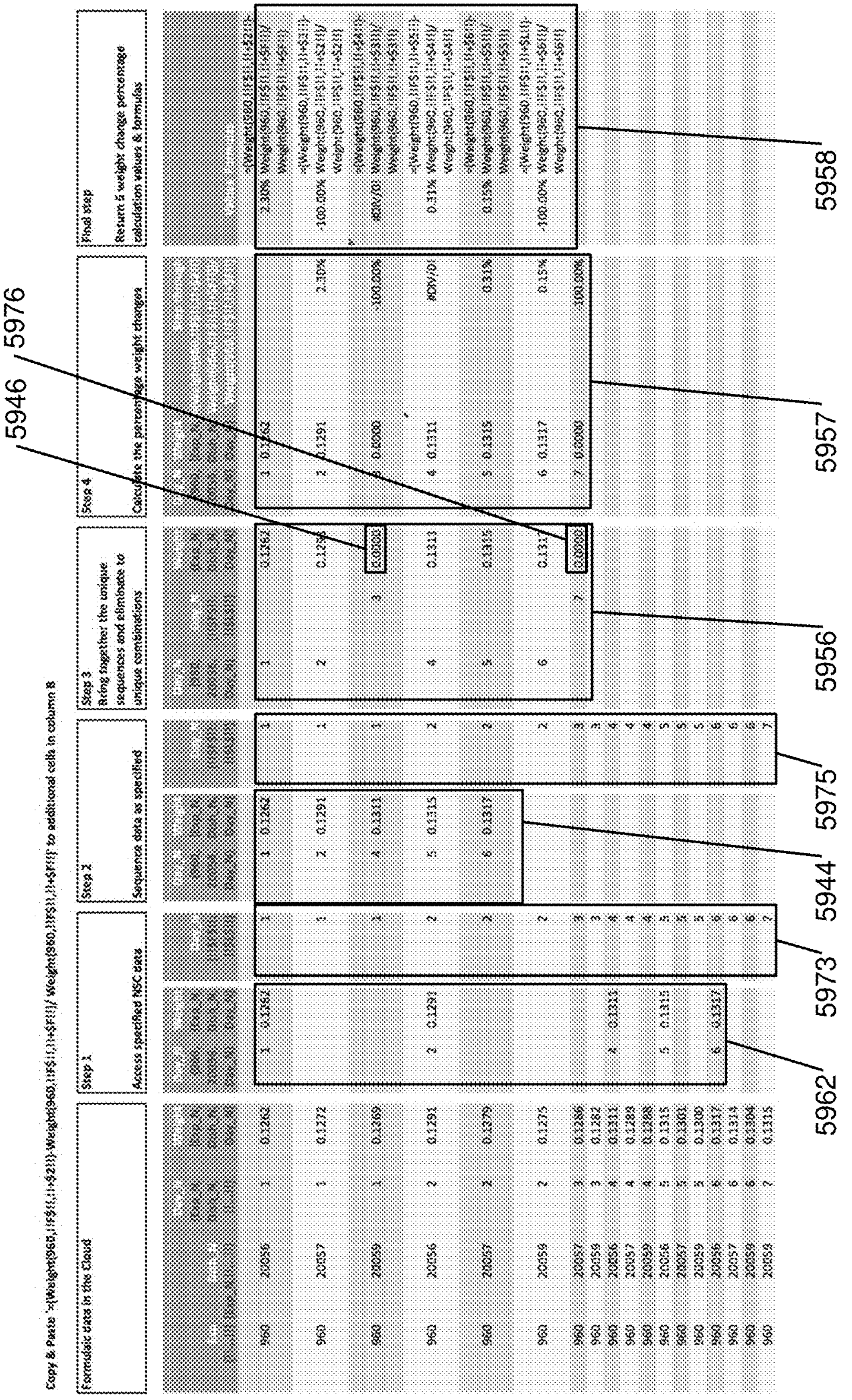
FIG. 59 illustrates the mechanics of Multiple Sequence Unique Sequence Ordered Sequential Replication copy and paste done in FIG. 57B with '0' filling of numeric missing data.
Figure 60:
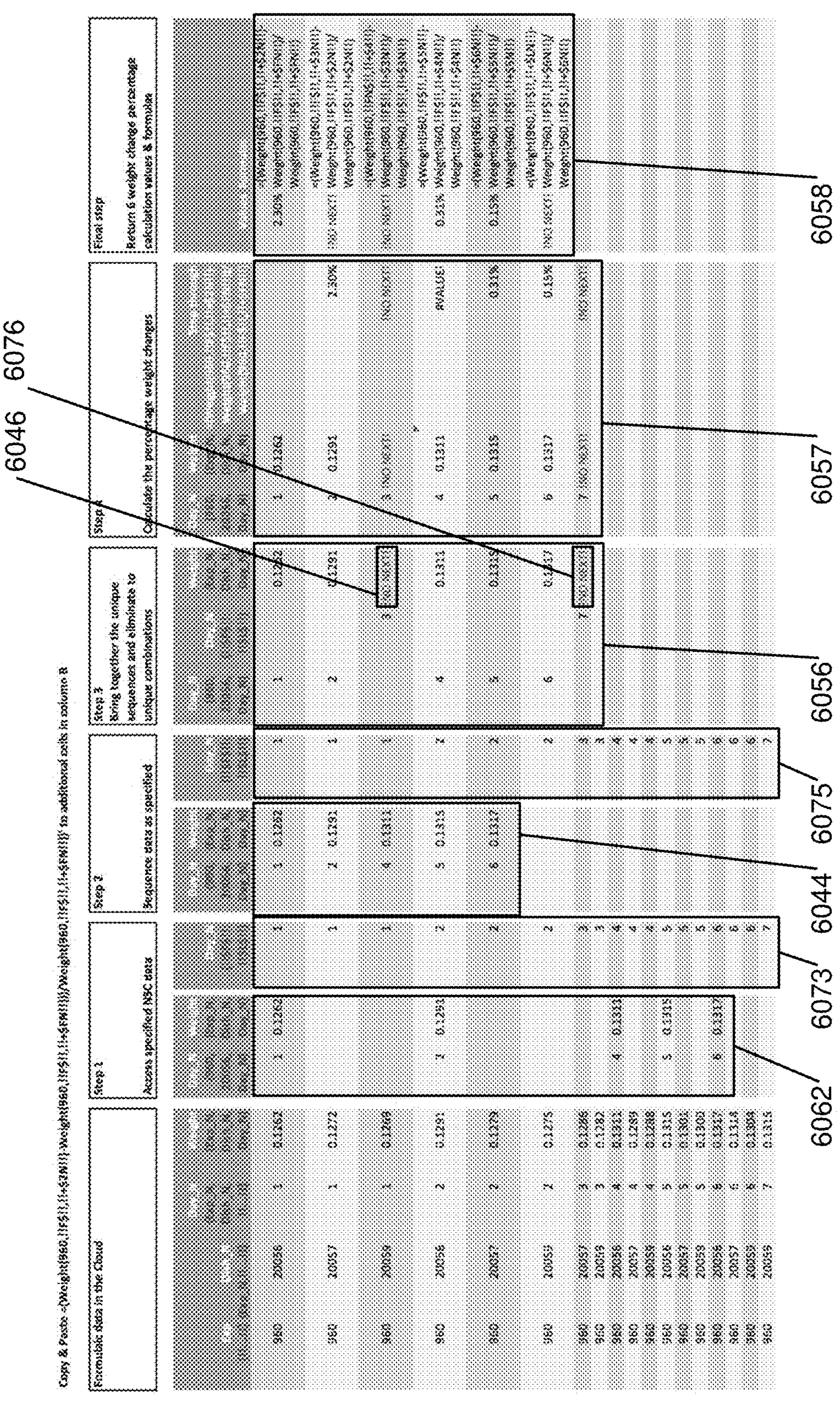
FIG. 60 illustrates the mechanics of Multiple Sequence Unique Sequence Ordered Sequential Replication copy and paste done in FIG. 57C with '!NO NEXT!' filling of missing data.

How our technology handles these the three different keyed data situations in FIG. 57A through FIG. 57C is illustrated in FIG. 58, FIG. 59 and FIG. 60. The steps parallel those done for the non-keyed data, with the user using our Unique and End variant of our Ordered Sequential Replication copy and paste. FIG. 58 illustrates the mechanics of the copy and paste done in FIG. 57A for copying cell B6 5722 to all the cells in column B 5732. Because nothing was done to fill in the missing data it accesses five values in step one 5864. It sequences the values in step two 5855. In step three 5856 it eliminates any duplicate values, of which there are none. Then in step four 5857 it uses those five values to do the calculation for what is four cells worth of calculations. In the final step 5848 it returns those four values and their respective formulas to the spreadsheet. Because the user employed the End copy and paste approach it does not send back any additional values.

FIG. 59 examples the difference if the formula replicated effectively fills in any missing or inconsistent data. Again, this process closely parallels that done by our technology for the non-keyed data and is using our Multiple Sequence and Data End variants of our Ordered Sequential Replication copy and paste. This example illustrates the mechanics of the copy and paste done in FIG. 57B for copying the cell B6 5752 to all the cells in column B 5762. In step one it accesses the 'Day_N' and 'Weight' values for 'Dish_N' '20056' 5962, and it accesses all of the 'Day_N' data 5973. In step two our technology sequences both data sets 5944 and 5975 before bringing them together and then eliminating to the Unique values in step three 5956. That results in filling the otherwise empty 'Day_N' '3' 5946 and '7' 5976 values with the '0.0000' values. All those values are then used in step four 5957 to calculate the percentage weight changes. In the final step 5958 the six different cell values are returned to the spreadsheet cells with their respective formulas.

FIG. 60 illustrates the Multiple Sequence and End variants of our Ordered Sequential Replication copy and paste done in FIG. 57C for the cell B6 5772 for all the cells in column B 5782. It parallels the processes in FIG. 59 except with the '!!FN!! function filling in the missing data with a red '!NO NEXT!'. In step one it accesses the 'Day_N' and 'Weight' values for 'Dish_N' '20056' 6062, and it accesses all of the 'Day_N' data 6073. In step two our technology sequences both of those data sets 6044 and 6075 before bringing them together and then eliminating to the unique values in step three 6056. That results in filling the otherwise empty 'Day_N' '3' 6046 and '7' 6076 values with the red '!NO NEXT!'. All those values are then used in step four 6057 to calculate the percentage weight changes. In the final step 6058 the six different cell values are returned to the spreadsheet cells with their respective formulas.

Figure 61A:
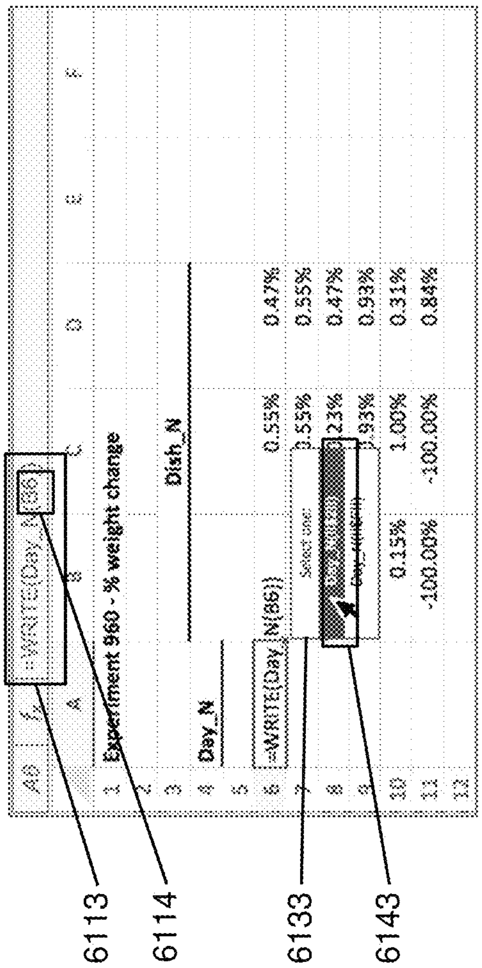
FIG. 61A and FIG. 61B example formulaic variable WRITE capability writing the selected variable from a formula with more than one value of that variable.
Figure 61B:
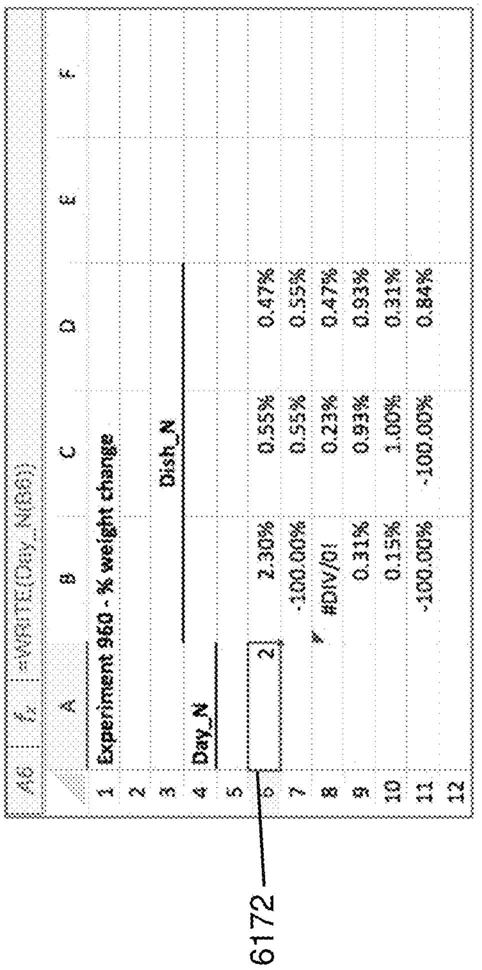

Our different NSC formulaic variable keyed data WRITE, formula, function and copy and paste commands, the workings of which are illustrated in FIG. 53, FIG. 55, FIG. 58, FIG. 59 and FIG. 60, allow users to access, manipulate and use external keyed data with spreadsheet commands. FIG. 61A examples a capability mentioned for non-keyed formulaic variables but not exampled-a WRITE statement writing the value from a cell which contains multiple values of that variable. When the user specifies a variable 'Day_N' and a cell 'B6' 6114 in the WRITE statement 6113 where that cell has a formula using more than one value of 'Day_N', in this embodiment, they get a pop-up box 6133 asking the user to select which value they want to WRITE. Once the user clicks on 6143 which value of the variable they want to use in the pop-up 6133, then the value '2' in is populated as shown in cell A6 6172 in FIG. 61B. This works the same way for our keyed and non-key NSC formulaic data variables.

Rather than do parallel keyed data examples for all the different non-keyed formulaic variable capabilities that work the same way, we example for one large sized and complex keyed data a number of keyed data dimensions that introduce some differences in our spreadsheet commands. We will example different keyed data types and usages. We will example keyed data identified by a single key, compound keys and usage of keyed data where we do not use the keys. We will work with constraints, formulas, functions, regular and special copy and paste covering capabilities or modifications to capabilities we have not already discussed.

Figure 62:
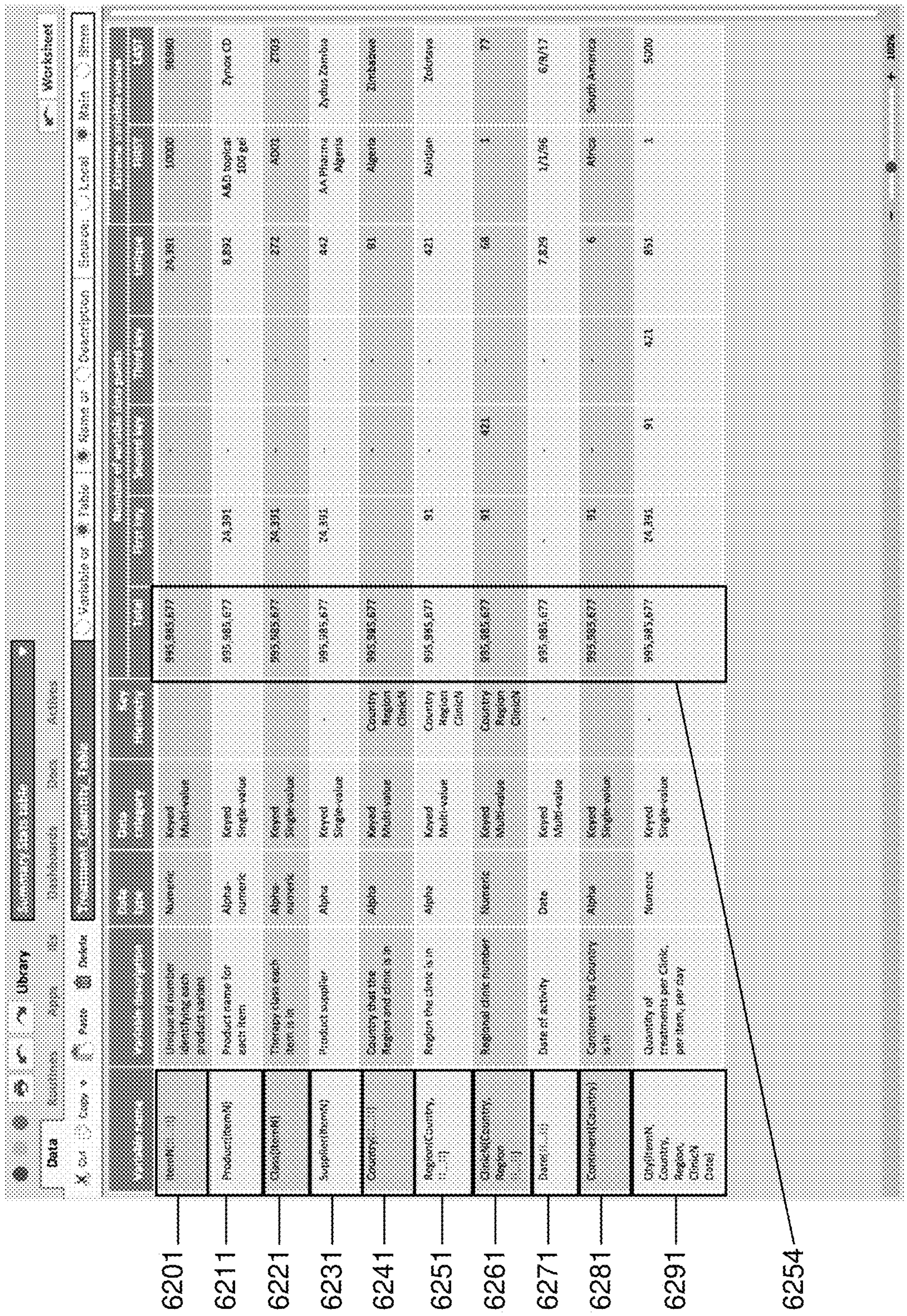
FIG. 62 shows the summary stats for a much larger and more complicated example keyed data set.

FIG. 62 lays out the summary stats for a large and reasonably complex keyed data set. A Global medical charity volunteer wants to determine usage of different drugs in their different volunteer clinics around the world. The drug identification is simple from a data perspective as each drug item has a single unique 'ItemN' 6201 identifying each variant of each drug. For each 'ItemN' there is one 'Product' 6211 value, one 'Class' (of treatment) 6221 value and one 'Supplier' 6231 value. However, on the clinic side there is no single identifying number and instead it requires a combination of 'Country' 6241, 'Region' 6251 and 'ClinicN' 6261 values to uniquely identify where something was administered. Therefore, the quantity of drug item usage 'Qty' 6291 is a function of the 'Country' 6241, 'Region' 6251, 'ClinicN' 6261, 'ItemN' 6201 and the 'Date' 6271 upon which it was given as a treatment. Additionally, there is a variable 'Continent' 6281 that like 'Product' 6211, 'Class' 6221 and 'Supplier" 6231 is not needed to identify 'Qty' 6291 but is of interest to users for informational and analytical purposes.

The data in FIG. 62 has been de-normalized into a single large data set with '995,985,677' 6254 rows for the ten variables stored in the cloud (NSC external data). However, the data could be in a set of linked normalized tables where the keys bring together the information for the purposes of the spreadsheet access, manipulation and usage. In this embodiment, we have continued our syntax of the '!! . . . !!' found in the 'ItemN' 6201 'Country' 6241, 'Region' 6251, 'ClinicN' 6261 and 'Date' 6271 telling the user that these variables are non-discrete having multiple values after all keys, if they have any, are specified. The actual syntax could differ but the importance is telling the user the different types of data they are dealing with in our NSC Formulaic keyed variables. As with our previous examples the other information in FIG. 62 is to give the user a quick summary of the data they are dealing with. Other information and formats could and would be used to give the user a perspective on the data included and its unique values.

Figure 63A:
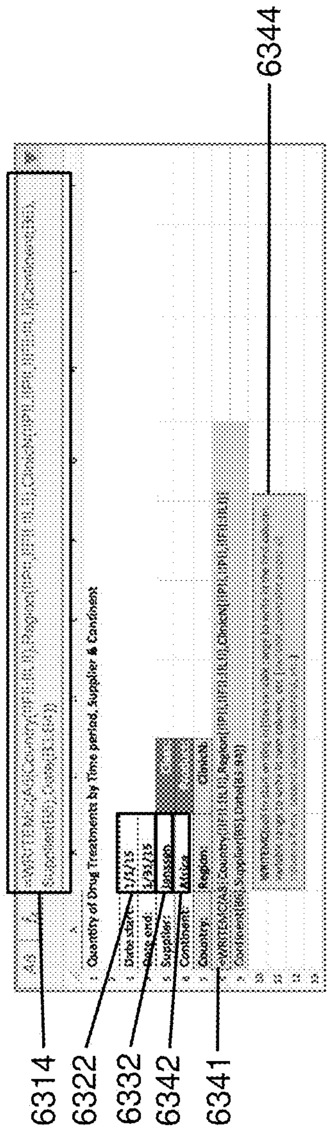
FIG. 63A FIG. 63B, FIG. 63C and FIG. 63D example the use of the multiple row or column WRITE command using constraints, Auto Flexing, different types and usages of keyed formulaic variables, and two different syntaxes for the formulaic variables.

FIG. 63A through FIG. 63D example the use of the multiple row or column WRITE command using constraints and two different syntaxes for the formulaic variables. This usage is very similar to that for the non-keyed data once you factor in the data keys. FIG. 63A uses in the 'WRITEMC' formula 6314 three multi-value keyed formulaic variables that are involved in compound keys ('Country' 6241, 'Region' 6251, and 'ClinicN' 6261), two single value keyed variables ('Continent' 6281 and 'Supplier' 6231) used with their non-keyed, not keyed, values, and two values of one multi-value formulaic variable ('Date' 6271) used as a constraint range.

In setting up their desired spreadsheet row headings the user types a three column 'WRITEMC' formula into cell A8 6341. The user is going to create a set of calculations with row, column and calculation cells driven by constraints including the two 'Date' constraints in cells B3 and B4 6322, a 'Supplier' value in cell B5 6332 and a 'Continent' value in cell B6 6342. Since they desired these constraints (filters) to apply to all the headings and spreadsheet calculation cells they input those four values:

'Continent(B6),Supplier(B5),Date(B3:B4)' after the second 'J' in the WRITEMC command 6314 following the instruction laid out in the help pop-up 6344. In this embodiment, since B6 is not a value of 'Country' 6281 the key for 'Continent' the app tries it as a non-keyed value and finds it is a value of 'Continent' 'Africa' 6342 and therefore uses it as a non-keyed value. B5 is also not a value of 'ItemN' 6231 the key for 'Supplier' so the app tries it as a non-keyed value and finds it is a value of 'Supplier' 'Janssen' 6332 and therefore uses it as a non-keyed value. This intelligence in the app as well as the different variants of the commands like !F! for non-keyed and !!F!! for keyed formulaic data is a way to differentiate when non-keyed vs. keyed formulaic data is used. Other embodiments use ways with less automation, such as, replacing the parentheses in the formulaic data with braces {curly brackets} '{ }' for non-keyed data and brackets [square brackets] '[ ]' for keyed formulaic data not requiring the check of the type of data by the app. No matter how the keyed and non-keyed formulaic data is differentiated, the constraints therefore apply to all of what will be written by the 'WRITEMC' command 6314 thereby being equivalent to being first in the data retrieval and manipulation instructions. The user specifies the three columns sets of data in the 'WRITEMC' command 6314:

'Country(!!F!!:!!L!!),Region(!!P!!,!F!!:!!L!!),ClinicN (!!P!!,!!P!!,!F!!:!!L!!)' after the 'A8|' and before the second 'I' in 6314. In this example, the user has used a more complete syntax referencing each of the keys for each of the formulaic data variables. Since 'Country' has no key but multiple values they have specified they want the Unique values from FIRST '!!F!' to LAST '!!L!!'. Because Region has one key, which is 'Country' and then multiple values the user has used the '!!P!!' formulaic variable command, which in this embodiment says use the PREVIOUSLY specified 'Country' values in this formula. So, Region will use the different 'Country' values and then for each Country value WRITE all of the Unique 'Region' values FIRST '!F!!' to LAST '!L!!'. Because 'ClinicN' is a function of both 'Country' and 'Region' the user has a '!!P!!' in each of those spots. Therefore 'ClinicN' will WRITE its unique FIRST '!!F!' to LAST '!!L!' values for all of those 'Country' and 'Region' combinations. The WRITE command uses our Ordered Sequential Replication with the four constraints ('Continent' value 'Africa' 6342, 'Supplier' value Janssen' 6332 and the period of time between the two 'Date's '1/1/15' and '1/31/15' 6322).

Figure 63B:
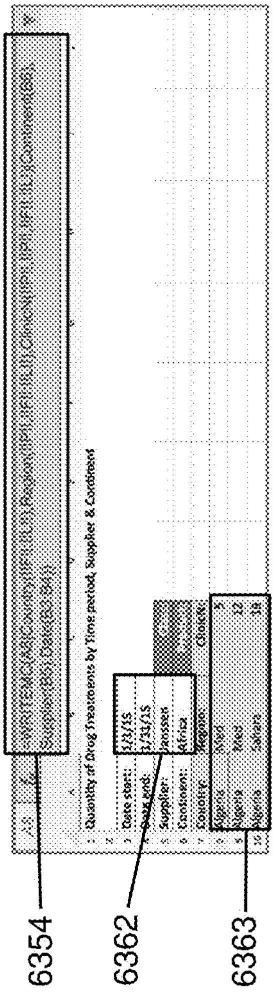
Figure 63C:
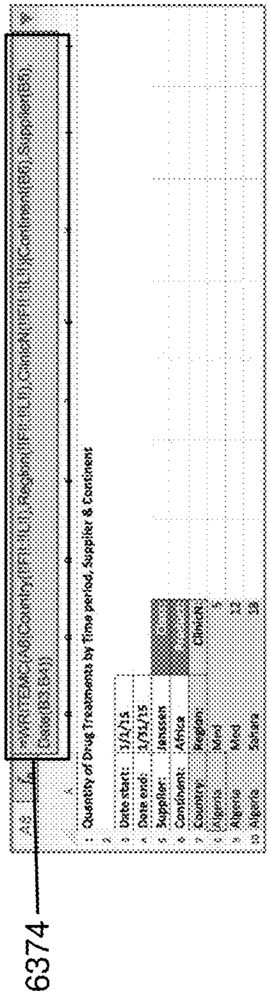

The result of the completed 'WRITEMC' formula 6354 in FIG. 63B is a complete set of the 'Country', 'Region' and 'ClinicN' row headings, the first four of which are shown in 6363. Those row headings will then change and Auto Flex, as previously exampled for non-keyed data, with a change to any one of the four constraints 6362. FIG. 63C examples a more abbreviated syntax for the formulaic data. In this syntax, the PREVIOUS '!!P!!' does not need to be written and is automatically filled in for the key as long as the key variable has preceded the variable in the formula. So, because 'Country' has preceded 'Region' in the formula 6374: '=WRITEMC(A8|Country(!!F!!:!!L!!),Region(!!F!!:!!L!!),ClinicN(!!F!!:!!L!!)|' it automatically gets the values of 'Country'. 'ClinicN', which has both 'Country' and 'Region' as keys will automatically get those values. This makes it easier and faster for a user to write the commands.

Figure 63D:
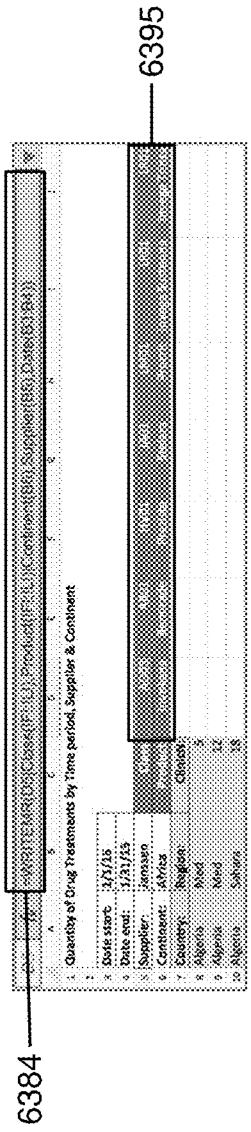

FIG. 63D examples the WRITEMR command, not because the WRITEMR works differently but as a chance to example using keyed data not with its keys but instead using its non-keyed Unique values. In this embodiment, the command to ignore the keys and use the non-keyed Unique values for the variable overall, is the non-keyed data series of '!F!' and '!L!' formulaic commands (instead of the '!!F!! and '!!L!!' commands). Therefore, in FIG. 63D the 'WRITEMR' command 6384:

'=WRITEMR(D5|Class(!F!:!L!),Product(!F!:!L!)|Continent(B6),Supplier(B5), Date(B3:B4))' uses the 'Class' and 'Product' non-keyed unique values, not their 'ItemN' keyed values. So when the user uses the '!F!:!L!' command they tell our application they want their Unique non-keyed values, in this example after applying the four constraints:

'Continent(B6),Supplier(B5),Date(B3:B4)'.

The inheritance works just like the regular non-keyed '!F! based commands or the keyed '!!F!!' ones, so in this example the Product values will be limited to those for the 'Class' values that preceded it. Those values will then employ our Ordered Sequential Replication capability giving the column headings, seven of which are shown in 6395. These column headings will then change and Auto Flex with any change to the constraints.

Figures 64A, 64B, 64C, 64D, 64E:
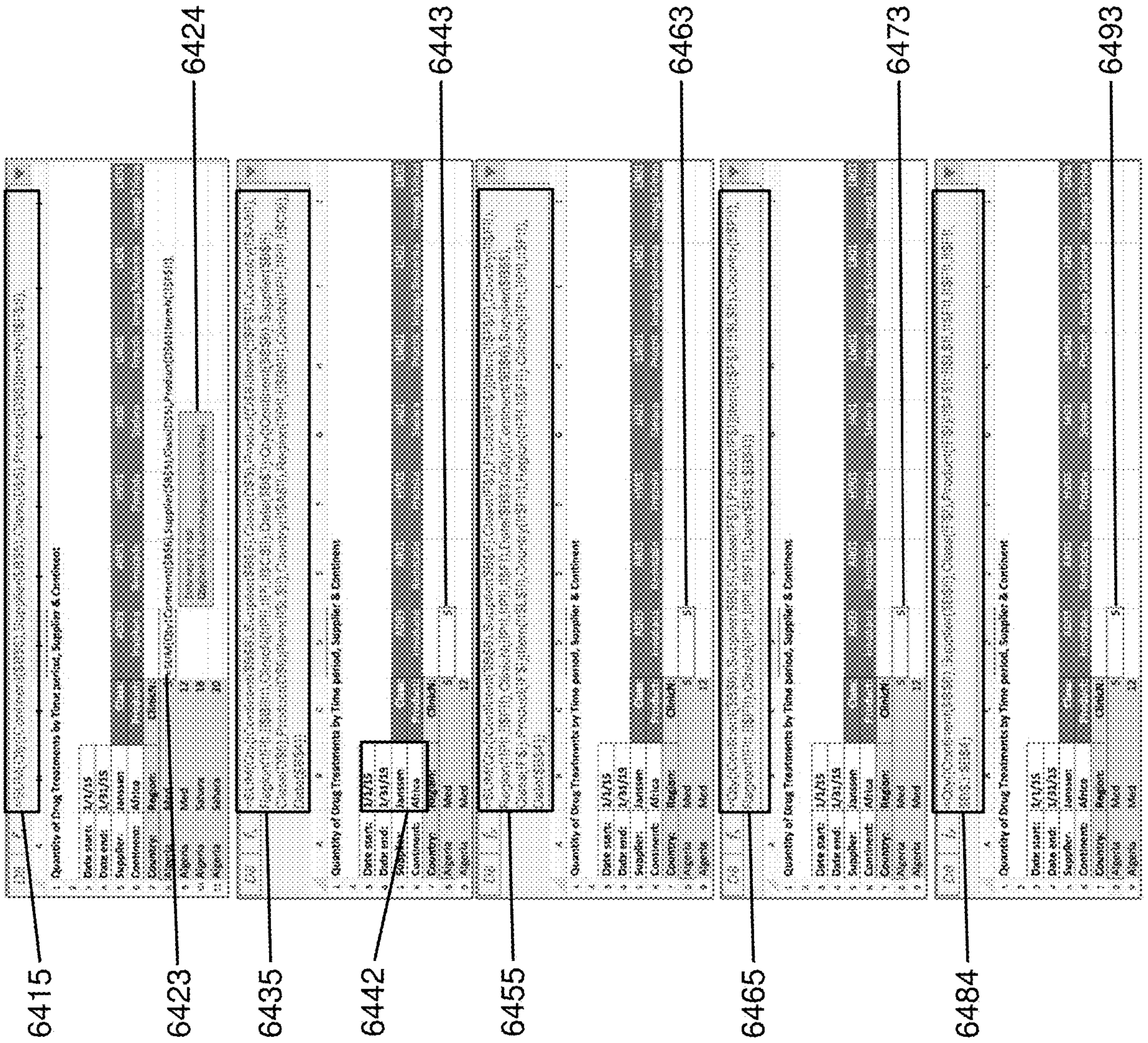
FIG. 64A FIG. 64B, FIG. 64C, FIG. 64D and FIG. 64E example creating the calculation cell that can be copied and pasted to match the headings completed in FIG. 63D using multiple formulaic variable approaches and syntaxes.

FIG. 64A through FIG. 64E example creating the calculation cells that match the headings completed in FIG. 63D. Having completed the row and column headings incorporating the constraints and handling the different types of keyed data, creating the calculation cells involves using the appropriate '$' conventions so it can be copied and pasted to match the row and column headings. FIG. 64A starts showing an example of the user creating in cell D8 6423 a formula 6415 for summing the 'Qty' of treatments in each cell matching the row and column headings of the spreadsheet. The user sees from the variable pop-up 6424 the pre-defined keys for 'Qty' and realizes that not all the constraints and not all the row and column headings are included in those keys. They therefore need to include those missing values as constraints, which in this embodiment and example are the formulaic values below which are between the two bars '| |' in 6415:

'|Continent($B$6),Supplier($B$5),Class(!F$!),Product (!F$!)|'

By positioning those constraints first in the formulaic variable 'Qty' they are applying those values first to limiting what data is accessed and used. They started entering the first key value 'ItemN (!$F$!!)' in which they used the double '$' because they as they copy the cell they want to retain the FIRST 'ItemN' value in the FIRST to LAST sum of all the 'ItemN' values that fit the constraints and the rest of the 'Qty' keys.

FIG. 64B then completes the formula for the FIRST to LAST summation formula 6435 thereby populating cell D8 6443 with the value '5'. The user has used the cell heading values with the '$' values set to ensure that the copy and paste delivers the correct row and column values to the calculation formula when it is copied. To complete all of the spreadsheet calculation cells the user then simply uses our Replicate special Column and Row End copy and paste option, previously described, to fill in the other cells. They then have rows and column headings and calculation cells that change content and Auto Flex on the user inputs into the constraint cells 6442. In this example, the user has employed the full syntax example version of our embodiment.

FIG. 64C examples the same syntax approach as FIG. 64B, to create the same spreadsheet calculation values but with a calculation cell formula not using the row and column headings. The user replaces our formulaic variable cell references in formula 6435:

'=SUM(Qty(|Continent($B$6),Supplier($B$5),Class(D$5),Product(D$6)|Item (!!$F$!!), Country(!!$A8!!), Region(!!P!!,!!$B8!!),ClinicN(!!P!!,!!P!!,!!$C8!!), Date($B$3):Qty(|Continent($B$6),Supplier($B$5), Class(D$5),Product(D$6)|Item (!!$L$!!),Country (!!$A8!!), Region(!!P!!,!!$B8!!),ClinicN(!!P!!,!!P!!, !!$C8!!),Date($B$4))' with our formulaic variable commands in the FIG. 64C formula 6455:

'=SUM(Qty(|Continent($B$6),Supplier($B$5),Class (!F$!),Product(!F$!)|Item (!!$F$!!), Country(!!$F!!), Region(!!P!!,!!$F!!),ClinicN(!!P!!,!!P!!,!!$F!!),Date ($B$3): Qty(|Continent($B$6),Supplier($B$5),Class (!F$!), Product(!F$!)|Item (!!$L$!!),Country(!!$F!!), Region(!!P!!,!!$F!!),ClinicN(!P!!,!!P!!,!!$F!!),Date ($B$4))' for cell D8 6463. They have managed to handle all the different constraint, and keyed variable formulaic variable requirements with the normal spreadsheet '$' and our '!F!, !L!,!!F!,!!L!! commands (and of course the !2!,!!2!!, and other intermediate values used), all of which support our different copy and paste technologies. However, because this is the full syntax with no abbreviations the formulas are more complicated than they need to be and will be dramatically simplified along similar lines shown previously for the non-keyed data, below.

FIG. 64D then examples our more abbreviated formulaic variable command syntax in the formula 6465:

=Qty(|Continent($B$6),Supplier($B$5),Class(!F$!), Product(!F$!)|Item (!!$F$!!:!!$L$!!), Country(!!$F!!), Region(!!P!!,!!$F!!),ClinicN(!!P!!,!!P!!,!!$F!!),Date ($B$3:$B$4))

for the cell D8 6473 using our implicit summation to the unique values described previously. This would equally apply to our ALL commands (!FA!,!LA!,!!FA!,!!2!! or !!LA!!) as well. It eliminates the need for the SUM command with our implicit value summation, which in this example is across both the 'ItemN' and 'Date' keys, and thereby dramatically abbreviates the commands to accomplish all the same results.

FIG. 64E takes our syntax and that simplification one step further using the key inheritance of the preceding values exampled in FIG. 63B and FIG. 63C. This further reduces the formula 6484:

'=Qty(|Continent($B$6),Supplier($B$5),Class(!F$!), Product(!!F$!)|!!$F$!:!!$L$!!,!!$F!,!!$F!!,!!$F!!, $B$3:$B$4)' for the cell D8 6493.

Figure 65A:
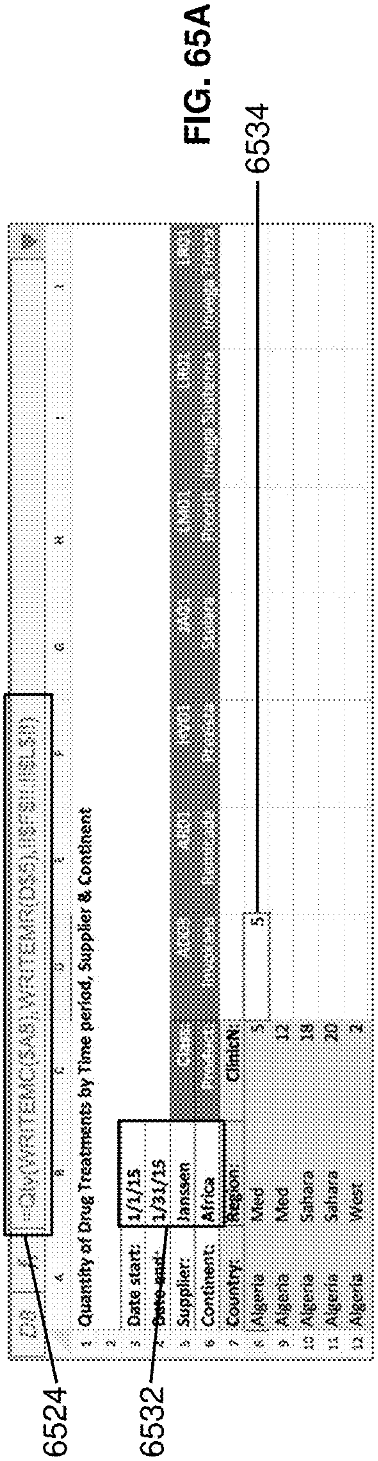
FIG. 65A and FIG. 65B show additional approaches for creating the calculation cell in FIG. 64A FIG. 64B, FIG. 64C, FIG. 64D and FIG. 64E, using the incorporation of one or more WRITE commands and a non-keyed approach to manipulating keyed data.

FIG. 65A then picks up where FIG. 64E stops with formula 6524 exampling another way for calculating the value of 'Qty'. FIG. 65A examples for keyed data an approach we exampled for non-keyed formulaic variables in FIG. 32B. It incorporates the WRITE function in the calculation cell formula 6524, in this example both a 'WRITEMC' and a 'WRITEMR'. The specified WRITE functions bring with them their respective values and any constraints (filters) thereby ensuring the values used for the calculation match those for the corresponding headings. In this example, the implicit SUM calculation of formulaic variable 'Qty' from '!!$F$!!' to !!$L$!' in 6524 uses in 'Qty' keys the formulaic data values from 'WRITEMC($A8)' and 'WRITEMR(D$5)' which include the constraint (filter) values in 6532. It will end up summing 'Qty' for all the 'ItemN' values for the Product in 'WRITEMR(D$5)' from Date '1/1/15' to Date '1/31/15' in 6532. This more abbreviated version of writing the calculation 6524 is easier for the user and ensures consistency with the headings of the 'WRITEMC($A8)' and 'WRITEMR(D$5)' that match the cell 6534.

Figure 65B:
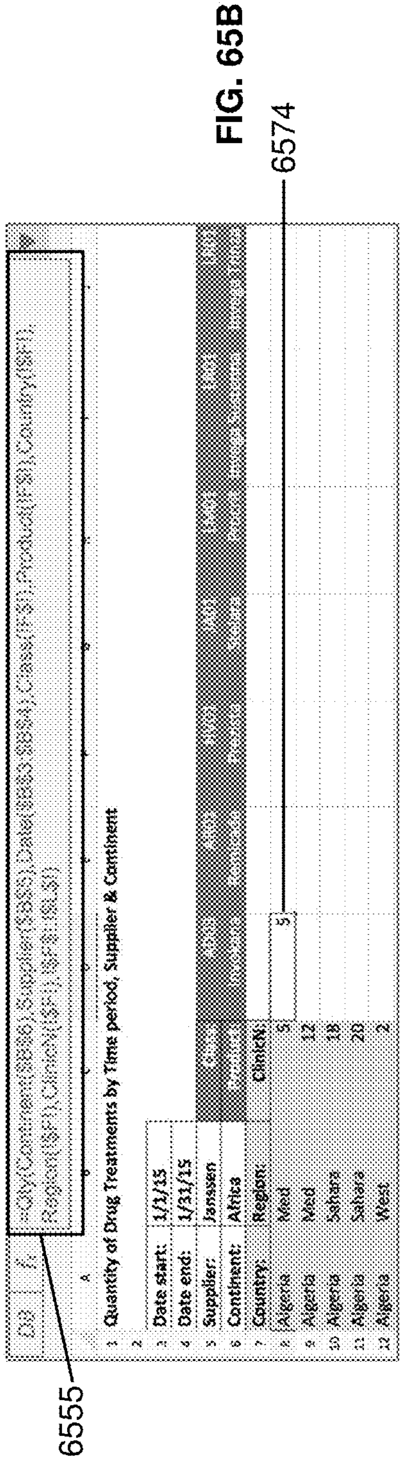

FIG. 65B examples a different approach to creating the calculation cell D8 6574. It employs the option of treating keyed data without using the keys, in this embodiment using the non-keyed functions such as the '!F!' and '!L!' (instead of the keyed variants '!!F!!' or '!!L!!'). Therefore, the user has written the formula 6555 as follows:

'=Qty(Continent($B$6),Supplier($B$5),Date($B$3: $B$4),Class(!F$!),Product(!F$!), Country(!$F!),Region(!$F!),ClinicN(!$F!),!$F$!:!$L$!)' where the constraints (filters) of 'Continent($B$6),Supplier ($B$5),Date($B$3:$B$4)' are ordered first so that they impact all the formulaic variables. The 'Class(!F$!), Product (!F$!)' are written with the matching '$' so they change together and only horizontally when you copy and paste. The 'Country(!$F!),Region(!$F!),ClinicN(!$F!)' set the other way '$' wise so they change together and only vertically when you copy and paste. The result is the user has written the calculation cell 6574 so it will change like the row and column headings but did not need any of their values to do it.

In FIG. 64A through FIG. 65B we have shown that using our technology a user is able to set up a complicated set of external data retrieval, manipulation and calculations with some reasonably short spreadsheet cell commands that users can easily copy and paste to deliver a sizeable number of cells that Auto Flex with simple user constraint cell 6442 or 6532 inputs. We have now shown that for a complicated set of headings (including many variables) and their related calculation cells (which use or match those headings) using our keyed- and non-keyed alpha, numeric, alpha-numeric and date formulaic variables. While we have used our implicit summation calculation in many of these examples, the formulaic data approach is applicable to most of the spreadsheet functions and mathematical operators. That would include simple math formulas (like the one used in FIG. 56A through FIG. 60), complex mathematical formulas, different functions like the AVERAGE (see FIG. 47A through FIG. 49), COUNT or many of the 450 plus other functions available in the leading spreadsheets. These heading, row, constraint and calculation cell capabilities can also be set up with our capability for fixing missing and inconsistent data as exampled in FIG. 52 through FIG. 60.

Figure 66A:
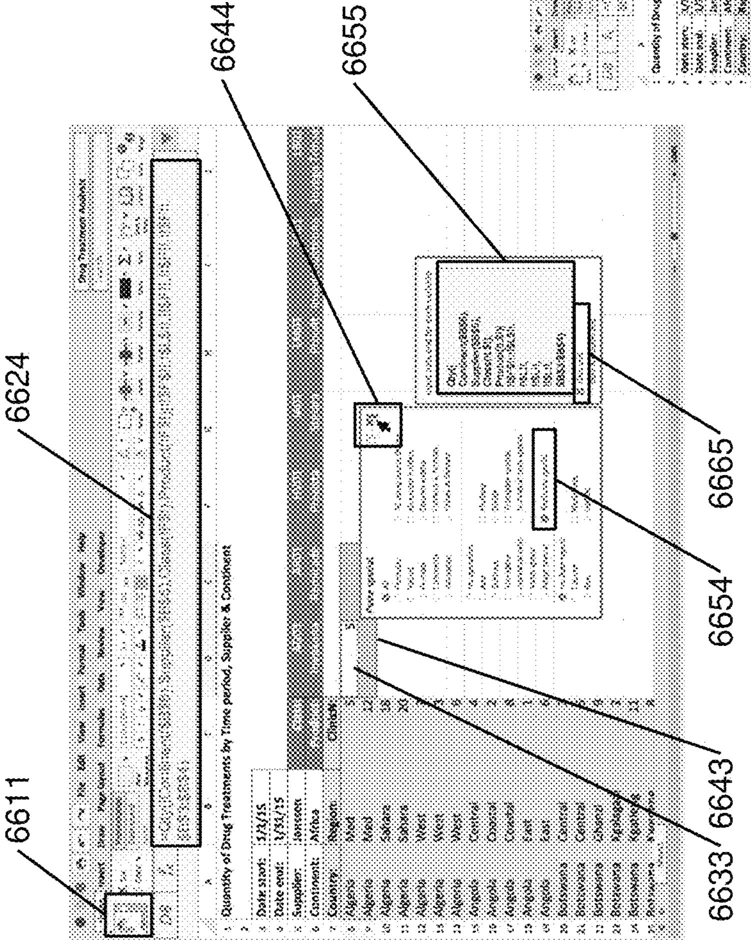
FIG. 66A and FIG. 66B example Ordered Sequence Data End Replication copy and paste for an implicit sum calculation cell using both keyed and non-keyed formulaic data.

FIG. 66A then examples the Replicate special 6654 Data end 6665 copy and paste 6611 of the cell D8 6633 and the formula 6624 giving the result 6688 in FIG. 65B. The user set the replication to the 'Data end' 6665 of their desired variables and then set the end values in 6655 thereby matching the spreadsheet cells to the row and column heading cells, despite not using their values. Had the user copied any of the cell D8s in FIG. 64B through FIG. 65B they would have achieved the same results using our appropriate Replicate Special Data end or Row and column end copy and paste.

Figure 66B:
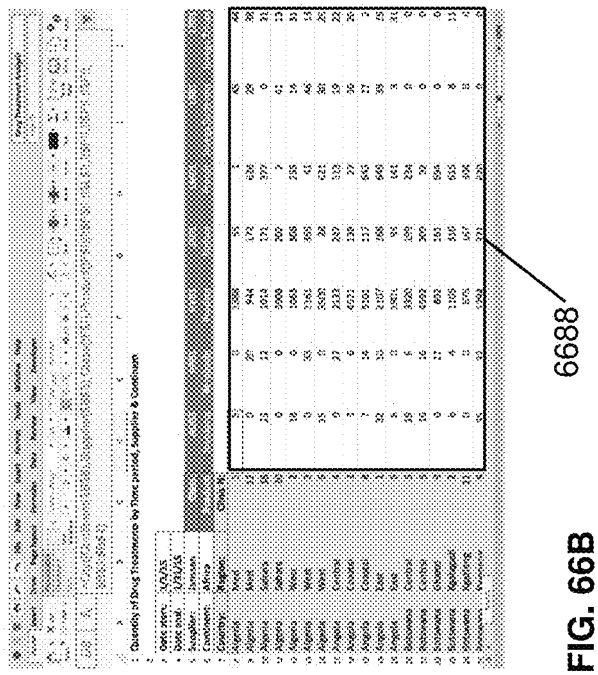
Figure 67A:
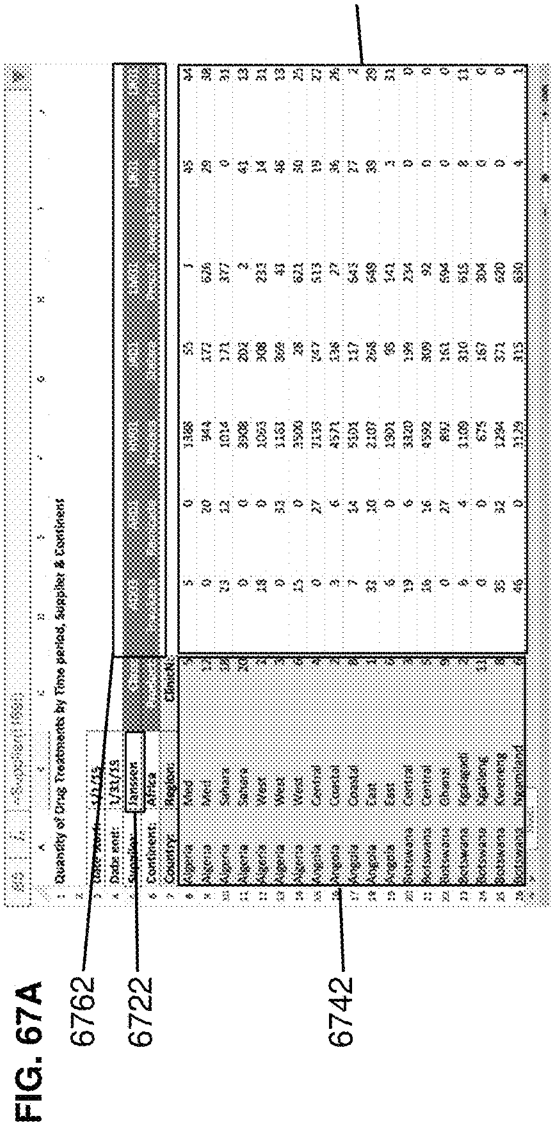
FIG. 67A FIG. 67B, FIG. 67C and FIG. 67D example the Auto Flexing result of changing a constraint (filter) in FIG. 66B.
Figure 67B:
Figure 67C:
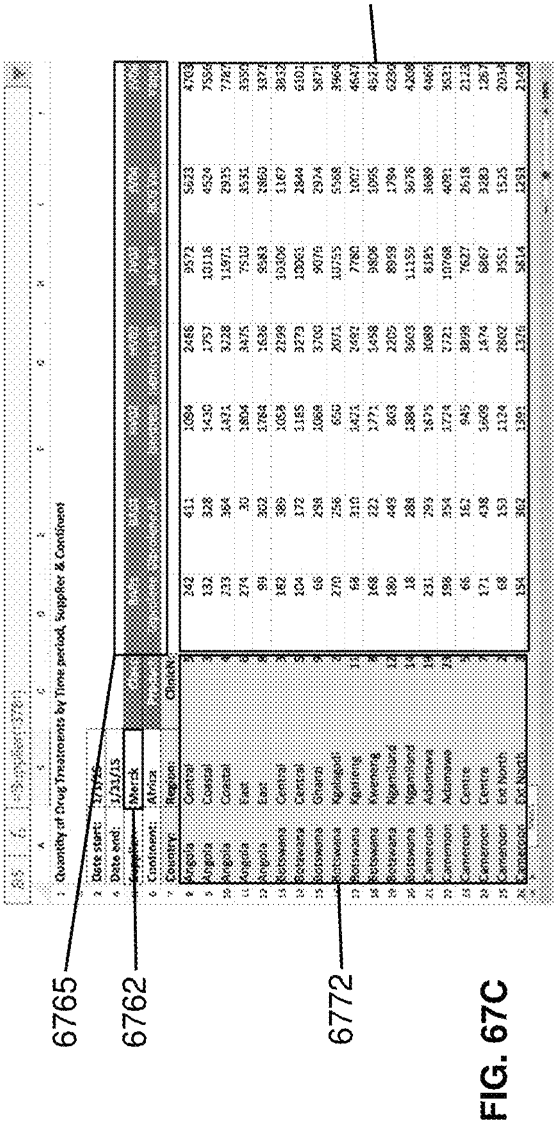
Figure 67D:
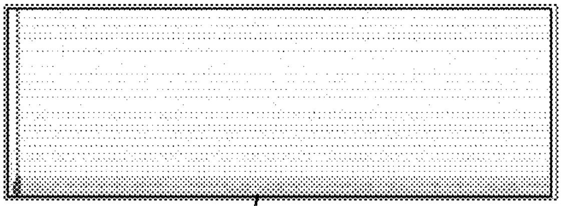

FIG. 67A through FIG. 67D then examples the result of changing constraints in FIG. 66B. FIG. 67A shows the 'Supplier' constraint (filter) settings of 'Janssen' 6722 and FIG. 67B shows the complete listing of its results, which includes 62 columns and 539 rows. FIG. 67C shows the result of the user changing the 'Supplier' value 'Janssen' 6722 to 'Merck' 6762 which Auto Flexes the row headings 6742 vs. 6772, column headings 6762 vs. 6765 and the calculation cells content 6745 vs. 6775. FIG. 67D then shows the overall difference in content 6768, which includes 78 columns and 603 rows, for Supplier 'Merck' 6762 vs. FIG. 67B 6738 which show less results for Supplier 'Janssen' 6722. While that comparison shows the spreadsheet as an extremely small zoom it gives you a perspective of the magnitude of change here from that one constraint change.

FIG. 68A through FIG. 68E examples our multiple row or column headings Auto Flexing drill down or drill up capability by simply clicking on an arrow box icon. As we will example in FIG. 69A through FIG. 69D, the headings work with corresponding drill down or drill up calculation cells giving users a very powerful way to set up analytics of formulaic data and formulaic variable calculations including formulas and functions.

Figures 68A, 68B, 68C, 68D, 68E:
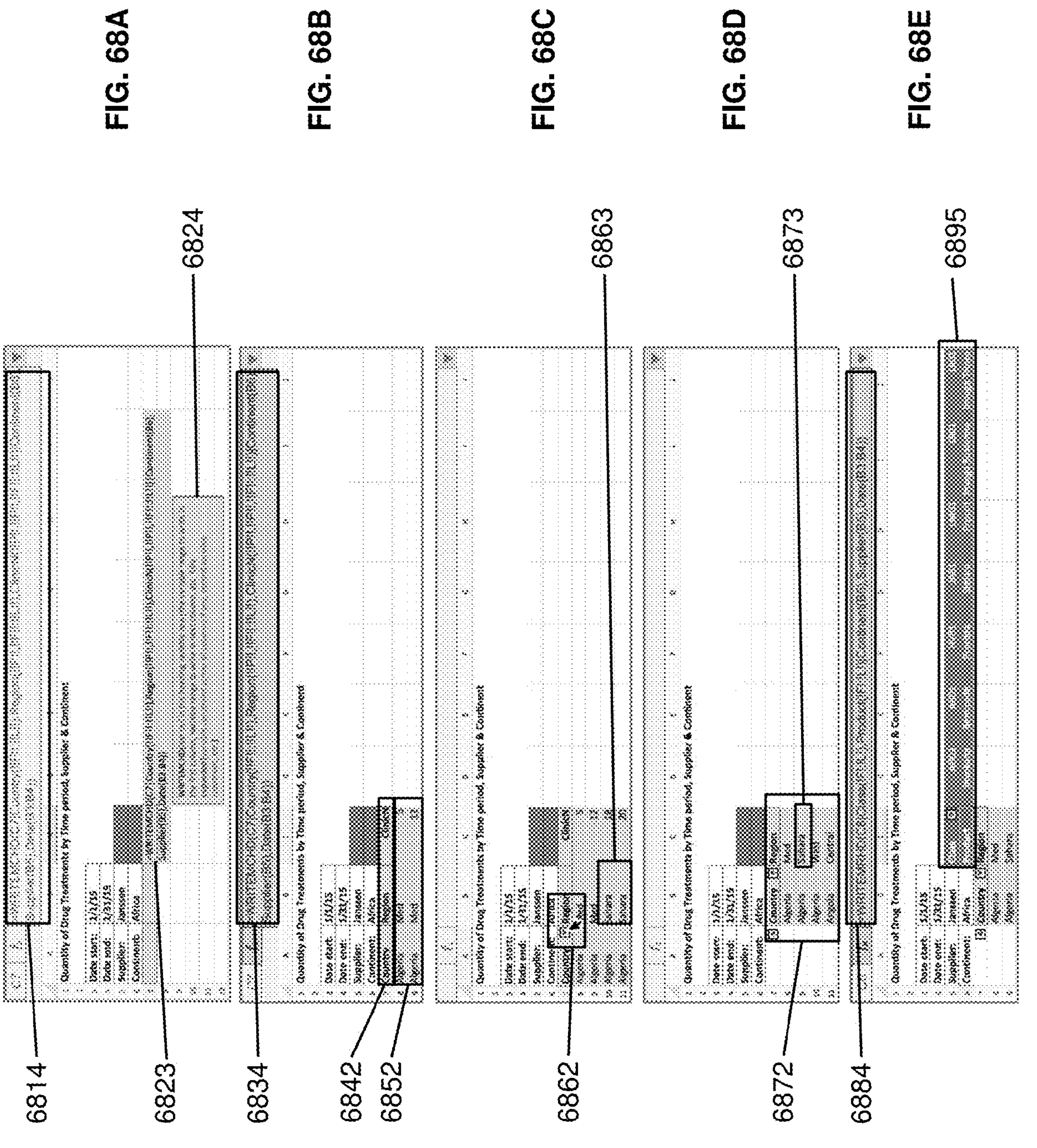
FIG. 68A FIG. 68B, FIG. 68C, FIG. 68D and FIG. 68E example multiple row or column headings that do Auto Flexing drill downs with keyed and non-keyed formulaic variables.

FIG. 68A show a user starting to set up a three-column row heading which has variable headings and our Auto Flexing drill down. In this embodiment of our technology the user starts to write a 'WRITEMCHD' (WRITE Multiple Column Header Drill) command in cell C7 6823 triggering a help pop-up 6824. That help pop-up tells them to first identify the last cell in the heading row, shown in formula 6814, to be 'C7'. What the user will get in the cell is the last variable name for the variable included in the WRITE. In this example, 'ClinicN' shows as the last value in 6842 shown in FIG. 68B. The other two values shown, are the preceding formulaic variable names written by the WRITE statement 6834. These three values variable headings given by using the 'H' variant of the 'WRITEMCHD' command. The 'D' part of the 'WRITEMCHD' command gives the down icon shown in the 6862 in FIG. 68C and the Auto Flexing Drill (down or up) capability that occurs when the arrow icon is clicked as is being initiated in 6862. Once that is completed it results in what is shown in 6872 in FIG. 68D where the three heading variables 6842 and the row heading content below them 6852 changes to two headings and two columns of content Auto Flexing as shown in 6872. In the process any duplicate rows, once the lower level is removed, are collapsed as shown by the comparison of the two 'Sahara' rows in 6863 turning into one in 6873. You will also see that one column of the row headings is collapsed a second icon pops up by the variable heading in 6872 so that the user has options to re-expand them back out.

FIG. 68E examples adding a similar set of row column headings 6895 using the 'WRITEMRHD' formula in 6884. At this point the user has both row and column headings which can Auto Flex drill down and drill up, and just needs to add the data or calculation cell content they want to drill into.

Figure 69A:
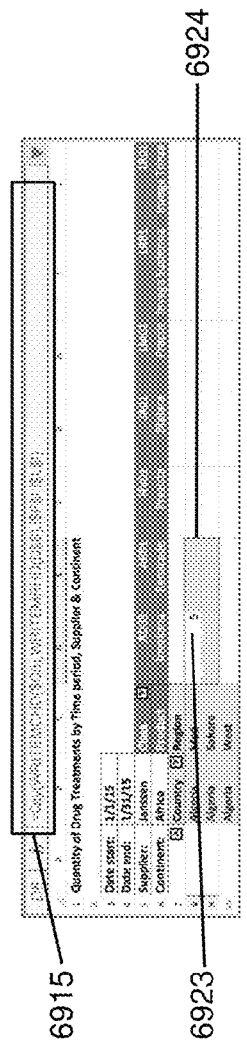
FIG. 69A FIG. 69B, FIG. 69C and FIG. 69D example creating, copying and then using the calculation cells with Auto Flexing drill downs or drill ups.
Figure 69B:
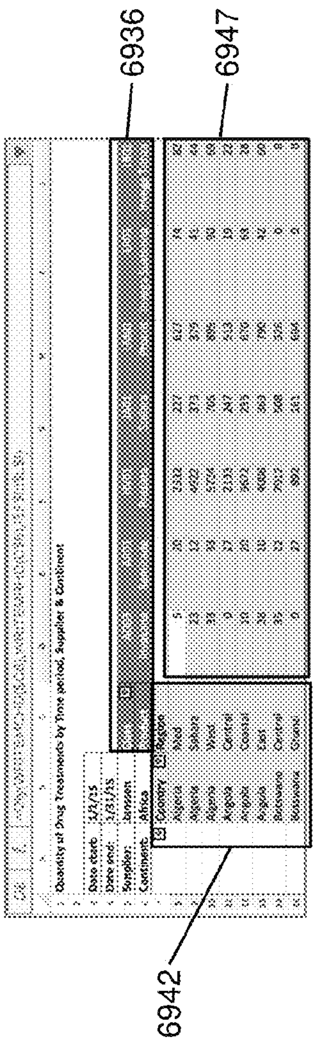

FIG. 69A through FIG. 69D examples creating, copying and then using the calculation cells with the Auto Flex Drill down headings. In FIG. 69A the user writes the formula 6915 for cell D8 6923 doing the 'Qty' implicit summation. This time they use the 'Qty' formulaic variable multiple WRITE version, similar to the one exampled in FIG. 65A It uses 'WRITEMCHD' and 'WRITEMRHD' so that the calculation cell will work with the Auto Flexing Drill down headings. They also use the '$'s so that they can copy and paste the cell to give the results shown in FIG. 69B 6947. At that point the user has headings (6936 and 6942) and calculation cell content (6947) that they can drill down into and drill up with.

Figure 69C:
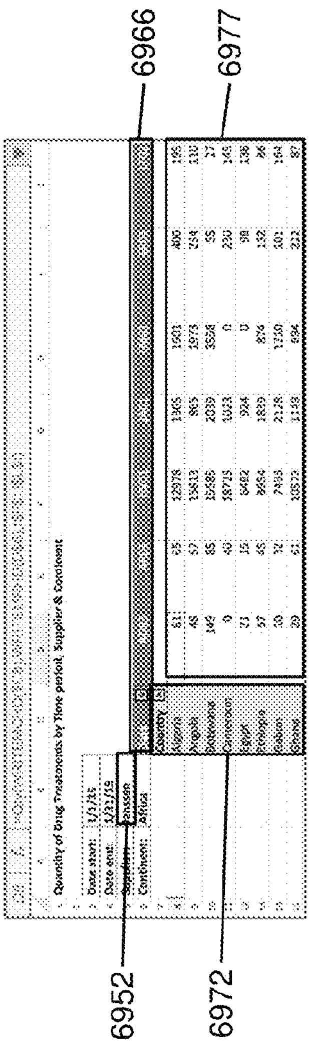
Figure 69D:
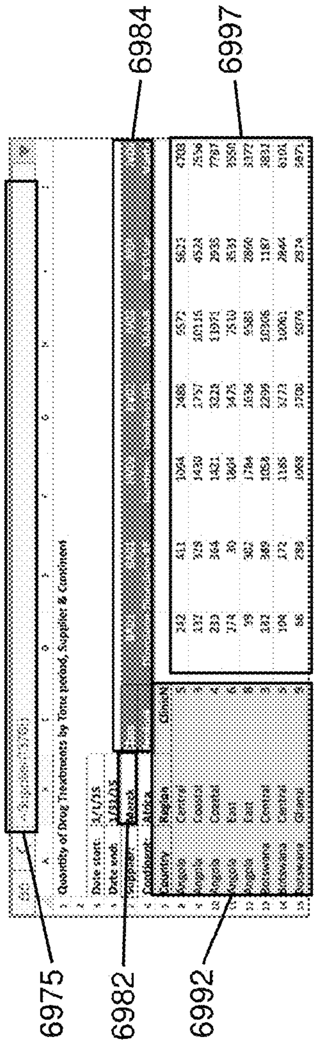

FIG. 69C shows the user having collapsed the row and column headings to one level each (6966 and 6972) and see an Auto Flex impact on the calculation cells 6977. FIG. 69D shows the user having switched the Supplier constraint (filter) from 'Janssen' 6952 to 'Merck' 6982 and expanded out both of the headings (6984 and 6992) with the resulting impact on the calculation cell content (6997). At this point with three formulaic commands, one for the row headings, one for the column headings, and one for the calculation cells, the user has created a very powerful and easily changeable analytic capability for their external data and the formulas and functions of their choice.

Figure 70A:
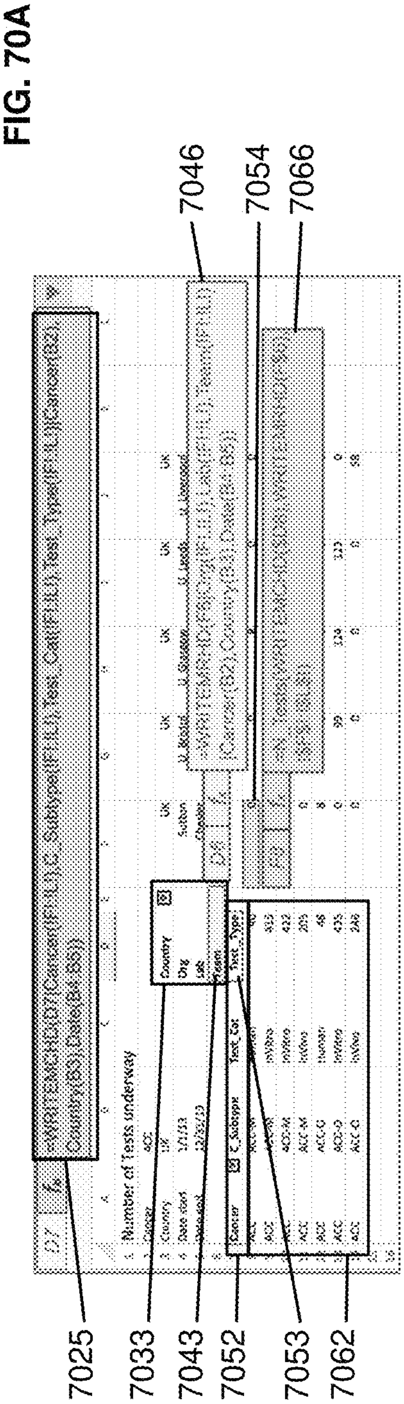
FIG. 70A and FIG. 70B example different Auto Flexing drill down heading and calculation cell formulas and drill down results.
Figure 70B:
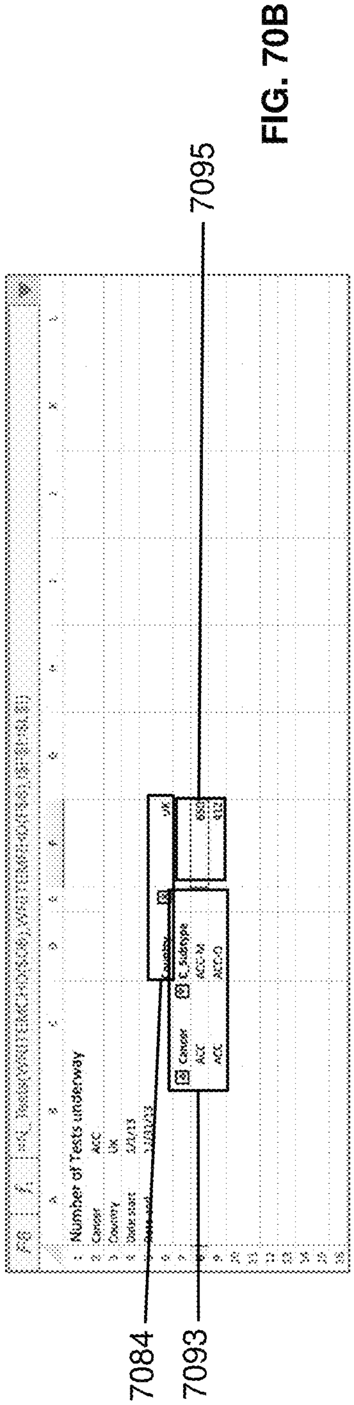

FIG. 70A and FIG. 70B examples the heading drill down and drill up Auto Flexing cells and headings being applied to our Cancer researcher's good sized non-keyed discrete data set summarized in FIG. 30. FIG. 70A shows a worksheet that the user created using the 'WRITEMCHD' command 7025 for cell D7 7053, the 'WRITEMRHD' 7046 for cell D6 7043. They then used both of those WRITE commands in the calculation cell 7054 that was special paste replicated to the other calculation cells. The user then does a drill down collapsing both the row 7052 and column 7033 headings in FIG. 70A to produce the much smaller set in FIG. 70B. You can see that the 28 row heading values in 7062 collapse down to the four values shown in 7093. And the set of column headings, some obscured by the formulas, in FIG. 70A collapse down to a single 'Country' value 'UK' in 7084. The numerous calculation cells, some obscured by the formulas, in FIG. 70A thereby collapse down to two values '650' and '412' 7095 in FIG. 70B.

Figure 71A:
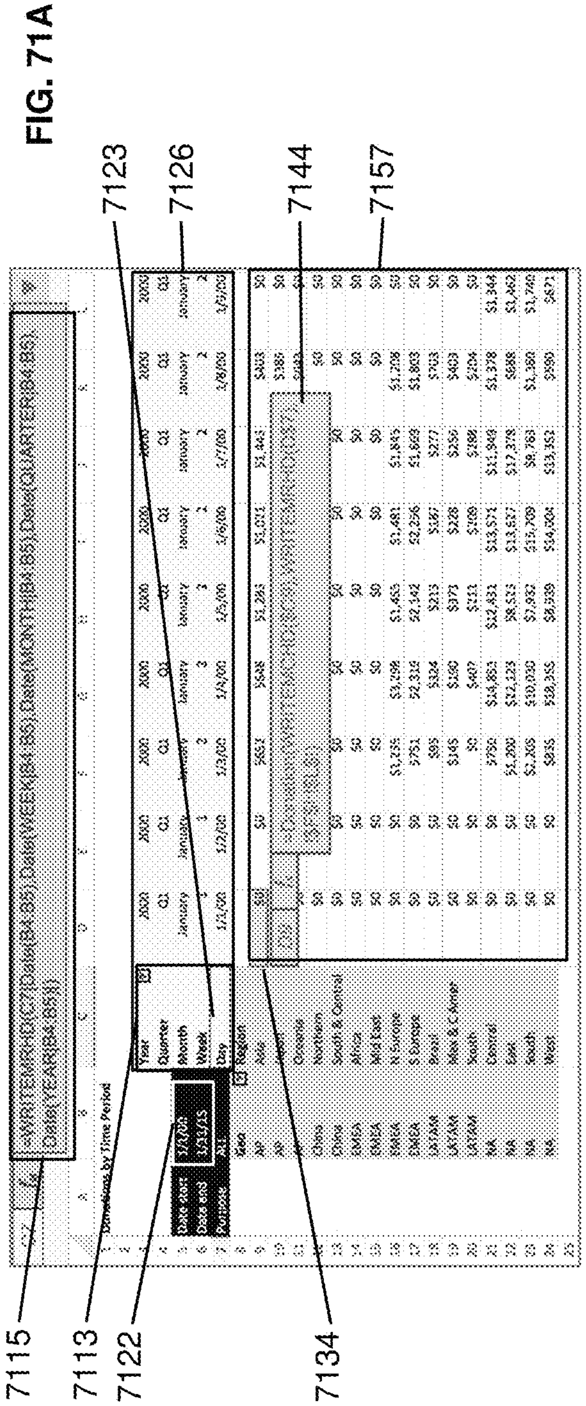
FIG. 71A and FIG. 71B example a specialized capability of drill down and drill up technology for dates/times.
Figure 71B:
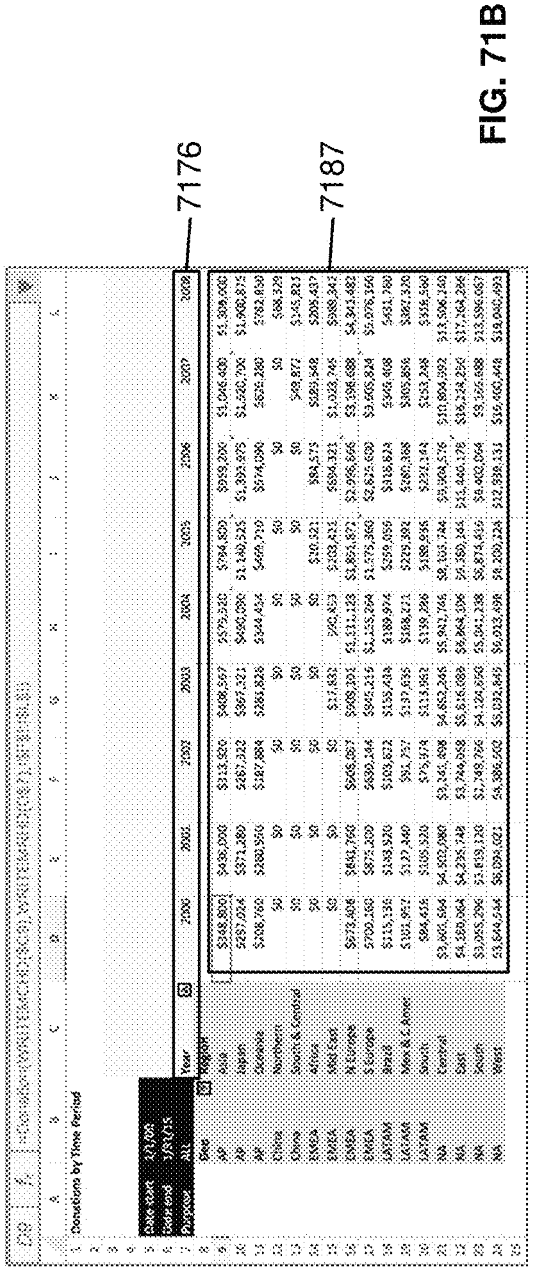

FIG. 71A and FIG. 71B examples a specialized capability of our drill down and drill up technology for dates. We have a series of time functions that allow a user to drill down on the time dimension with data or complex calculations. In FIG. 71A the user has used four of those time commands in conjunction with the 'Date' data to construct the 'WRITEMRHD' heading formula 7115 for cell C7 7123. It gives the column heading 7126 which can be drilled down on the time dimension of 'Year, Quarter, Month, Week and Day' 7113. For example, the 'WEEK' command determines the week value for the 'Date' value within its parentheses. In this example, it is doing that for the entire date range constraint (filter) specified in cells B4 and B5 7122 as shown in 7126. The user then wrote the calculation cell D9 7134 formula 7144 using the 'WRITEMCHD' and 'WRITEMRHD' commands and copy and pasted that formula to the cells in 7157 using our Row and Column End copy and paste previously described in FIG. 33A and FIG.

33B. Then the user could drill down to the date level they are interested as shown between FIG. 71A and FIG. 71B where the user has gone from the 'Year' through 'Day' level in 7126 to just the 'Year' level in 7176. With the corresponding change to the calculation cells 7157 to 7187. Where 7157 shows values for an individual day and 7187 shows values for an entire year.

The disclosed technology can be utilized set up pop-up or other graphical selection modes for the constraints (filters) that control the content of the keyed or non-keyed non-discrete data headings and calculation cells, similar to UI elements shown in FIG. 41A through FIG. 44B or other graphical control mechanisms.

We have therefore made it very easy for creators of spreadsheets or users of other's spreadsheets to do data and calculation drill-downs, Auto Flex, filters and other manipulations in their spreadsheet cells with external data for very complicated calculation cells previously exampled and described using the broad range of spreadsheet functions. Our technology has made it easy for users to harness complex external data sets made up of one or many tables of data and using our NSC formulaic variables and commands easily manipulate the data in ways very similar to how they now use data stored in their spreadsheets today. That external data can be all kinds of keyed and non-keyed alpha, numeric, date/time and combinations therein.

The formulaic variable technology disclosed can be applied to internal data sources, as readily as to external databases. The data needs to have a table-like organization, i.e. as one or more lists of tuples (records, rows), each consisting of a predetermined set of attributes (columns). Each attribute must have a name. Physical representation of internal data can be an in-memory database built into the spreadsheet application, data file in any format that can be converted to one or many lists of tuples, a spreadsheet, one or more worksheets within a spreadsheet, one or more special data tabs within a spreadsheet, or even one or more rectangular areas within a worksheet, marked as an internal data source. In a worksheet or a worksheet area, records can be laid out vertically (columns represent attributes, rows represent tuples) or horizontally (rows represent attributes, columns represent tuples) to the same effect.

While internal data may be imported from an external data source, it is held within the spreadsheet application and therefore not external, to avoid inconsistency with use of "external data" in spreadsheet documentation.

In one embodiment, the formulaic variables use the column heading field names (attributes) as the formulaic variables. The tuple or row value selected by the formulaic variable is then specified by the formulaic variable direct references, e.g., directly specified value like "Americas" specified for the formulaic variable Geo("Americas", Region(!F!), indirect cell references, e.g., B5 in Geo(B5, Region(!F!)) where the formulaic variable uses the Geo value in cell B5, and/or indirect index references, e.g., !F! in Geo(!F!, Region(!F!)) where both Geo and Region use respectively their FIRST Unique values. In another embodiment the columns and rows could be transposed so that the formulaic variable uses the first row of the data heading field names (attributes) as the formulaic variable name and the tuple or column value is then specified by the formulaic variable direct or indirect references.

Formulaic variables can be made up of variables from internal data, from external data and from a combination of internal and external data. All of the formulaic variable capabilities previously described for external data also work for internal data and the internal and external data combinations. To further show this we will now example how users employ our formulaic variables to join multiple keyed and/or non-keyed external data sets. In the examples we refer to both across-cell joins and in-cell joins using formulaic variables. They differ in the extent to which intermediate combinations of data are visible. In the examples of across-cell joins, key values from multiple external tables are displayed and a computed variable appears with the key values. The computed value can result from a look-up, using the keys, a look-up followed by a computation, or by some computation or aggregation. Across-cell means that values from multiple external tables are apparent in spreadsheet cells and not only in spreadsheet formulas. In the examples of in-cell joins, values from multiple external tables are used in a formula to produce a calculated value, without necessarily showing key values from either of the tables. A formulaic variable can, and often will, include both across-cell aspects that label data sources and in-cell aspects that aggregate more data than is visible.

Figure 72A:
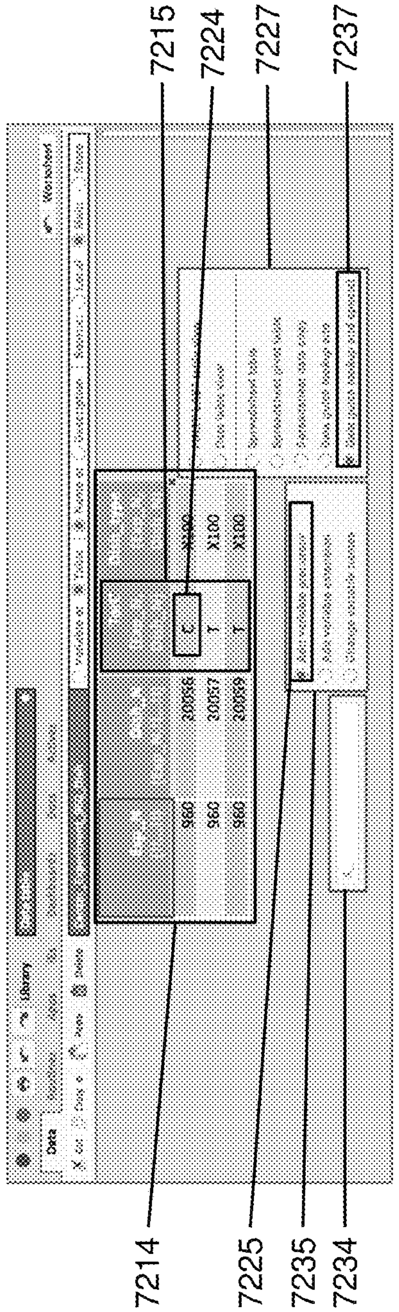
FIG. 72A FIG. 72B and FIG. 72C example Across-cell joining data from two different external (e.g., cloud) data tables using keyed data.

We again will start with an illustratively small external dataset so we can easily illustrate how our technology works for joining data from external tables. We are going to join data to the small data set in FIG. 50 previously used by the Cancer researcher doing calculations using data for 'Exp_N' 5021 '960'. The user wants to label the different 'Dish_Ns 5031 with whether they are test or control dishes. To do that the user needs to join the data from the external table in FIG. 51 with data from another external data table shown in FIG. 72A In this embodiment, to do that the user highlights the data 7214 they are interested in from the 'Data table' view in FIG. 72A and then opens the pop-up box 7227. In that pop-up, they then click on the 'Data quick lookup add special' option 7237. That option opens an additional pop-up box 7235 where the user clicks on the 'Add variable precursor' option 7225 which opens the final pop-up 7234. In that pop-up the user adds a short precursor 'X' which the user wants to add to each data variable name highlighted 7214. The reason they are doing this is because they already are using the variable names 'Exp_N' 5021 and 'Dish_N' 5031 in their NSC formulaic variables so they want a slightly different variant that they can then use to join the data they desire-thus adding the 'X_'.

Figure 72B:
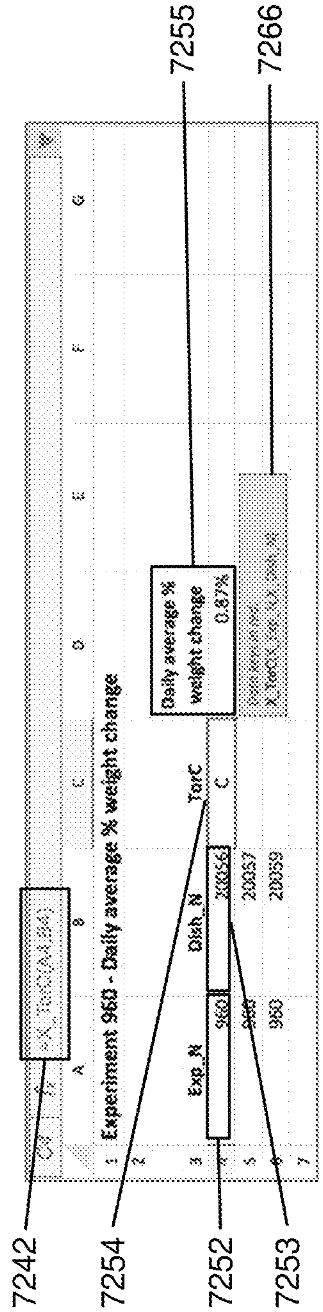

The user then goes to a worksheet in FIG. 72B where they have already done a set of three calculations (two of which are obscured by the pop up 7266 but visible in FIG. 72C) labelled 'Daily average % weight change' in column D 7255. The user prepared column C for the join of the Test vs. Control data 'TorC' 7215. In cell C4 7254 the user then across-cells joins the data from the two external tables by simply filling in the key values from the formulaic variables sourced from the tables shown in FIG. 50 and FIG. 51 via cells A4 7252 and B4 7253 into the formulaic variable sourced from FIG. 72A When the user starts to write the formulaic variable for 'X_TorC' in cell C4 7254 they get the pop-up 7266 showing them that 'X-TorC' is a keyed discrete formulaic variable with 'X_Exp_N and 'X_Dish_N' as the two keys. Those are the two variables equivalents sitting in cells A4 7252 and B4 7253 (having previously been populated by formulaic variables retrieving data for the external data set shown in FIG. 50), so they fill them in the formula '=X_TorC (A4,B5)' 7242 and when they hit return they get the value 'C' in cell C4 7254 from the external data 7214. They then get the 'X_TorC' (shown as TorC in 7214) value with an 'X_Exp_N' (shown as Exp_N in 7214) value of '960' and the 'X_Dish_N' (shown as Dish_N in 7214) value of '20056' which is 'C' 7224. With this one very simple formula they have successfully across-cells joined the data across the two external databases with no need to learn and use a database language like SQL or use complicated imports into their spreadsheet and then data manipulation once they have the data imported to a cell. They can also then simply copy and paste that cell C4 7254 to get the additional values they want 7284, making it incredibly easy to scale joining large and dramatically more complicated keyed data sets.

Figure 73A:
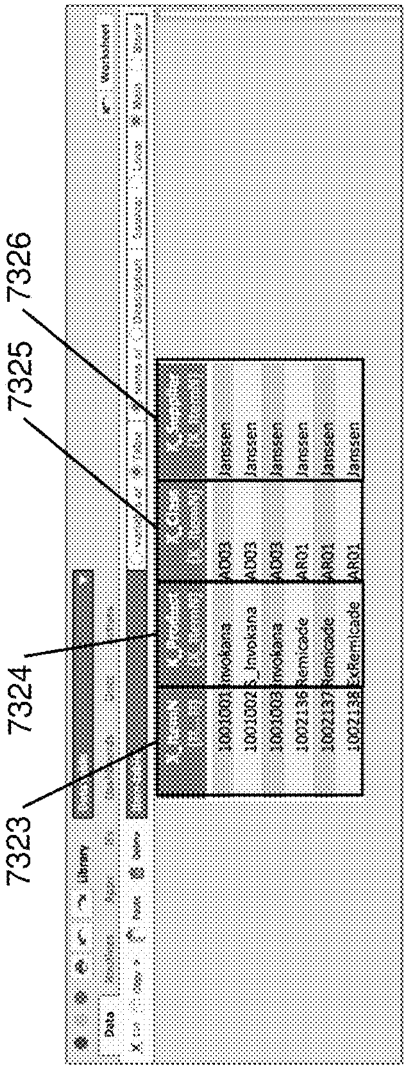
FIG. 73A and FIG. 73B show two related NSC keyed cloud data sets.
Figure 73B:
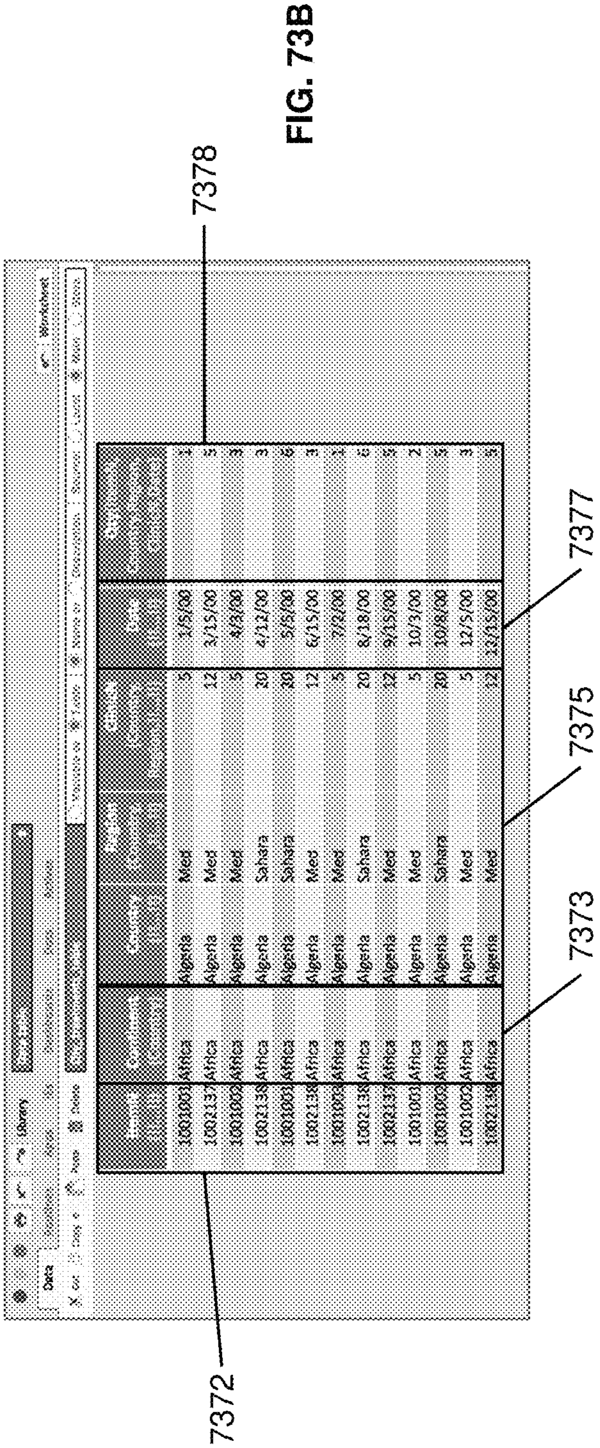

FIG. 73A and FIG. 73B revisits the data of one of our earlier examples, the data in FIG. 62, except in an example where the data is held in two different tables. In this disclosure, external data join means using data from two different tables that are external to a spreadsheet that is using the data. Using data from the two different tables sometimes produces cells and rows in a spreadsheet. Formulas also can aggregate data using the two different tables or otherwise perform calculations involving both tables and potentially multiple values in one or both external tables, producing calculated variables. For this new example, we are going to again use an illustratively small amount of the data so we can more easily show what is going on. FIG. 73A shows the external data table called the Item table because it holds information on each 'ItemN' giving the 'X_Product' 7324, 'X_Class' 7325 and the 'X-Supplier' 7326 values for each of the six 'X_ItemN' values 7323. The other table holds the 'Qty' of treatments data 7378, its 'Date' key 7377, its 'Country', 'Region' and 'ClinicN' keys 7375, and its 'ItemN' key 7372. It also includes the Continent data 7373. We are going to show this example because it examples the ability of our technology to make more complicated compound keyed non-discrete and discrete external data joins but more importantly shows that these table joins can go directly into simple or complicated calculation cells using implicit or explicit spreadsheet mathematical and function capabilities. It also shows that these cells can then be easily replicated via copy and paste.

Figure 74A:
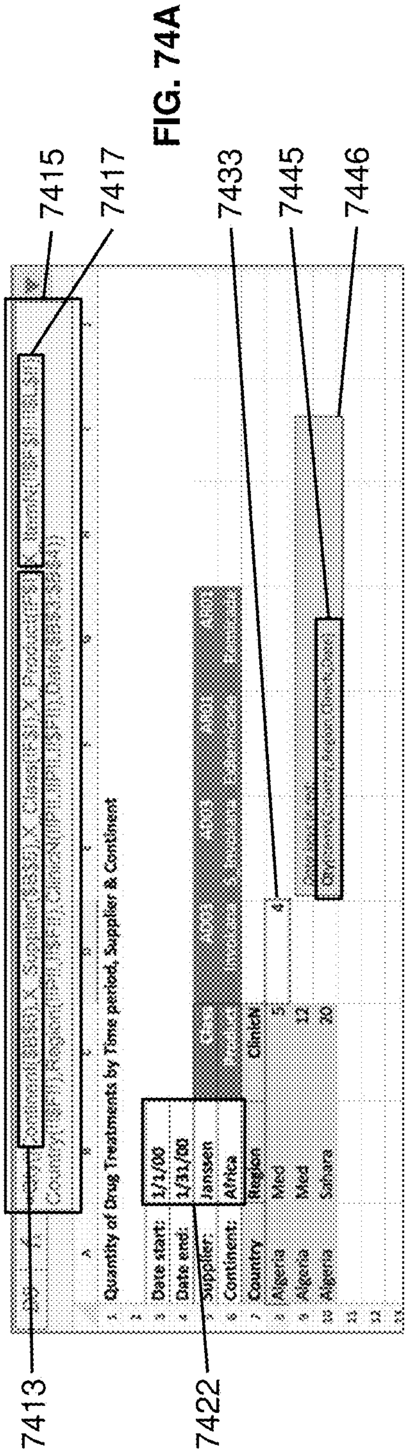
FIG. 74A FIG. 74B and FIG. 74C example a user creating and then copying a calculation cell in which NSC formulaic variables join data from two different keyed cloud data tables using both Across-cell and In-cell join capabilities.
Figure 75:
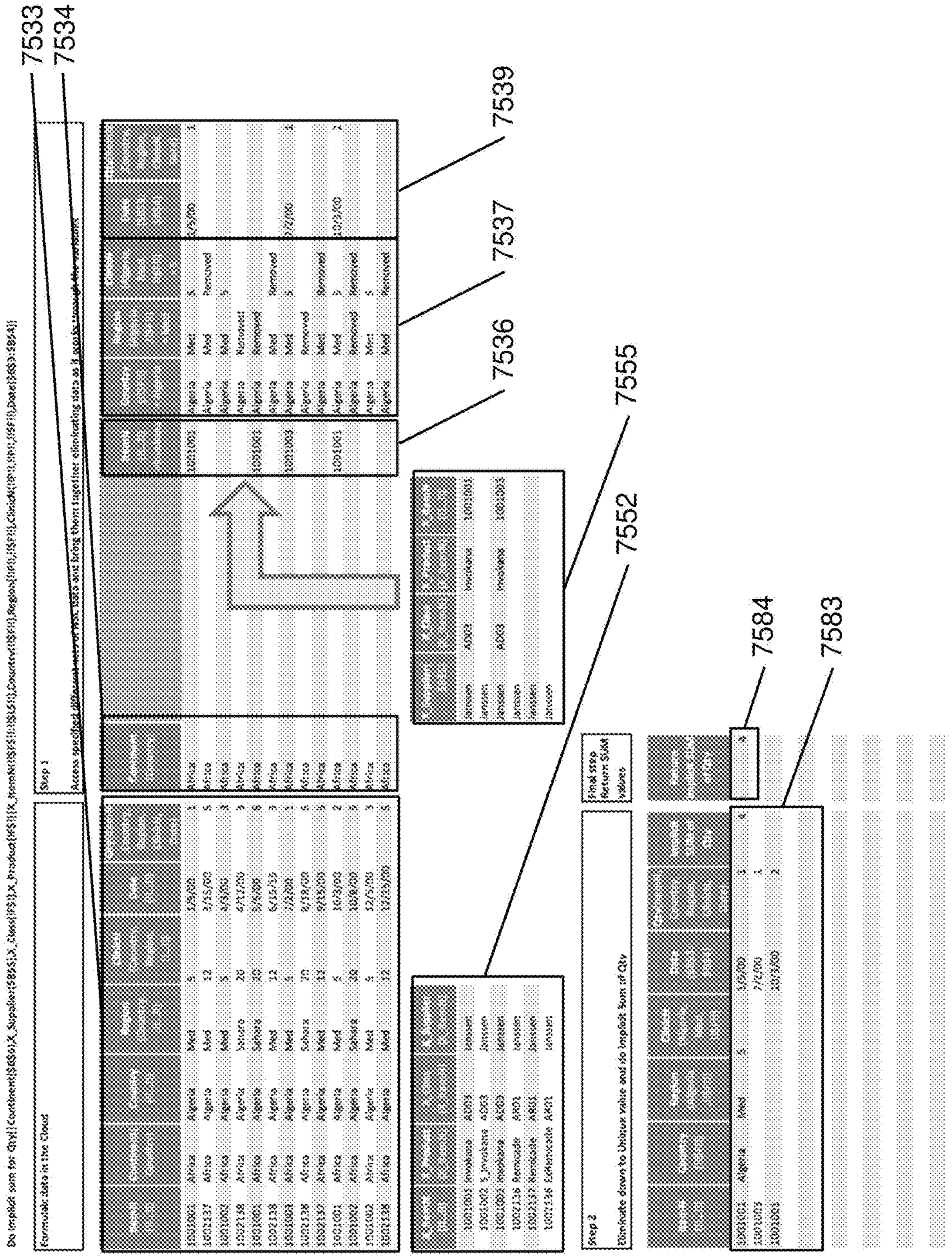
FIG. 75 illustrates the mechanics of the data joins and calculation for the calculation cell created in FIG. 74A.

FIG. 74A shows the user setting the quantity ('Qty') of drug treatments for a specific 'Class' and 'Product' for a specific 'Country', 'Region' and 'ClinicN'. They are writing that calculation in our manner we have previously discussed where they are not using the row and column headings, although they could have easily done that. They are going to do the calculation and the two cloud table data join all in the calculation formula (in-cell join). In cell D8 7433 the user wrote the formula 7415 for the formulaic variable 'Qty' triggering the pop-up box 7446 giving the formulaic set-up of 'Qty'. From that pop-up box the user can see that 'Qty' is a discrete compound keyed formulaic variable requiring the input of five key values, 'ItemN', 'Country', 'Region', ClinicN' and 'Date' 7445. Since the user knows they have constraint and row heading values not included in those keys, they are going to add those additional values as a formulaic constraint 7413 between the two bars '| |' as exampled in FIG. 64A The difference this time is that this formula is using variables sourced from two different cloud tables. The variables in formula 7415 starting with the 'X' come from the cloud dataset in FIG. 73A while the others come from the cloud dataset in FIG. 73B. The constraint values in 7413 determine the 'X_ItemN (!!F!!:!!L!!)' 7417 values used in 'Qty' because they limit the values of 'X_ItemN' which are then used in the 'ItemN' key of 'Qty'. FIG. 75 illustrates how the mechanics of that works for the value in D8 7433.

Figure 74B:
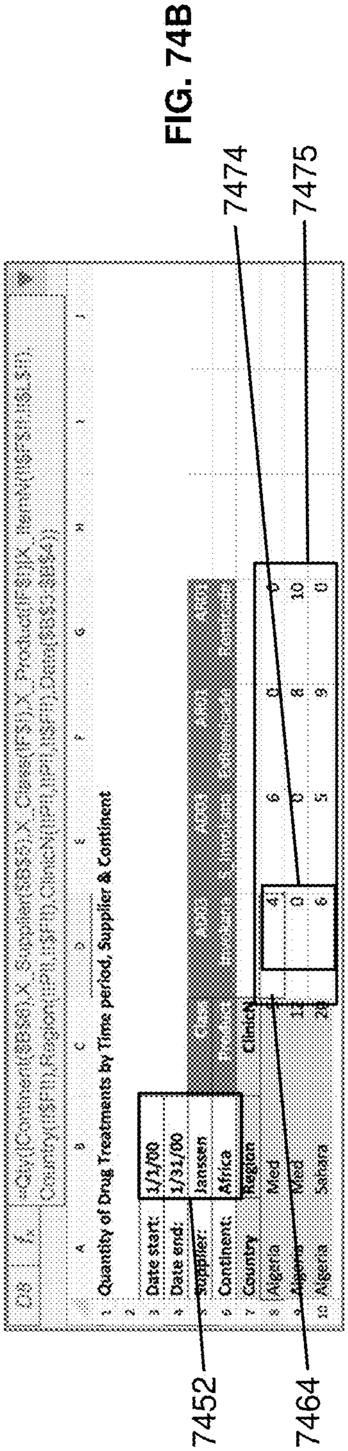
Figure 76:
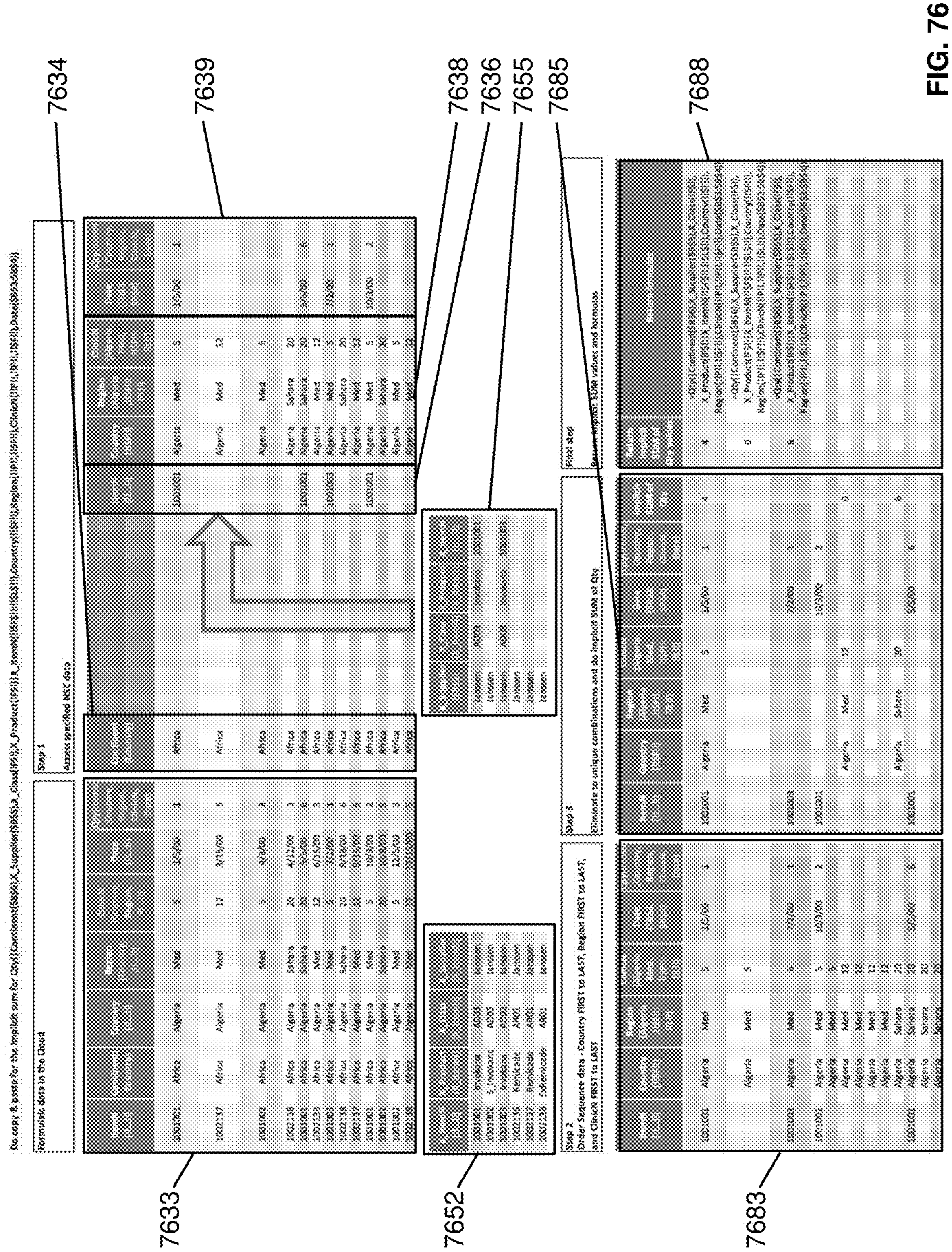
FIG. 76 illustrates the mechanics of the copy and paste of the calculation cell including the joining of two external (e.g., cloud) data tables and constraint (filter) based Auto Flexing shown in FIG. 74B.

FIG. 74B then shows the result of the user having copied and pasted cell D8 7464 to the cells in 7475. Because the calculation cells have constraints (filter) 7452 and the user desires them to change when those constraint values are changed, the user employees our Replicate Special Data end copy and paste capability. FIG. 76 illustrates the mechanics of how that works joining across the two Non-Spreadsheet Cell (NSC) data sets to create the values in the first column 7474 of the copy and paste.

Figure 74C:
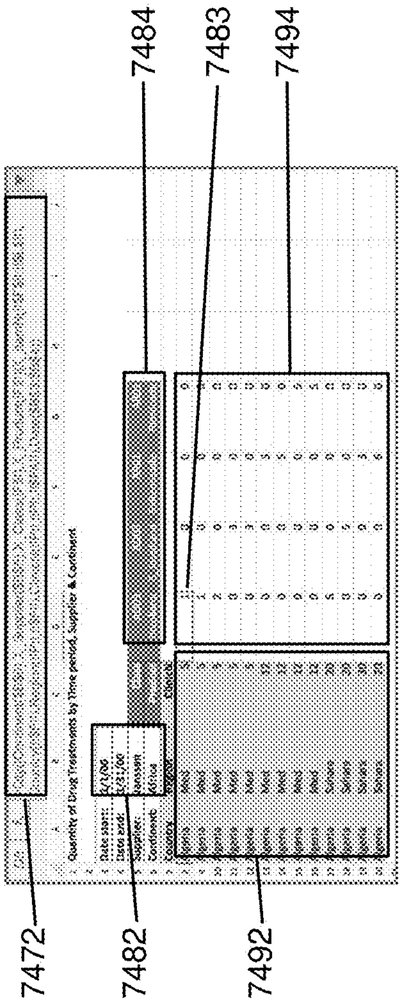

FIG. 74C shows the result the user would have gotten had they elected to use our ALL command '!!FA!!' in creating the formula 7472 for cell D8 7483. When that cell is copied and pasted to the cells in 7494 it shows a complete set of all the 'Qty' values rather than doing the Unique implicit summation. It still responds to the constraints (filters) in 7482 just as it did in FIG. 74B. In this example, the row heading values in 7492 have also been generated using the ALL command for the variable 'ClinicN' and therefore match the granularity of the calculation cells 7494. Both the keyed (e.g., '!!FA!!') and non-keyed (e.g., '!FA!') work for the various multiple table cloud joining capabilities we are exampling here.

FIG. 75 illustrates the mechanics of the calculation of the value '4' in cell D8 7433 in FIG. 74A It starts with the two different external (e.g., cloud) data sets, 7552 and 7533. As the order of the variables matters in step one our system starts by bringing in the 'Continent' constraint value 'Africa', which happens to be all of the values 7534. Then it works on the 'X_' variables in FIG. 73A using the Supplier constraint value in '$B$5' which is 'Janssen' in 'X_Supplier', the FIRST value of 'X_Class'—'AD03' and the FIRST value of 'X_Product'—'Invokana' shown in 7555. That then specifies the full set of 'X_ItemN' values in 7555 which are then used in 'ItemN' key 7536. Because the 'Country', 'Region' and 'ClinicN' formulaic variables employed the other form of the '$' they are not limited by the Item values and so they then use our Order Sequencing to determine the first value of each of the variables and remove all the other values as shown in 7537. The remaining values are then subjected to the date constraint from '$B$3:$B$4' values in 7415. Any dates outside of that range would be removed in 7539, which in this example are none removed. The joined data is now ready for Step two 7583 where the implicit summation is done for the value of 'Qty'. In the final step 7584, the 'Qty' value of '4' is sent to cell D8 7433. This has allowed the user to do a two-table cloud join and a calculation all in one formula that is now ready for replication that will correctly set it up for Auto Flexing of it and the heading rows and columns it is working with.

FIG. 76 then illustrates the mechanics of our system for copying the cell created in FIG. 75 and pasting it to itself and the two other cells in 7474. The process starts with accessing the data from the two external (e.g., cloud databases), 7633 and 7652. Then as shown in FIG. 76 our technology works in the order of the variables starting with the specified value of 'Continent' which is 'Africa' 7634. The system then works on the values of 'X_Supplier', 'X_Class' and 'X_Product' to arrive at the set of 'X-ItemN' values as shown in 7655. Those 'X_ItemN' values are then used in the 'ItemN' key 7636. As we discussed in FIG. 75 the system then works on the values of 'Country', 'Region' and 'ClinicN' 7638 but in this copy and paste keeps all the values for use in the next step. It also keeps all the values for 'Date' and 'Qty' in completing Step one in 7639.

In step two 7683 our technology then does an Ordered Sequence FIRST to LAST, FIRST to LAST, and FIRST to LAST sequencing of the all the values based on 'Country', 'Region' and 'ClinicN'. In step three 7685 our technology eliminates down to the unique combinations of 'Country', 'Region' and 'ClinicN' (as the other variables remaining were not set to change during a copy down) and then does the implicit summations of 'Qty'. In the final step 7688 those 'Qty' values are returned with their accompanying formulas. So, the user has now completed replication of a calculation cell to a column of cells that joined data from two external (e.g., cloud) data tables into cells that do constraint (filter) based Auto Flexing.

Having exampled a range of different types of our multiple database keyed data spreadsheet joins, we will now example different ways to spreadsheet command multiple non-keyed discrete (multiple value) NSC data set joins. We will again start with two illustratively small cloud datasets so we can show the basic mechanics of our technology. We have a user working on a small set of data from a global charity that gets and records its online donations and its mail-in/in-person donations in two different databases. The user wants to put those two sets of data together to have a single view of their donations.

Figure 77A:
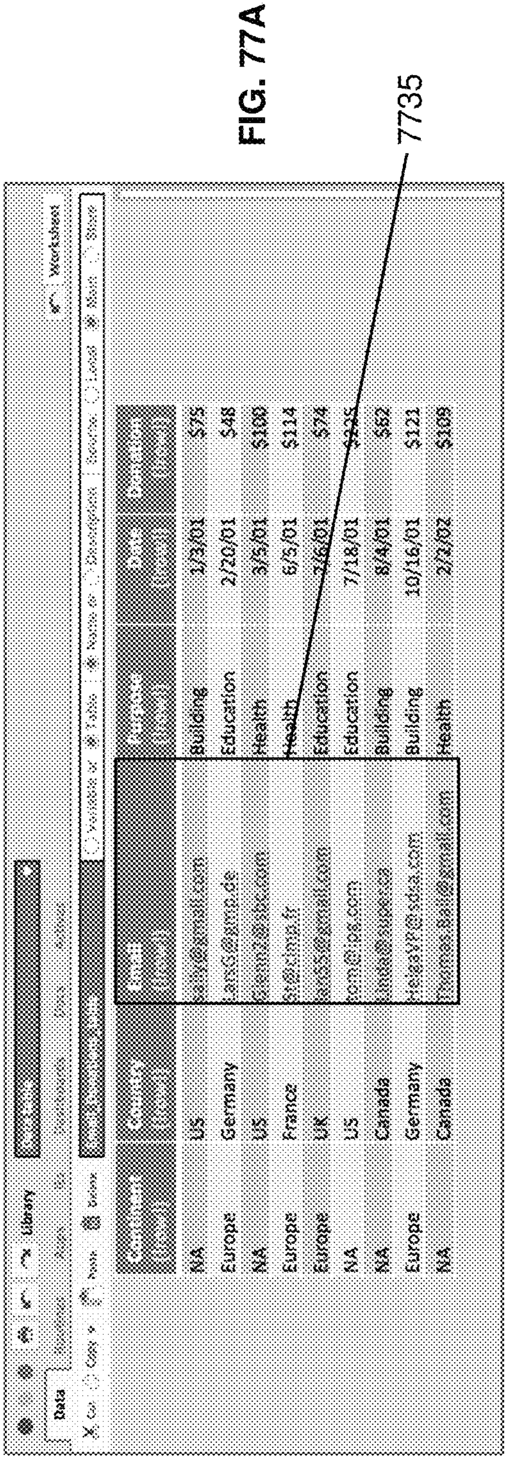
FIG. 77A and FIG. 77B show two very small non-keyed NSC data sets used to example data join capabilities.
Figure 77B:
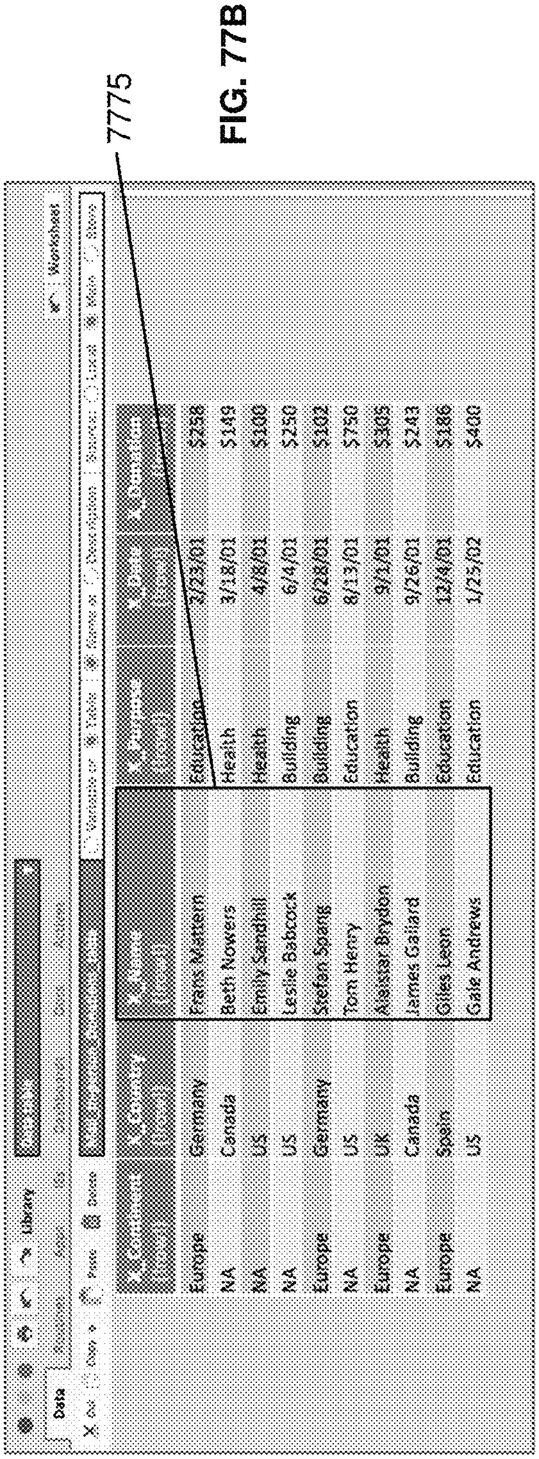

FIG. 77A and FIG. 77B show two very small non-keyed non-discrete NSC data sets (e.g., in the Cloud). FIG. 77A contains the online donations and FIG. 77B contains the mail-in/in-person donations. The good news is other than the 'Email' 7735 and the 'X_Name' 7775 columns, the rest of the two databases share the same definitions of the data (one with 'X' prefixes).

Figure 78A:
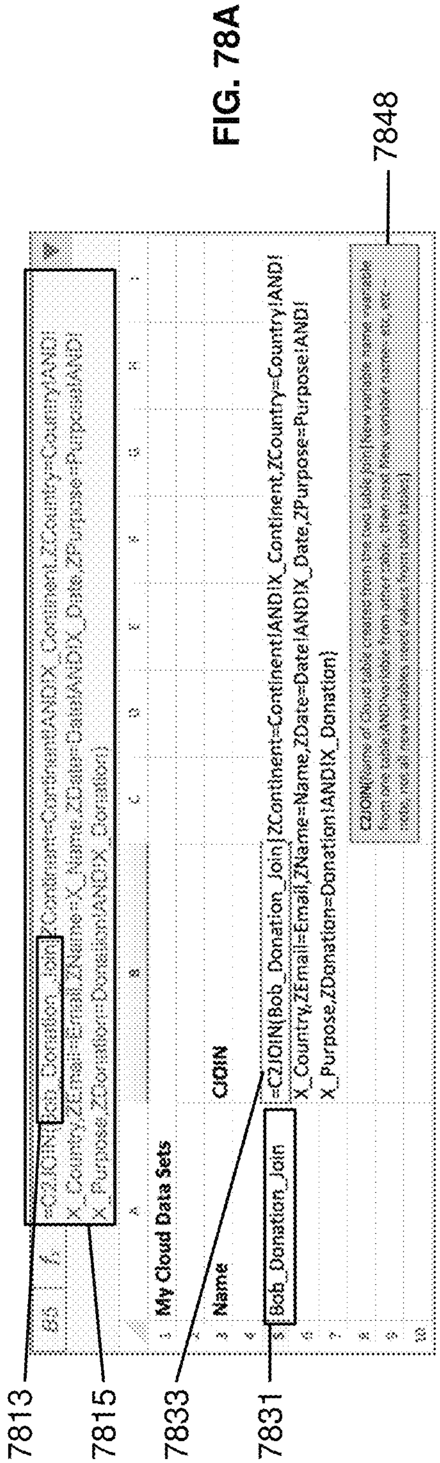
FIG. 78A and FIG. 78B example the use of the disclosed technology to join data to create a new external (e.g., cloud) data table spreadsheet accessible by the creator and others.
Figure 78B:
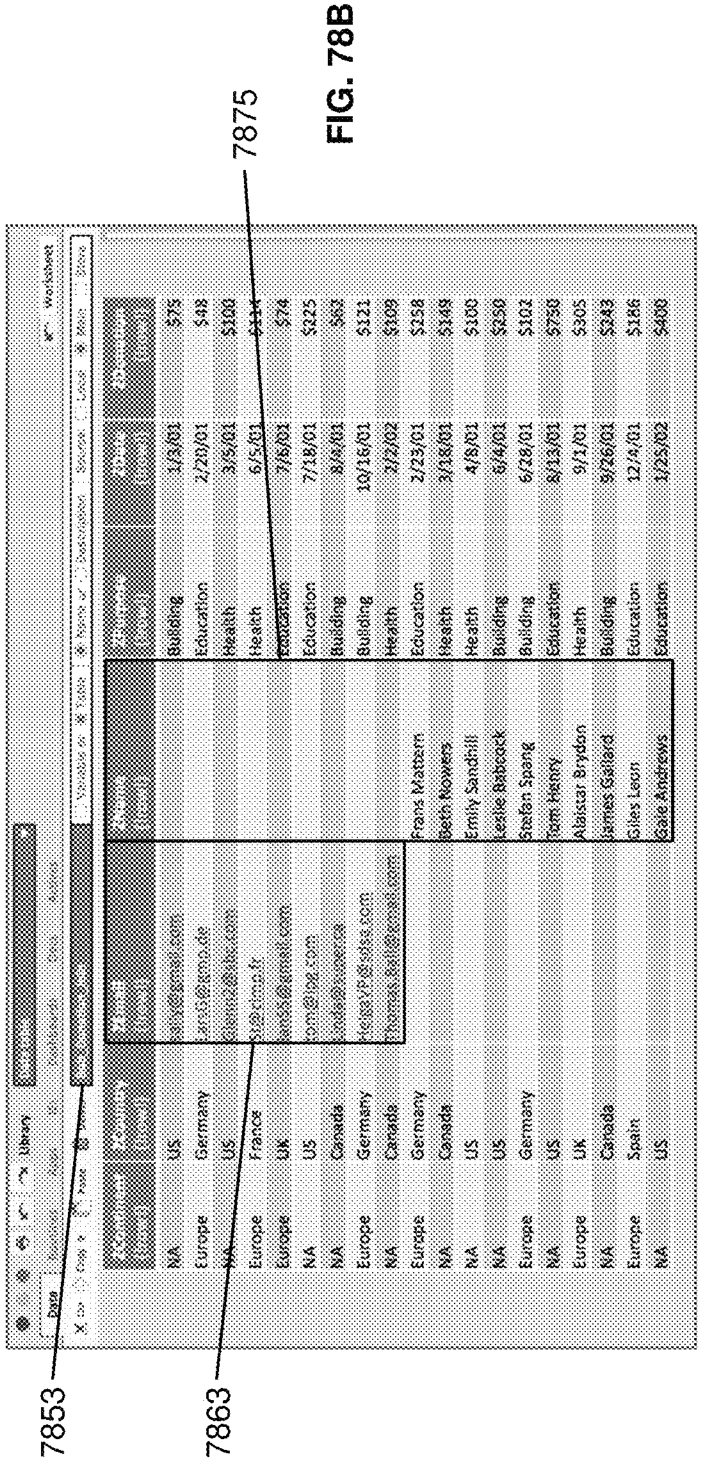

FIG. 78A examples one very easy way for the user to join the two data sets which works on non-keyed or keyed data. It is to create a new table external to the spreadsheet (e.g., in the cloud) which holds their specified joined data with the data labels of their choice. In this example, the user has started their own spreadsheet page that will hold all the different external (e.g., cloud) data sets joins they create. They have decided to call this one 'Bob_Donation_Join 7831 (which is then how it will show up in the external data library 7853) and written the formula for the join in cell B5 7833. Once they start to write the 'C2JOIN' function they get the pop-up 7848 that explains its syntax. It tells them first they type the name of the cloud table (that will then show up in their data library) before the bar 'I' after which they should type each variable they want to insert into the data table and where it gets its values from. The user then inputted the formula 7815:

'=C2JOIN(Bob_Donation_Join|ZContinent-Continent!AND!X_Continent, ZCountry=Country!AND!X_Country,ZEmail=Email, ZName=X_Name,ZDate=Date!AND!X_Date, ZPurpose=Purpose!AND!X_Purpose, ZDonation=Donation!AND!X_Donation)' which created an NSC data set with seven formulaic variables shown in FIG. 78B. The first one created the variable 'ZContinent' inserting values from both data sets 'Continent' and 'X_Continent'. The 'C2JOIN' function does a row level join of all the values specified. It does not have to have values from both data sets, as exampled by 'ZEmail=Email' 7863 and 'ZName=X_Name' 7875. The result in this example is the formulaic variable cloud data set shown in FIG. 78B. That data set can then be used like any of our previous examples (recognizing it is non-keyed) for any of our spreadsheet capabilities. It also could be shared with other users, depending on the authorization rights of Bob. The formula 7815 constructed in FIG. 78A also used what we call a Formulaic AND to join the data which will be further exampled and explained next.

Figure 79A:
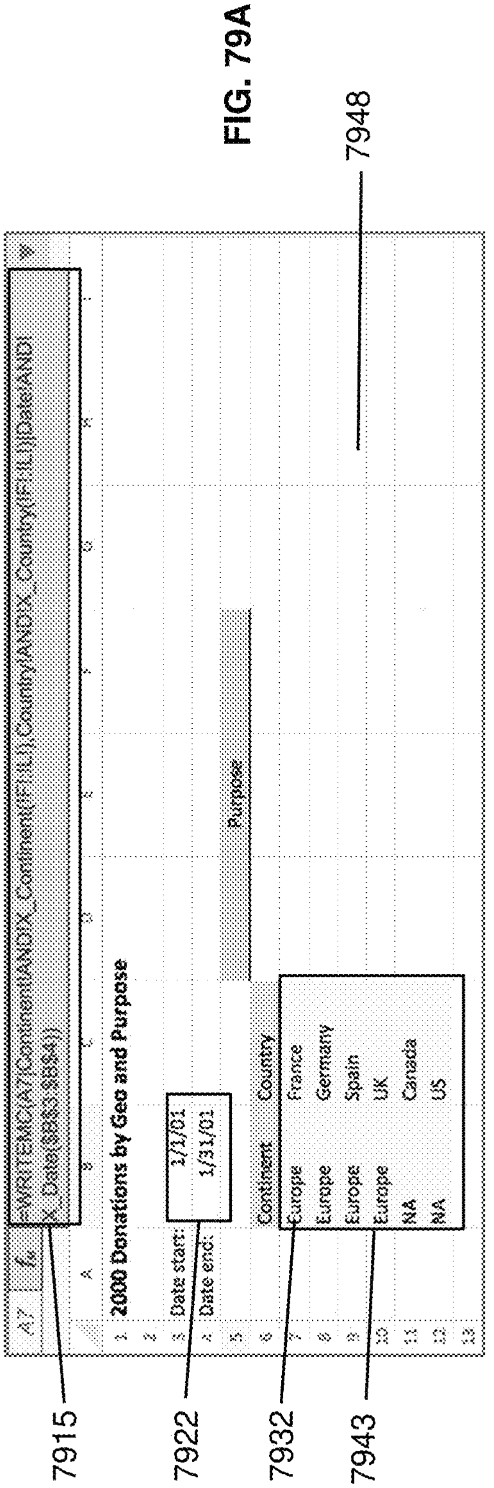
FIG. 79A and FIG. 79B example the disclosed !AND! function approach to more directly join data from multiple non-keyed or keyed cloud data tables.
Figure 79B:
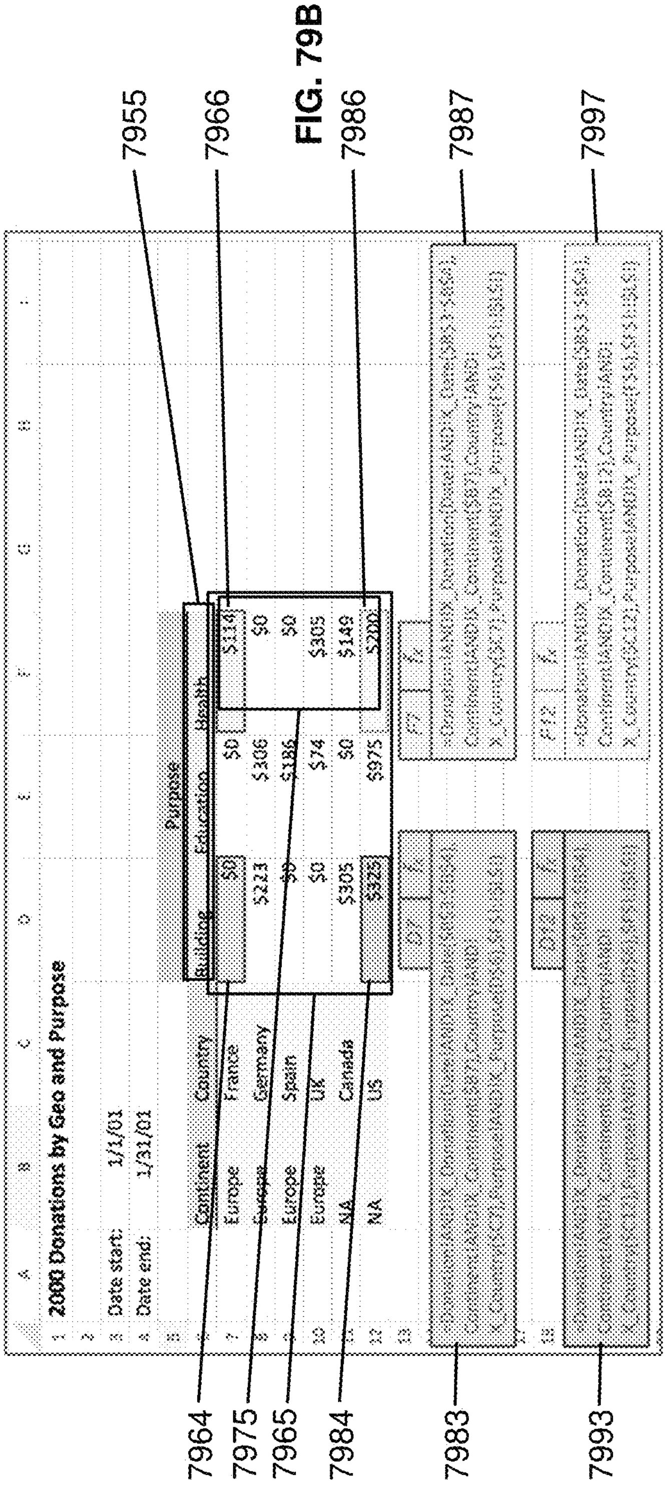
Figure 80:
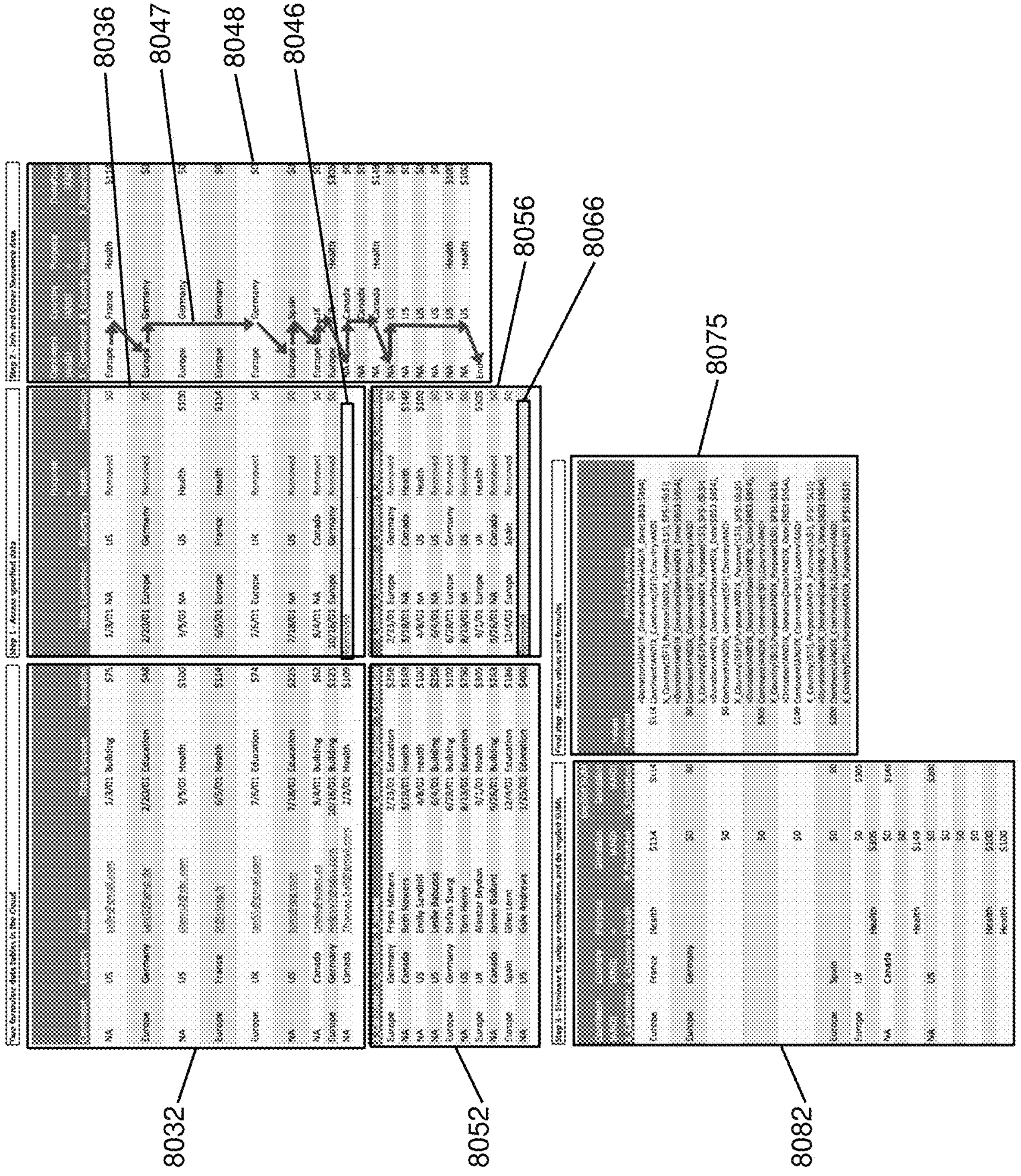
FIG. 80 illustrates the mechanics of copying and pasting calculation cells employing the disclosed !AND! function capability joining multiple NSC data tables.

FIG. 79A and FIG. 79B example another way users can use what we call a Formulaic AND to join data using our technology for non-keyed non-discrete data or keyed data. It uses the two or more NSC external (e.g., cloud) data tables in FIG. 77A and FIG. 77B. However, this time the user wants to do the join directly in the WRITE statement and calculation cells. They want to set up a date constraint (filter) driven calculation table determining the combined donations broken by 'Continent', 'Country' and 'Purpose'. In FIG. 79A they have started to lay that out by setting up the date constraint in cells B3 and B4 7922. They then used a 'WRITEMC' command in cell A7 7932 popping up the help box 7948. They just completed the formula 7915:

=WRITEMC(A6|Continent!AND!X_Continent(!F!:!L!), Country!AND!X_Country(!F!:!L!)| Date!AND!X_Date($B$3:$B$4))

generating the values in 7943. The two different formulaic variables specified in the 'WRITEMC' and the constraint are using our non-keyed formulaic mode, designated by the '!F!' and '!L!' (not the "!!F!!' used in this embodiment for keyed commands). Each of the variables being written in a column uses our Formulaic AND which in this particular embodiment syntax is an '!AND!' row join command, the workings of which are illustrated in FIG. 80. Therefore, the 'Date' constraint will be applied to both the 'Continent' and 'Country' values via the 'Date' part of 'Date!AND!X_Date ($B$3:$B$4)' and the 'X_Continent' and 'X_Country' values via the 'X_Date' part of Date!AND!X_Date($B$3:$B$4). Then those sets of combinations will be combined, Order Sequenced (FIRST to LAST) and made Unique to arrive at the values in 7943.

In FIG. 79B the user has then written a similar 'WRITEMR' joining the 'Purpose' and 'X_Purpose' values to generate the column headings in 7955. They then type the formula 7983 in cell D7 7964 to generate the implicit sum of the online and mail-in/in-person donations via:

'=Donation!AND!X_Donation(Date!AND!X_Date ($B$3:$B$4),Continent!AND!X_Continent($B7), Country!AND!X_Country($C7),Purpose!AND!X_Purpose(D$6), $F$!:!$L$!)' where they have combined 'Donation' and 'X_Donation' values from the two different NSC data sets in FIG. 77A and FIG. 77B. They have then used our Replicate Special Row and Column End copy and paste to generate all the values in 7965. You can see how that worked comparing the formulas 7983 (for cell D7 7964), 7987 (for cell F7 7966), 7993 (for cell D12 7984), and 7997 (for cell F12 7986). Our technology combined all the combinations from both data sets and filled in all the missing data with '$0' values to give the right donation totals eliminating any donations not between the Date start '1/1/00' and the Date end '12/31/00' 7922.

The outcome in FIG. 79B could also be accomplished by a calculation cell D7 7964 filled by formula not needing to use the heading values as written below:

'=Donation!AND!X_Donation(Date!AND!X_Date ($B$3:$B$4),Continent!AND!X_Continent(!$F!), Country!AND!X_Country(!$F!),Purpose!AND!X_Purpose(!F$!), $F$!:!$L$!)'

It would generate the exact same results when Replicate Special Data end copied and pasted to the eighteen cells in 7965. FIG. 80 illustrates the mechanics of how that heading free cell copy and paste works for the last column 7975 of six values. The process starts with the two different cloud data sets, 8032 (FIG. 77A) and 8052 (FIG. 77B). In step 1 each of the data sets is accessed and the first thing is that any data outside the Date range 7922 ('1/1/01' to '1/31/01') is removed. In this example that results in the removal of one line of data, 8046 and 8066, from each of the two data sets, 8036 and 8056. No further data is removed from either of the 'Continent'/'X_Continent' or 'Country'/'X_Country' columns. However, because we are doing the LAST set of 'Purpose' values equal to 'Health' all the other 'Purpose' values are removed, shown by the Red 'Removed' words and their respective Donation values changed to '$0'. They are not removed because the 'Continent'/'X_Continent' and 'Country'/'X_Country' values do not inherit impacts from Purpose(because it has the different '$' setup) but the Donation values do.

Step 2 8048 in FIG. 80 then does the join of the data sets and does an Order Sequence FIRST to LAST FIRST to LAST sequencing 8047 of:

'Continent!AND!X_Continent,Country!AND!X_Country'

Step 3 8082 then eliminates down to the Unique combinations and does the implicit summations of 'Donations! AND!X_Donations'. The final step 8075 returns the six values and their related formulas to the equivalent of 7975 in FIG. 79B.

The capabilities that we exampled in FIG. 79A through FIG. 80 also work for keyed non-discrete and discrete data manipulated in the '!F!' rather than the '!!F!!' mode, we described earlier (treating the keyed data in a row instead of keyed mode). These capabilities allow a user to construct a new data set for any type of alpha, numeric, date/time and combinations therein, to construct headings and do spreadsheet calculation from the multiple cloud data sets. They can also join more than two data sets that share related variables, thus allowing users to save a great deal of time and work relative to what they would need to otherwise do bringing data into their spreadsheets, joining it to create a new data set (likely with a VLOOKUP or HLOOKUP), and then doing their calculations using that new data set. Let alone if that is a repetitive activity say weekly where the size and composition of the data set changes requiring manual work at each step of the way which our technology automates away because it automatically accommodates different sized data sets with no formula revisions required. Note that VLOOKUP is a Microsoft Excel spreadsheet function that allows users to search and retrieve a cell's content from another column. "V" stands for vertical and relies on looking up data from the leftmost column of a lookup table. This column could be on the worksheet in use or another worksheet. Similarly, the HLOOKUP function performs a horizontal lookup by searching for a value in the top row of the table and returning the value in the same column based on the index number.

Figure 81A:
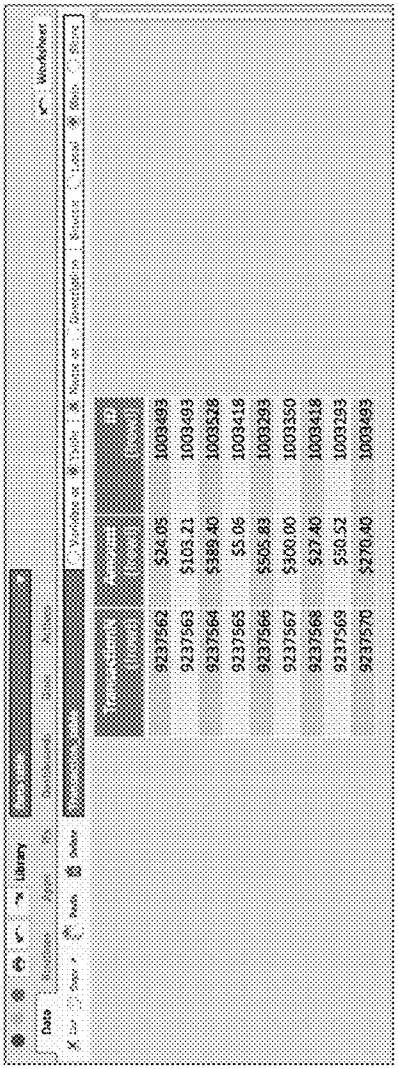
FIG. 81A FIG. 81B and FIG. 81C show three related non-keyed data sets that will be used in the Formulaic Data LOOKUP examples.
Figure 81B:
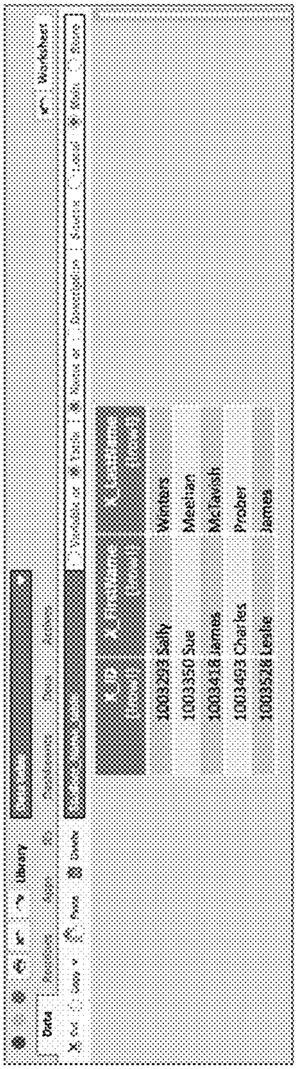
Figure 81C:
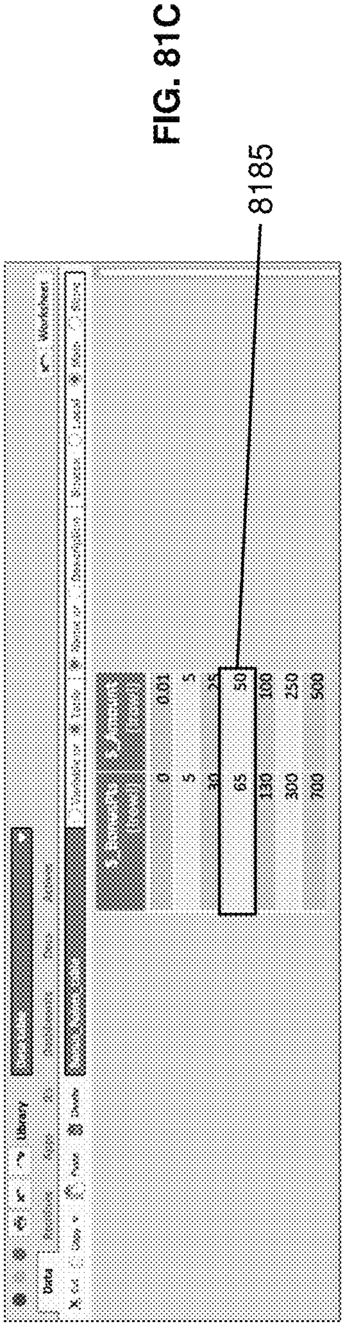

Since we mentioned the existing spreadsheet data joining capability VLOOKUP and HLOOKUP, which users are familiar with, we can run our technology through a similar Formulaic data LOOKUP function we call in this embodiment CLOOKUP (short for Cloud LOOKUP). FIG. 81A through FIG. 81C shows three illustratively small data sets that we will use to example how our CLOOKUP works. It not only accesses and joins external data without having to import all the data into cells, but it also does not require any special positioning of the data that you are using to join, like the spreadsheet VLOOKUP and HLOOKUP require (e.g., target data to the right of the join variable in VLOOKUP). As we will example in a moment we also have both TRUE and FALSE versions of our CLOOKUP doing the approximate (TRUE) or exact match (FALSE) versions as is done in VLOOKUP or HLOOKUP.

Figure 82A:
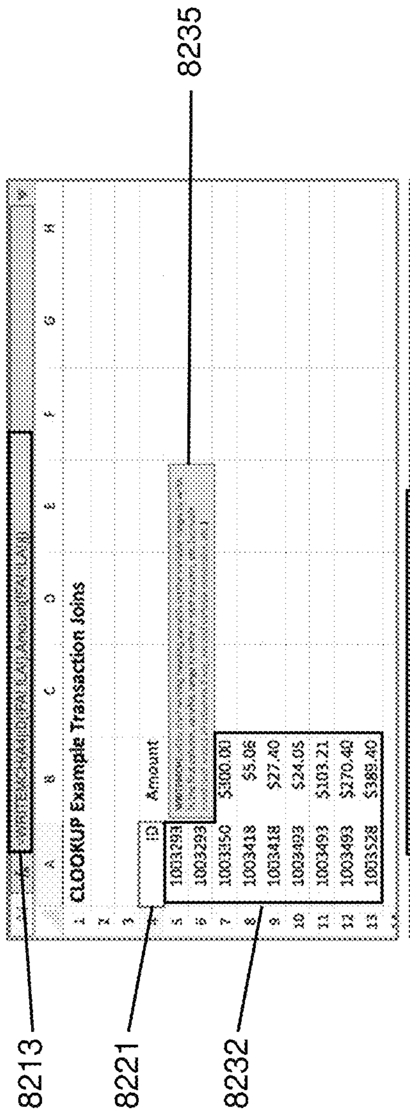
FIG. 82A FIG. 82B and FIG. 82C example multiple cloud data table exact (FALSE) Formulaic Data LOOKUP data joins.

Our example is for a small College Bookstore that has three separate cloud data tables used for Transactions (FIG. 81A), Student Names (FIG. 81B), and Bonus Points awards thresholds (FIG. 81C). The user wants to combine data from all three cloud data sets in a single spreadsheet. All the data shown in FIG. 81A through FIG. 81C is non-keyed non-discrete (multi-values), however our CLOOKUP capability works equally well for keyed data FIG. 82A through FIG. 82C examples the use of our CLOOKUP function for exact matches (FALSE). In FIG. 82A the user employs our 'WRITEMCH' function which writes multiple columns of formulaic variable data starting with a heading row listing the variable names. They write the formula 8213 in cell A4 8221 popping up the help box 8235. They decide to list ALL the 'ID' and 'Amount' data which are variables from the data in FIG. 81A and to organize it FIRST to LAST and FIRST to LAST in formula 8213.

=WRITEMCH(A4|ID(!FA!:!LA!),Amount(!FA!:!LA!)|)

This gives the two values under the pop-up box 8235 and the sixteen values shown in 8232.

Figure 82B:
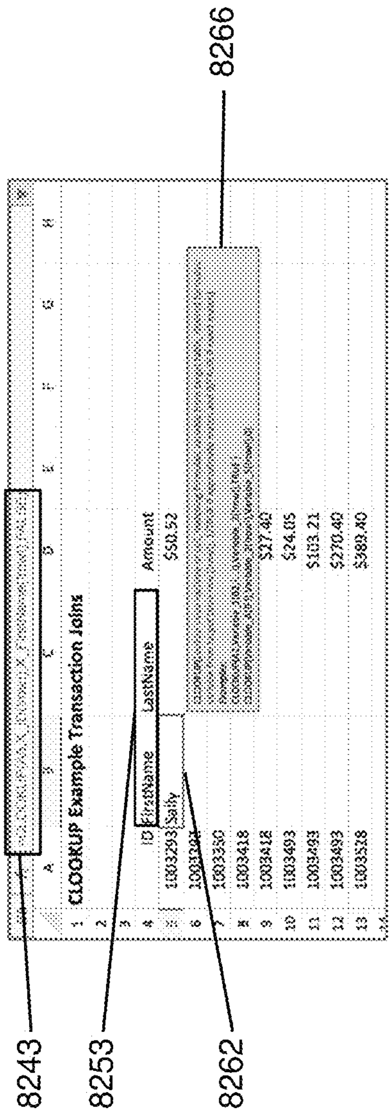

In FIG. 82B the user then inserts two columns 8253 with labels where they want to join in the 'FirstName' and 'LastName' data from the table in FIG. 81B. Next the user starts to write one of our 'CLOOKUP' functions getting the help pop-up 8266. Following the pop-up instructions, they write the formula 8243:

'=CLOOKUP (A5,X_ID(!row!),X_FirstName(!row!), FALSE)'

Figure 82C:
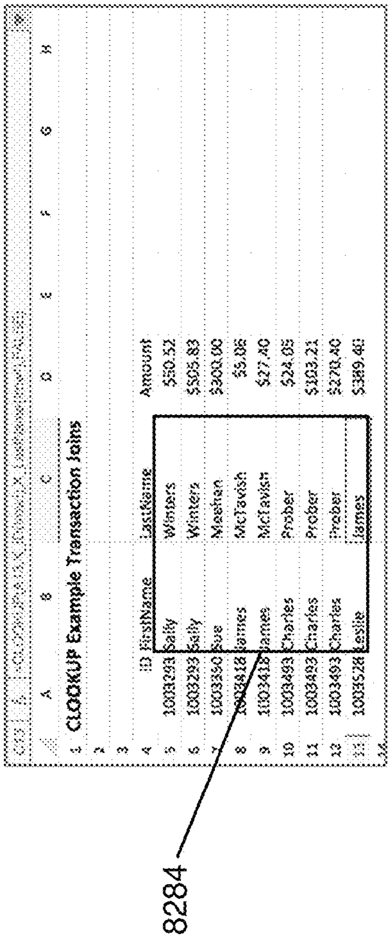

In the formula 'A5' is the cell with the value (ID retrieved from the external data shown in FIG. 81A) they are going to match to the next variable 'X_ID(!row!)' (which is in the external data shown in FIG. 81B) and because they used '!row!' it will match it by row. This gives the user the option in keyed data to match based on using keys or on using rows. The next variable 'X_FirstName (!row!)' is the variable they want returned, in this example with the value of the row of the matched 'X_ID'. The final specification is whether the user wants an exact match or approximate match. Because they specified FALSE they will get exact matches, as with the same selection in most spreadsheets. Upon completion of the formula in 8243 and hitting return, the pop-up 8266 will disappear and the content in the cell B5 'Sally' 8262 appears. FIG. 82C then shows the user has completed the CLOOKUP' for the 'LastName' column and copied both it and 'FirstName' to give the set of values in 8284.

Figure 83A:
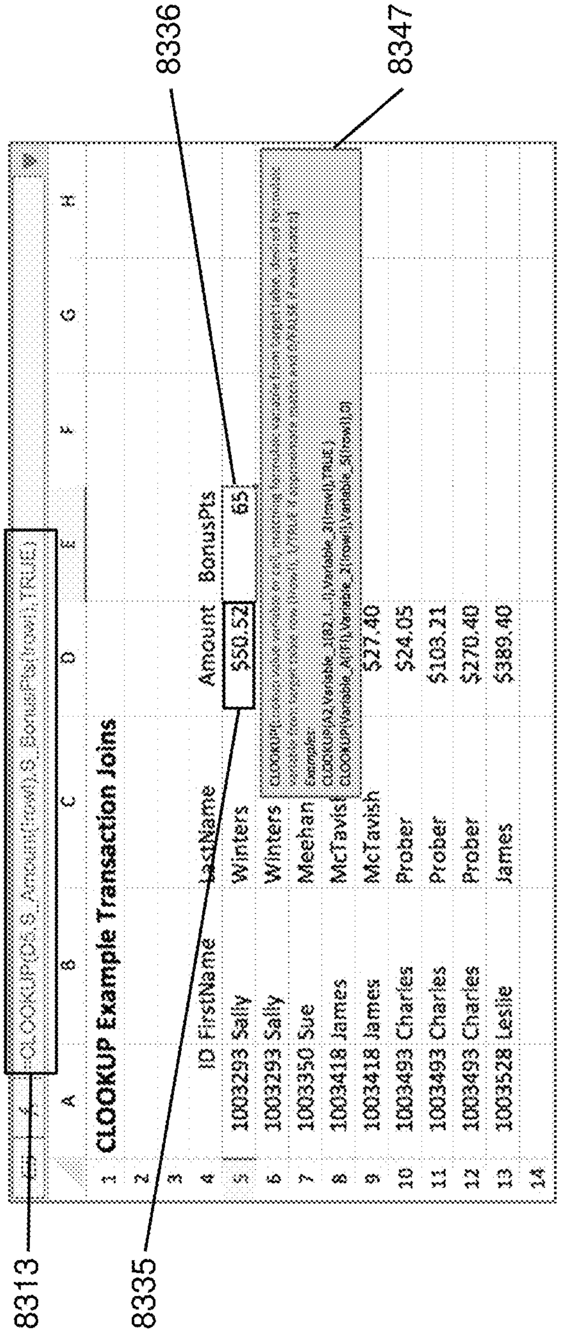
FIG. 83A and FIG. 83B example multiple cloud data table approximate (TRUE) Formulaic Data LOOKUP data joins.

The user then wants to figure out how many bonus points each Student has earned and so they decide to add a column doing an approximate join (TRUE) using the data in FIG. 81C. FIG. 83A shows the user writing that approximate join for cell E5 8336 triggering the help pop-up 8347. The formula 8213:

'=CLOOKUP (D5,S_Amount(!row!),S_BonusPts(!row!), TRUE)'

Figure 83B:
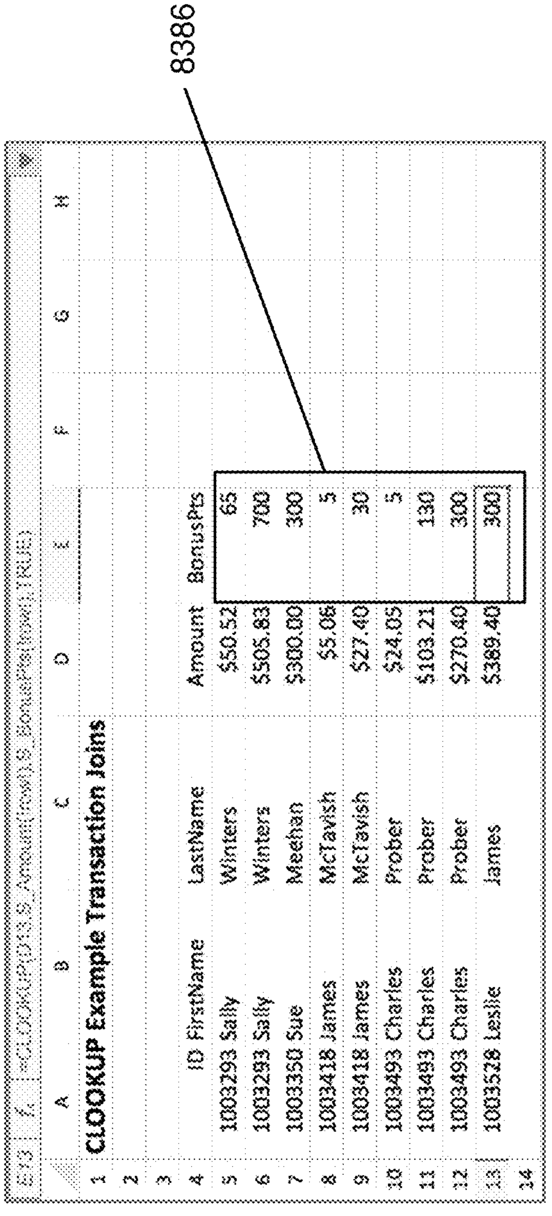

In this 'D5' 8335 is the cell with the value they are going to match to the next variable 'S_Amount' from the external dataset in FIG. 81C bringing back the approximate match of the "S_BonusPts' (using the same criteria as TRUE in a VLOOKUP), also from the external dataset in FIG. 81C. In this example that returns '65' 8336 points because the amount '$50.52' 8335 in cell D5 is just over the '$50' spend hurdle to get 65 points 8185 in the data in FIG. 81C. The user then copies cell E5 to the cells below to get the full set of values 8386 shown in FIG. 83B.

As we mentioned in the prior descriptions, our Formulaic data LOOKUP (e.g., CLOOKUP) works similarly for keyed data where the user has the option to use the keys, in this embodiment the '!! . . . !!' or '!!F!!' and on commands, or to use the keyed data not using the keys, in this embodiment the '!row!' or '!F!' and on commands. This gives great flexibility in using the broad spectrum of our technology capabilities in joining external (e.g., cloud) data. The result is that via our CLOOKUP and the other multiple table joining capabilities we have discussed, and their mix and match combinations, we have outlined extensive capabilities that make it easy for spreadsheet users to directly use cloud data in many different ways.

Our technology also works to join keyed and non-keyed data in a number of ways. For example, had the data in FIG. 77B had an additional column with a Unique ID number for each transaction, then a user could still join this keyed data set with the non-keyed data set in FIG. 77A using the non-keyed join approaches used in FIG. 78A to generate the external (e.g., Cloud) data set shown in FIG. 78B. The user can also use keyed approaches combined with non-keyed data or approaches to join data. For example, if the data and data formulas for 'Exp_N' 7252 and 'Dish_N' 7253 shown in FIG. 72B were non-keyed formulaic variables, which they could be, the keyed formulaic variable join 7242 in cell C4 7254 would work just as well. Our technology can join data of different key and non-key types provided they share the values to be matched.

The formulaic variable data join technology disclosed can be applied to internal data sources, as readily as to external databases. The data needs to have a table-like organization, i.e. as one or more lists of tuples (records, rows), each consisting of a predetermined set of attributes (columns). Each attribute must have a name. Physical representation of internal data can be an in-memory database built into the spreadsheet application, data file in any format that can be converted to one or many lists of tuples, a spreadsheet, one or more worksheets within a spreadsheet, one or more special data tabs within a spreadsheet, or even one or more rectangular areas within a worksheet, marked as an internal data source. In a worksheet or a worksheet area, records can be laid out vertically (columns represent attributes, rows represent tuples) or horizontally (rows represent attributes, columns represent tuples) to the same effect.

While internal data may be imported from an external data source it is held within the spreadsheet application and therefore not external, to avoid inconsistency with use of "external data" in spreadsheet documentation.

In one embodiment the formulaic variables use the column heading field names (attributes) as the formulaic variables. The tuple or row value selected by the formulaic variable is then specified by the formulaic variable direct references, e.g., directly specified value like "Americas" specified for the formulaic variable Geo("Americas",Region (!F!), indirect cell references, e.g., B5 in Geo(B5,Region (!F!)) where the formulaic variable uses the Geo value in cell B5, and/or indirect index references, e.g., !F! in Geo(!F!, Region(!F!)) where both Geo and Region use respectively their FIRST Unique values. In another embodiment the columns and rows could be transposed so that the formulaic variable uses the first row of the data heading field names (attributes) as the formulaic variable name and the tuple or column value is then specified by the formulaic variable direct or indirect references.

Formulaic variables data joins can be done with data from two or more internal data sources, from two or more external data sources and from a combination of internal and external data sources. All of the formulaic variable join capabilities previously described for external data work for internal data and the internal and external data combinations.

Our technology also allows automation of those spreadsheets, as discussed in patent filing entitled, "METHODS AND SYSTEMS FOR CONNECTING A SPREADSHEET TO EXTERNAL DATA SOURCES WITH FORMULAIC SPECIFICATION OF DATA RETRIEVAL", so users can setup the creation of their data join, data calculation Auto Flex, Drill down and other capabilities to automatically generate new results with the latest data. These capabilities can also be embedded within presentations, as discussed in our patent filing entitled "METHODS AND SYSTEMS FOR PROVIDING SELECTIVE MULTI-WAY REPLICATION AND ATOMIZATION OF CELL BLOCKS AND OTHER ELEMENTS IN SPREADSHEETS AND PRESENTATIONS", in which the presentation and other document pages have embedded spreadsheet calculations using our formulaic data. Those calculations can then be interactively connected to the external data and can also be automatically updated with the latest data should the user elect that option-thus bringing the power of our new capabilities to auto-generated new spreadsheets and presentations incorporating their capabilities.

Data Descriptions

Our technology is structured such that the data sourced from other systems first gets stored in our own Non-Spreadsheet Cell (NSC) database. In that database, the data is structured into our Formulaic Data for its easy use spreadsheet cells (in spreadsheets or in our other documents). That data then gets used, on demand, by the spreadsheet cells as needed by the user or as set up using our Auto-Cell Replication (ACR). In most situations most of that NSD data will be used temporarily used in spreadsheet calculations with only small quantities of the NSC Formulaic Data stored directly in a cell for report display purposes.

Figure 84:
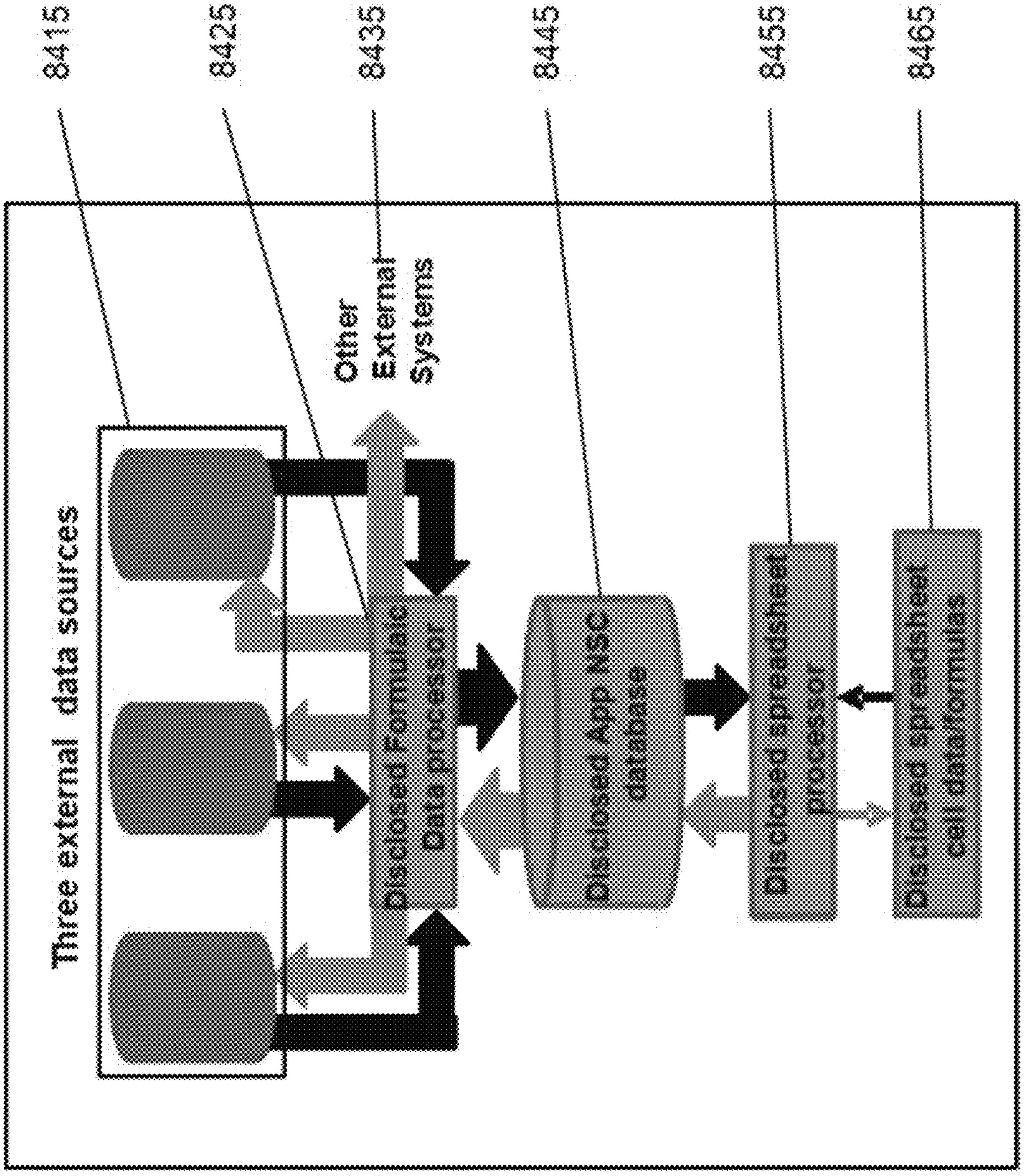
FIG. 84 illustrates an example of formulaic data processing flow, which allows users to create, within their spreadsheet cells, ordered data sets from external data sets using disclosed NSC data variables, exploiting identified data hierarchies or finding their own relationships.

FIG. 84 illustrates such a setup, with three external data sources 8415 feeding data into our formulaic processor 8425 that then translates that data into our Formulaic Data syntax for storage in our NSC database and easy use in the spreadsheet cells. There could have been many more external data sources 8435 and those data sources could be feeding data on a one-time, batch or real-time basis. In some situations, the NSC database could be one and the same with the source databases via a direct linkage to our spreadsheet app. Our Formulaic processor 8425 is also set up to process outbound data from our system using our SHARE capability to any one of the external systems connected to our system.

The Formulaic Data required by a user's spreadsheet cell, in a spreadsheet or in embedded in other documents such as presentations, word pages, dashboards, forms, data visualizers or other documents, is available from the NSC database 8445. Those spreadsheet cells then run their computations drawing in as little or as much NSC Formulaic Data as needed in the spreadsheet processor 8455. That process will also use any spreadsheet held data 8465 and of course all the spreadsheet cell stored formulas and specified functions. In most situations most if not all of the NSC data will be replaced in the spreadsheet processors by the next calculation, however, any data the user specifies can be stored in a spreadsheet cell for reporting or other purposes.

When the user wants to send answers or other results from the spreadsheet to other systems those calculation results are sent via the NSC database 8445 or directly to the Formulaic Data processor 8425 for SHARING with the external systems via the connections 8435. This allows user or ACR initiated real-time, batch or some hybrid transfers of spreadsheet generated results to external systems through the use of spreadsheet commands.

In other embodiments of our technology, the data from the external systems is directly sourced from our application, without the need of the Non-Spreadsheet Cell (NSC) database, and used as needed directly from the external data sources. The data can then be used on demand by our application using our Auto-Cell Replication (ACR) to time the retrieval of data from the external data sources. The user can then also send answers or other results from the spreadsheet to other systems via connections established with those systems.

In another implementation the technology can be applied to internal data sources replacing the external data source. Physical representation of internal data can be an in-memory database built into the spreadsheet application, data file in any format that can be converted to one or many lists of tuples, a spreadsheet, one or more worksheets within a spreadsheet, one or more special data tabs within a spreadsheet, or even one or more rectangular areas within a worksheet, marked as an internal data source. Our technology can work entirely from internal data, from a combination of internal and external data sources or entirely from external data sources.

Computer System

Figure 85:
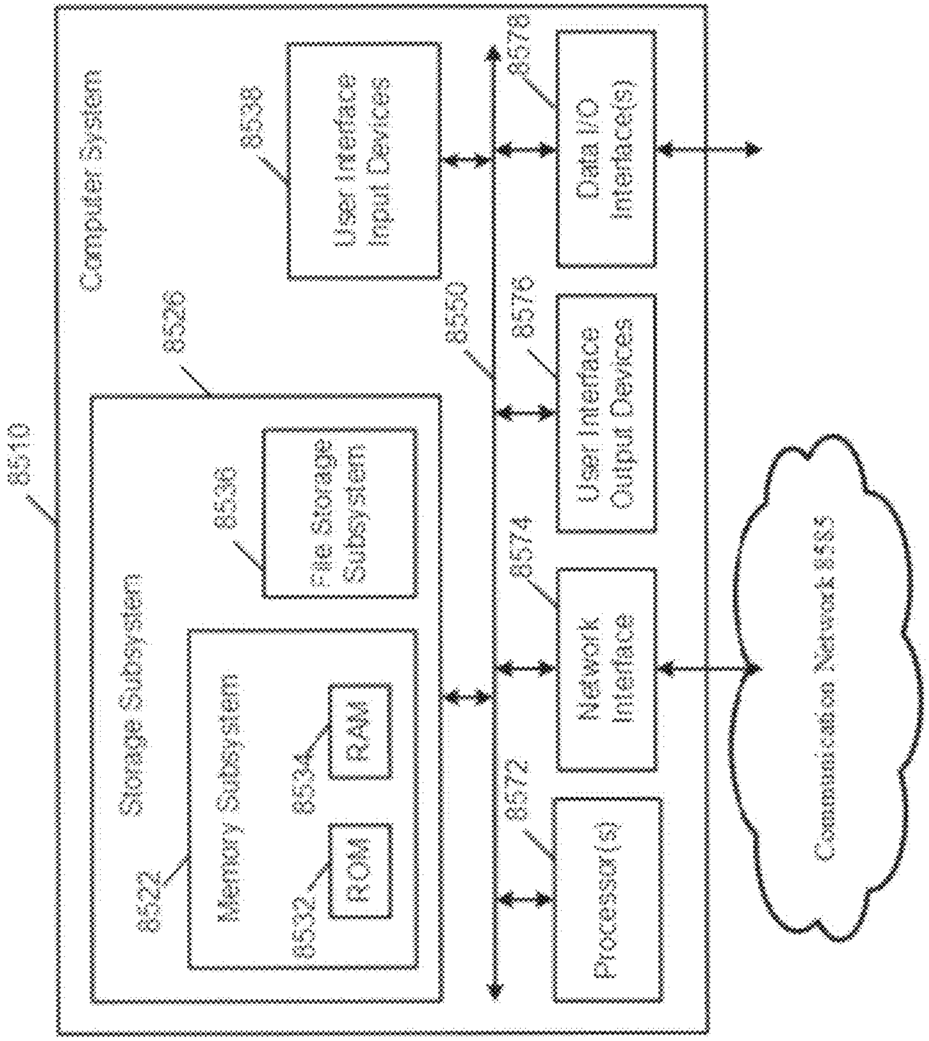
FIG. 85 lays out an example computer system usable for automating creating of ordered data sets from external data sets within their spreadsheet cells using disclosed NSC data variables.

FIG. 85 is a block diagram of an example computer system, according to one implementation. Computer system 8510 typically includes at least one processor 8514 which communicates with a number of peripheral devices via bus subsystem 8512. These peripheral devices may include a storage subsystem 8524 including, for example, memory devices and a file storage subsystem, user interface input devices 8522, user interface output devices 8520, and a network interface subsystem 8516. The input and output devices allow user interaction with computer system 8510. Network interface subsystem 8516 provides an interface to outside networks, including an interface to communication network 8585, and is coupled via communication network 8585 to corresponding interface devices in other computer systems or in the cloud and usable for cloud applications.

User interface input devices 8522 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 8510 or onto communication network 8585.

User interface output devices 8520 may include a display subsystem, a printer, a fax machine, or non-visual displays such as audio output devices. The display subsystem may include a touch screen, a flat-panel device such as a liquid crystal display (LCD), a projection device, a cathode ray tube (CRT), or some other mechanism for creating a visible image. The display subsystem may also provide a non-visual display such as via audio output devices. In general, use of the term "output device" is intended to include all possible types of devices and ways to output information from computer system 8510 to the user or to another machine or computer system.

Storage subsystem 8524 stores programming and data constructs that provide the functionality of some or all of the modules and methods described herein. These software modules are generally executed by processor 8514 alone or in combination with other processors.

Memory 8526 used in the storage subsystem can include a number of memories including a main random access memory (RAM) 8530 for storage of instructions and data during program execution and a read only memory (ROM) 8532 in which fixed instructions are stored. A file storage subsystem 8528 can provide persistent storage for program and data files, and may include a hard disk drive, a CD-ROM or DVD-ROM drive, an optical drive, or removable media cartridges. The modules implementing the functionality of certain implementations may be stored by file storage subsystem 8528 in the storage subsystem 8524, or in other machines accessible by the processor.

Bus subsystem 8512 provides a mechanism for letting the various components and subsystems of computer system 8510 communicate with each other as intended. Although bus subsystem 8512 is shown schematically as a single bus, alternative implementations of the bus subsystem may use multiple busses.

Computer system 8510 can be of varying types including a workstation, server, computing cluster, blade server, server farm, or any other data processing system or computing device. Due to the ever-changing nature of computers and networks, the description of computer system 8510 depicted in FIG. 85 is intended only as one example. Many other configurations of computer system 8510 are possible having more or fewer components than the computer system depicted in FIG. 85.

Some Particular Implementations

Some particular implementations and features are described in the following discussion.

The technology disclosed can be practiced as a method, system or computer readable media. A method implementation includes accessing external data from spreadsheet cells and using that data in spreadsheet cell activities. External data can be directly accessed responsive to formulaic variables, as described in our prior application. An ordered progression of records or objects can be selected using direct references (e.g., a specific value such as "Americas"), indirect cell references (e.g., A1) and/or indirect index references (e.g., !F!) in formulaic variables. Where those references are combined with database fieldnames (e.g., column names) in an ordered sequence, e.g., <fieldname> (<reference>) or <fieldname> (<fieldname> (<reference>)<reference>), that determines how to select the formulaic variable value or values and determines how to increment the values in vertical or horizontal copy and paste replication.

The sequencing of the Formulaic Variables and their references (e.g., "Americas", A1,!F!, or !LA!) is very important in our technology for delivering the specific data desired by the user. When two or more formulaic variables that reference fields in the external data are nested in a formulaic variable, they produce an ordered sequence relationship. FIG. 3A-E examples how the order of the formulaic variables and their INDIRECT INDEX REFERENCES result in different values retrieved from the external data sets.

The ordering and progression of the Order Sequence is maintained during replication. Examples of this appear in FIG. 3 through FIG. 5, exampling the order sequencing during copy and paste replication and also showing where the pasted area has more rows or columns than the retrieved data set, the additional cells are indicated by an unpopulated message.

Formulaic variables values can be retrieved from external databases using non-predefined user key data or predefined user keyed data. That is formulaic variables values are the values the formulaic variable returns from the external database. Note that a formulaic variable often includes more than one variable. In one example, for =Rev{Geo(!F!), Region(!F!),Product(!2!),!F!), the Rev value returned is a function of Geo, Region and Product values. Differentiation of that non-keyed vs. keyed data retrieval approach can be via difference in the references (e.g., !F! vs !!F!!) or in the types of brackets (e.g., { } vs. [ ])), or other differentiation used in writing the formulaic variable. In some implementations of the disclosed method, the Ordered Sequence of variables and Replication can use UNIQUE values selected using the formulaic variables (exampled in FIG. 3 through FIG. 5). In other cases, the Ordered Sequence of variables and Replication can use ALL records or objects selected using the formulaic variables (exampled in FIG. 9 through FIG. 11). In adjoining vectors, an Ordered Sequence of variables and Replication can be composed using a combination of UNIQUE and ALL values in different fields of the formulaic variables. Other forms of differentiation can be used to distinguish between selection of ALL records or objects in a sequence (e.g., !FA! where the A stands for ALL) and just UNIQUE values present among records or objects in the sequence (e.g., !F! where the lack of an A means UNIQUE).

In another implementation, shown in FIG. 18 through FIG. 20, the formulaic variables use a combination of cell references and INDIRECT INDEX REFERENCES to specify the external data fields to be used.

In another implementation shown in FIG. 12 through FIG. 14, we example how a user can decide to alter that Order Sequencing of variables to thereby change the value retrieved from the external data. In some instances, a single ongoing inheritance of our Ordered Sequence and its replication makes sense, such as specifying a continent and a country which are linked. In other situations, there are reasons to break the inheritance as shown in FIG. 12B, where two of the variables are linked and inheritance makes sense (e.g., Geos and their Regions) but the third variable is thought of separately (Purpose of the Charity contributions) so the user wants to see all its possible options in the combined combination. ADJUSTMENT CONSTRAINTS applied to formulaic variables via repetitive variable names (shown in FIG. 12B) or modifications of INDIRECT INDEX REFERENCES (shown in FIG. 12C) are ways of differentiating two or more sequences without inheritance that then combine in a combinatorial sequence for retrieving external data. FIG. 12A (and FIG. 13) shows how having full inheritance for all three formulaic variables gives fewer values (rows) than FIG. 12B or FIG. 12C (and FIG. 14) where one of the combined variables has no inheritance with the other two.

One implementation of a disclosed method of accessing external data in spreadsheet cells, includes accessing external data direct via a formulaic variable in a spreadsheet; specifying an ordered progression for the accessed external data; and selectively propagating data accessed using the formulaic variable two-dimensionally in a replication propagation pattern responsive to ADJUSTMENT CONSTRAINTS (e.g., A$1, $A1 and $A$1 spreadsheet conventions). These ADJUSTMENT CONSTRAINTS limit the progression of cell values (e.g., A$1, $A1 and $A$1) and our INDIRECT INDEX REFERENCES (e.g., !$F!,!2$!, and !$LA$!) used in formulaic variables, as exampled in FIG. 19 through FIG. 23.

In another embodiment, the ADJUSTMENT CONSTRAINTS follow the typical spreadsheet conventions of single and double $ signs. The formulaic variables with the same single $ sign INDIRECT INDEX REFERENCES (e.g., !$F!,!$2!, and !$L!) have inheritance but are not impacted by the other variant (e.g., !F$!,!2$!, and !L$!) and vis-a-versa, while double $ sign INDIRECT INDEX REFERENCE (e.g., !$F$!) inherit constraints (filters) from all formulaic variables. In Replication formulaic variables with single $ sign cell references and/or INDIRECT INDEX REFERENCES parallel what would occur matching row and column headings giving users a very understandable Replication outcome. The formulaic variables with double $ sign ADJUSTMENT CONSTRAINTS to the INDIRECT INDEX REFERENCES do not change value. All of this is exampled for non-keyed (non-predefined user keyed) data in FIG. 21 through FIG. 23 and for keyed (predefined user keyed) data in FIG. 74 through FIG. 76.

In another implementation of the disclosed method, the ordered sequence is set by the order of the variables and their references in the formulaic variable and combines values from two or more separate sequences in a combinatorial combined sequence.

In yet another implementation of the disclosed method, the Ordered Sequence variables and Replication for two dimensional relationships can combinatorically combine values from respective dimensions. Then, the possible combinations are enumerated even for tuples that are not inhabited, that have no example records or objects as illustrated in FIG. 15 through FIG. 17. This disclosed method can be combined with user specification of a value (e.g., 0 or !NO NEXT!) to report for any missing numeric values created by the recombination of the dimensions. This is a way of handling un-inhabited tuples. See, for instance, FIG. 22 and FIG. 56 through FIG. 60.

In one implementation of the disclosed method, the Ordered Sequencing can be used in a calculation cell employing math or other functions. Examples are shown in FIG. 18 through FIG. 23 and FIG. 47 through FIG. 49. Constrained examples are shown in FIG. 32, FIG. 35, FIG. 64 and FIG. 65.

In another implementation of the disclosed method, formulaic variables can include constraints (filters) using direct references (e.g., specific value such as "Americas"), indirect cell references (e.g., A1) and/or indirect index references (e.g., !F!) with or without adjustment constraints (e.g., $) to limit values returned in the Ordered Sequence variables and Replication. Examples of constraints appear in FIG. 26, FIG. 32, FIG. 35, FIG. 64 and FIG. 65.

In some implementations of the disclosed method, the Ordered Sequence variables and Replication can combine or join many sets of data into one cell, responsive to one or more formulaic variable(s), and producing one set of Replications. Examples of this appear in FIG. 54 through FIG. 55. In this case, the method can combine multiple sets of values from different non-keyed columns or different keyed data sets for each value. In other cases, Ordered Sequence variables and Replication can combine or join many sets of data into one set which is then sequenced together to give one formulaic variable, or the replicated set of variables producing one set of Replications. This formulaic variable or replication formulaic variables, depending on the INDIRECT INDEX REFERENCE used, can be UNIQUE or ALL values retrieved from the external data source.

In another embodiment our technology uses a special copy & paste special, to determine the size of the paste region into which data is deposited via a formulaic variable specified by the user instead of a selected (highlighted) region of cells. In one implementation of the disclosed method, the replication endpoint can be specifiable via a Special Spreadsheet copy & paste END function, which is shown in FIG. 6, FIG. 11, and FIG. 21 through FIG. 23 where the user specifies formulaically the end point of the data (Data End). That pasted area can then automatically adjust to changes in the external data. In an implementation with constraints (filters), as shown in FIG. 36 through FIG. 37, the size of the area that has been copied & pasted automatically changes with changes to the constraint values.

In some implementations of the disclosed technology, versions of a WRITE command can deliver the equivalent of a formulaically defined copy & paste where the user specifies in the WRITE command the starting and ending points formulaic variables (Equivalent of Data Start & End) and the Ordered Sequence using direct or indirect references. The user specifies a row or column orientation (e.g., by WRITEMR or WRITEMC) as shown in FIG. 7 through FIG. 8 and FIG. 15 through FIG. 17. With constraints, these variations on WRITE are shown in FIG. 31 and FIG. 63, exampling how the WRITE Replication changes with a change in one or more constraints.

In another implementation of the special copy & paste the starting and end points are executed according to parameters in a user selected linkage to a WRITE command. The copy paste is linked to either a row or a column of a WRITE command (Row & Column END) and will replicate the equivalent number of cells. A two-dimensional Replication area is achieved by linking to both a Row and a Column WRITE command. FIG. 33A through FIG. 33B example the set up and resulting space when copying & pasting where one or more WRITE commands set the boundaries of this special copy & paste. FIG. 29C and FIG. 29D example how that special copy & paste area automatically changes with changes to the linked WRITE statements.

In another implementation of the special copy & paste the starting and end points of a WRITE command are set according to row or column linkages to an area with a preexisting replication created with user specified formulaic endpoints. The values are also then taken from the linked cells in that preexisting replication area with user specified formulaic endpoints. FIG. 38 through FIG. 39 examples the special WRITE copy & paste row or column linkage to a previously created area (created in FIG. 35 through FIG. 37). FIG. 38 through FIG. 39 also example the impact of constraints (filters) on the special WRITE copy & paste via constraints applied in the area to which they are linked. Implicit summations are exampled for all of the different types of special copy & paste implementations.

Some implementations of the disclosed method, include applying auto flexing, which adaptively changes a region of cells in which data is deposited to fit returned results, replication is responsive to a constraint (filter), such that a constraint change automatically changes impacted content as well as the starting and endpoints of the auto replication. This is illustrated in FIG. 28 through FIG. 29, FIG. 37, FIG. 40 and FIG. 67. The constraints can be changed by multi-level drill down or drill up clickable headings. This drill down feature is illustrated in FIG. 68 through FIG. 70. In some implementations, drill down can use specialized time functions that allow easy movement from one timeframe to another—e.g., day, week, month, quarter and year. This date drill down is illustrated in FIG. 71.

In some implementations of the disclosed method, constraint values can be selectable via a pop-up that shows either the current option or the current options and all possible options given relaxing of all constraints to ALL. FIG. 41 through FIG. 44 illustrate variations on using pop-ups.

For some implementations of the disclosed technology, predefined user keyed data fields can be accessed using non-keyed formulaic data commands to specify searches within the predefined user keyed data fields, as shown in FIG. 63 through FIG. 64.

In another implementation the technology can be applied to internal data sources replacing the external data source. The data needs to have an accessible table-like organization of attributes and tuples accessible to the formulaic variables. Our technology can work entirely from internal data, from a combination of internal and external data sources or entirely from external data sources.

For joins of multiple external tables, a method implementation includes accessing external data from spreadsheet cells and using that data in across-cell or in-cell data joins. External data can be directly accessed responsive to formulaic variables, as described in our prior application. An ordered progression of records or objects can be selected using direct references (e.g., specific value such as "Americas"), indirect cell references (e.g., A1) and/or indirect index references (e.g., !F!) in formulaic variables. Where those references are combined with database fieldnames (e.g., column names) in an ordered sequence, e.g., <fieldname> (<reference>) or <fieldname> (<fieldname> (<reference>) <reference>), that determines how to select the formulaic variable value or values and determines how to increment the values in vertical or horizontal copy and paste replication. Indirect index reference tokens can be surrounded by single or double exclamation points or another break character that distinguishes reserved word tokens from literals. Indirect references to values can be used as ordered progression parameters in the formulaic variables. The tokens can be accompanied by a parameter that distinguishes between selection of all records or objects in a sequence or just unique values present among records or objects in the sequence.

Figure 72C:
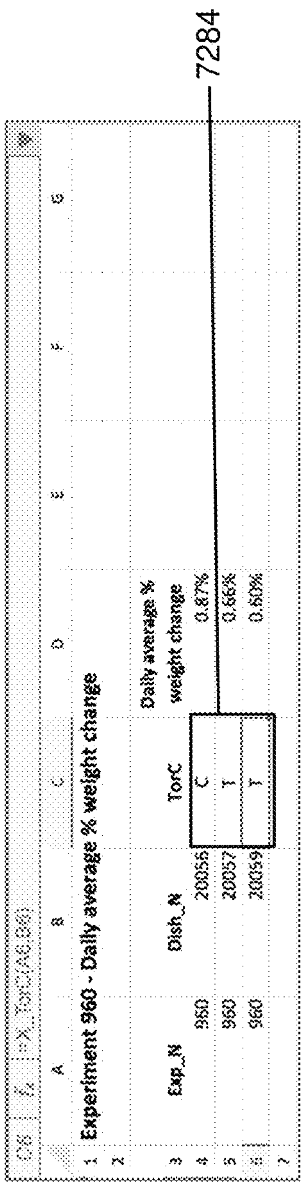

For one implementation of the disclosed method, external data is accessed and joined across-cells or accessed and joined within a cell (in-cell). For across-cell joins, at least one value from the first external data table is populated in a cell via our formulaic variables. That value is then used to retrieve data from a target external data table as shown in FIG. 72B. More than one value can be used from the first external data table as well as formulaic values from more than one table can be used in defining the value retrieved from the target data table. For in-cell joins the formulaic variable directly accesses external data from two or more tables and so the formulaic variable formula uses formulaic variables from those two or more tables as shown in FIG. 74A These across-cell and in-cell joined cells can then be Order Sequenced Replicated using copy & paste as shown in FIG. 72C and FIG. 74B where the Ordered Sequence is set by the order of the variables and their references.

In another implementation the joining of the data can use both Across-cell and In-cell joins in the formulaic data as shown in the example in FIG. 74.

Another implementation of joining external data in spreadsheet cells, includes accessing external data direct via a formulaic variable in a spreadsheet; specifying an ordered progression for the accessed external data; and selectively propagating data accessed using the formulaic variable two-dimensionally in a replication propagation pattern responsive to ADJUSTMENT CONSTRAINTS (e.g., A$1, $A1 and $A$1 spreadsheet conventions). These ADJUSTMENT CONSTRAINTS limit the progression of cell values (e.g., A$1, $A1 and $A$1) and our INDIRECT INDEX REFERENCES (e.g., !$F!,!2$!, and !$LA$!) used in formulaic variables, as exampled in FIG. 74B. These ADJUSTMENT CONSTRAINTS can also break the sequential data inheritance into multiple sequences, as shown in FIG. 19 through FIG. 23, across the externally joined data so that inheritance only works on variables using the same ADJUSTMENT CONSTRAINT (e.g., variables sharing the same single $ sign A$1 or !F$ share inheritance and do not share inheritance with variables with the other $ sign $A1 or !$F). The different ADJUSTMENT CONSTRAINTS change the ordered sequence set by the order of the variables and their references in the formulaic variable to two or more separate sequences (e.g., !F$! and !A$1 versus !$F! and !$A1) that then combine values in a combinatorial combined sequence.

In one implementation, a disclosed method of accessing multiple external data in spreadsheet cells includes accessing external data direct via a formulaic variable in a spreadsheet. The method also includes specifying an ordered progression for the accessed external data and selectively propagating data accessed using the formulaic variable two-dimensionally in a replication propagation pattern responsive to ADJUSTMENT CONSTRAINTS. For the disclosed method, two or more external data fields responsive to the formulaic variable have an ordered sequence relationship that nests ordering of vectors of the propagated data and the formulaic data is generated using an across-cell or an in-cell join (collectively referred to as external data joins) of data from at least two external data sources, to generate multiple vectors of spreadsheet cells of data, responsive to selection parameters in the formulaic variable.

For some implementations of the disclosed method, external data join acts on a first dimension of values from a first source retrieved using a predefined keyed value function, joined with a row or object from a second source retrieved using a non-predefined keyed search.

In one implementation of the disclosed method, the external data join acts on data from the two external data sources to combine values from at least a first dimension of a first external data source with values from at least a second dimension of a second data source as an outer join. In yet another implementation of the disclosed method, at least one of the external data sources is replaced by an internal data source used by the formulaic variables.

Other implementations of the disclosed method can be practiced performing the join of data using matching keyed predefined data keys, as shown in FIG. 72. Alternatively, the join can be performed by matching non-predefined keyed data unique or all values using our formulaic variables, as shown in FIG. 78. In some implementations of the disclosed method, the external data join can be done within a cell as part of a calculation See, for example FIG. 74 through FIG. 76 (implicit SUMMATION).

For other implementations of the disclosed technology, joins can be performed using a WRITE command employing our Ordered Sequential Replication as in FIG. 79 and FIG. 80. In some disclosed methods, joins can be made using a Formulaic data LOOKUP command (e.g., CLOOKUP) matching data using syntax similar to existing spreadsheet VLOOKUP/HLOOKUP, using our formulaic variables to match data in rows of the external data set. Those joins can be done with either an approximate match (designated TRUE in today's spreadsheets) or an exact match (Designated FALSE) as in FIG. 82 and FIG. 83. The TRUE and FALSE alternatives are contrasted in FIG. 82 and FIG. 83.

In another implementation, the external data join is included in a constraint of a formulaic variable and therefore is part of determining the value of a formulaic variable as shown in FIG. 74A That data join then participates in setting the Ordered Sequence of the copy & paste replication as shown in FIG. 74B. Changes to that Constraint value will then automatically change the replication area of any copy paste where it is involved in variable formulaically setting the endpoint of the replication area, as previously exampled in FIG. 33 and FIG. 36 through FIG. 37.

For some implementations of the disclosed method, the external data join is executed using a combination of one or more matching keyed data key determined formulaic variable and one or more matching non-keyed matching row variable row values and selecting the corresponding row value of the additionally specified non-keyed variable.

In another implementation, what we call the Formulaic AND join, our formulaic data when combined with a special joining command, in this embodiment !AND!, joins external data from two or more external data sets in an Ordered Sequence. The ordered sequence is done via formulaic variables connected by the !AND! commands and works for retrieving both Unique and ALL values from the external datasets. The Formulaic AND join is exampled for a WRITE command in FIG. 79A and calculation cell (implicit SUM) in FIG. 79B.

In another implementation our Formulaic AND join capability is combined with our external (e.g., CLOUD) data create function capability to allow spreadsheet users to create an external dataset that can then be used by the creator (typically a user) and others, as exampled in FIG. 78.

In another implementation the technology can be applied to at least one internal data sources replacing an external data source. The internal data needs to have an accessible table-like organization of attributes and tuples accessible to the formulaic variables. The internal data formulaic variables can be used in across-cell, in-cell or combination across-cell and in-cell joins. Joins can be made between two or more internal data sources, one or more internal and one or more external data sources, or two or more external data sources using our formulaic variables.

These disclosed implementations of the method technology also can be practiced as a device or system. A device can include a processor and memory, the memory loaded with instructions that, when executed, cause the processor to implement any of the methods disclosed. A system can include a local device running a browser or light weight interface, which uses network-based web apps and connects to a server, instead of using traditional applications to implement the technology disclosed.

Yet another implementation may include a tangible, non-transitory computer readable storage media loaded with computer program instructions that, when combined with and executed on computer hardware, cause a computer to implement any of the methods described earlier. In this application, tangible computer readable storage media do not include non-patentable transitory signals. While the technology disclosed could be implemented using transitory signals, reference to tangible computer readable storage media does not include the non-patentable transitory signals. If the law changes and transitory signals become patentable, separate claims may be made to transitory signals.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

CLAUSES

Clause 1. A method of accessing external data in spreadsheet cells, including:

accessing external data direct via a formulaic variable in a spreadsheet;

specifying an ordered progression for the accessed external data;

selectively propagating data accessed using the formulaic variable two-dimensionally in a replication propagation pattern responsive to ADJUSTMENT CONSTRAINTS;

wherein two or more external data fields responsive to the formulaic variable have an Ordered Sequence relationship that nests ordering of adjoining vectors of the propagated data; and wherein the ordering according to the ordered sequence relationship is maintained and incremented during vertical or horizontal replication by copy and paste.

Clause 2. The method of clause 1, wherein the Ordered Sequence relationship is set by the order of the variables and their references in the formulaic variable.

Clause 3. The method of clause 1, wherein parameters of the formulaic variable can specify whether to retrieve data matching one or more user keys, against a field, or to perform data retrieval using a user specified formulaic variable within the fields.

Clause 4. The method of clause 1, wherein the Ordered Sequence relationship of variables returns unique values of the formulaic variables.

Clause 5. The method of clause 1, wherein the related Ordered Sequence relationship of variables and replication return data corresponding to ALL records or objects in the external data that are responsive to parameters of the formulaic variable.

Clause 6. The method of clause 1, wherein the Ordered Sequence relationship of variables and replication uses a combination of "unique" and "all values" for different fields in the formulaic variable.

Clause 7. The method of clause 2, wherein a combination of cell and INDIRECT INDEX references are used in the formulaic variable to specify the external data fields used.

Clause 8. The method of clause 1, wherein the Ordered Sequence relationship of variables and Replication combines values from two or more separate sequences in a combinatorial combined sequence.

Clause 9. The method of clause 8, wherein the Ordered Sequence relationship is subject to an ADJUSTMENT CONSTRAINT separating sequences.

Clause 10. The method of clause 1, wherein the Ordered Sequence relationship in the formulaic variable nests ordering between two or more of the external data fields without limiting replication of data from a second dimension that is nested within values of a first dimension.

Clause 11. The method of clause 10, wherein relationships of the first dimension and second dimension are differentiated by ADJUSTMENT CONSTRAINTS.

Clause 12. A method of clause 11, wherein the ADJUSTMENT CONSTRAINTS follow spreadsheet conventions "A$1" and "$A1" for formulaic cell and indirect index references.

Clause 13. The method of clause 10, wherein a user specifies the value for any missing numeric values created by recombination of the dimensions.

Clause 14. The method in clause 10, wherein Ordered Sequencing is used in a calculation cell employing mathematical or other spreadsheet functions.

Clause 15. The method of clause 1, wherein constraints limit the Ordered Sequence of variables and Replication.

Clause 16. The method of clause 15, wherein the constraints employ one of direct or indirect cell or index references.

Clause 17. The method of clause 1, where the Ordered Sequence of variables and Replication combines many sets of data to arrive at one variable or one set of Replications.

Clause 18. The method of clause 1, wherein the replication populates an area of cells determined by the formulaic variable rather than a physical highlight of the area of cells targeted.

Clause 19. The method of clause 18, wherein a data end for replication is formulaically set by a user modifying the formulaic variable of a starting point cell.

Clause 20. The method of clause 19, wherein a constraint on the data end for replication formulaically sets the data end for replication and automatically changes a replication area with a change in the constraint.

Clause 21. The method of clause 18, wherein that replication Order Sequence, starting point and endpoint are specified in a WRITE command, with row wise or column wise ordering and quantity of data determined by different variations of the WRITE command.

Clause 22. The method in clause 21, wherein the WRITE command replicates the Ordered Sequence for two or more rows or columns.

Clause 23. The method of clause 21, wherein a WRITE command formulaic variable or variables includes a constraint and automatically changes a replication area with a change in the constraint or constraints.

Clause 24. The method of clause 18, wherein a starting point and endpoint are specified by linkage to a preexisting WRITE command.

Clause 25. The method of clause 24, wherein a two-dimensional replication space is obtained by linkage to two WRITE commands.

Clause 26. The method of clause 24, wherein the replication area automatically adjusts to changes in the linked WRITE command.

Clause 27. The method of clause 18, wherein a starting point, endpoint and content of a WRITE command is specified in linked cells previously created by a formulaically set replication area.

Clause 28. The method of clause 18, wherein the formulaic variable includes a constraint and changing the constraint automatically changes impacted content as well as starting and endpoints of an area of cells populated with data responsive to the formulaic variable.

Clause 29. The method of clause 28, wherein the constraint is changed by multi-level drill down or drill up clickable headings.

Clause 30. The method of clause 29, further including using a specialized time functions to specify the constraint.

Clause 31. The method of clause 28, wherein the constraint is specified using a pop-up that shows either a current option or the current options and all possible options given relaxing of all constraints to ALL.

Clause 32. The method of clause 3, wherein a predefined keyed data field can be searched using a non-keyed search for a value within the predefined keyed data field.

Clause 33. The method of clause 1, wherein at least one source of external data is replaced by an internal data source used by the formulaic variables.

I claim as follows:

1. A method for creating a spreadsheet functional formula that has more flexibility to accept different numbers of arguments, including:

providing a spreadsheet function delivered prebuilt with the spreadsheet which employs a defined syntax/argument structure that employs more than one argument group, two different types of argument delimiters, and required and optional arguments;

where the spreadsheet function has a name followed by opening and closing characters within which the arguments and argument groups reside;

where the spreadsheet function syntax/argument structure contains a predefined number of required or optional argument groups where argument groups contain fixed or variable numbers of arguments:

where at least two of those argument groups has a variable number of arguments, where once the user fills in the first argument in a particular group they are offered the required or optional opportunity to add a like second argument to the particular group and so on until they stop adding arguments or encounter an upper limit of the like arguments for the particular argument group;

wherein a delimiter type one separates argument groups;

wherein a delimiter type two, which is different than the type one, separates arguments within an argument group; and receiving the required arguments and any acceptable optional arguments are specified with the correct delimiters within the function and entered into the spreadsheet cell; and responsive to the arguments, generating a result.

2. The method of claim 1, wherein the like arguments are sequential versions of the same argument.

3. The method of claim 1, wherein the user has the ability to populate at least two argument groups with variable numbers of arguments, wherein at least one argument group will accept zero arguments.

4. The method of claim 1, wherein the first delimiter type is a bar character ("|").

5. The method of claim 1, wherein the second delimiter type is a comma (",").

6. The method of claim 1, wherein the function opening character following the name is an opening parenthesis and the closing character is a closing parenthesis.

7. A non-transitory computer readable medium holding program instructions that, when executed on a processor a computer-implemented system including at least one processor and memory coupled to the processor, the memory holding program instructions that implements a method for creating a spreadsheet functional formula that has more flexibility to accept different numbers of arguments, including:

providing a spreadsheet function delivered prebuilt with the spreadsheet which employs a defined syntax/argument structure that employs more than one argument group, two different types of argument delimiters, and required and optional arguments;

where the spreadsheet function has a name followed by opening and closing characters within which the arguments and argument groups reside;

where the spreadsheet function syntax/argument structure contains a predefined number of required or optional argument groups where argument groups contain fixed or variable numbers of arguments:

where at least two of those argument groups has a variable number of arguments, where once the user fills in the first argument in a particular group they are offered the required or optional opportunity to add a like second argument to the particular group and so on until they stop adding arguments or encounter an upper limit of the like arguments for the particular argument group;

wherein a delimiter type one separates argument groups;

wherein a delimiter type two, which is different than the type one, separates arguments within an argument group; and receiving the required arguments and any acceptable optional arguments are specified with the correct delimiters within the function and entered into the spreadsheet cell; and responsive to the arguments, generating a result.

8. The method of claim 1, wherein the function opening and closing characters are right and left curly brackets or right and left square brackets.

9. The non-transitory computer readable medium of claim 7, wherein the like arguments are sequential versions of the same argument.

10. The non-transitory computer readable medium of claim 7, wherein the user has the ability to populate at least two argument groups with variable numbers of arguments, wherein at least one argument group will accept zero arguments.

11. The non-transitory computer readable medium of claim 7, wherein the first delimiter type is a bar character ("|").

12. The non-transitory computer readable medium of claim 7, wherein the second delimiter type is a comma (",").

13. The non-transitory computer readable medium of claim 7, wherein the function opening character following the name is an opening parenthesis and the closing character is a closing parenthesis.

14. The non-transitory computer readable medium of claim 7, wherein the function opening and closing characters are right and left curly brackets or right and left square brackets.

15. A computer-implemented system including at least one processor and memory coupled to the processor, the memory holding program instructions that implements a method for creating a spreadsheet functional formula that has more flexibility to accept different numbers of arguments, including:

providing a spreadsheet function delivered prebuilt with the spreadsheet which employs a defined syntax/argument structure that employs more than one argument group, two different types of argument delimiters, and required and optional arguments;

where the spreadsheet function has a name followed by opening and closing characters within which the arguments and argument groups reside;

where the spreadsheet function syntax/argument structure contains a predefined number of required or optional argument groups where argument groups contain fixed or variable numbers of arguments:

where at least two of those argument groups has a variable number of arguments, where once the user fills in the first argument in a particular group they are offered the required or optional opportunity to add a like second argument to the particular group and so on until they stop adding arguments or encounter an upper limit of the like arguments for the particular argument group;

wherein a delimiter type one separates argument groups;

wherein a delimiter type two, which is different than the type one, separates arguments within an argument group; and receiving the required arguments and any acceptable optional arguments are specified with the correct delimiters within the function and entered into the spreadsheet cell; and responsive to the arguments, generating a result.

16. The system of claim 15, wherein the like arguments are sequential versions of the same argument.

17. The system of claim 15, wherein the user has the ability to populate at least two argument groups with variable numbers of arguments, wherein at least one argument group will accept zero arguments.

18. The system of claim 15, wherein the first delimiter type is a bar character ("|").

19. The system of claim 15, wherein the second delimiter type is a comma (",").

20. The system of claim 15, wherein the function opening character following the name is an opening parenthesis and the closing character is a closing parenthesis.

21. The system of claim 15, wherein the function opening and closing characters are right and left curly brackets or right and left square brackets.

* * * * *